(12) United States Patent
Liu et al.

(10) Patent No.: US 12,282,761 B2
(45) Date of Patent: Apr. 22, 2025

(54) APPLICATION MODULE STARTUP METHOD AND ELECTRONIC DEVICE

(71) Applicant: Honor Device Co., Ltd., Shenzhen (CN)

(72) Inventors: Xiaoqiang Liu, Shenzhen (CN); Junsong Gong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 149 days.

(21) Appl. No.: 18/003,871

(22) PCT Filed: Sep. 8, 2021

(86) PCT No.: PCT/CN2021/117295
§ 371 (c)(1),
(2) Date: Dec. 29, 2022

(87) PCT Pub. No.: WO2022/052962
PCT Pub. Date: Mar. 17, 2022

(65) Prior Publication Data
US 2023/0259346 A1 Aug. 17, 2023

(30) Foreign Application Priority Data

Sep. 10, 2020 (CN) .......................... 202010948973.3
Nov. 30, 2020 (CN) .......................... 202011377014.7

(51) Int. Cl.
*G06F 8/61* (2018.01)
(52) U.S. Cl.
CPC ...................................... *G06F 8/61* (2013.01)

(58) Field of Classification Search
CPC ..................................... G06F 8/61; G06F 8/60
(Continued)

(56) References Cited

U.S. PATENT DOCUMENTS 8,239,679 B2 8/2012 Shan
9,075,627 B2 7/2015 Seo et al.
(Continued)

FOREIGN PATENT DOCUMENTS

CN 1866215 A 11/2006
CN 101075874 A 11/2007
(Continued)

OTHER PUBLICATIONS

Cai, "A Control Method and Electronic Device", English translation CN 103699400 A. (Year: 2014).*

*Primary Examiner* — Thuy Dao
*Assistant Examiner* — Zengpu Wei
(74) *Attorney, Agent, or Firm* — Slater Matsil, LLP

(57) ABSTRACT

Disclosed are an application module startup method and an electronic device. When a first device needs to start an application module that is not installed and that is in an application on the first device or another device that is communicatively connected to the first device, a system module on the first device may query whether the application module is installed on the first device. When it is determined that the application module is not installed on the first device and/or another device, the system module on the first device may communicate with a first server, so that the system module on the first device may download, install, and start a first application module on the first device and/or another device based on a message sent from the first server.

19 Claims, 58 Drawing Sheets

(58) Field of Classification Search
USPC .......................................................... 717/174
See application file for complete search history.

(56) References Cited

U.S. PATENT DOCUMENTS

| | | |
|---|---|---|
| 9,397,889 B2 | 7/2016 | Han |
| 10,164,955 B1 | 12/2018 | Michael et al. |
| 11,190,523 B1 * | 11/2021 | McCracken ............ H04L 67/34 |
| 2007/0006220 A1 | 1/2007 | Han |
| 2009/0099864 A1 | 4/2009 | Cronrath et al. |
| 2012/0185759 A1 | 7/2012 | Helen et al. |
| 2018/0091301 A1 | 3/2018 | David et al. |
| 2018/0121185 A1 | 5/2018 | Yoshitomi et al. |
| 2018/0191865 A1 * | 7/2018 | De Gaetano ........ G06F 11/2048 |
| 2018/0316818 A1 | 11/2018 | Negoro |
| 2020/0151356 A1 | 5/2020 | Kurt |
| 2021/0026612 A1 * | 1/2021 | Cronrath ................ G16H 40/67 |
| 2022/0147641 A1 | 5/2022 | Xiwen et al. |
| 2023/0123223 A1 * | 4/2023 | Gong .................. H04L 67/1095 |
| | | 709/217 |

FOREIGN PATENT DOCUMENTS

| | | | |
|---|---|---|---|
| CN | 201518127 U | | 6/2010 |
| CN | 103699400 A | * | 4/2014 |
| CN | 103777962 A | | 5/2014 |
| CN | 105809045 A | | 7/2016 |
| CN | 110162389 A | | 8/2019 |
| CN | 111614698 A | | 9/2020 |
| CN | 111966373 A | | 11/2020 |
| CN | 112262548 A | | 1/2021 |
| CN | 112560058 A | | 3/2021 |
| CN | 112632593 A | | 4/2021 |
| CN | 113408016 A | | 9/2021 |
| EP | 2341428 A1 | | 7/2011 |
| EP | 2530950 A1 | | 12/2012 |

* cited by examiner

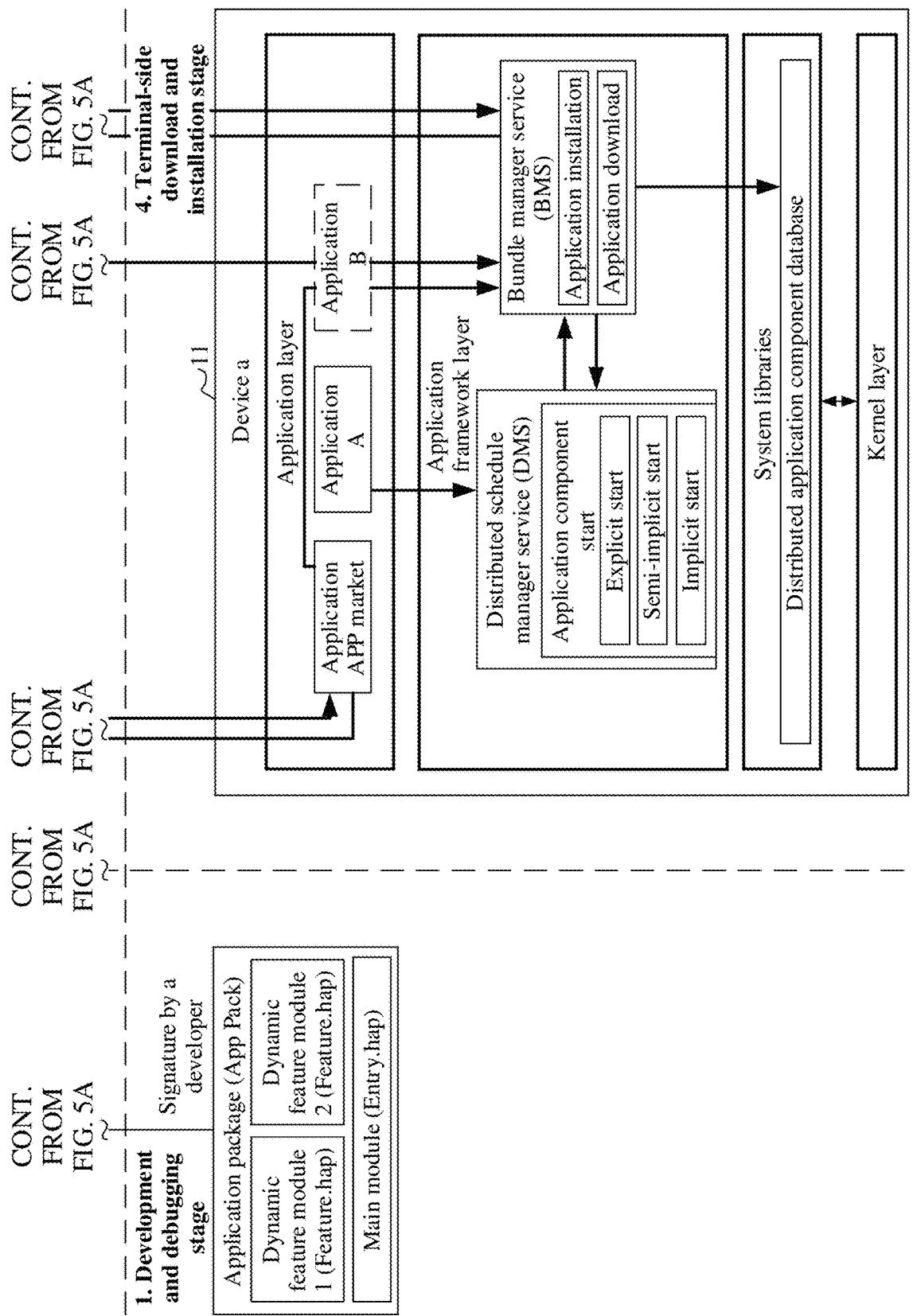

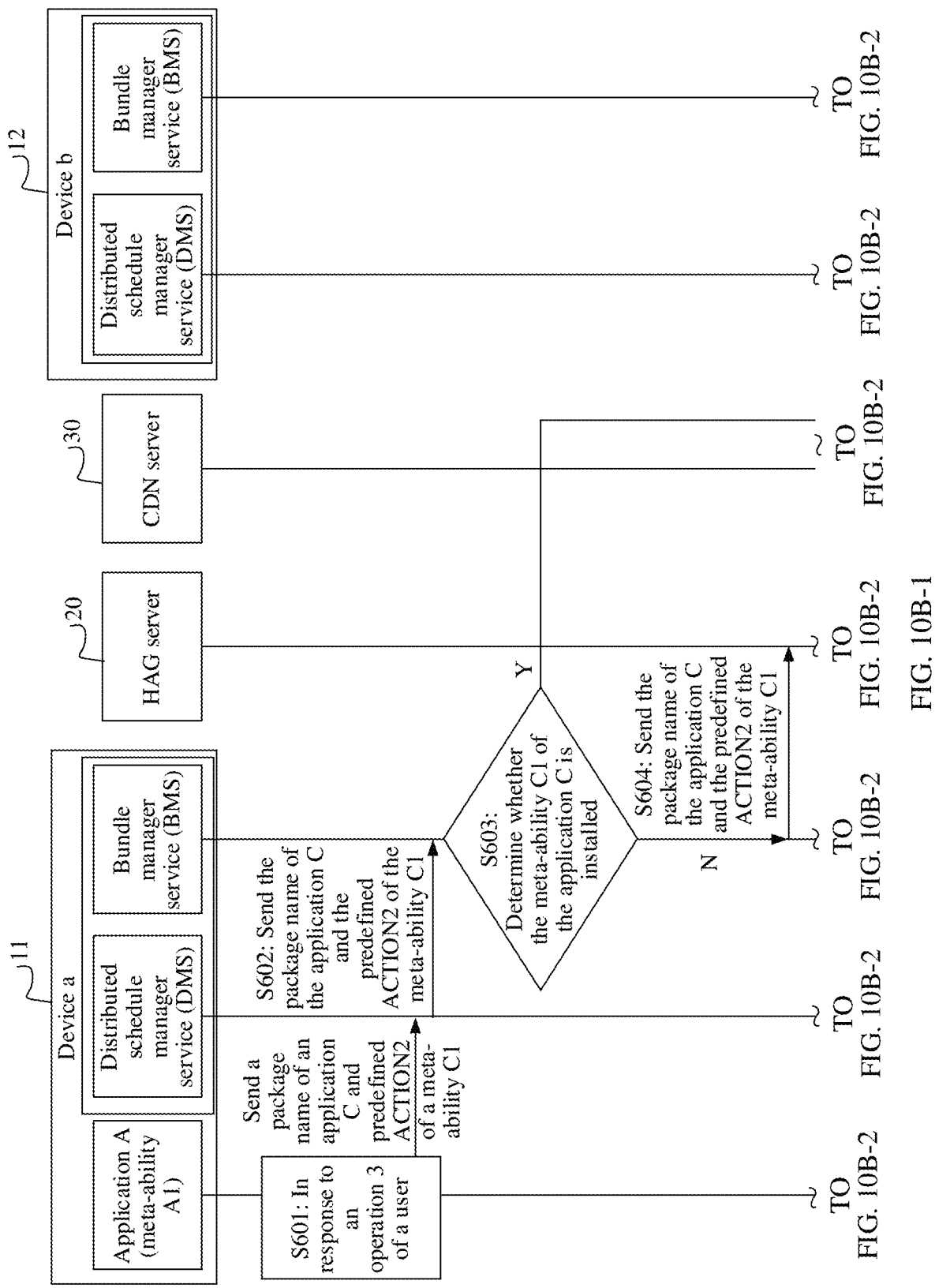

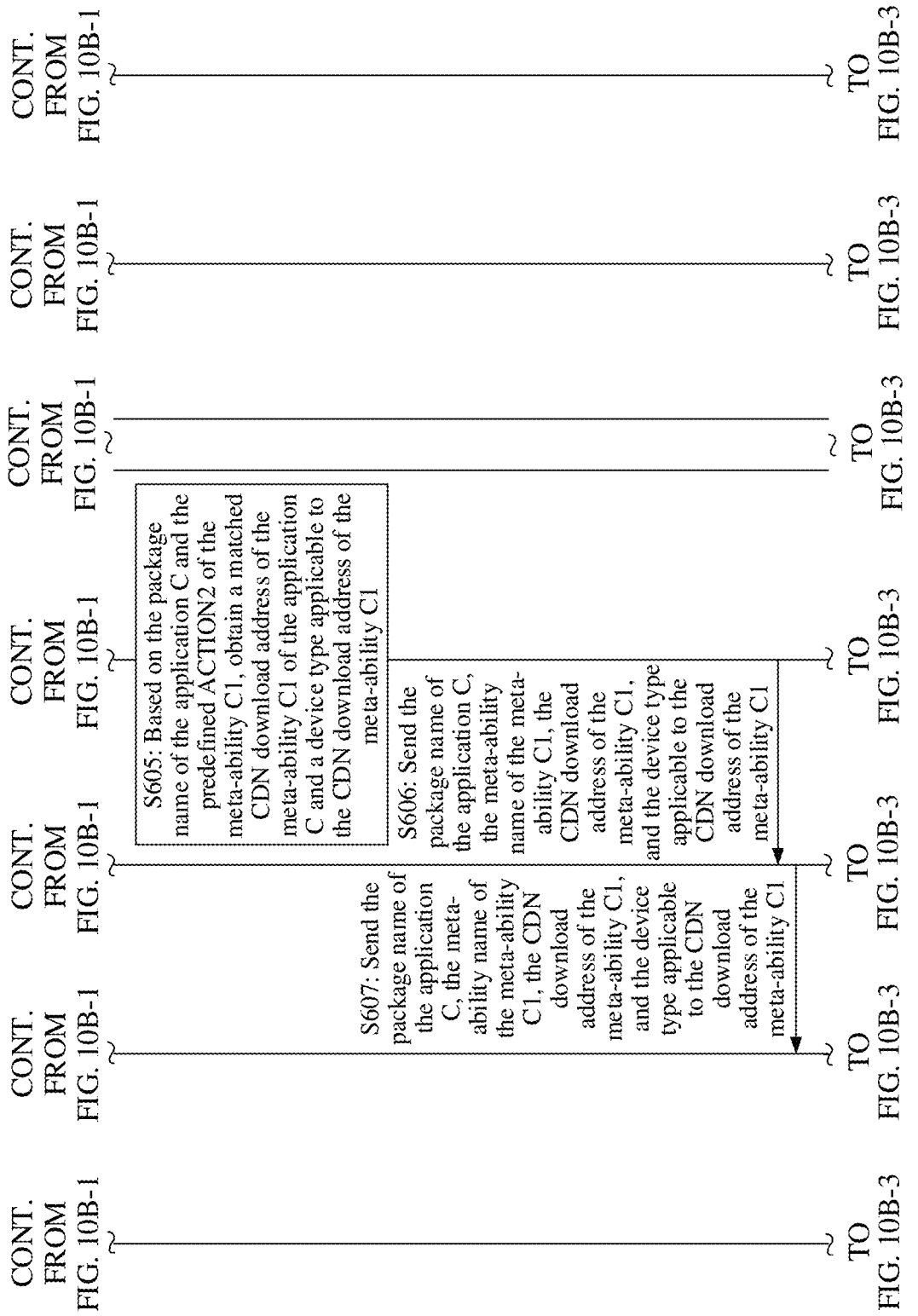

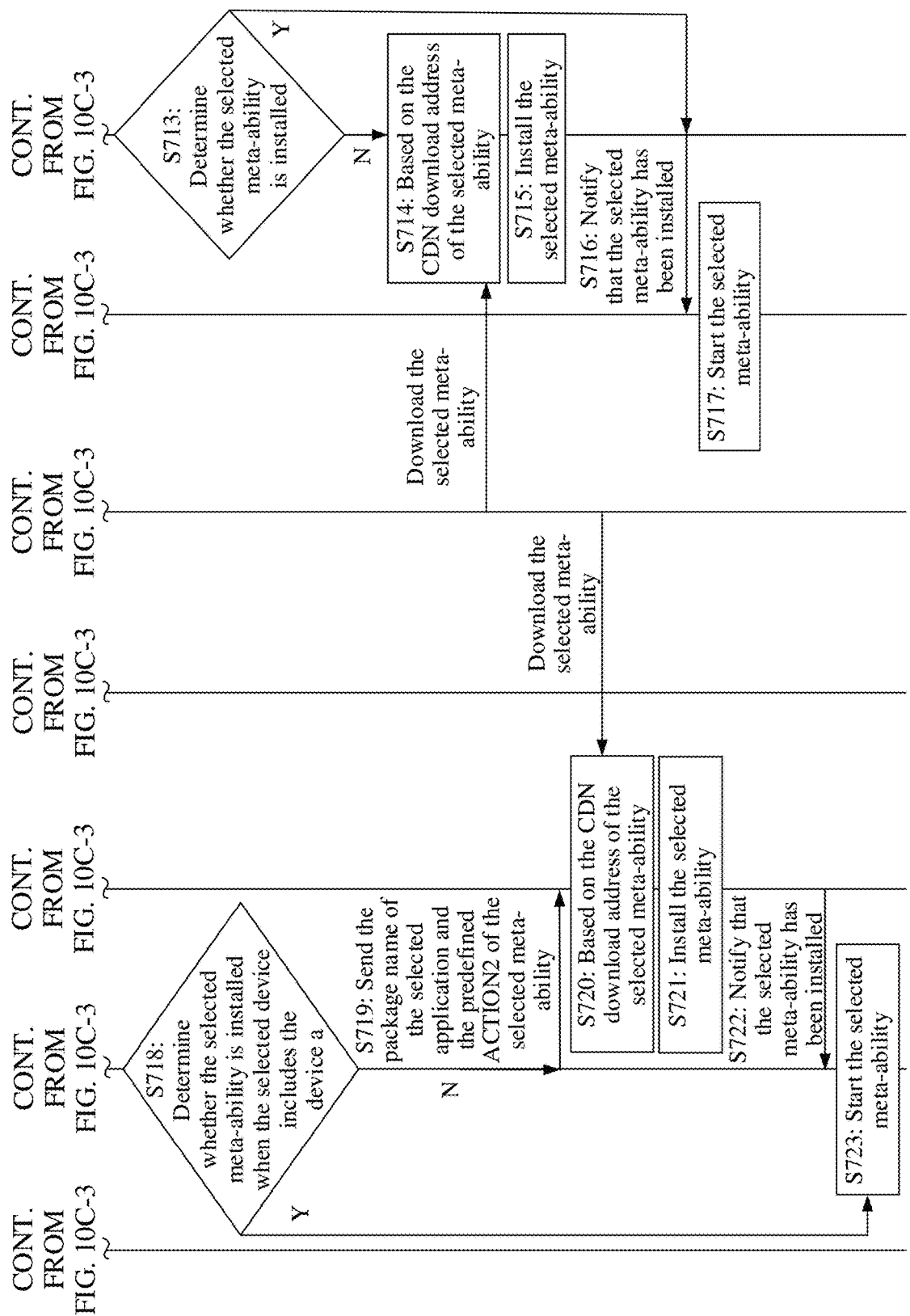

APPLICATION MODULE STARTUP METHOD AND ELECTRONIC DEVICE

CROSS-REFERENCE TO RELATED APPLICATIONS

This application is a national stage of International Application No. PCT/CN2021/117295, filed on Sep. 8, 2021, which claims priority to Chinese Patent Application No. 202010948973.3, filed on Sep. 10, 2020, and claims priority to Chinese Patent Application No. 202011377014.7, filed on Nov. 30, 2020. The disclosures of each of the aforementioned applications are hereby incorporated by reference in their entireties.

TECHNICAL FIELD

This application relates to the field of electronic technologies, and in particular, to an application module startup method and an electronic device.

BACKGROUND

An application usually includes a plurality of function implementations. After an application is installed on an electronic device, a user may use only some function implementations of the application, while most of the remaining function implementations are not used by the user. This may easily lead to a waste of storage space of the electronic device, and installation duration of the application is longer, which reduces user experience.

SUMMARY

This application provides an application module startup method and an electronic device, so as to start an application module that is not installed and that is in an application by using a system service in the electronic device, so that the electronic device does not need to install all application modules in the application, storage space of the electronic device is saved, function implementations of the application are enriched, and the electronic device is enabled to install more applications, thereby providing various applications to a user, and improving user experience.

According to a first aspect, this application provides an application module startup method, where the method is applied to a first device, and the first device includes a system module.

The method includes: The system module receives a first message, where the first message is associated with a first application module, and the first application module is a software module in a first application. In response to receiving the first message, the system module determines whether the first application module is installed on the first device. In response to determining that the first application module is not installed on the first device, the system module sends a second message to a first server, where the second message is used to download the first application module. The system module receives a third message from the first server, where the third message is a message that is associated with the first application module and that is obtained by the first server in response to receiving the second message. In response to receiving the third message, the system module downloads, installs, and starts the first application module on the first device.

For a specific implementation of the system module, refer to the description of the system service in this application. For a specific implementation of the application module, refer to a description of a meta-ability in this application. For the first server, refer to a description of a HAG server in this application. Details are not described herein.

In the method according to the first aspect, when the first device needs to start an application module that is not installed and that is in an application, the system module on the first device may query whether the application module is installed on the first device. When it is determined that the application module is not installed on the first device, the system module on the first device may communicate with the first server, so that the system module on the first device may download, install, and start a first application module on the first device based on a message sent from the first server. Therefore, on-demand download of the application module is implemented, so that when the application is installed on the first device for the first time, some application modules in the application may be selected, without installing all application modules in the application, storage space of the first device for installing the application is saved, and function implementations of the application are enriched, thereby providing more functions of the application to the user, further enabling the first device to install more types of applications, and enabling the user to use more types of applications.

In a possible design, the method specifically includes: The system module receives the third message from the first server, where the third message carries a download address of the first application module. In response to receiving the third message, the system module downloads the first application module from a second server. The system module installs the first application module on the first device, and starts the first application module.

For a specific implementation of the download address of the first application module, refer to a description of a CDN download address of the meta-ability in this application. For a specific implementation of the second server, refer to a description of a CDN server in this application. Details are not described herein.

Therefore, the system module on the first device may obtain the download address of the first application module from the first server. The system module on the first device downloads the first application module from the second server based on the download address of the first application module. The system module on the first device may install the first application module on the first device, and may start the first application module after the installation is completed. Therefore, the first server stores the download address of the application module, and the second server stores the application module, so that the system module on the first device interacts with both the first server and the second server, which enables the system module on the first device to successfully start the application module that is not installed.

In addition, in addition to the foregoing implementation of downloading the first application module, the first server may also pre-store the first application module, so that the system module on the first device may directly download the first application module from the first server.

In addition, when the system module on the first device starts the application module that is not installed on the first device, a developer may finish startup of the application module that is not installed by only allocating a corresponding interface for the system module to receive the first message, thereby reducing a quantity of interfaces between an application and the system service that are allocated by the developer, and reducing programming costs for the developer; and the developer does not need to integrate a Google Play Core (Google Play Core) Library into the application, thereby reducing configuration costs for the developer, and facilitating development of more meta-abilities for enriching use by the user.

In a possible design, the first device further includes a second application module, and the second application module is a software module in a second application. The method specifically includes: In response to receiving a first operation of a user, the second application module sends the first message to the system module.

In a possible design, the first application is the same as the second application. Therefore, on the first device, an installed application module in an application may trigger the system module to start an application module that is not installed and that is in the application, so that the system module on the first device downloads, installs, and starts, by using the first server, the application module that is not installed and that is in the application. Therefore, through mutual cooperation between different application modules in the same application, function implementations of the application module that is not installed can be completed, and on-demand download of the application module is implemented, which further enables the user to experience various functions when using an application, and improves user experience.

In a possible design, the first application is different from the second application. Therefore, on the first device, an installed application module in an application may trigger the system module to start an application module that is not installed and that is in another application, so that the system module on the first device downloads, installs, and starts, by using the first server, the application module that is not installed and that is in another application. Therefore, through mutual cooperation between application modules in different applications, function implementations of the application module that is not installed can be completed, and on-demand download of the application module is implemented, which further enables the user to experience functions of another application when using an application, and improves user experience.

In a possible design, the first device is communicatively connected to a second device. The method specifically includes: The system module receives the first message from the second device, where the first message is sent by the second device in response to receiving a second operation of the user, and the first message further carries a device identifier of the first device.

Therefore, the second device may trigger the system module on the first device to start an application module that is not installed and that is in an application, so that the user is unaware of a download process of the application module, and the application module does not need to be downloaded when the application which the application module belongs to is installed for the first time, thereby implementing on-demand download of the application module.

In a possible design, the method specifically includes: A distributed schedule manager service DMS in the system module receives the first message from a distributed schedule manager service DMS in the second device.

In a possible design, when the system module includes a distributed schedule manager service DMS and a bundle manager service BMS, the method specifically includes: The distributed schedule manager service DMS receives the first message, where the first message carries an identifier of the first application and a module identifier of the first application module. In response to receiving the first message, the distributed schedule manager service DMS sends a fourth message to the bundle manager service BMS, where the fourth message carries the identifier of the first application and the module identifier of the first application module. In response to receiving the fourth message, the bundle manager service BMS determines whether the first application module is installed on the first device. In response to determining that the first application module is not installed on the first device, the bundle manager service BMS sends the second message to the first server, where the second message carries the device identifier of the first device, the identifier of the first application, and the module identifier of the first application module. The bundle manager service BMS receives the third message from the first server, where the third message carries the download address of the first application module, the identifier of the first application, and the module identifier of the first application module. In response to receiving the third message, the bundle manager service BMS downloads the first application module from the second server based on the download address of the first application module, and installs the first application module on the first device. The bundle manager service BMS sends a fifth message to the distributed schedule manager service DMS, where the fifth message is used to notify the distributed schedule manager service DMS that the first application module has been installed on the first device. In response to receiving the fifth message, the distributed schedule manager service DMS starts the first application module.

For a specific implementation of the identifier of the application, refer to a description of a package name of the application in this application. For a specific implementation of the module identifier of the first application module, refer to a description of a meta-ability name of the meta-ability in this application. Details are not described herein.

Therefore, the system module on the first device may explicitly start an application module by using an identifier of an application and a module identifier of the application module, so that an application module that is not installed is automatically installed, and the user is unaware of a download process of the application module. The application module does not need to be downloaded when the application is installed for the first time, and may be downloaded on demand.

In a possible design, when the system module includes a distributed schedule manager service DMS and a bundle manager service BMS, the method specifically includes: The distributed schedule manager service DMS receives the first message, where the first message carries the identifier of the first application and an identifier of a type of the first application module. In response to receiving the first message, the distributed schedule manager service DMS sends a fourth message to the bundle manager service BMS, where the fourth message carries the identifier of the first application and the identifier of the type of the first application module. In response to receiving the fourth message, the bundle manager service BMS determines whether the first application module is installed on the first device. In response to determining that the first application module is not installed on the first device, the bundle manager service BMS sends the second message to the distributed schedule manager service DMS, where the second message carries the device identifier of the first device, the identifier of the first application, and the identifier of the type of the first application module. The bundle manager service BMS receives the third message from the first server, where the third message carries the download address of the first application module, the identifier of the first application, and the identifier of the type of the first application module. In response to receiving the third message, the bundle manager service BMS downloads the first application module from the second server based on the download address of the first application module, and installs the first application module on the first device. The bundle manager service BMS sends a fifth message to the distributed schedule manager service DMS, where the fifth message is used to notify the distributed schedule manager service DMS that the first application module has been installed on the first device. In response to receiving the fifth message, the distributed schedule manager service DMS starts the first application module.

For a specific implementation of the identifier of the first application, refer to a description of a package name of the application in this application. For a specific implementation of the identifier of the type of the first application module, refer to a description of a predefined ACTION of the meta-ability in this application. Details are not described herein.

Therefore, the system module on the first device may semi-implicitly start an application module by using an identifier of an application and an identifier of a type of the application module, fully considering that a third-party application vendor usually does not provide the identifier of the application module to other vendors, that is, there is no need to rely on the identifier of the application module. An application module that is not installed is further automatically installed, and the user is unaware of a download process of the application module. The application module does not need to be downloaded when the application is installed for the first time, and may be downloaded on demand.

In a possible design, when the system module includes a distributed schedule manager service DMS and a bundle manager service BMS, the method specifically includes: The distributed schedule manager service DMS receives the first message, where the first message carries the identifier of the type of the first application module. In response to receiving the first message, sending a fourth message to the bundle manager service BMS by the distributed schedule manager service DMS, where the fourth message carries the identifier of the type of the first application module. In response to receiving the fourth message, the bundle manager service BMS determines whether the first application module is installed on the first device. In response to determining that the first application module is not installed on the first device, the bundle manager service BMS sends the second message to the first server, where the second message carries the device identifier of the first device and the identifier of the type of the first application module. The bundle manager service BMS receives the third message from the first server, where the third message carries a first set, each subset in the first set carries an identifier of an application, a module identifier of a software module included in the application, and a download address of the software module, and a corresponding software module in each subset and the first application module are of a same type. In response to receiving the third message, the bundle manager service BMS downloads a selected software module from a second server based on a download address of the software module selected from the first set, and installs the selected software module on the first device. The bundle manager service BMS sends a fifth message to the distributed schedule manager service DMS, where the fifth message is used to notify the distributed schedule manager service DMS that the first application module has been installed on the first device. In response to receiving the fifth message, the distributed schedule manager service DMS starts the selected software module.

For a specific implementation of the identifier of the type of the first application module, refer to the description of the predefined ACTION in this application. Details are not described herein.

Therefore, the system module on the first device may implicitly start an application module by using an identifier of a type of the application module, fully considering that a third-party application vendor usually does not provide the identifier of the application module to other vendors, that is, there is no need to rely on the identifier of the application module. An application module that is not installed is further automatically installed, and the user is unaware of a download process of the application module. The application module does not need to be downloaded when the application is installed for the first time, and may be downloaded on demand.

In a possible design, the method further includes: In response to receiving the third message, the bundle manager service BMS sends a sixth message to the distributed schedule manager service DMS, where the sixth message carries the first set.

In response to receiving the sixth message, the distributed schedule manager service DMS determines the selected software module from the first set based on a preset rule. Alternatively, in response to receiving the sixth message, the distributed schedule manager service DMS displays a first window, where the first window includes controls corresponding to software modules in the first set; and in response to receiving a third operation of the user on a control corresponding to the selected software module in the first window, the distributed schedule manager service DMS determines the selected software module.

The distributed schedule manager service DMS sends a seventh message to the bundle manager service BMS, where the seventh message carries an identifier of an application which the selected software module belongs to and a module identifier of the selected software module. In response to receiving the seventh message, the bundle manager service BMS determines a download address of the selected software module from the first set based on the identifier of the application which the selected software module belongs to and the module identifier of the selected software module.

As such, the identifier of the type of the application module may correspond to a plurality of software modules. Therefore, the distributed schedule manager service DMS in the system module may determine a software module that the first device needs to start from the plurality of software modules based on the preset rule or a user's selection.

In a possible design, the method further includes: In response to determining that the first application module has installed on the first device, the system module starts the first application module. Therefore, various situations of whether the application module is installed on the first device are fully considered, and integrity of the solution is ensured.

In a possible design, the first device is communicatively connected to a third device. The method further includes: The system module sends an eighth message to the third device, where the eighth message is used to request the third device to start a third application module, the third application module is a software module in a third application, and the third application module is not installed on the third device; and the eighth message carries a device identifier of the third device, an identifier of the third application, and a module identifier of the third application module, or the eighth message carries a device identifier of the third device, an identifier of the third application, and an identifier of a type of the third application module, or the eighth message carries a device identifier of the third device and an identifier of a type of the third application module.

Therefore, the first device can trigger a system module in the third device to start an application module that is not installed on the third device, so that the first device can not only start an application module that is not installed on the first device, but also control another device to start the application module that is not installed on the third device, thereby increasing implementation functions of the first device.

In a possible design, the method specifically includes: The distributed schedule manager service DMS in the system module sends the eighth message to a distributed schedule manager service DMS in the third device.

According to a second aspect, this application provides an application module startup method, where the method is applied to a first device, the first device includes a fourth application module and a system module, the fourth application module is a software module in a fourth application, and the first device is communicatively connected to a fourth device.

The method includes: In response to receiving a fourth operation of a user, the fourth application module sends a ninth message to the system module, where the ninth message is associated with a fifth application module, the fifth application module is a software module in a fifth application, and the fourth application is different from the fifth application. In response to receiving the ninth message, the system module determines whether the fifth application module is installed on the first device and the fourth device. In response to determining that the fifth application module is not installed on the first device and the fourth device, the system module sends a tenth message to a first server, where the tenth message is used to download the fifth application module. The system module receives an eleventh message from the first server, where the eleventh message is a message that is associated with the fifth application module and that is obtained by the first server in response to receiving the tenth message. In response to receiving the eleventh message, the system module downloads, installs, and starts the fifth application module on the first device and/or the fourth device.

For a specific implementation of the system module, refer to the description of the system service in this application. For a specific implementation of the application module, refer to a description of a meta-ability in this application. For the first server, refer to a description of a HAG server in this application. Details are not described herein. In addition, that the first device is communicatively connected to a fourth device may be understood as that the first device and the fourth device are in a same distributed network.

In the method according to the second aspect, an application module that has been installed on the first device can trigger the system module on the first device to start a fifth application module that is not installed and that is in a selected device in a same distributed network, and the system module on the first device can query whether the fifth application module is installed on all devices in the same distributed network. When it is determined that no fifth application module is installed on all the devices in the same distributed network, the system module on the first device may communicate with a first server, so that the system module on the first device may download, install, and start the fifth application module in the selected device in the same distributed network based on a message sent from the first server. Therefore, through linkage between the devices in the same distributed network, on-demand download of the application module is implemented, so that when the application is installed in a device in the same distributed network for the first time, some application modules in the application may be selected, without installing all application modules in the application, storage space of the device in the same distributed network for installing the application is saved, and function implementations of the application are enriched, thereby providing more functions of the application to the user, further enabling the device in the same distributed network to install more types of applications, and enabling the user to use more types of applications.

In a possible design, the method specifically includes: The system module receives the eleventh message from the first server, where the eleventh message carries a download address of the fifth application module and a device type applicable to the download address of the fifth application module. In response to receiving the eleventh message, the system module determines whether the device type applicable to the download address of the fifth application module includes the first device and the fourth device.

In response to determining that the device type applicable to the download address of the fifth application module includes the first device, the system module downloads the fifth application module from a second server based on the download address of the fifth application module, installs the fifth application module on the first device, and starts the fifth application module on the first device.

Alternatively, in response to determining that the device type applicable to the download address of the fifth application module includes the fourth device, the system module sends a twelfth message to the fourth device, where the twelfth message is used to request the fourth device to start the fifth application module, and the twelfth message carries the download address of the fifth application module.

Alternatively, in response to determining that the device type applicable to the download address of the fifth application module includes the first device and the fourth device, the system module displays a second window, where the second window includes a control corresponding to the first device and a control corresponding to the fourth device; in response to receiving a fifth operation of the user on the control corresponding to the first device in the second window, the system module downloads the fifth application module from a second server based on the download address of the fifth application module, installs the fifth application module on the first device, and starts the fifth application module on the first device; and/or, in response to receiving a fifth operation of the user on the control corresponding to the fourth device in the second window, the system module sends a twelfth message to the fourth device, where the twelfth message is used to request the fourth device to start the fifth application module, and the twelfth message carries the download address of the fifth application module.

For a specific implementation of the download address of the fifth application module, refer to a description of a CDN download address of the meta-ability in this application. For a specific implementation of the second server, refer to a description of a CDN server in this application. For the device type applicable to the download address of the fifth application module, refer to a description of a device type applicable to a download address of the meta-ability in this application. Details are not described herein.

Therefore, the system module on the first device may obtain the download address of the fifth application module from the first server. The system module on the first device downloads the fifth application module from the second server based on the download address of the fifth application module. In addition, the system module on the first device determines a device that needs to start the fifth application module from the first device and the fourth device based on the device type applicable to the download address of the fifth application module. Therefore, the system module on the first device can implement a process of starting the fifth application module on the first device and/or the fourth device. It may be learned that, the first server stores the download address of the application module, and the second server stores the application module, so that the system module on the first device interacts with both the first server and the second server, which enables the system module on the first device to successfully start the application module that is not installed.

In addition, in addition to the foregoing implementation of downloading the fifth application module, the first server may also pre-store the fifth application module, so that the system module on the first device may directly download the fifth application module from the first server.

In a possible design, when the system module includes a distributed schedule manager service DMS and a bundle manager service BMS, the method specifically includes: In response to receiving the fourth operation, the fourth application module sends the ninth message to the distributed schedule manager service DMS, where the ninth message carries an identifier of the fifth application and a module identifier of the fifth application module. In response to receiving the ninth message, the distributed schedule manager service DMS sends a thirteenth message to the bundle manager service BMS, where the thirteenth message carries the identifier of the fifth application and the module identifier of the fifth application module. In response to receiving the thirteenth message, the bundle manager service BMS determines whether the fifth application module is installed on the first device and the fourth device. In response to determining that the fifth application module is not installed on the first device and the fourth device, the bundle manager service BMS sends the tenth message to the first server, where the tenth message carries the identifier of the fifth application and the module identifier of the fifth application module. The bundle manager service BMS receives the eleventh message from the first server, where the eleventh message carries the download address of the fifth application module, the device type applicable to the download address of the fifth application module, the identifier of the fifth application, and the module identifier of the fifth application module. In response to receiving the eleventh message, the bundle manager service BMS sends a fourteenth message to the distributed schedule manager service DMS, where the fourteenth message carries the download address of the fifth application module, the device type applicable to the download address of the fifth application module, the identifier of the fifth application, and the module identifier of the fifth application module. In response to receiving the fourteenth message, the distributed schedule manager service DMS determines whether the device type applicable to the fifth application module includes the first device and the fourth device.

In response to determining that the device type applicable to the download address of the fifth application module includes the first device, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; and in response to receiving the sixteenth message, the distributed schedule manager service DMS starts the fifth application module on the first device.

Alternatively, in response to determining that the device type applicable to the download address of the fifth application module includes the fourth device, the distributed schedule manager service DMS sends a twelfth message to a distributed schedule manager service DMS in the fourth device, where the twelfth message is used to request the fourth device to start the fifth application module, and the twelfth message carries the download address of the fifth application module, a device identifier of the fourth device, the identifier of the fifth application, and the module identifier of the fifth application module.

Alternatively, in response to determining that the device type applicable to the download address of the fifth application module includes the first device and the fourth device, the distributed schedule manager service DMS displays a second window, where the second window includes a control corresponding to the first device and a control corresponding to the fourth device; in response to receiving a fifth operation of the user on the control corresponding to the first device in the second window, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; in response to receiving the sixteenth message, starting the fifth application module on the first device by the distributed schedule manager service DMS; and/or, in response to receiving a fifth operation of the user on the control corresponding to the fourth device in the second window, the distributed schedule manager service DMS sends the twelfth message to a distributed schedule manager service DMS in the fourth device, where the twelfth message is used to request the fourth device to start the fifth application module, and the twelfth message carries the download address of the fifth application module, the device identifier of the fourth device, the identifier of the fifth application, and the module identifier of the fifth application module.

For a specific implementation of the identifier of the application, refer to a description of a package name of the application in this application. For a specific implementation of the module identifier of the fifth application module, refer to a description of a meta-ability name of the meta-ability in this application. Details are not described herein.

Therefore, the system module on the first device may explicitly start an application module on the first device and/or the fourth device in the same distributed network by using an identifier of an application and a module identifier of the application module, so that an application module that is not installed is automatically installed, and the user is unaware of a download process of the application module. The application module does not need to be downloaded when the application is installed for the first time, and may be downloaded on demand.

In a possible design, when the system module includes a distributed schedule manager service DMS and a bundle manager service BMS, the method specifically includes: In response to receiving the fourth operation, the fourth application module sends the ninth message to the distributed schedule manager service DMS, where the ninth message carries the identifier of the fifth application and an identifier of a type of the fifth application module. In response to receiving the ninth message, the distributed schedule manager service DMS sends a thirteenth message to the bundle manager service BMS, where the thirteenth message carries the identifier of the fifth application and the identifier of the type of the fifth application module. In response to receiving the thirteenth message, the bundle manager service BMS determines whether the fifth application module is installed on the first device and the fourth device. In response to determining that the fifth application module is not installed on the first device and the fourth device, the bundle manager service BMS sends the tenth message to the first server, where the tenth message carries the identifier of the fifth application and the identifier of the type of the fifth application module. The bundle manager service BMS receives the eleventh message from the first server, where the eleventh message carries the download address of the fifth application module, the device type applicable to the download address of the fifth application module, the identifier of the fifth application, and the identifier of the type of the fifth application module. In response to receiving the eleventh message, the bundle manager service BMS sends a fourteenth message to the distributed schedule manager service DMS, where the fourteenth message carries the download address of the fifth application module, the device type applicable to the download address of the fifth application module, the identifier of the fifth application, and the identifier of the type of the fifth application module. In response to receiving the fourteenth message, the distributed schedule manager service DMS determines whether the device type applicable to the download address of the fifth application module includes the first device and the fourth device.

In response to determining that the device type applicable to the download address of the fifth application module includes the first device, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; and in response to receiving the sixteenth message, the distributed schedule manager service DMS starts the fifth application module on the first device.

Alternatively, in response to determining that the device type applicable to the download address of the fifth application module includes the fourth device, the distributed schedule manager service DMS sends a twelfth message to a distributed schedule manager service DMS in the fourth device, where the twelfth message is used to request the fourth device to start the fifth application module, and the twelfth message carries the download address of the fifth application module, a device identifier of the fourth device, the identifier of the fifth application, and the identifier of the type of the fifth application module.

Alternatively, in response to determining that the device type applicable to the download address of the fifth application module includes the first device and the fourth device, the distributed schedule manager service DMS displays a second window, where the second window includes a control corresponding to the first device and a control corresponding to the fourth device; in response to receiving a fifth operation of the user on the control corresponding to the first device in the second window, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; in response to receiving the sixteenth message, starting the fifth application module on the first device by the distributed schedule manager service DMS; and/or, in response to receiving a fifth operation of the user on the control corresponding to the fourth device in the second window, the distributed schedule manager service DMS sends the twelfth message to a distributed schedule manager service DMS in the fourth device, where the twelfth message is used to request the fourth device to start the fifth application module, and the twelfth message carries the download address of the fifth application module, the device identifier of the fourth device, the identifier of the fifth application, and the identifier of the type of the fifth application module.

For a specific implementation of the identifier of the first application, refer to a description of a package name of the application in this application. For a specific implementation of the identifier of the type of the fifth application module, refer to a description of a predefined ACTION of the meta-ability in this application. Details are not described herein.

Therefore, the system module on the first device may semi-implicitly start an application module on the first device and/or the fourth device in the same distributed network by using an identifier of an application and an identifier of a type of the application module, fully considering that a third-party application vendor usually does not provide the identifier of the application module to other vendors, that is, there is no need to rely on the identifier of the application module. An application module that is not installed is further automatically installed, and the user is unaware of a download process of the application module. The application module does not need to be downloaded when the application is installed for the first time, and may be downloaded on demand.

In a possible design, when the system module includes a distributed schedule manager service DMS and a bundle manager service BMS, the method specifically includes: In response to receiving the fourth operation, the fourth application module sends the ninth message to the distributed schedule manager service DMS, where the ninth message carries the identifier of the type of the fifth application module. In response to receiving the ninth message, the distributed schedule manager service DMS sends a thirteenth message to the bundle manager service BMS, where the thirteenth message carries the identifier of the type of the fifth application module. In response to receiving the thirteenth message, the bundle manager service BMS determines whether the fifth application module is installed on the first device and the fourth device. In response to determining that the fifth application module is not installed on the first device and the fourth device, the bundle manager service BMS sends the tenth message to the first server, where the tenth message carries the identifier of the type of the fifth application module. The bundle manager service BMS receives the eleventh message from the first server, where the eleventh message carries a second set, each subset in the second set carries an identifier of an application, a module identifier of a software module included in the application, and a device type applicable to a download address of the software module, and a corresponding software module in each subset and the fifth application module are of a same type. In response to receiving the eleventh message, the bundle manager service BMS sends a fourteenth message to the distributed schedule manager service DMS, where the fourteenth message carries the second set. In response to receiving the fourteenth message, the distributed schedule manager service DMS determines whether the device type applicable to the download address of the fifth application module in the second set includes the first device and the fourth device.

In response to determining that the device type applicable to the download address of the fifth application module in the second set includes the first device, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; and in response to receiving the sixteenth message, the distributed schedule manager service DMS starts the fifth application module on the first device.

Alternatively, in response to determining that the device type applicable to the download address of the fifth application module in the second set includes the fourth device, the distributed schedule manager service DMS sends a twelfth message to a distributed schedule manager service DMS in the fourth device, where the twelfth message is used to request the fourth device to start the fifth application module, and the twelfth message carries the download address of the fifth application module, a device identifier of the fourth device, the identifier of the fifth application, and the identifier of the type of the fifth application module.

Alternatively, in response to determining that the device type applicable to the download address of the fifth application module in the second set includes the first device and the fourth device, the distributed schedule manager service DMS displays a second window, where the second window includes a control corresponding to the first device and a control corresponding to the fourth device; in response to receiving a fifth operation of the user on the control corresponding to the first device in the second window, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; in response to receiving the sixteenth message, starting the fifth application module on the first device by the distributed schedule manager service DMS; and/or, in response to receiving a fifth operation of the user on the control corresponding to the fourth device in the second window, the distributed schedule manager service DMS sends the twelfth message to a distributed schedule manager service DMS in the fourth device, where the twelfth message is used to request the fourth device to start the fifth application module, and the twelfth message carries the download address of the fifth application module, the device identifier of the fourth device, the identifier of the fifth application, and the identifier of the type of the fifth application module.

For a specific implementation of the identifier of the type of the fifth application module, refer to the description of the predefined ACTION in this application. Details are not described herein.

Therefore, the system module on the first device may implicitly start an application module on the first device and/or the fourth device in the same distributed network by using an identifier of a type of the application module, fully considering that a third-party application vendor usually does not provide the identifier of the application module to other vendors, that is, there is no need to rely on the identifier of the application module. An application module that is not installed is further automatically installed, and the user is unaware of a download process of the application module. The application module does not need to be downloaded when the application is installed for the first time, and may be downloaded on demand.

In a possible design, the method further includes: In response to determining that the fifth application module has been installed on the first device, and the fifth application module is not installed on the fourth device, the system module starts the fifth application module on the first device module.

Alternatively, in response to determining that the fifth application module is not installed on the first device, and the fifth application module has been installed on the fourth device, the system module sends a seventeenth message to the fourth device, where the seventeenth message is used to request the fourth device to start the fifth application module.

Alternatively, in response to determining that the fifth application module has been installed on both the first device and the fourth device, the system module displays a third window, where the third window includes a control corresponding to the first device and a control corresponding to the fourth device; in response to receiving a sixth operation of the user on the control corresponding to the first device in the third window, the system module downloads the fifth application module from a second server based on the download address of the fifth application module, installs the fifth application module on the first device, and starts the fifth application module on the first device; and/or, in response to receiving a sixth operation of the user on the control corresponding to the fourth device in the third window, the system module sends a seventeenth message to the fourth device, where the seventeenth message is used to request the fourth device to start the fifth application module.

Therefore, various situations of whether the fifth application module is installed on the first device and the fourth device are fully considered, and integrity of the solution is ensured.

According to a third aspect, this application provides an electronic device, including a memory and a processor, where the memory is configured to store program instructions; and the processor is configured to invoke the program instructions in the memory, so that the electronic device performs the application module startup method according to any one of the first aspect or the possible designs of the first aspect; or the processor is configured to invoke the program instructions in the memory, so that the electronic device performs the application module startup method according to any one of the second aspect or the possible designs of the second aspect.

According to a fourth aspect, this application provides a chip system, where the chip system is applied to an electronic device including a memory, a display, and a sensor; the chip system includes a processor; and when the processor executes computer instructions stored in the memory, the electronic device performs the application module startup method according to any one of the first aspect or the possible designs of the first aspect; or the electronic device performs the application module startup method according to any one of the second aspect or the possible designs of the second aspect.

According to a fifth aspect, this application provides a computer readable storage medium storing a computer program, where when the computer program is executed by a processor, an electronic device is enabled to implement the application module startup method according to any one of the first aspect or the possible designs of the first aspect; or when the computer program is executed by a processor, an electronic device is enabled to implement the application module startup method according to any one of the second aspect or the possible designs of the second aspect.

According to a sixth aspect, this application provides a computer program product, including executable instructions, where the executable instructions are stored in a readable storage medium, at least one processor of an electronic device can read the executable instructions from the readable storage medium, and the at least one processor executes the executable instructions to enable the electronic device to implement the application module startup method according to any one of the first aspect or the possible designs of the first aspect; or the at least one processor executes the executable instructions to enable the electronic device to implement the application module startup method according to any one of the second aspect or the possible designs of the second aspect.

BRIEF DESCRIPTION OF THE DRAWINGS

FIG. 5A and FIG. 5B are a schematic diagram of each stage of an application according to an embodiment of this application;

FIG. 7A-1 and FIG. 7A-2 to FIG. 7C-1 and FIG. 7C-2 are schematic flowcharts of an application module startup method according to an embodiment of this application;

FIG. 10A-1-FIG. 10A-4 to FIG. 10C-1-FIG. 10C-4 are schematic flowcharts of an application module startup method according to an embodiment of this application;

FIG. 13A-1 and FIG. 13A-2 to FIG. 13C-1 and FIG. 13C-2 are schematic flowcharts of an application module startup method according to an embodiment of this application;

DETAILED DESCRIPTION OF ILLUSTRATIVE EMBODIMENTS

In this application, "at least one" means one or more, and "a plurality of" means two or more. "And/or", which describes an association relationship between associated objects, represents that three relationships may exist. For example, A and/or B may represent the following cases: Only A exists, both A and B exist, and only B exists. A and B may be singular or plural. The character "/" generally represents that there is an "or" relationship between the associated objects. "At least one of the following items" or an expression similar thereto means any combination of these items, including a single item or any combination of plural items. For example, at least one of only a, only b, or only c may mean: only a, only b, only c, a combination of a and b, a combination of a and c, a combination of b and c, or a combination of a, b, and c, where a, b, and c may be singular or plural. In addition, the terms "first" and "second" are used for description only, and cannot be construed as indicating or implying relative importance.

In this application, an electronic device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), a smart TV, a smart screen, a high definition television, an ultra high definition television, a smart speaker, a smart projector, or the like. A specific type of the electronic device is not limited in this application.

Using an electronic device being a mobile phone as an example, an electronic device according to this application is described below with reference to FIG. 1.

Figure 1:
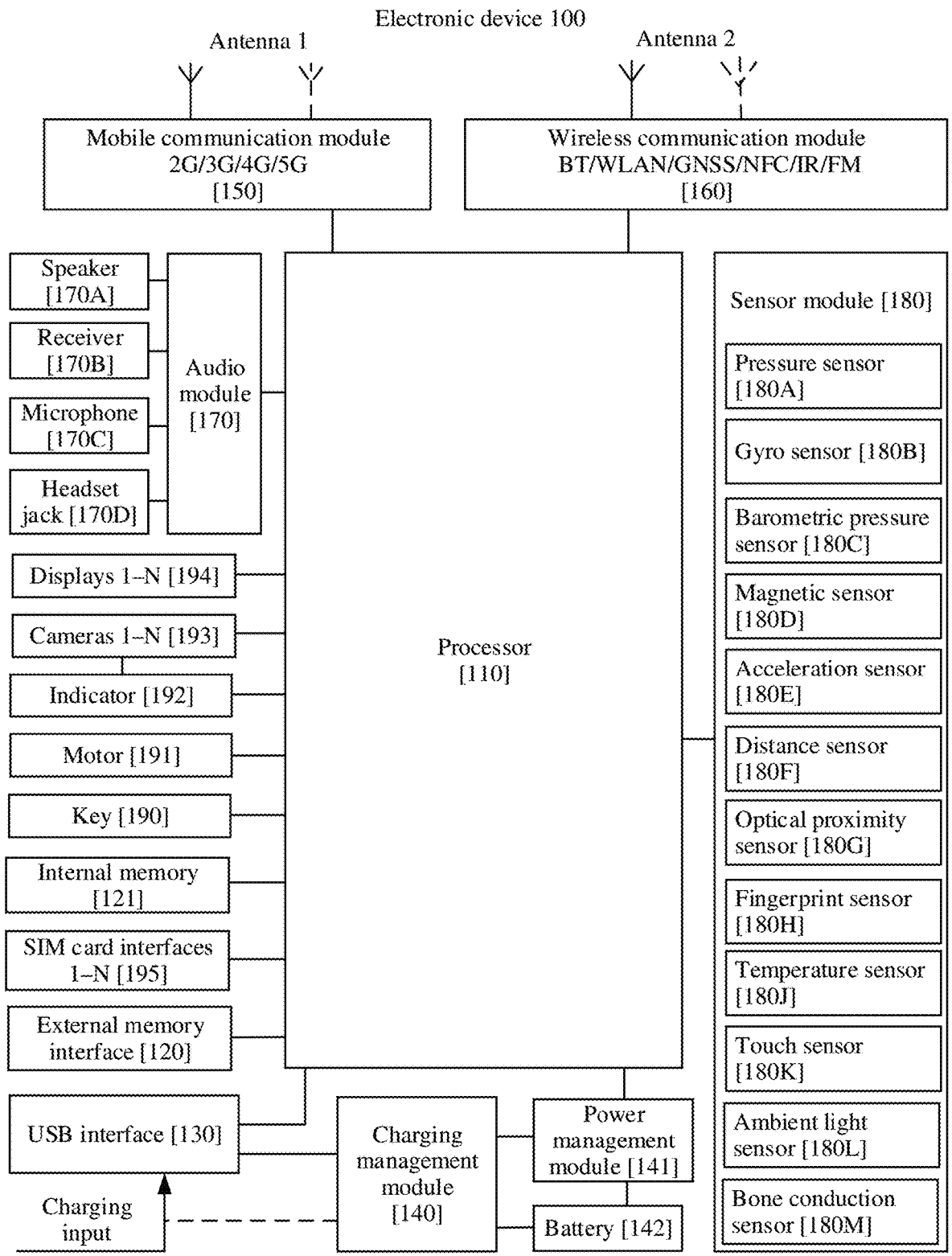
FIG. 1 is a schematic diagram of a structure of an electronic device according to an embodiment of this application.

FIG. 1 is a schematic diagram of a structure of an electronic device according to an embodiment of this application. As shown in FIG. 1, the electronic device 100 may include a processor no, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this application does not constitute a specific limitation on the electronic device 100. In some other embodiments, the electronic device 100 may include more or fewer components than those shown in the figure, or combine some components, or split some components, or have different component arrangements. The illustrated components may be implemented by using hardware, software or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated in one or more processors.

The controller may be a nerve center and a command center of the electronic device 100. The controller may generate an operation control signal based on an instruction operation code and a timing signal, and read an instruction and control execution of instructions.

A memory may be further disposed in the processor no to store instructions and data. In some embodiments, the memory in the processor no is a cache. The memory may store instructions or data that the processor no has just used or recycled. If the processor no needs to use the instructions or data again, the instructions or data may be directly invoked from the memory. Repeated access is avoided, and a waiting time of the processor no is reduced, thereby improving efficiency of a system.

In some embodiments, the processor no may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The I2C interface is a bidirectional synchronous serial bus, which includes a serial data line (serial data line, SDA) and a serial clock line (serial clock line, SCL). In some embodiments, the processor no may include a plurality of groups of I2C buses. The processor no may be coupled to the touch sensor 180K, a charger, a flash, the camera 193, and the like by using different I2C bus interfaces. For example, the processor no may be coupled to the touch sensor 180K by using the I2C interface, so that the processor no communicates with the touch sensor 180K by using the I2C bus interface to implement a touch function of the electronic device 100.

The I2S interface may be used for audio communication. In some embodiments, the processor no may include a plurality of groups of I2S buses. The processor no may be coupled to the audio module 170 by using the I2S bus, so as to implement communication between the processor no and the audio module 170. In some embodiments, the audio module 170 may transmit an audio signal to the wireless communication module 160 by using the I2S interface, to implement a function of answering a phone by using a Bluetooth headset.

The PCM interface may also be used for audio communication, to sample, quantize and code analog signals. In some embodiments, the audio module 170 may be coupled to the wireless communication module 160 by using a PCM bus interface. In some embodiments, the audio module 170 may also transmit an audio signal to the wireless communication module 160 by using the PCM interface, to implement a function of answering a phone by using a Bluetooth headset. The I2S interface and the PCM interface may be both used for audio communication.

The UART interface is a universal serial data bus, which is used for asynchronous communication. The bus may be a bidirectional communication bus, and converts to-be-transmitted data between serial communication and parallel communication. In some embodiments, the UART interface is usually configured to connect the processor no to the wireless communication module 160. For example, the processor no communicates with a Bluetooth module in the wireless communication module 160 by using the UART interface to implement a Bluetooth function. In some embodiments, the audio module 170 may transmit an audio signal to the wireless communication module 160 by using the UART interface, to implement a function of playing music by using a Bluetooth headset.

The MIPI interface may be configured to connect the processor no to peripheral devices such as the display 194 and the camera 193. The MIPI interface includes a camera serial interface (camera serial interface, CSI), a display serial interface (display serial interface, DSI), and the like. In some embodiments, the processor no and the camera 193 communicate with each other by using the CSI to implement a photographing function of the electronic device 100. The processor 110 and the display 194 communicate with each other by using the DSI to implement a display function of the electronic device 100.

The GPIO interface may be configured by software. The GPIO interface may be configured as a control signal or a data signal. In some embodiments, the GPIO interface may be configured to connect the processor no to the camera 193, the display 194, the wireless communication module 160, the audio module 170, the sensor module 180, and the like. The GPIO interface may also be configured as an I2C interface, an I2S interface, a UART interface, a MIPI interface, or the like.

The USB interface 130 is an interface conforming to a USB standard specification, and may specifically be a Mini USB interface, a Micro USB interface, a USB Type C interface, or the like. The USB interface 130 may be configured to connect the charger to charge the electronic device 100, or may be configured to transmit data between the electronic device 100 and a peripheral device, or may be configured to connect a headset, to play audio by using the headset. The interface may alternatively be configured to connect another electronic device, such as an AR device.

It may be understood that an interface connection relationship between modules illustrated in this application is only a schematic illustration, and does not constitute a structural limitation to the electronic device 100. In some other embodiments, the electronic device 100 may use different interface connection manners in the foregoing embodiments, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device 100. While charging the battery 142, the charging management module 140 may also supply power to the electronic device by using the power management module 141.

The power management module 141 is configured to connect the battery 142, the charging management module 140, and the processor 110. The power management module 141 receives an input from the battery 142 and/or an input from the charging management module 140, and supplies power to the processor 110, the internal memory 121, an external memory, the display 194, the camera 193, the wireless communication module 160, and the like. The power management module 141 may be further configured to monitor parameters such as a battery capacity, a quantity of battery cycles, and a battery health status (electric leakage or impedance). In some other embodiments, the power management module 141 may also be disposed in the processor 110. In some other embodiments, the power management module 141 and the charging management module 140 may be disposed in a same device.

A wireless communication function of the electronic device 100 may be implemented by using an antenna 1, an antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover a single or a plurality of communication bands. Different antennas may be further multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a wireless communication solution that is applied to the electronic device 100, including 2G/3G/4G/5G and the like. The mobile communication module 150 may include at least one filter, a switch, a power amplifier, a low noise amplifier (low noise amplifier, LNA), and the like. The mobile communication module 150 may receive electromagnetic waves by using the antenna 1, perform processing such as filtering and amplification on the received electromagnetic waves, and transmit the electromagnetic waves to the modem processor for demodulation. The mobile communication module 150 may further amplify a signal modulated by the modem processor and convert, by using the antenna 1, the signal into electromagnetic waves for radiation. In some embodiments, at least some functional modules of the mobile communication module 150 may be disposed in the processor no. In some embodiments, at least some functional modules of the mobile communication module 150 may be disposed in a same device as at least some modules of the processor no.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then the demodulator transmits the demodulated low-frequency baseband signal to the baseband processor for processing. The low-frequency baseband signal is processed by the baseband processor and then transmitted to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor no, and is disposed in a same device as the mobile communication module 150 or another functional module.

The wireless communication module 160 may provide a wireless communication solution that is applied to the electronic device 100, including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more devices integrating at least one communication processing module. The wireless communication module 160 receives electromagnetic waves by using the antenna 2, performs frequency modulation and filtering on an electromagnetic wave signal, and sends the processed signal to the processor 110. The wireless communication module 160 may further receive a to-be-sent signal from the processor 110, perform frequency modulation and amplification on the signal, and convert, by using the antenna 2, the signal into electromagnetic waves for radiation.

In some embodiments, the antenna 1 of the electronic device 100 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, a WLAN, NFC, FM, and/or an IR technology, and the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and connects the display 194 to the application processor. The GPU is configured to perform mathematical and geometric calculations for graphics rendering. The processor 110 may include one or more GPUs, where the one or more GPUs execute program instructions to generate or change display information.

The display 194 is configured to display an image, a video, and the like. The display 194 includes a display panel. The display may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a MiniLED, a MicroLED, a Micro-OLED, quantum dot light-emitting diodes (quantum dot light-emitting diodes, QLEDs), and the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera by using a lens, an optical signal is converted into an electrical signal, and the electrical signal is transmitted by the photosensitive element of the camera to the ISP for processing and converted into an image visible to a naked eye. The ISP may further perform algorithm optimization on noise, brightness, and a skin color of the image. The ISP may further optimize parameters such as exposure and a color temperature of a photographing scenario. In some embodiments, the ISP may be disposed in the camera 193.

The camera 193 is configured to capture a still image or a video. An optical image of an object is generated by using the lens and projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and in addition to a digital image signal, the digital signal processor may process another digital signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, such as moving picture experts group (moving picture experts group, MPEG)1, MPEG2, MPEG3, and MPEG4.

The NPU as a neural-network (neural-network, NN) computational processor quickly processes input information by learning from a structure of a biological neural network, for example, a transmission mode between neurons in human brain, and may further perform self-learning continuously. The NPU may implement applications such as intelligent cognition of the electronic device 100, for example, image recognition, face recognition, speech recognition, and text understanding.

The external memory interface 120 may be configured to connect an external memory card, such as a Micro SD card, to expand a storage capacity of the electronic device 100. The external memory card communicates with the processor 110 by using the external memory interface 120 to implement a data storage function. For example, files such as music and videos are saved in the external memory card.

The internal memory 121 may be configured to store computer executable program code, where the executable program code includes instructions. The processor 110 executes various functional applications and data processing of the electronic device 100 by executing the instructions stored in the internal memory 121. The internal memory 121 may include a program storage area and a data storage area. The program storage area may store an operating system, an application required for at least one function (such as a sound playing function and an image playing function), and the like. The data storage area may store data (such as audio data and a phone book) and the like created during use of the electronic device 100. In addition, the internal memory 121 may include a high-speed random access memory, and may further include a nonvolatile memory, such as at least one disk memory device, a flash memory device, and a universal flash memory (universal flash storage, UFS).

The electronic device 100 may implement an audio function, such as music playing or recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be configured to listen to music or a hands-free call by using the speaker 170A.

The receiver 170B, also referred to as an "earpiece", is configured to convert an audio electrical signal into a sound signal. When answering a call or a voice message, the electronic device 100 may answer the voice by placing the receiver 170B close to a human ear.

The microphone 170C is configured to convert a sound signal into an electrical signal. When making a call or sending a voice message, a user may sound near the microphone 170C with the mouth of the user, and input a sound signal to the microphone 170C. The electronic device 100 may be provided with at least one microphone 170C. In some other embodiments, the electronic device 100 may be provided with two microphones 170C, which may implement a noise reduction function in addition to collecting a sound signal. In some other embodiments, the electronic device 100 may alternatively be provided with three, four or more microphones 170C to collect a sound signal, reduce noise, recognize a sound source, and implement a directional recording function and the like.

The headset jack 170D is configured to connect a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, capacitance between electrodes changes. The electronic device 100 determines an intensity of a pressure based on a change in capacitance. When a touch operation acts on the display 194, the electronic device 100 detects an intensity of the touch operation based on the pressure sensor 180A. The electronic device 100 may further calculate a touch position based on a detection signal of the pressure sensor 180A. In some embodiments, touch operations acting on a same touch position but with different touch operation intensities may correspond to different operation instructions. For example, when a touch operation with a touch operation intensity less than a first pressure threshold acts on a short message application icon, an instruction for viewing a short message is executed. When a touch operation with a touch operation intensity greater than or equal to the first pressure threshold acts on the short message application icon, an instruction for creating a new short message is executed.

The gyro sensor 180B may be configured to determine a motion attitude of the electronic device 100. In some embodiments, the gyro sensor 180B may determine an angular velocity of the electronic device 100 about three axes (that is, an x-axis, a y-axis, and a z-axis). The gyro sensor 180B may be used for photographing anti-shaking. For example, when the shutter is pressed, the gyro sensor 180B detects an angle at which the electronic device 100 shakes, calculates, based on the angle, a distance to be compensated for by a lens module, and makes the lens counteract shaking of the electronic device 100 through reverse motion, thereby implementing anti-shaking. The gyro sensor 180B can be further used in navigation and somatosensory gaming scenarios.

The barometric pressure sensor 180C is configured to measure a barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip holster by using the magnetic sensor 180D. In some embodiments, when the electronic device 100 is a flip phone, the electronic device 100 may detect opening and closing of a flip based on the magnetic sensor 180D, and then set features such as automatic unlocking of the flip based on a detected opening or closing state of the holster or the flip.

The acceleration sensor 180E may detect an acceleration of the electronic device 100 in various directions (generally on three axes), may detect a magnitude and a direction of gravity when the electronic device 100 is stationary, may be further configured to recognize an attitude of the electronic device, and is applicable to applications such as switching between a horizontal screen and a vertical screen and a pedometer.

The distance sensor 180F is configured to measure a distance. The electronic device 100 may measure the distance by infrared or laser. In some embodiments, in a photographing scenario, the electronic device 100 may measure the distance by using the distance sensor 180F to implement fast focusing.

The optical proximity sensor 180G may include, for example, a light-emitting diode (LED) and an optical detector, such as a photodiode. The light-emitting diode may be an infrared emitting diode. The electronic device 100 emits infrared light outward by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to the ear for a call, so as to automatically turn off a screen to save electricity. The optical proximity sensor 180G may also be used for a holster mode and a pocket mode for automatic unlocking and lock screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent accidental touch.

The fingerprint sensor 180H is configured to collect a fingerprint. The electronic device 100 may use collected fingerprint features to perform unlocking by using the fingerprint, access an application lock, photograph by using the fingerprint, answer a call by using the fingerprint, and the like.

The temperature sensor 180J is configured to detect a temperature. In some embodiments, the electronic device 100 performs a temperature processing policy by using the temperature detected by the temperature sensor 180J. For example, when the temperature reported by the temperature sensor 180J exceeds a threshold, the electronic device 100 reduces performance of a processor near the temperature sensor 180J, so as to reduce power consumption to implement thermal protection. In some other embodiments, when the temperature is less than another threshold, the electronic device 100 heats the battery 142 to avoid abnormal shutdown of the electronic device 100 caused by low temperature. In some other embodiments, when the temperature is less than still another threshold, the electronic device wo boosts an output voltage of the battery 142 to avoid abnormal shutdown caused by low temperature.

The touch sensor 180K is also referred to as a "touch panel". The touch sensor 180K may be disposed on the display 194, and the touch sensor 180K and the display 194 constitute a touch screen, which is also referred to as a "touch control screen". The touch sensor 180K is configured to detect a touch operation on or near the touch sensor 180K. The touch sensor may transmit the detected touch operation to the application processor to determine a touch event type. A visual output associated with the touch operation may be provided by using the display 194. In some other embodiments, the touch sensor 180K may alternatively be disposed on the surface of the electronic device wo at a position different from that of the display 194.

The bone conduction sensor 180M may obtain a vibration signal. In some embodiments, the bone conduction sensor 180M may obtain a vibration signal of a vibrating bone block of a human voice part. The bone conduction sensor 180M may be in contact with the human pulse to receive a blood pressure and pulse signal. In some embodiments, the bone conduction sensor 180M may alternatively be disposed in a headset to be combined into a bone conduction headset. The audio module 170 may parse a voice signal based on the vibration signal of the vibrating bone block of the voice part obtained by the bone conduction sensor 180M, to implement a voice function. The application processor may parse heart rate information based on the blood pressure and pulse signal obtained by the bone conduction sensor 180M, to implement a heart rate detection function.

The key 190 includes a power-on key, a volume key, and the like. The key 190 may be a mechanical key, or may be a touch key. The electronic device wo may receive a key input, and generate a key signal input related to user settings and function control of the electronic device 100.

The motor 191 may generate a vibration prompt. The motor 191 may be used for a vibration prompt of an incoming call, and may also be used for a vibration feedback of touch. For example, a touch operation acting on different applications (such as photographing and audio playing) may correspond to different vibration feedback effects. With regard to a touch operation acting on different areas of the display 194, the motor 191 may also correspond to different vibration feedback effects. Different application scenarios (such as a time reminder, receiving information, an alarm clock, and a game) may also correspond to different vibration feedback effects. Vibration feedback effects may further support customization.

The indicator 192 may be an indicator lamp, which may be configured to indicate a charging state and a change of power, and may also be configured to indicate a message, a missed call, a notification, and the like.

The SIM card interface 195 is configured to connect a SIM card. The SIM card may be inserted into the SIM card interface 195, or removed from the SIM card interface 195, so as to be in contact with or separated from the electronic device 100. The electronic device 100 may support one or N SIM card interfaces, where N is a positive integer greater than 1. The SIM card interface 195 may support a Nano SIM card, a Micro SIM card, a SIM card, and the like. The same SIM card interface 195 may allow a plurality of cards to be inserted simultaneously. The plurality of cards may be of a same type or different types. The SIM card interface 195 may also be compatible with different types of SIM cards. The SIM card interface 195 may also be compatible with an external memory card. The electronic device 100 interacts with a network by using the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may have a layered architecture, an event-driven architecture, a micro-kernel architecture, a micro-service architecture, or a cloud architecture. This application describes an example of a software architecture of the electronic device 100 by using an Android system with a layered architecture as an example. A type of an operating system of the electronic device is not limited in this application, and is, for example, an Android system, a Linux system, a Windows system, an iOS system, or a Harmony operating system (Harmony operating system, Harmony OS).

Figure 2:
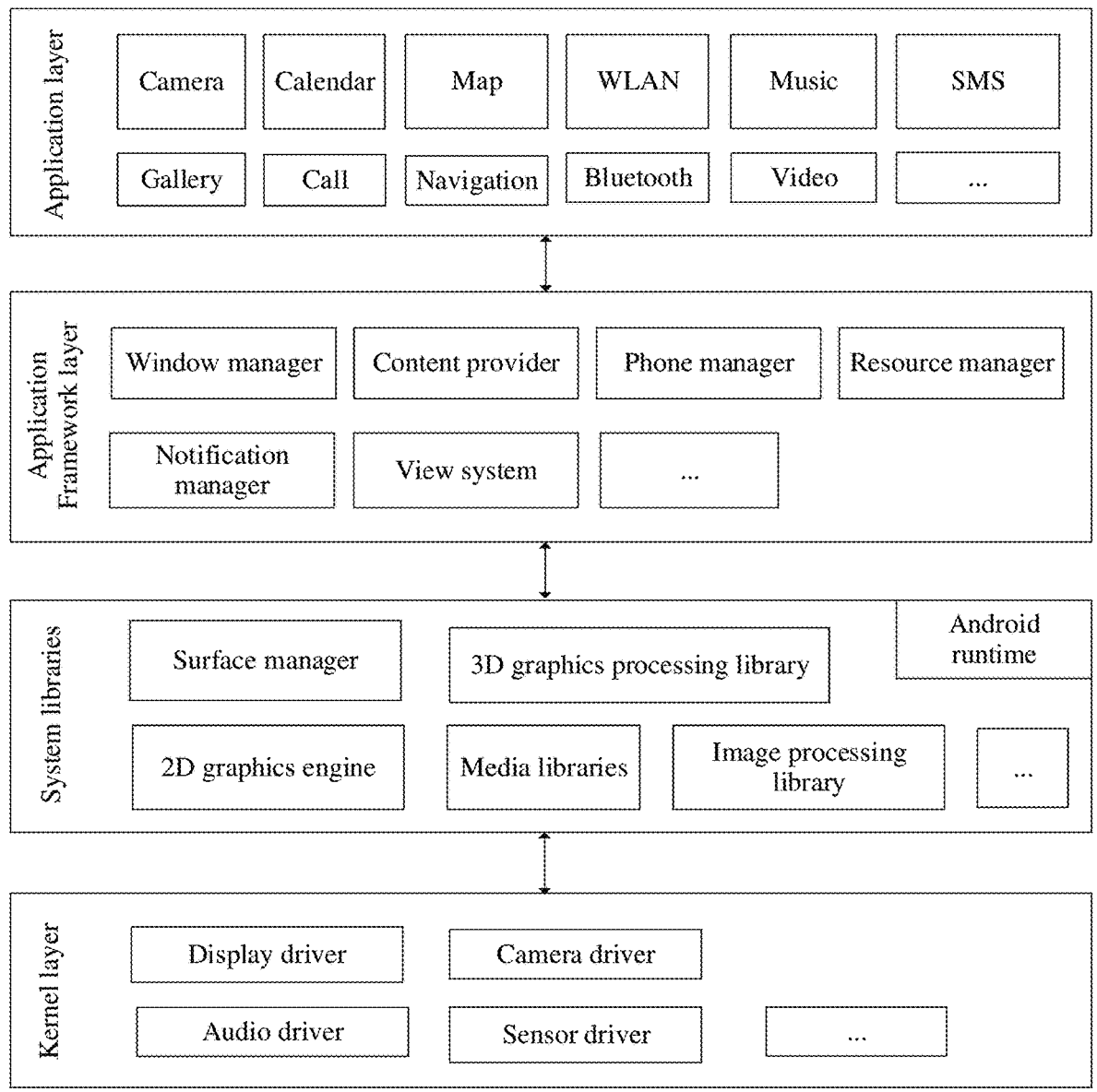
FIG. 2 is a block diagram of a software architecture of an electronic device according to an embodiment of this application.

FIG. 2 is a block diagram of a software architecture of an electronic device according to an embodiment of this application. As shown in FIG. 2, the layered architecture divides the software into several layers, and each layer has a clear function and division of labor. The layers communicate with each other by using a software interface. In some embodiments, the Android system is divided into four layers, that is, an application (APP) layer, an application framework (APP framework) layer, Android runtime (Android runtime) and system libraries (libraries), and a kernel (kernel) layer from top to bottom.

The application layer may include a series of application packages.

As shown in FIG. 2, the application packages may include applications (applications, APPs) such as camera, gallery, calendar, call, map, navigation, WLAN, Bluetooth, music, video, game, chat, shopping, travel, instant messaging (such as short messaging service), smart home, and device control.

The smart home applications may be used to control or manage home devices with a networking function. For example, the home devices may include a lamp, a television, and an air conditioner. For another example, the home devices may further include an anti-theft door lock, a speaker, a vacuum cleaning robot, a socket, a body fat scale, a desk lamp, an air purifier, a refrigerator, a washing machine, a water heater, a microwave oven, a rice cooker, a curtain, a fan, a television, a set top box, doors and windows, and the like.

In addition, the application packages may further include applications such as a home screen (desktop), Leftmost home screen, a control center, and a notification center.

The leftmost home screen means a user interface (user interface, UI) that is implemented by sliding a screen to the right on the home screen of the electronic device until it slides to a leftmost split screen. For example, the leftmost home screen may be used to place some quick service functions and notification messages, such as global search, quick entry of an application page (a payment code, WeChat, and the like), instant messages and reminders (express information, expenditure information, commuting road conditions, taxi travel information, schedule information, and the like), and focusing on a dynamic state (football stands, basketball stands, stock information, and the like). The control center is a slide-up message notification bar of the electronic device, that is, the user interface displayed by the electronic device when the user starts to perform a slide-up operation at the bottom of the electronic device. The notification center is a drop-down message notification bar of the electronic device, that is, the user interface displayed by the electronic device when the user starts to perform a drop-down operation at the bottom of the electronic device.

The application framework layer provides an application programming interface (application programming interface, API) and a programming framework for applications at the application layer. The application framework layer includes some predefined functions.

As shown in FIG. 2, the application framework layer may include a window manager, an activity manager, a window manager, a content provider, a view system, a phone manager, a resource manager, a notification manager, and the like.

The window manager (window manager) is configured to manage a window program, such as managing a window state, attributes, view (view) addition, deletion, update, a window order, and message collection and processing. The window manager may obtain a display size, determine whether the display has a status bar, lock the screen, take a screenshot, and the like. In addition, the window manager is an entry for the outside world to access a window.

The content provider is configured to store and obtain data and make the data accessible to applications. The data may include videos, images, audio, calls made and received, browsing history and bookmarks, a personal address book, and the like.

The view system includes visual controls, such as a control for displaying text and a control for displaying pictures. The view system may be configured to construct an application. A display interface may be composed of one or more views. For example, a display interface including a short message notification icon may include a view for displaying text and a view for displaying pictures.

The phone manager is configured to provide a communication function of the electronic device 100, such as management of a call status (including connection, hanging up, and the like).

The resource manager (resource manager) provides various resources for an application, such as localized strings, icons, pictures, user interface layout files (layout xml), video files, fonts, colors, and an identity document (identity document, ID) of a user interface module (user interface module, UI module). In addition, the resource manager is configured to manage the foregoing resources in a unified manner.

The notification manager enables an application to display notification information in a status bar, may be configured to convey a notification-type message, and may automatically disappear after a short pause without user interaction. For example, the notification manager is configured to notify download completion, message reminding, and the like. The notification manage may further display a notification in the status bar at the top of the system in the form of a chart or scroll bar text, such as a notification for an application running in the background, or a notification that appears on the screen in the form of a dialog window. For example, prompt text information is presented in the status bar, a prompt tone is given, the electronic device vibrates, or an indicator lamp flashes.

The Android runtime includes a core library and a virtual machine. The Android runtime is responsible for scheduling and management of an Android system.

The core library includes two parts: One part is a function that a java language needs to invoke, and the other part is a core library of the Android system.

The application layer and the application framework layer run in the virtual machine. The virtual machine executes java files at the application layer and the application framework layer as binary files. The virtual machine is used to perform functions such as object lifecycle management, stack management, thread management, security and exception management, and garbage collection.

The system library may include a plurality of functional module, such as a surface manager (surface manager), media libraries (media libraries), a three-dimensional graphics processing library (such as OpenGLES), and a 2D graphics engine (such as SGL).

The surface manager is configured to manage a display subsystem, and provides fusion of 2D and 3D layers for a plurality of applications.

The media libraries support playback and recording of audio and videos in a plurality of commonly used formats, still image files, and the like. The media libraries may support a plurality of audio and video coding formats, such as MPEG4, H.264, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An example of a workflow of software and hardware of the electronic device 100 is described below with reference to a scenario in which sound is played by using a smart speaker.

When the touch sensor 180K receives a touch operation, a corresponding hardware interrupt is sent to the kernel layer. The kernel layer processes the touch operation into a raw input event (including information such as touch coordinates and a timestamp of the touch operation). The raw input event is stored at the kernel layer. The application framework layer obtains the raw input event from the kernel layer, and recognizes a control corresponding to the input event. Using that the touch operation is a touch tap operation, and a control corresponding to the tap operation is a control of a smart speaker icon as an example, an interface at the application framework layer is invoked for a smart speaker application, to start the smart speaker application, then the kernel layer is invoked to start the audio driver, and the speaker 170A converts an audio electrical signal into a sound signal.

It may be understood that the structure illustrated in this application does not constitute a specific limitation on the electronic device 100. In some other embodiments, the electronic device 100 may include more or fewer components than those shown in the figure, or combine some components, or split some components, or have different component arrangements. The illustrated components may be implemented by using hardware, software or a combination of software and hardware.

Based on the foregoing description, using the electronic device with the structure shown in FIG. 1 and FIG. 2 as an example, the following embodiments of this application describe an application module startup method according to this application in detail with reference to the accompanying drawings and application scenarios.

Figure 3A:
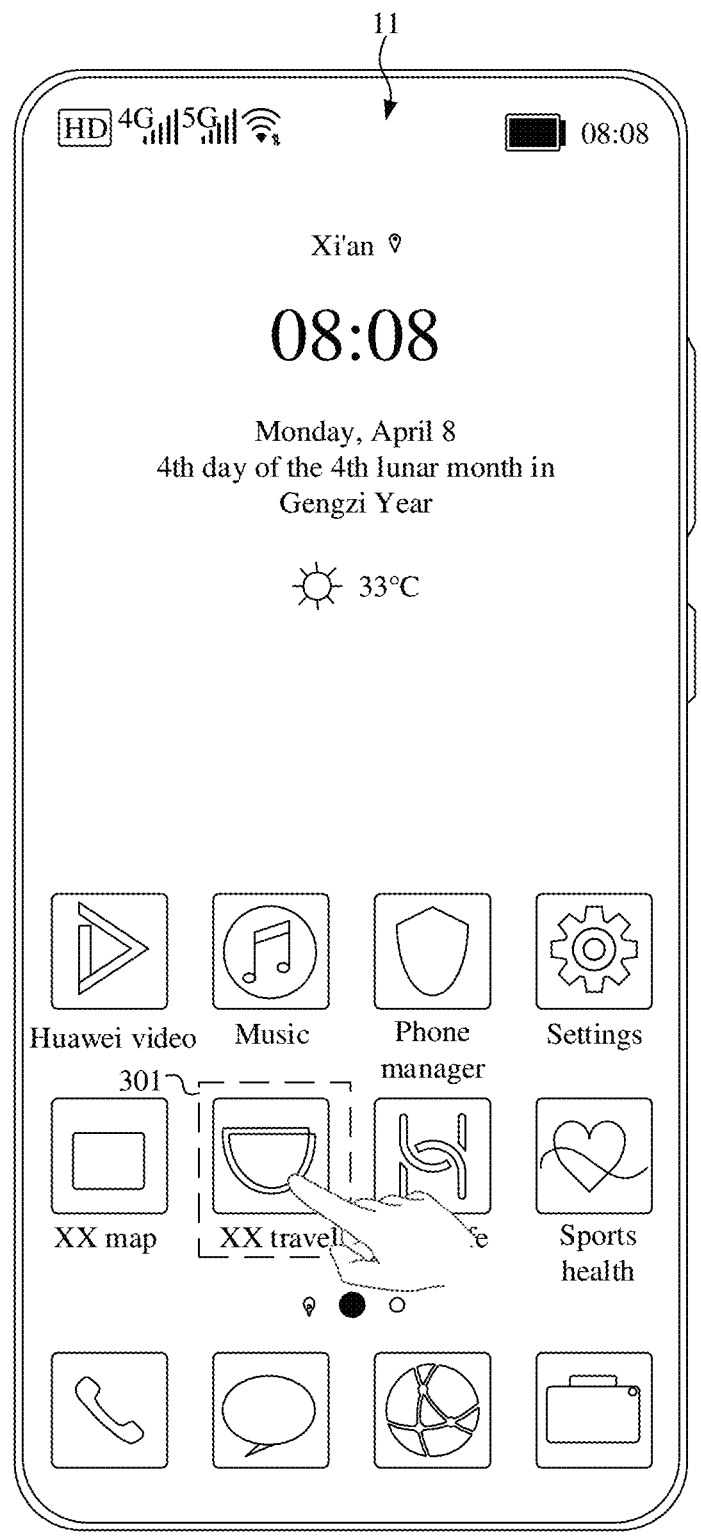
FIG. 3A to FIG. 3C are schematic diagrams of man-machine interaction interfaces according to an embodiment of this application.
Figure 3B:
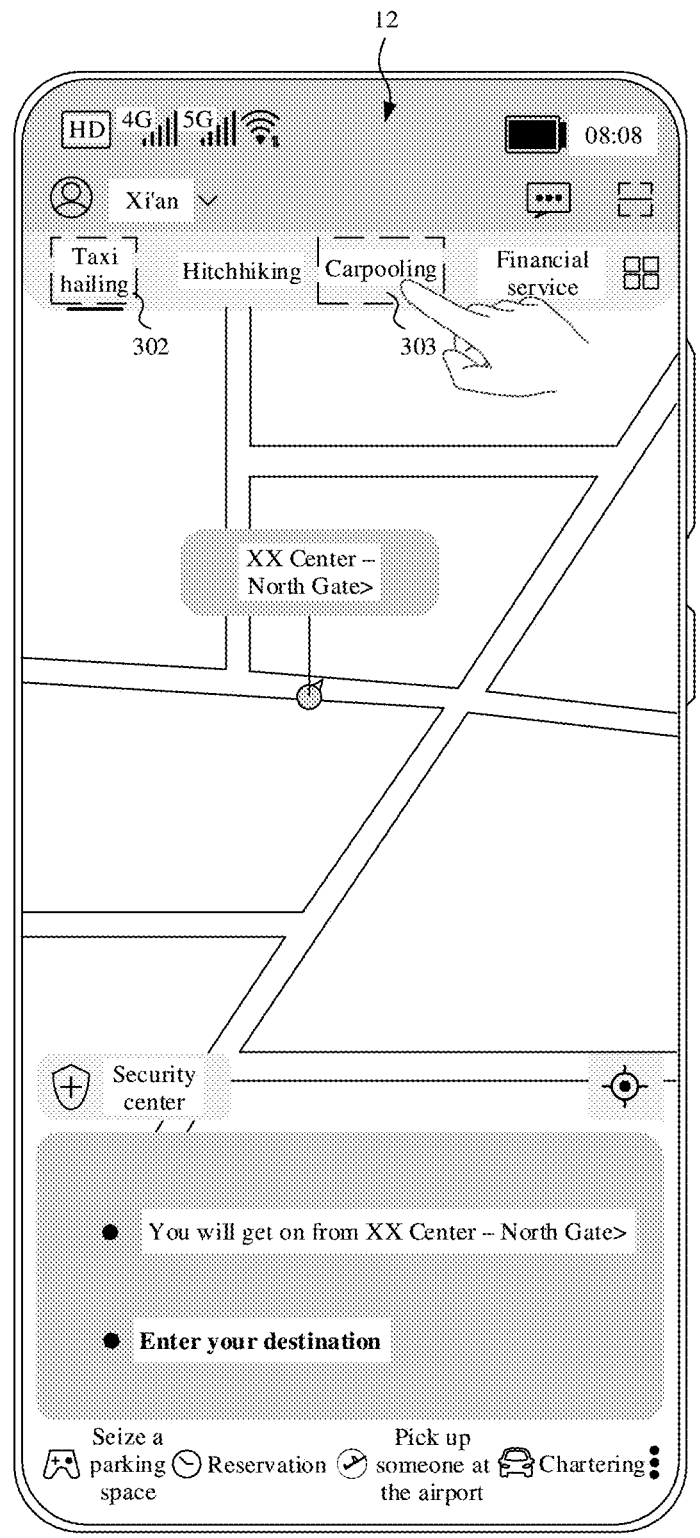
Figure 3C:
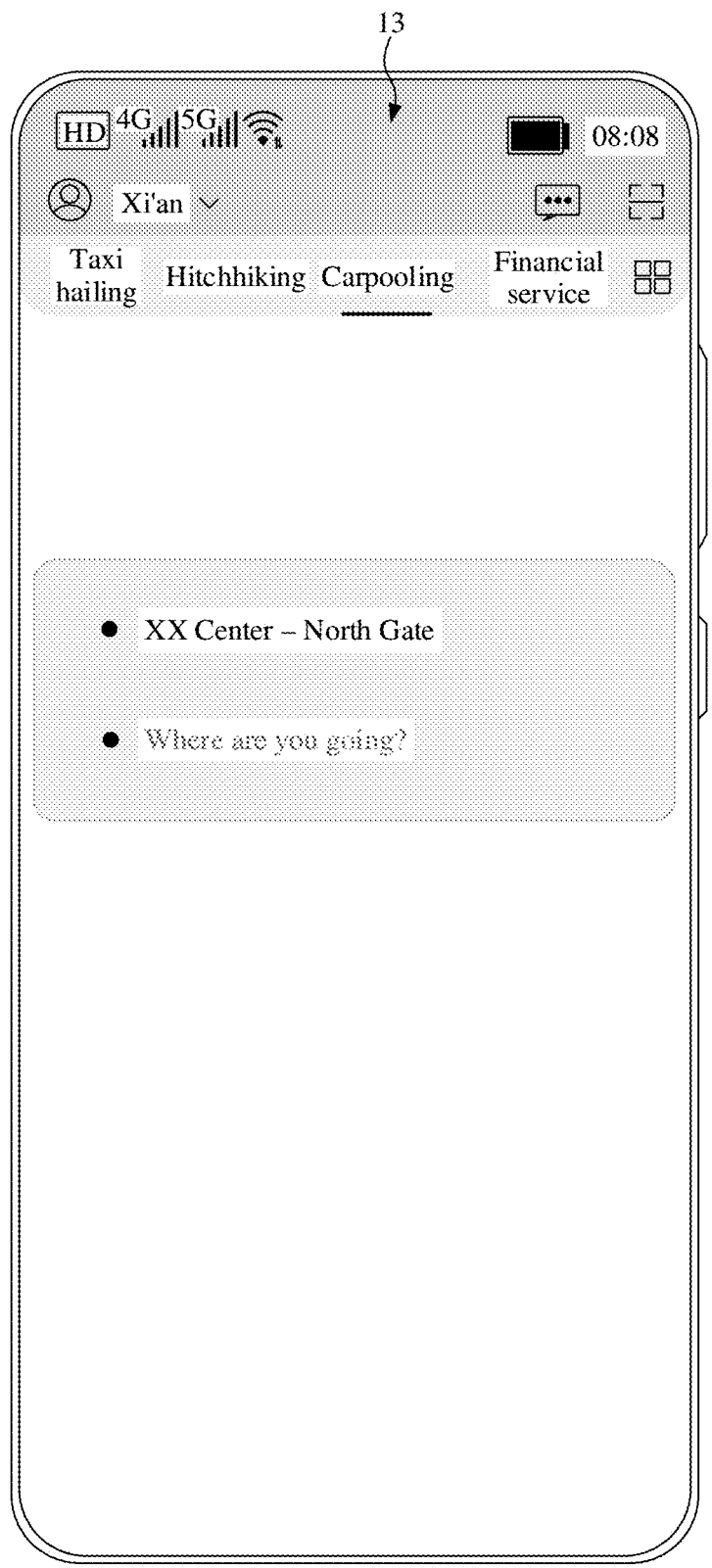

With reference to FIG. 3A to FIG. 3C, a specific implementation process in which an electronic device starts a meta-ability that is not installed and that is in an application is described. For ease of description, in FIG. 3A to FIG. 3C, the following is used as an example for description: An electronic device is a mobile phone, and an application A is installed on the mobile phone and is an XX travel application.

When the XX travel application is installed on the electronic device for the first time, a meta-ability A1 is installed and a meta-ability A2 is not installed. Both the meta-ability A1 and the meta-ability A2 are software code. The meta-ability A1 is used to provide a page corresponding to taxi hailing and trigger and start the meta-ability A1 of the application A, and the meta-ability A2 is used to provide a page corresponding to carpooling.

The meta-ability (referred to as Ability) is the smallest unit module by which the electronic device can run an application independently. An application can include one or more meta-abilities. Different applications may include meta-abilities with a same function or meta-abilities with different functions.

FIG. 3A to FIG. 3C are schematic diagrams of man-machine interaction interfaces according to an embodiment of this application.

A mobile phone may display a user interface 11 in an example shown in FIG. 3A. The user interface 11 may be a home screen (Home screen) of a desktop, and the user interface 11 may include, but is not limited to, a status bar, a navigation bar, a calendar indicator, a weather indicator, and a plurality of application icons. The application icons may further include an icon 301 of the XX travel application, and may also include, for example, an icon of a Huawei video application, an icon of a music application, an icon of a phone manager application, an icon of a setting application, an icon of an XX map application, an icon of a smart life application, an icon of a sports health application, an icon of a calling application, an icon of a short message application, an icon of a browser application, an icon of a camera application, and the like.

Because the meta-ability A1 has been installed on the mobile phone after the XX travel application is installed on the mobile phone for the first time, the mobile phone starts the meta-ability A1 after detecting an operation of starting the XX travel application as indicated by the user (for example, tapping the icon 301 of the XX travel application on the user interface 11 shown in FIG. 3A), so that a user interface 12 in an example shown in FIG. 3B may be displayed, and the user interface 12 is used to display a page corresponding to taxi hailing. The user interface 12 may include a control 302 and a control 303, where the control 302 is used to enter a page corresponding to taxi hailing, and the control 303 is used to enter a page corresponding to carpooling.

The meta-ability A2 is not installed on the mobile phone after the XX travel application is installed on the mobile phone for the first time, and may be downloaded and installed on the mobile phone by using the meta-ability A1 after responding to an operation of the user. Therefore, after the mobile phone detects that the user performs an operation such as tapping the control 303 on the user interface 12 shown in FIG. 3B, the meta-ability A1 triggers a system service in the mobile phone, and the system service in the mobile phone obtains a CDN download address of the meta-ability A2 of the XX travel application from a HAG server. The system service in the mobile phone may download the meta-ability A2 of the XX travel application from a CDN server based on the CDN download address of the meta-ability A2 of the XX travel application. Furthermore, the system service in the mobile phone may install the meta-ability A2 of the XX travel application in the mobile phone, so that the system service in the mobile phone starts the meta-ability A2, and therefore a user interface 13 in an example shown in FIG. 3C may be displayed. The user interface 13 is used to display a page corresponding to carpooling.

In conclusion, the mobile phone may trigger the system service in the mobile phone, by using an installed meta-ability in an application, to query, download and install a meta-ability that is not installed and that is in the application, so as to start the meta-ability that is not installed. Therefore, when the application is installed on the mobile phone for the first time, some meta-abilities in the application may be selected without installing all meta-abilities in the application, thereby saving storage space of the mobile phone, enriching function implementations of the application, and providing more functions of the application to the user.

Figure 4A:
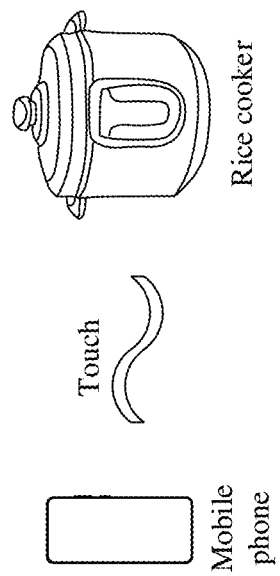
FIG. 4A is a schematic diagram of a scenario according to an embodiment of this application.
Figure 4B:
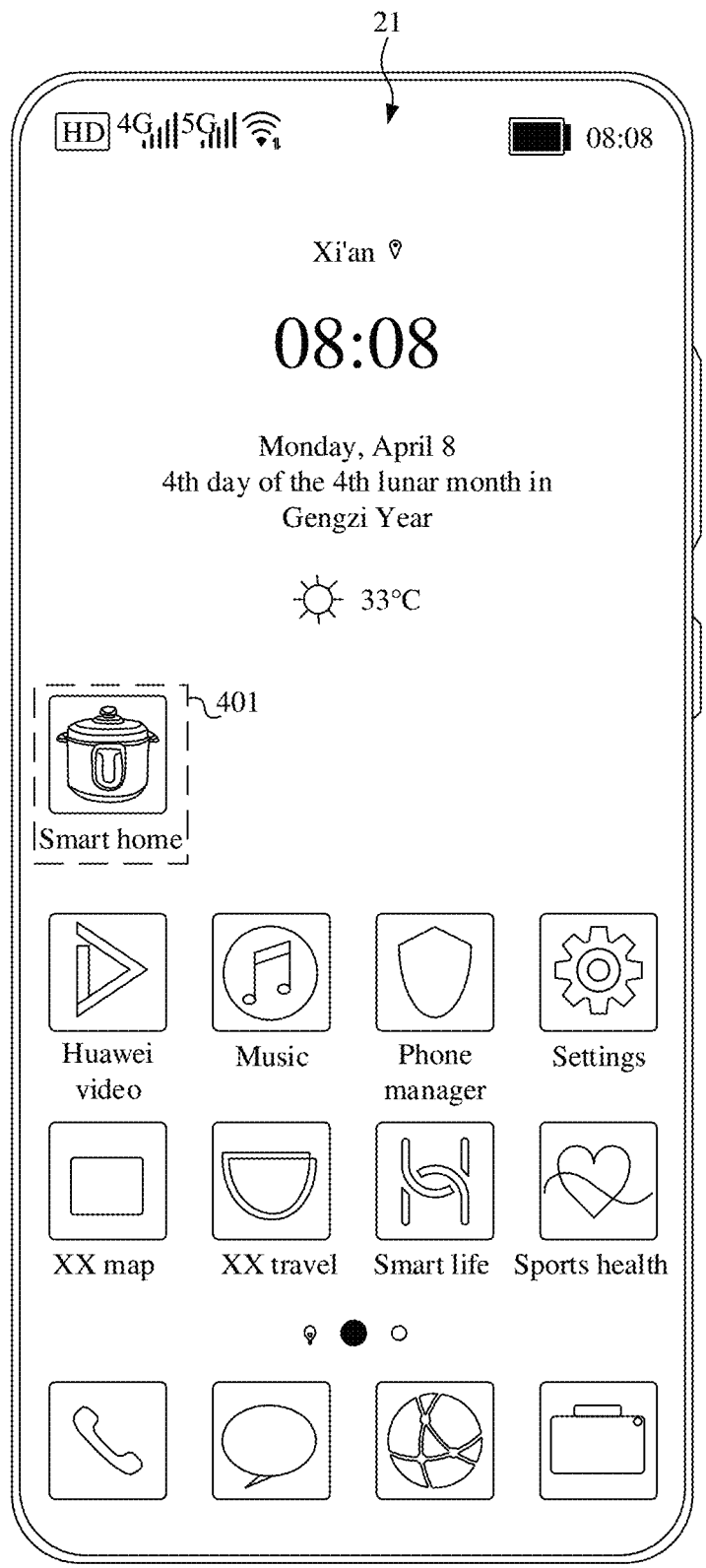
FIG. 4B and FIG. 4C are schematic diagrams of man-machine interaction interfaces according to an embodiment of this application.
Figure 4C:
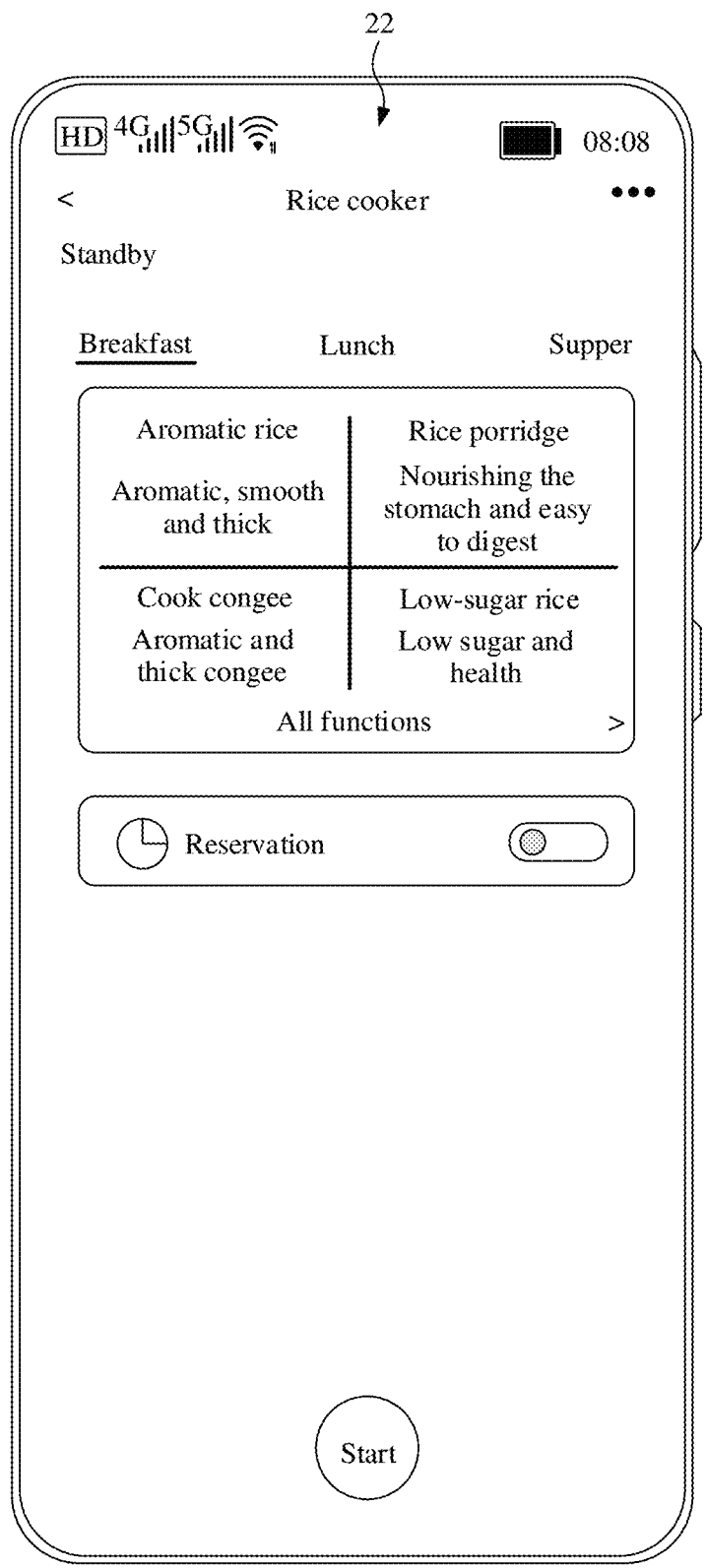

With reference to FIG. 4A to FIG. 4C, a specific implementation process in which an electronic device starts a meta-ability that is not installed and that is in an application is described. For ease of description, in FIG. 4A to FIG. 4C, the electronic device is a mobile phone, a meta-ability A1 of an application A is installed on the mobile phone, a meta-ability B1 of an application B is not installed on the mobile phone, and the meta-ability A1 of the application A may trigger and start the meta-ability B1 of the application B. The following is used as an example for description: The meta-ability A1 of the application A is a Huawei Hilink service (service) software module, the application B is a smart home application of an XX electrical appliance manufacturer, and the meta-ability B1 is a meta-ability of a rice cooker.

The Huawei Hilink service software module has no UI, and the Huawei Hilink service software module is configured to trigger and start the meta-ability B1 of the application B. The meta-ability B1 is software code, and the meta-ability B1 is used to provide a page for adjusting parameters of the rice cooker, such as an operation mode, a heating temperature, and heating duration.

FIG. 4A is a schematic diagram of a scenario according to an embodiment of this application, and FIG. 4B and FIG. 4C are schematic diagrams of man-machine interaction interfaces according to an embodiment of this application.

A mobile phone may display a user interface 21 in an example shown in FIG. 4B. The user interface 21 may be a home screen (Home screen) of a desktop, and the user interface 21 may include, but is not limited to, a status bar, a navigation bar, a calendar indicator, a weather indicator, and a plurality of application icons. The application icons may include a smart home application 401 of an XX electric appliance manufacturer, and may further include, for example: an icon of a Huawei video application, an icon of a music application, an icon of a phone manager application, an icon of a setting application, an icon of an XX map application, an icon of an XX travel application, an icon of a smart life application, an icon of a sports health application, an icon of a calling application, an icon of a short message application, an icon of a browser application, an icon of a camera application, and the like.

Assuming that the user wants to adjust, on the mobile phone, the parameters of the rice cooker such as the operation mode, the heating temperature, and the heating duration, and the meta-ability B1 of the rice cooker in the smart home application of the XX electric appliance manufacturer is not installed on the mobile phone, as shown in FIG. 4A, the mobile phone touches the rice cooker. The Huawei Hilink service software module triggers a system service in the mobile phone after the mobile phone detects that the user performs an operation such as touching the rice cooker with the mobile phone. The system service in the mobile phone determines whether the meta-ability B1 of the rice cooker in the smart home application of the XX electric appliance manufacturer is installed. When the system service in the mobile phone determines that the meta-ability B1 of the rice cooker in the smart home application of the XX electric appliance manufacturer is not installed, the system service in the mobile phone obtains a CDN download address of the meta-ability B1 of the rice cooker in the smart home application of the XX electric appliance manufacturer by using a HAG server. The system service in the mobile phone may download the meta-ability B1 of the rice cooker from a CDN server based on the CDN download address of the meta-ability B1 of the rice cooker. Furthermore, the system service in the mobile phone may install the meta-ability B1 of the rice cooker in the mobile phone, so that the system service in the mobile phone starts the meta-ability B1 of the rice cooker, and therefore the user interface 21 shown in the example in FIG. 4B may be switched to a user interface 22 in an example shown in FIG. 4C. The user interface 22 is used to display a page corresponding to the meta-ability B1 of the rice cooker, that is, a page for adjusting the parameters of the rice cooker, such as the operation mode, the heating temperature, and the heating duration. Therefore, it is convenient for the user to flexibly and quickly adjust the parameters of the rice cooker by using the page corresponding to the meta-ability B1 of the rice cooker.

In conclusion, the mobile phone may trigger the system service in the mobile phone, by using an installed meta-ability in an application, to query, download and install a meta-ability that is not installed and that is in another application, so as to start the meta-ability that is not installed and that is in another application. Therefore, meta-abilities of different applications may cooperate with each other to complete function implementations corresponding to the meta-abilities, thereby reducing a quantity of storage of the mobile phone, and saving storage space of the mobile phone.

Based on the description of the embodiments in FIG. 3A to FIG. 3C and FIG. 4A to FIG. 4C, the electronic device not only supports that an installed meta-ability in a same application triggers the system service in the electronic device to start a meta-ability that is not installed, but also supports that an installed meta-ability in an application to trigger the system service in the electronic device to start a meta-ability that is not installed and that is in another application. Therefore, the electronic device does not need to install all meta-abilities in an application, and may also use an installed meta-ability to quickly and timely download a meta-ability that is not installed based on a user requirement, which reduces a quantity of storage of the electronic device, saves storage space of the electronic device, and enriches types of applications installed on the electronic device, thereby enabling the electronic device to provide more function implementations to the user.

Figure 5A:
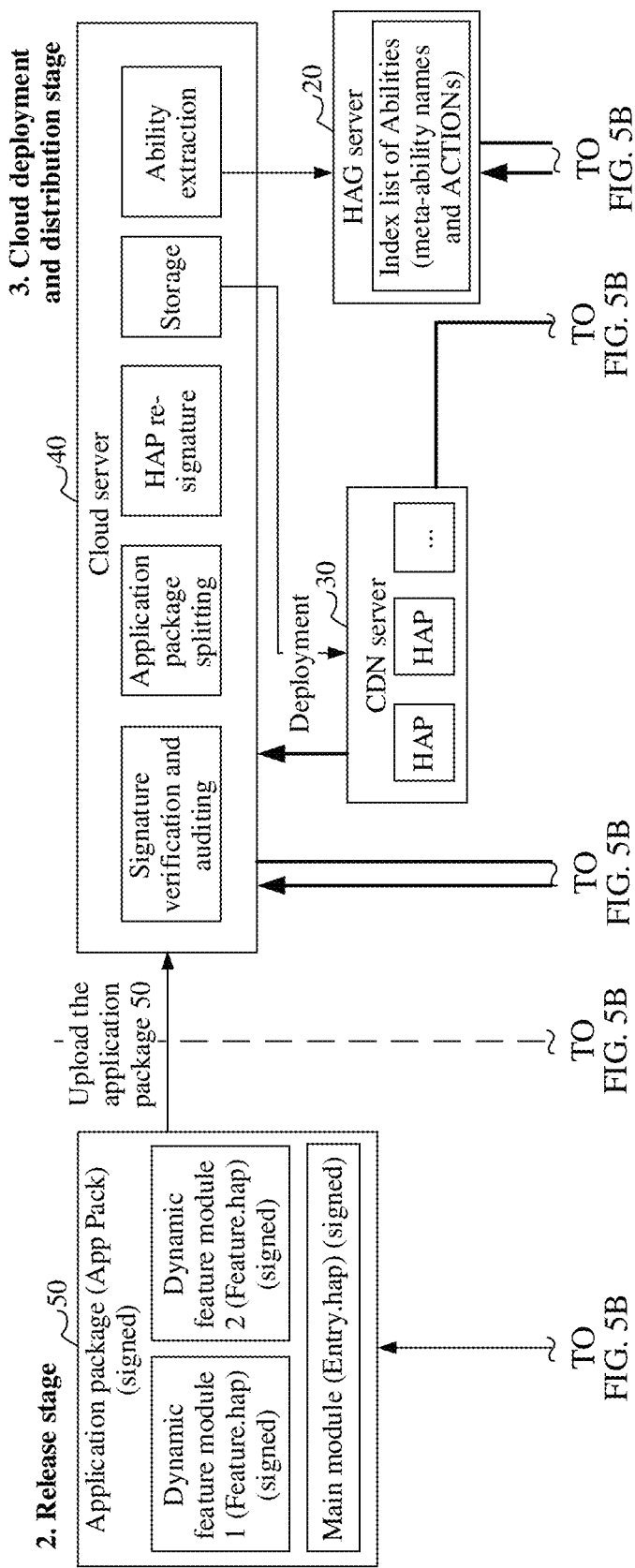

FIG. 5A and FIG. 5B are a schematic diagram of each stage of an application according to an embodiment of this application.

As shown in FIG. 5A and FIG. 5B, a life cycle process of an application may include four stages: a development and debugging stage, a release stage, a cloud deployment and distribution stage, and a terminal-side download and installation stage.

In the development and debugging stage, a developer develops an application, the application may generate a Harmony OS ability package (Harmony OS ability package, HAP), and one or more HAPs may be packaged into an application package (App Pack, .app for short).

A plurality of HAPs in one application package may be grouped into one or more groups of HAPs. Each group of HAPs may correspond to devices of one or more device types, programming languages corresponding to each HAP in each group of HAPs are the same, and programming languages corresponding to different groups of HAPs may be the same or different.

In some embodiments, each group of HAPs may usually include two types of HAPs.

The first type of HAP is a deployment package (that is, a main module shown in FIG. 5A and FIG. 5B, Entry.hap for short) including an entry Ability of the application. Usually, only one HAP which is of the first type is provided, and includes code, a third-party library, resources, and configuration files. The code may be one or more Abilities and dependent common codes (common codes). The third-party library may be a so library. Different from the common codes, the so library can be compiled independently and has no source code. In addition, the first type of HAP may be installation-free, and is usually automatically installed when the application is installed for the first time. In addition, the entry Ability of the application is usually an Ability corresponding to a home page of the application.

The second type of HAP is a deployment package (that is, a dynamic feature module 1 and a dynamic feature module 2 shown in FIG. 5A and FIG. 5B, Feature.hap for short) of other code or resources of the application. A plurality of HAP which are of a second type may be provided and each includes code, a third-party library, resources, and configuration files. The code may be one or more Abilities and dependent common codes (common codes), or may include the third-party library, or may not include any node but include only resources. This is not limited in this application. The resources may be resources that the code in this group of HAPs depends on, or may be resources used by other HAPs, or may be the foregoing two types of resources. This is not limited in this application. In addition, a second type of HAP including an Ability may be installation-free, and is usually automatically installed when the application is installed for the first time. A second type of HAP including no Ability usually needs to be downloaded and installed by using an application programming interface (application programming interface, API) of the electronic device, and is usually not automatically installed when the application is installed for the first time. In addition, other code or resources of the application is/are code or resources other than the entry Ability of the application, such as an Ability corresponding to a page of the application other than the home page.

It should be noted that the types of HAPs are not limited to the foregoing two types.

In the development and debugging stage, the developer signs an application package (App Pack, .app for short) to obtain a signed application package (App Pack) 50 (that is, a main module, a dynamic feature module 1, and a dynamic feature module 2 in the application package (App Pack) 50 are all signed).

In the release stage, the developer uploads the application package (App Pack) 50 to a cloud server 40, such as a Huawei market server.

In the cloud deployment and distribution stage, the cloud server 40 may perform operations such as signature verification and auditing, application package splitting, HAP re-signature, storage, and Ability extraction on the application package (App Pack) 50.

In some embodiments, a specific implementation process of the storage operation is as follows: The cloud server 40 may divide the application package (App Pack) 50 into a plurality of HAPs, and store the plurality of HAPs, such as deploying the HAPs to a content delivery network (content delivery network, CDN) server 30.

In some embodiments, a specific implementation process of the Ability extraction operation is as follows: The cloud server 40 may extract Abilities of the plurality of HAPs after the division, and establish an index list of the Abilities of the plurality of HAPs after the division, so that the index list of the Abilities of the plurality of HAPs after the division may be stored to, for example, a HUAWEI ability gallery (HUAWEI ability gallery, HAG) server 20.

The index list of the Abilities include a meta-ability name of the Ability of each HAP, or a meta-ability name and a predefined ACTION of the Ability of each HAP.

The meta-ability name is a unique identifier of the meta-ability, and is represented by, for example, digits, letters or characters.

The predefined ACTION is an event defined by the HAG server 20. Each predefined ACTION identifies a specific function. After a meta-ability registers a predefined ACTION, the meta-ability supports a specific function corresponding to the predefined ACTION. In addition, if a meta-ability 1 and a meta-ability 2 have registered a same predefined ACTION, the meta-ability 1 and a meta-ability 2 support a same function, that is, a specific function corresponding to the predefined ACTION. If a meta-ability 1 and a meta-ability 2 have registered different predefined ACTIONs, the meta-ability 1 and a meta-ability 2 support different functions. An application in which a meta-ability 1 is located and an application in which a meta-ability 2 is located may be the same or different.

In addition, the system service in the electronic device may start, by using a predefined ACTION, a meta-ability that has registered the predefined ACTION. The HAG server may match, based on the predefined ACTION, a meta-ability that has registered the ACTION.

In the terminal-side download and installation stage, based on the block diagram of the software architecture of the electronic device of the Android system in the embodiment in FIG. 2, a layered architecture of a device a 11 includes an application (APP) layer, an application framework (APP framework) layer, Android runtime (Android runtime, not shown in FIG. 5A and FIG. 5B) and system libraries (libraries), and a kernel (kernel) layer from top to bottom.

The device a 11 is an electronic device.

The application layer includes an application A, or an application A and an application B. The device a 11 may trigger a system service in the device a 11, by using a meta-ability of the application A, to start a meta-ability of the application B.

The application framework layer includes a distributed schedule manager service (distributed schedule manager service, DMS) and a bundle manager service (bundle manager service, BMS). Both the DMS and the BMS are system services in the electronic device.

The DMS is used to start a meta-ability. For example, the DMS may start a meta-ability after learning, based on a meta-ability name of the meta-ability and a package name of an application in which the meta-ability is located, that the meta-ability of the application has been installed on the electronic device (referred to as explicit start). For another example, the DMS may start a meta-ability after learning, based on a predefined ACTION of the meta-ability and a package name of an application in which the meta-ability is located, that the meta-ability of the application has been installed on the electronic device (referred to as semi-implicit start). For another example, the DMS may start a meta-ability corresponding to a predefined ACTION after learning, based on the predefined ACTION, that the meta-ability corresponding to the predefined ACTION has been installed on the electronic device (referred to as implicit start).

The BMS is used to determine whether a meta-ability is installed on the device a 11, and obtain a CDN download address of the meta-ability from the HAG server 20 when the meta-ability is not installed, so as to obtain the meta-ability from the CDN server 30 based on the CDN download address of the meta-ability. The system libraries include a distributed application component database.

The BMS is further used to store a parsed configuration file of a meta-ability in the distributed application component database when installing the meta-ability. The parsed configuration file (config.json) may include: a package name of an application corresponding to the meta-ability and a meta-ability name of the meta-ability, or a package name of an application corresponding to the meta-ability and a predefined ACTION of the meta-ability, or a package name of an application corresponding to the meta-ability, a meta-ability name of the meta-ability, and a predefined ACTION of the meta-ability. That is, a package name of an application corresponding to a meta-ability, and a meta-ability name and a predefined ACTION of the meta-ability may be registered in a configuration file of the meta-ability. In addition, the parsed configuration file (config.json) may further include information such as a device type supported by the meta-ability, a name of a HAP corresponding to the meta-ability, a type of the HAP corresponding to the meta-ability, and whether the meta-ability is actively installed.

With reference to Scenario 1 and Scenario 2, a specific implementation process in which an electronic device starts a meta-ability that is not installed and that is in an application is described below.

Scenario 1

Scenario 1 describes a specific implementation process in which an electronic device triggers, by using an installed meta-ability in an application, a system service in the electronic device to start a meta-ability that is not installed and that is in the same application.

With reference to FIG. 5A and FIG. 5B, assuming that a meta-ability A1 of an application A has been installed on a device a 11, and a system service in the device a 11 may be triggered, by using the meta-ability A1, to start a meta-ability A2 that is not installed and that is in the application A, then based on wishes of a user, the meta-ability A1 of the application A may request a DMS to start the meta-ability A2 of the application A. The DMS may request a BMS to query whether the meta-ability A2 is installed on the device a 11.

When the BMS determines that the meta-ability A2 has been installed on the device a 11, the BMS may notify the DMS that the meta-ability A2 has been installed. Therefore, the DMS may start the meta-ability A2.

When the BMS determines that the meta-ability A2 is not installed on the device a 11, the BMS may obtain a CDN download address of the meta-ability A2 from a HAG server 20. Based on the CDN download address of the meta-ability A2, the BMS may download the meta-ability A2 from a CDN server 30, so that the BMS installs the meta-ability A2 in the device a 11. The BMS may notify the DMS that the meta-ability A2 has been installed. Therefore, the DMS may start the meta-ability A2.

The content in the examples in FIG. 3A to FIG. 3C may explain the foregoing process.

In conclusion, the device a 11 may trigger the system service in the electronic device, by using the installed meta-ability A1 in the application A, to start the meta-ability A2 that is not installed and that is in the application A.

Figure 6A:
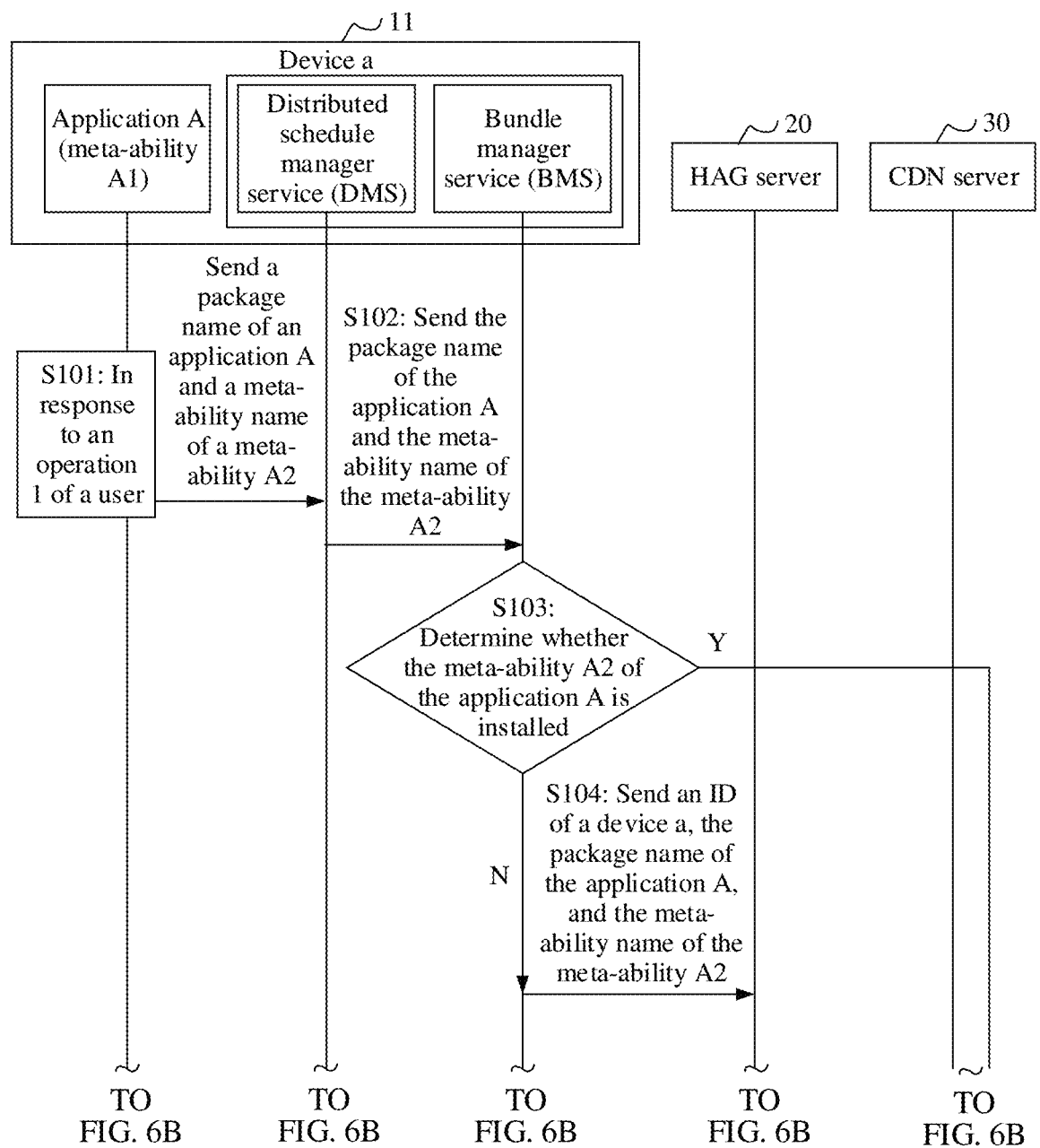
FIG. 6A and FIG. 6B are a schematic flowchart of an application module startup method according to an embodiment of this application.
Figure 6B:
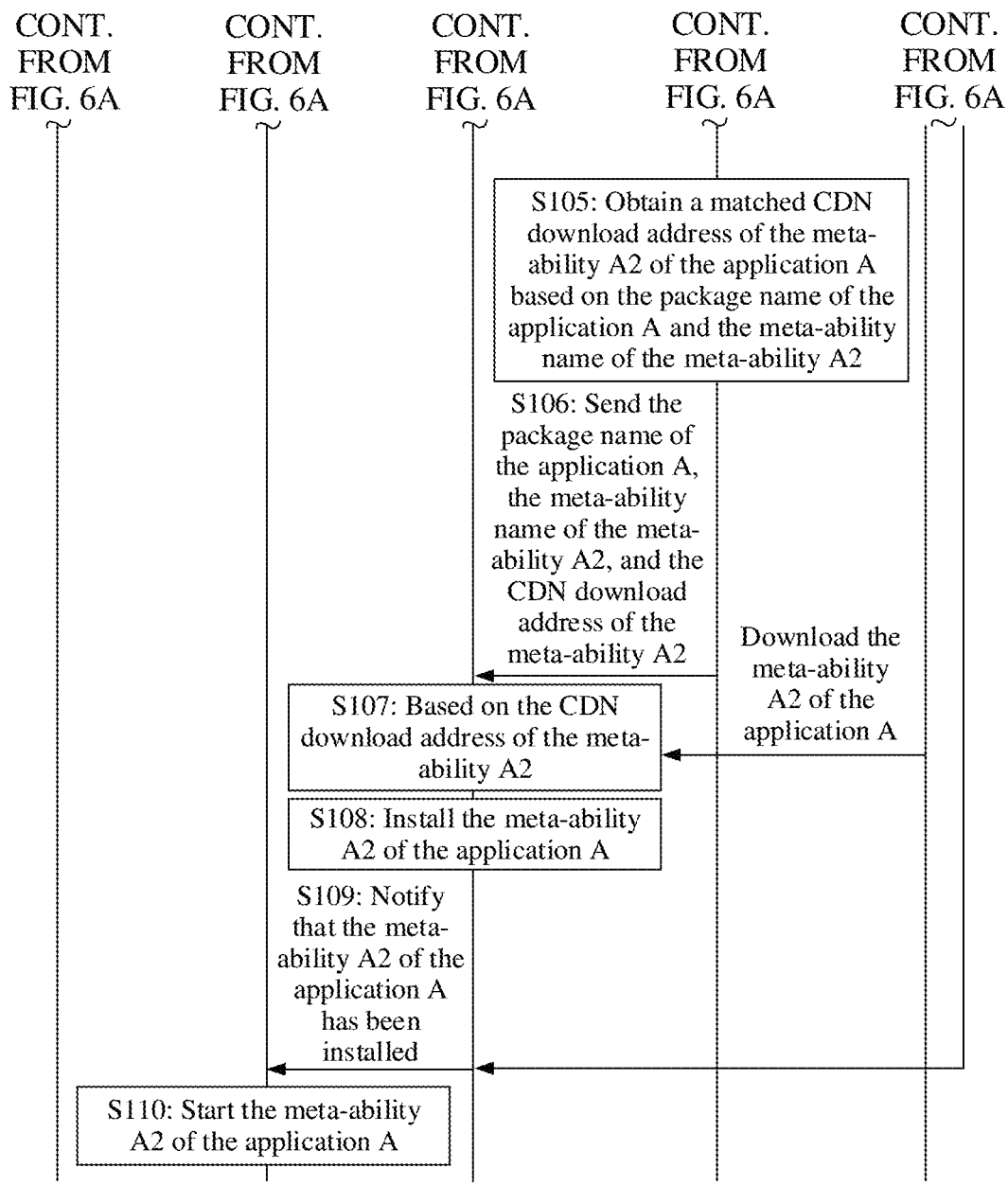

Based on the foregoing description, with reference to FIG. 6A and FIG. 6B, the implementation process in which the device a 11 triggers the system service in the device a 11, by using the installed meta-ability A1 in the application A, to start the meta-ability A2 that is not installed and that is in the application A in the embodiment in FIG. 3A to FIG. 3C is described in detail. For the device a 11, refer to the description of the mobile phone in the embodiment in FIG. 3A to FIG. 3C. For the application A, refer to the description of the XX travel application in the embodiment in FIG. 3A to FIG. 3C. For the meta-ability A1, refer to the description of the meta-ability A1 in the embodiment in FIG. 3A to FIG. 3C. For the meta-ability A2, refer to the description of the meta-ability A2 in the embodiment in FIG. 3A to FIG. 3C.

FIG. 6A and FIG. 6B are a schematic flowchart of an application module startup method according to an embodiment of this application.

As shown in FIG. 6A and FIG. 6B, a specific implementation process of the application module startup method according to this application may include the following steps.

S101. A meta-ability A1 of an application A sends a package name of the application A and a meta-ability name of a meta-ability A2 to a DMS in response to an operation 1 of a user.

The operation 1 may include, but is not limited to, a type of operation such as tap, double tap, touch and hold, or touch. For example, the operation 1 may be an operation such as tapping the control 303 performed by the user on the user interface 12 shown in FIG. 3B.

In addition, the operation 1 is associated with the meta-ability A2 of the application A. That is, the meta-ability A1 may learn, based on the operation 1, that the device a 11 needs to start the meta-ability A2 of the application A. Because the application A pre-stores the meta-ability name of the meta-ability A2 associated with the operation 1, and both the meta-ability A1 and the meta-ability A2 are meta-abilities of the application A, the meta-ability A1 may learn the package name of the application A and the meta-ability name of the meta-ability A2. Therefore, the meta-ability A1 may request the DMS to start the meta-ability A2 of the application A, and the request carries the package name of the application A and the meta-ability name of the meta-ability A2.

The package name of the application A can uniquely identify the application A, and the meta-ability name of the meta-ability A2 can uniquely identify the meta-ability A2. The package name of the application A and the meta-ability name of the meta-ability A2 may be represented in at least one manner, such as letters, characters, and digits. Herein, the package name of the application A may correspond to an identifier of a first application in step S1201, and the meta-ability name of the meta-ability A2 may correspond to a module identifier of a first application module in step S1201.

In addition, the meta-ability A1 may carry the package name of the application A and the meta-ability name of the meta-ability A2 in a message, and send the message to the DMS. The specific implementation of this message is not limited in this application. The message herein may correspond to a first message in step S1101 and step S1201.

S102: The DMS sends the package name of the application A and the meta-ability name of the meta-ability A2 to a DMS. Therefore, the DMS may request the BMS to query whether the meta-ability A2 of the application A has been installed.

The DMS may carry the package name of the application A and the meta-ability name of the meta-ability A2 in a message, and send the message to the BMS. The specific implementation of this message is not limited in this application. The message herein may correspond to a fourth message in step S1202.

S103: The BMS determines, based on the package name of the application A and the meta-ability name of the meta-ability A2, whether the meta-ability A2 of the application A is installed on a device a 11.

The BMS may store a parsed configuration file of a meta-ability in a distributed application component database when installing the meta-ability. Therefore, the BMS may query whether a configuration file of the meta-ability A2 of the application A exists in the distributed application component database, so as to determine whether the meta-ability A2 of the application A is installed on the device a 11.

When no configuration file of the meta-ability A2 of the application A exists in the distributed application component database, the BMS may determine that the meta-ability A2 of the application A is not installed on the device a 11, so that the BMS may perform step S104 to step S110; or when the configuration file of the meta-ability A2 of the application A exists in the distributed application component database, the BMS may determine that the meta-ability A2 of the application A has been installed on the device a 11, so that the BMS may perform step S109 and step S110.

S104: The BMS sends an ID of the device a 11, the package name of the application A, and the meta-ability name of the meta-ability A2 to a HAG server 20. Therefore, the BMS may obtain the ID of the device a 11 by using a system attribute in the device a 11, and request the HAG server 20 to download the meta-ability A2 of the application A for the device a 11.

The BMS may carry the ID of the device a 11, the package name of the application A, and the meta-ability name of the meta-ability A2 in a message, and send the message to the HAG server 20 through a communication channel between the device a 11 and the HAG server 20. The specific implementation of this message is not limited in this application. The message herein may correspond to a second message in step S1103 and step S1204.

In addition, the ID of the device a 11 is used to uniquely indicate the device a 11, indicating that the device a 11 needs to obtain a CDN download address of the meta-ability A2 from the HAG server 20. In addition, the specific implementation of the ID of the device a 11 is not limited in this application, for example, by using a device type of the device a 11 or a fixed asset number of the device a 11.

S105: The HAG server 20 obtains a matched CDN download address of the meta-ability A2 of the application A based on the package name of the application A and the meta-ability name of the meta-ability A2.

Because the HAG server 20 pre-stores a plurality of HAPs and a CDN download address of a meta-ability corresponding to each HAP, and the HAG server 20 may obtain an application package name and a meta-ability name of each HAP, the HAG server 20 may match the CDN download address corresponding to the meta-ability A2 of the application A based on the package name of the application A and the meta-ability name of the meta-ability A2.

The CDN download address may be expressed in a manner such as a link or an address string. In addition, the meta-ability A2 corresponding to the CDN download address that is corresponding to the meta-ability A2 and that is matched by the HAG server 20 is usually a latest version.

S106: The HAG server 20 sends the package name of the application A, the meta-ability name of the meta-ability A2, and the CDN download address of the meta-ability A2 to the BMS. The HAG server 20 may carry the package name of the application A, the meta-ability name of the meta-ability A2, and the CDN download address of the meta-ability A2 in a message, and send the message to the BMS in the device a 11 through the communication channel between the device a 11 and the HAG server 20. The specific implementation of this message is not limited in this application. The message herein may correspond to a third message in step S1104 and step S1205. The CDN download address of the meta-ability A2 herein may correspond to a download address of the first application module in step S1205.

S107: The BMS downloads the meta-ability A2 of the application A from a CDN server 30 based on the package name of the application A, the meta-ability name of the meta-ability A2, and the CDN download address of the meta-ability A2. The CDN server 30 herein corresponds to a second server in step S1206.

S108: The BMS installs the meta-ability A2 of the application A.

S109: The BMS notifies the DMS that the meta-ability A2 of the application A has been installed. The notification herein may correspond to a fifth message in step S1207.

S110: The DMS starts the meta-ability A2 of the application A (that is, explicit start), corresponding to the description in step S1208.

In conclusion, based on the description of the embodiment in FIG. 6A and FIG. 6B, the device a 11 may trigger the system service in the device a 11, by using the meta-ability A1 of the application A, to start the meta-ability A2 of the application A in the device a 11 based on the package name of the application A and the meta-ability name of the meta-ability A2.

Scenario 2

Scenario 2 describes a specific implementation process in which an electronic device triggers, by using an installed meta-ability in an application, a system service in the electronic device to start a meta-ability that is not installed and that is in another application. Whether another application is installed on the electronic device is not limited in this application.

With reference to FIG. 5A and FIG. 5B, assuming that a meta-ability A1 of an application A has been installed on a device a 11, and a system service in the device a 11 may be triggered, by using the meta-ability A1, to start a meta-ability B1 of an application B, then based on wishes of a user, the meta-ability A1 of the application A may request a DMS to start the meta-ability B1 of the application B. The DMS may request the BMS to query whether the meta-ability B1 of the application B is installed on the device a 11.

When the BMS determines that the meta-ability B1 has been installed on the device a 11, the BMS may notify the DMS that the meta-ability B1 has been installed. Therefore, the DMS may start the meta-ability B1. The application layer further includes the application B.

When the BMS determines that the meta-ability B1 is not installed on the device a 11, the BMS may obtain a CDN download address of the meta-ability B1 from a HAG server 20. Based on the CDN download address of the meta-ability B1, the BMS may download the meta-ability B1 from a CDN server 30, so that the BMS installs the meta-ability B1 in the device a 11, and the application layer further includes the application B. The BMS may notify the DMS that the meta-ability B1 has been installed. Therefore, the DMS may start the meta-ability B1.

The content in the examples in FIG. 4A to FIG. 4C may explain the foregoing process.

In conclusion, the device a 11 may trigger the system service in the device a 11, by using the installed meta-ability A1 in the application A, to start the meta-ability B1 that is not installed and that is in the application B.

Figures 1, 7A:
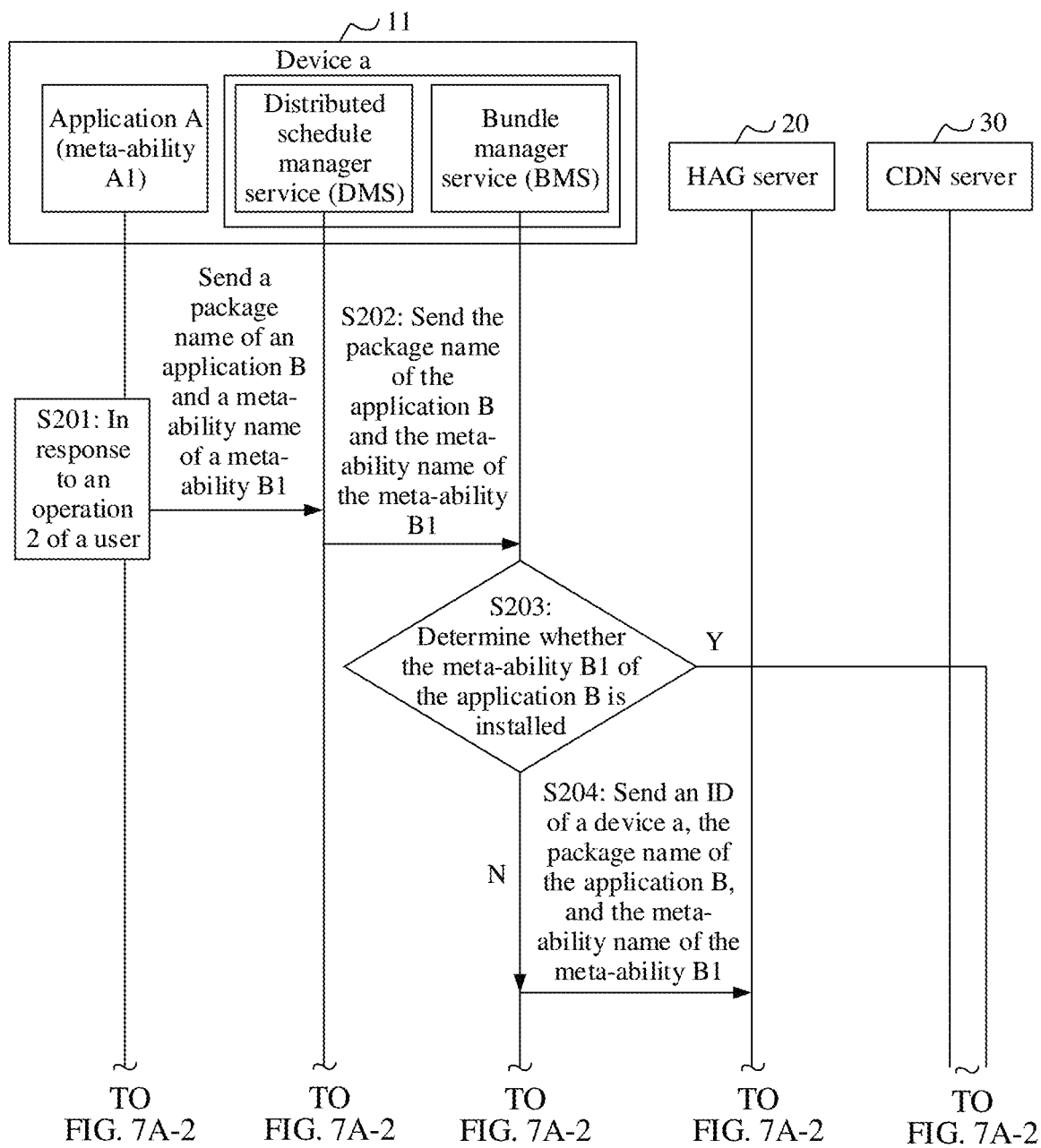
Figures 2, 7A:
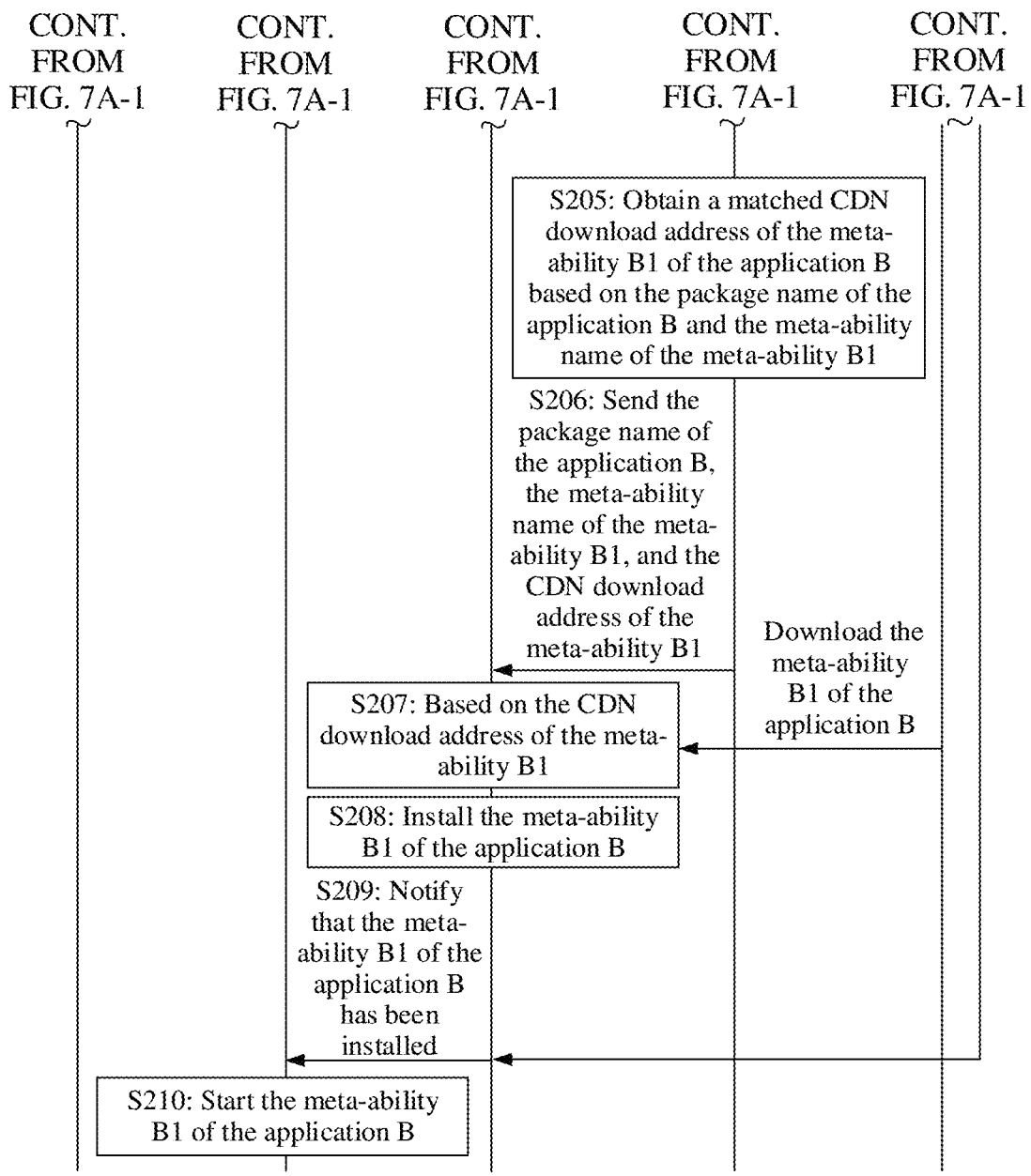
Figures 1, 7B:
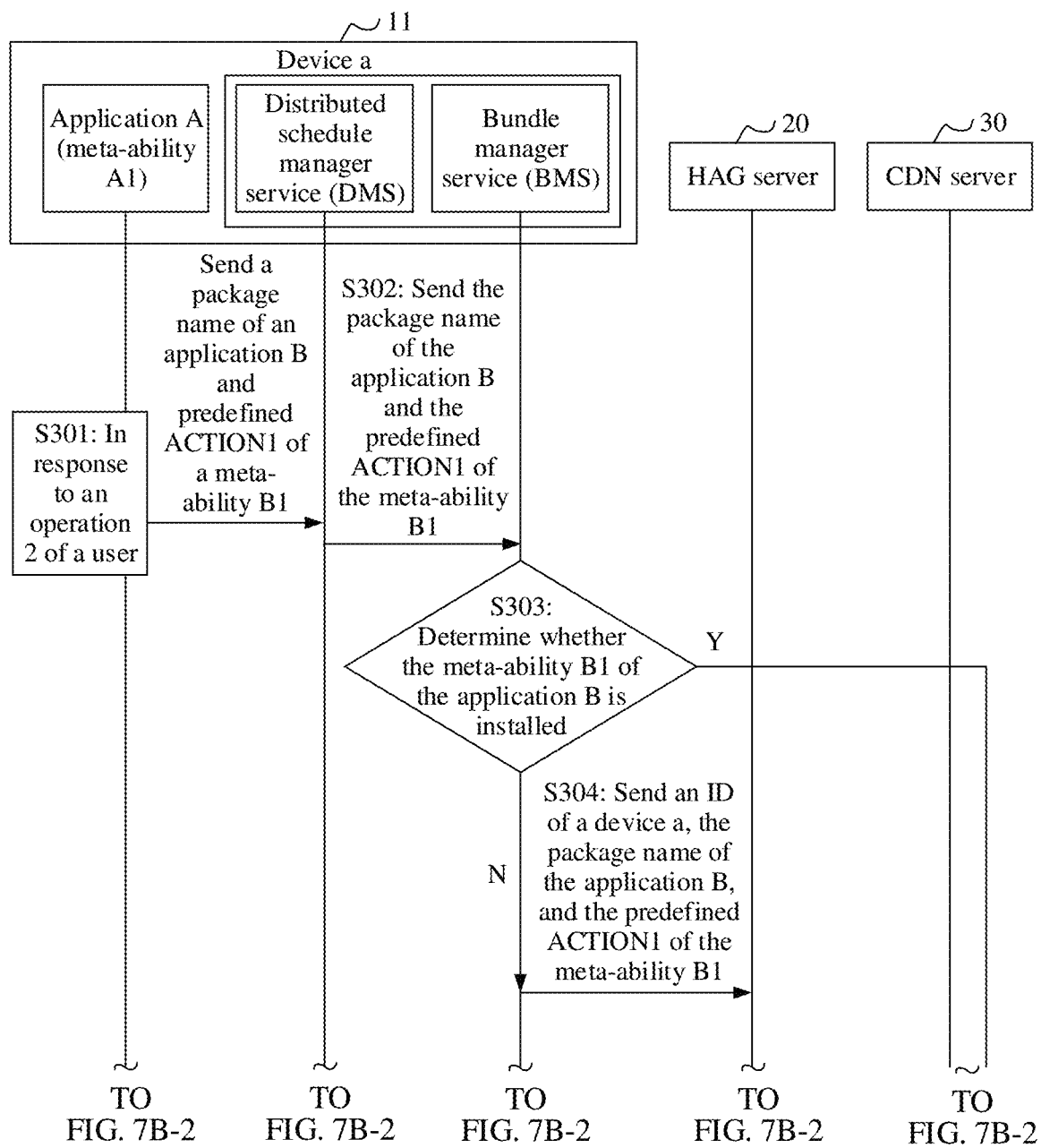
Figures 2, 7B:
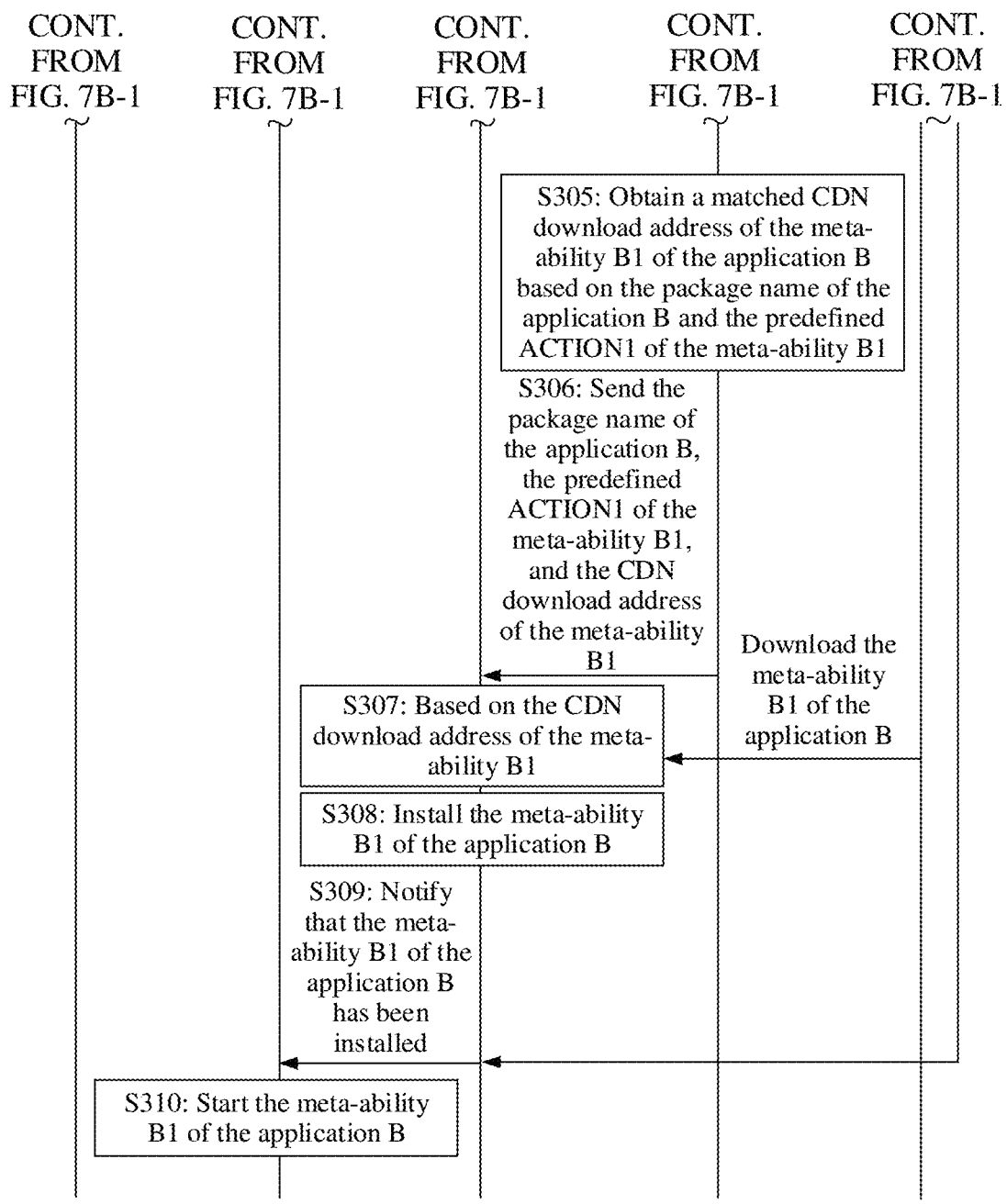
Figures 1, 7C:
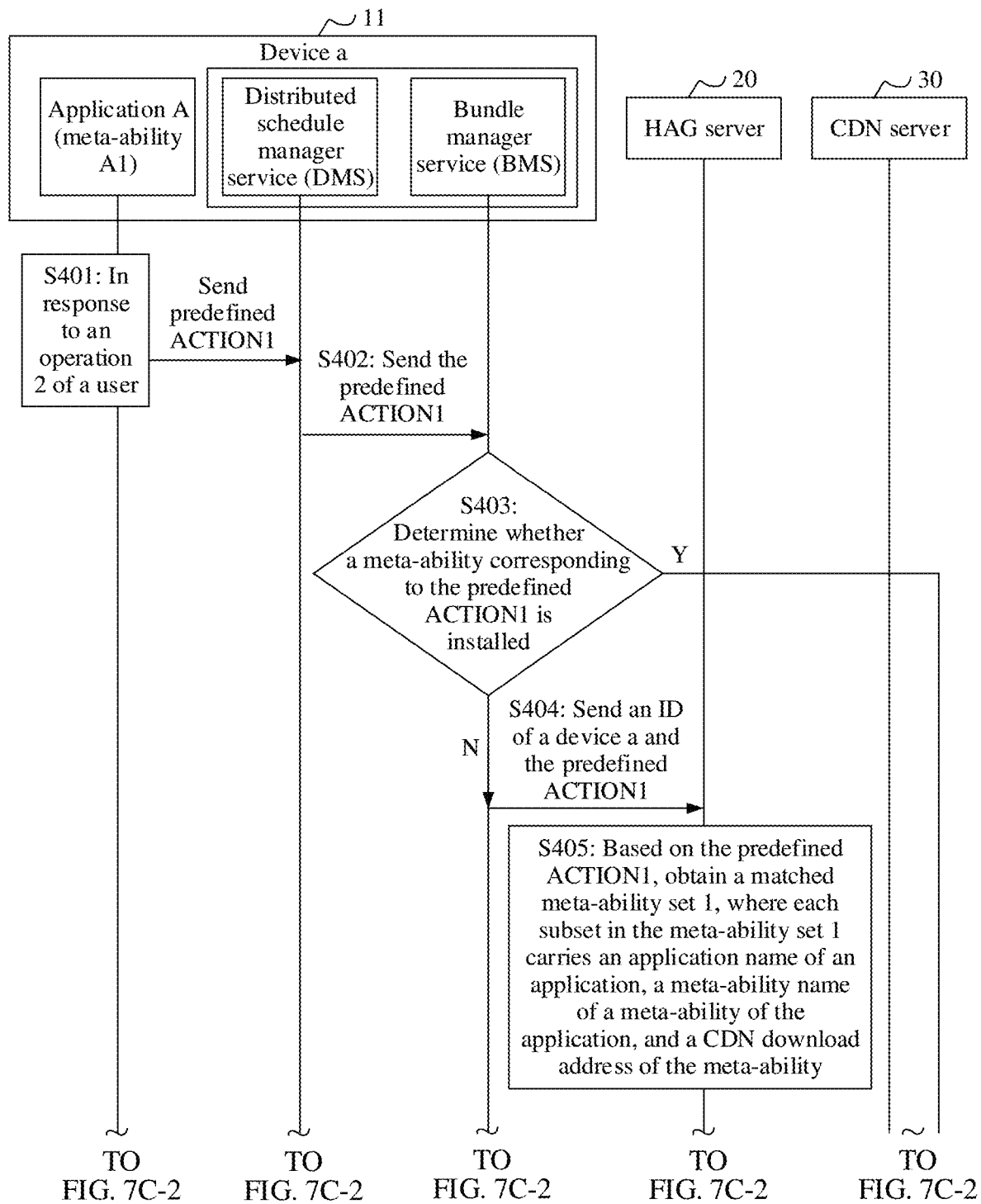
Figures 2, 7C:
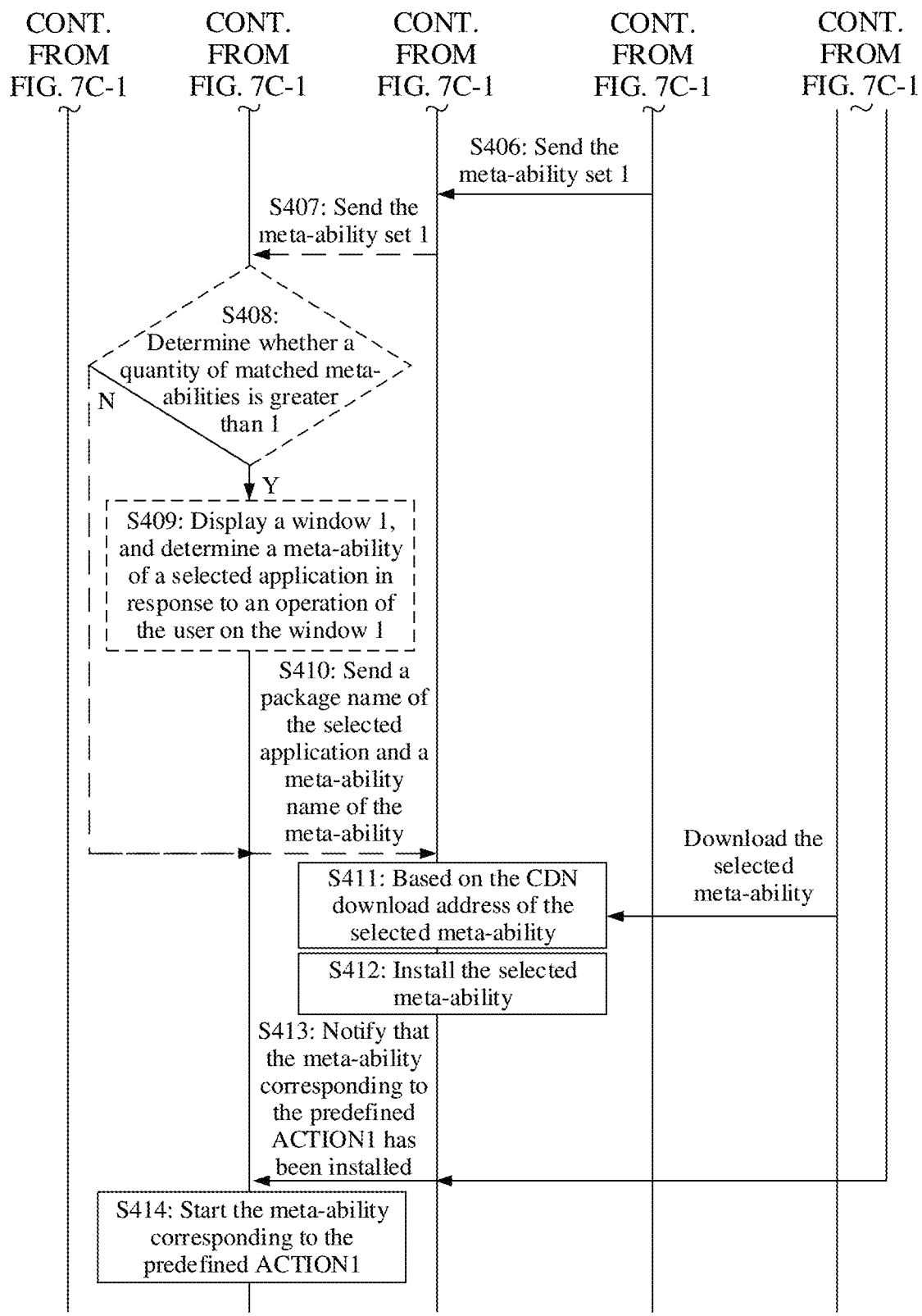

Based on the foregoing description, with reference to 7A to FIG. 7C-1 and FIG. 7C-2, the implementation process in which the device a 11 triggers the system service in the device a 11, by using the installed meta-ability A1 in the application A, to start the meta-ability B1 that is not installed and that is in the application B in the embodiment in FIG. 4A to FIG. 4C is described in detail. For the device a 11, refer to the description of the mobile phone in the embodiment in FIG. 4A to FIG. 4C. For the application A, refer to the description of the Huawei Hilink service (service) software module in the embodiment in FIG. 4A to FIG. 4C. For the application B, refer to the description of the smart home application of XX manufacturer in the embodiment in FIG. 4A to FIG. 4C. For the meta-ability A1, refer to the description of the meta-ability A1 in the embodiment in FIG. 4A to FIG. 4C. For the meta-ability B1, refer to the description of the meta-ability B1 of the rice cooker in the embodiment in FIG. 4A to FIG. 4C.

FIG. 7A-1 and FIG. 7A-2 to FIG. 7C-1 and FIG. 7C-2 are schematic flowcharts of an application module startup method according to an embodiment of this application.

As shown in FIG. 7A-1 and FIG. 7A-2, a specific implementation process of the application module startup method according to this application may include the following steps.

S201: A meta-ability A1 of an application A sends a package name of an application B and a meta-ability name of a meta-ability B1 to a DMS in response to an operation 2 of a user.

The operation 2 may include, but is not limited to, a type of operation such as tap, double tap, touch and hold, or touch. For example, the operation 2 may be an operation of touching a rice cooker with a mobile phone, which is performed by the user in the embodiment in FIG. 4B.

In addition, the operation 2 is associated with the meta-ability B1 of the application B. That is, the meta-ability A1 may learn, based on the operation 2, that the device a 11 needs to start the meta-ability B1 of the application B. Because the application A pre-stores the package name of the application B and the meta-ability name of the meta-ability B1 of the application B that are associated with the operation 2, the meta-ability A1 may learn the package name of the application B and the meta-ability name of the meta-ability B1. Therefore, the meta-ability A1 may request the DMS to start the meta-ability B1 of the application B.

The package name of the application B can uniquely identify the application B, and the package name of the application B and the meta-ability name of the meta-ability B1 can uniquely identify the meta-ability B1 of the application B. The package name of the application B and the meta-ability name of the meta-ability B1 may be represented in at least one manner, such as letters, characters, and digits. Herein, the package name of the application B may correspond to an identifier of a first application in step S1201, and the meta-ability name of the meta-ability B1 may correspond to a module identifier of a first application module in step S1201.

In addition, the meta-ability A1 may carry the package name of the application B and the meta-ability name of the meta-ability B1 in a message, and send the message to the DMS. The specific implementation of this message is not limited in this application. The message herein may correspond to a first message in step S1101 and step S1201.

S202: The DMS sends the package name of the application B and the meta-ability name of the meta-ability B1 to a DMS. Therefore, the DMS may request the BMS to query whether the meta-ability B1 of the application B has been installed.

The DMS may carry the package name of the application B and the meta-ability name of the meta-ability B1 in a message, and send the message to the BMS. The specific implementation of this message is not limited in this application. The message herein may correspond to a fourth message in step S1202.

S203: The BMS determines, based on the package name of the application B and the meta-ability name of the meta-ability B1, whether the meta-ability B1 of the application B is installed on a device a 11.

The BMS may store a parsed configuration file of a meta-ability in a distributed application component database when installing the meta-ability. Therefore, the BMS may query whether a configuration file of the meta-ability B1 of the application B exists in the distributed application component database, so as to determine whether the meta-ability B1 of the application B is installed on the device a 11.

When no configuration file of the meta-ability B1 of the application B exists in the distributed application component database, the BMS may determine that the meta-ability B1 of the application B is not installed on the device a 11, so that the BMS may perform step S204 to step S210; or when the configuration file of the meta-ability B1 of the application B exists in the distributed application component database, the BMS may determine that the meta-ability B1 of the application B has been installed on the device a 11, so that the BMS may perform step S209 and step S210.

S204: The BMS sends an ID of the device a 11, the package name of the application B, and the meta-ability name of the meta-ability B1 to a HAG server 20. Therefore, the BMS may obtain the ID of the device a 11 by using a system attribute in the device a 11, and request the HAG server 20 to download the meta-ability B1 of the application B for the device a 11.

The BMS may carry the ID of the device a 11, the package name of the application B, and the meta-ability name of the meta-ability B1 in a message, and send the message to the HAG server 20 through a communication channel between the device a 11 and the HAG server 20. The specific implementation of this message is not limited in this application. The message herein may correspond to a second message in step S1103 and step S1204. In addition, for the specific implementation of the ID of the device a 11, refer to the description of step S104. Details are not described herein.

S205: The HAG server 20 obtains a matched CDN download address of the meta-ability B1 of the application B based on the package name of the application B and the meta-ability name of the meta-ability B1.

Because the HAG server 20 pre-stores a plurality of HAPs and a CDN download address of a meta-ability corresponding to each HAP, and the HAG server 20 may obtain an application package name and a meta-ability name of each HAP, the HAG server 20 may match the CDN download address corresponding to the meta-ability B1 of the application B based on the package name of the application B and the meta-ability name of the meta-ability B1.

The CDN download address may be expressed in a manner such as a link or an address string. In addition, the meta-ability B1 corresponding to the CDN download address that is corresponding to the meta-ability B1 and that is matched by the HAG server 20 is usually a latest version.

S206: The HAG server 20 sends the package name of the application B, the meta-ability name of the meta-ability B1, and the CDN download address of the meta-ability B1 to the BMS.

The HAG server 20 may carry the package name of the application B, the meta-ability name of the meta-ability B1, and the CDN download address of the meta-ability B1 in a message, and send the message to the BMS in the device a 11 through the communication channel between the device a 11 and the HAG server 20. The specific implementation of this message is not limited in this application. The message herein may correspond to a third message in step S1104 and step S1205. The CDN download address of the meta-ability B1 herein may correspond to a download address of the first application module in step S1205.

S207: The BMS downloads the meta-ability B1 of the application B from a CDN server 30 based on the package name of the application B, the meta-ability name of the meta-ability B1, and the CDN download address of the meta-ability B1. The CDN server 30 herein corresponds to a second server in step S1206.

S208: The BMS installs the meta-ability B1 of the application B.

S209: The BMS notifies the DMS that the meta-ability B1 of the application B has been installed. The notification herein may correspond to a fifth message in step S1207.

S210: The DMS starts the meta-ability B1 of the application B (that is, explicit start), corresponding to the description in step S1208.

In conclusion, based on the description of the embodiment in FIG. 7A-1 and FIG. 7A-2, the device a 11 may trigger the system service in the device a 11, by using the meta-ability A1 of the application A, to start the meta-ability B1 of the application B in the device a 11 based on the package name of the application B and the meta-ability name of the meta-ability B1.

As shown in FIG. 7B-1 and FIG. 7B-2, a specific implementation process of the application module startup method according to this application may include the following steps.

S301: A meta-ability A1 of an application A sends a package name of an application B and predefined ACTION1 of a meta-ability B1 to a DMS in response to an operation 2 of a user.

The operation 2 may include, but is not limited to, a type of operation such as tap, double tap, touch and hold, or touch. For example, the operation 2 may be an operation of touching a rice cooker with a mobile phone, which is performed by the user in the embodiment in FIG. 4B.

In addition, the operation 2 is associated with the meta-ability B1 of the application B. That is, the meta-ability A1 may learn, based on the operation 2, that the device a 11 needs to start the meta-ability B1 of the application B. Because the application A pre-stores the package name of the application B and the predefined ACTION1 of the meta-ability B1 of the application B that are associated with the operation 2, the meta-ability A1 may learn the package name of the application B and the predefined ACTION1 of the meta-ability B1. Therefore, the meta-ability A1 may request the DMS to start the meta-ability B1 of the application B.

The package name of the application B can uniquely identify the application B, and the package name of the application B and the predefined ACTION1 of the meta-ability B1 can uniquely identify the meta-ability B1 of the application B. The package name of the application B and the predefined ACTION1 of the meta-ability B1 may be represented in at least one manner, such as letters, characters, and digits. Herein, the package name of the application B may correspond to an identifier of a first application in step S1301, and the predefined ACTION1 of the meta-ability B1 may correspond to an identifier of a type of a first application module in step S1301.

In addition, the meta-ability A1 may carry the package name of the application B and the predefined ACTION1 of the meta-ability B1 in a message, and send the message to the DMS. The specific implementation of this message is not limited in this application. The message herein may correspond to a first message in step S1101 and step S1301.

S302: The DMS sends the package name of the application B and the predefined ACTION1 of the meta-ability B1 to the BMS. Therefore, the DMS may request the BMS to query whether the meta-ability B1 of the application B has been installed.

The DMS may carry the package name of the application B and the predefined ACTION1 of the meta-ability B1 in a message, and send the message to the BMS. The specific implementation of this message is not limited in this application. The message herein may correspond to a fourth message in step S1302.

S303: The BMS determines, based on the package name of the application B and the predefined ACTION1 of the meta-ability B1, whether the meta-ability B1 of the application B is installed on the device a 11.

The BMS may store a parsed configuration file of a meta-ability in a distributed application component database when installing the meta-ability. Therefore, the BMS may query whether a configuration file of the meta-ability B1 of the application B exists in the distributed application component database, so as to determine whether the meta-ability B1 of the application B is installed on the device a 11.

When no configuration file of the meta-ability B1 of the application B exists in the distributed application component database, the BMS may determine that the meta-ability B1 of the application B is not installed on the device a 11, so that the BMS may perform step S304 to step S310; or when the configuration file of the meta-ability B1 of the application B exists in the distributed application component database, the BMS may determine that the meta-ability B1 of the application B has been installed on the device a 11, so that the BMS may perform step S309 and step S310.

S304: The BMS sends an ID of the device a 11, the package name of the application B, and the predefined ACTION1 of the meta-ability B1 to a HAG server 20. Therefore, the BMS may obtain the ID of the device a 11 by using a system attribute in the device a 11, and request the HAG server 20 to download the meta-ability B1 of the application B for the device a 11.

The BMS may carry the ID of the device a 11, the package name of the application B, and the predefined ACTION1 of the meta-ability B1 in a message, and send the message to the HAG server 20 through a communication channel between the device a 11 and the HAG server 20. The specific implementation of this message is not limited in this application. The message herein may correspond to a second message in step S1103 and step S1304. In addition, for the specific implementation of the ID of the device a 11, refer to the description of step S104. Details are not described herein.

S305: The HAG server 20 obtains a matched CDN download address of the meta-ability B1 of the application B based on the package name of the application B and the predefined ACTION1 of the meta-ability B1.

Because the HAG server 20 pre-stores a plurality of HAPs and a CDN download address of a meta-ability corresponding to each HAP, and the HAG server 20 may obtain an application package name, a meta-ability name, and a predefined ACTION of each HAP, the HAG server 20 may match the CDN download address corresponding to the meta-ability B1 of the application B based on the package name of the application B and the predefined ACTION1 of the meta-ability B1.

The CDN download address may be expressed in a manner such as a link or an address string. In addition, the meta-ability B1 corresponding to the CDN download address that is corresponding to the meta-ability B1 and that is matched by the HAG server 20 is usually a latest version.

S306: The HAG server 20 sends the package name of the application B, the predefined ACTION1 of the meta-ability B1 (this parameter may be replaced with the meta-ability name of meta-ability B1), and the CDN download address of the meta-ability B1 to the BMS.

The HAG server 20 may carry the package name of the application B, the predefined ACTION1 of the meta-ability B1, and the CDN download address of the meta-ability B1 in a message, and send the message to the BMS in the device a 11 through the communication channel between the device a 11 and the HAG server 20. The specific implementation of this message is not limited in this application. The message herein may correspond to a third message in step S1104 and step S1305. The CDN download address of the meta-ability B1 herein may correspond to a download address of the first application module in step S1305.

S307: The BMS downloads the meta-ability B1 of the application B from a CDN server 30 based on the package name of the application B, the predefined ACTION1 of the meta-ability B1, and the CDN download address of the meta-ability B1. The CDN server 30 herein corresponds to a second server in step S1306.

S308: The BMS installs the meta-ability B1 of the application B.

S309: The BMS notifies the DMS that the meta-ability B1 of the application B has been installed. The notification herein may correspond to a fifth message in step S1307.

S310: The DMS starts the meta-ability B1 of the application B (that is, semi-implicit start), corresponding to the description in step S1308.

In conclusion, based on the description of the embodiment in FIG. 7B-1 and FIG. 7B-2, the device a 11 may trigger the system service in the device a 11, by using the meta-ability A1 of the application A, to start the meta-ability B1 of the application B in the device a 11 based on the package name of the application B and the predefined ACTION1 of the meta-ability B1, fully considering that a third-party application vendor usually does not provide the meta-ability name of the meta-ability B1 to other vendors, that is, there is no need to rely on the meta-ability name of the meta-ability B1.

As shown in FIG. 7C-1 and FIG. 7C-2, a specific implementation process of the application module startup method according to this application may include the following steps.

S401: A meta-ability A1 of an application A sends predefined ACTION1 to a DMS in response to an operation 2 of a user.

The operation 2 may include, but is not limited to, a type of operation such as tap, double tap, touch and hold, or touch. For example, the operation 2 may be an operation of touching a rice cooker with a mobile phone, which is performed by the user in the embodiment in FIG. 4B.

In addition, the operation 2 is associated with a meta-ability corresponding to the predefined ACTION1. That is, the meta-ability A1 may learn, based on the operation 2, that the device a 11 needs to start the meta-ability corresponding to the predefined ACTION1. Because the application A pre-stores the predefined ACTION1 of the meta-ability associated with the operation 2, the meta-ability A1 may learn the meta-ability corresponding to the predefined ACTION1. Therefore, the meta-ability A1 may request the DMS to start the meta-ability corresponding to the predefined ACTION1.

The predefined ACTION1 may identify meta-abilities with a same function. The predefined ACTION1 may be represented in at least one manner, such as letters, characters, and digits. The predefined ACTION1 may correspond to one or more meta-abilities. This is not limited in this application. The predefined ACTION1 herein may correspond to an identifier of a type of a first application module in step S1401.

In addition, the meta-ability A1 may carry the predefined ACTION1 in a message, and send the message to the DMS. The specific implementation of this message is not limited in this application. The message herein may correspond to a first message in step S1101 and step S1401.

S402: The DMS sends the predefined ACTION1 to a BMS. Therefore, the DMS may request the BMS to query whether the meta-ability corresponding to the predefined ACTION1 has been installed.

The DMS may carry the predefined ACTION1 in a message, and send the message to the BMS. The specific implementation of this message is not limited in this application. The message herein may correspond to a fourth message in step S1402.

S403: The BMS determines, based on the predefined ACTION1, whether a meta-ability corresponding to the predefined ACTION1 has been installed on a device a 11.

The BMS may store a parsed configuration file of a meta-ability in a distributed application component database when installing the meta-ability. Therefore, the BMS may query whether a configuration file of the meta-ability corresponding to the predefined ACTION1 exists in the distributed application component database, so as to determine whether the meta-ability corresponding to the predefined ACTION1 is installed on the device a 11.

When no configuration file of the meta-ability corresponding to the predefined ACTION1 exists in the distributed application component database, the BMS may determine that the meta-ability corresponding to the predefined ACTION1 is not installed on the device a 11, so that the BMS may perform step S404 to step S414; or when the configuration file of the meta-ability corresponding to the predefined ACTION1 exists in the distributed application component database, the BMS may determine that the meta-ability corresponding to the predefined ACTION1 has been installed on the device a 11, so that the BMS may perform step S413 and step S414.

S404: The BMS sends an ID of the device a 11 and the predefined ACTION1 to a HAG server 20. Therefore, the BMS may obtain the ID of the device a 11 by using a system attribute in the device a 11, and request the HAG server 20 to download the meta-ability corresponding to the predefined ACTION1 for the device a 11.

The BMS may carry the ID of the device a 11 and the predefined ACTION1 in a message, and send the message to the HAG server 20 through a communication channel between the device a 11 and the HAG server 20. The specific implementation of this message is not limited in this application. The message herein may correspond to a second message in step S1103 and step S1404. In addition, for the specific implementation of the ID of the device a 11, refer to the description of step S104. Details are not described herein.

S405: Based on the predefined ACTION1, the HAG server 20 obtains a matched meta-ability set 1, where each subset in the meta-ability set 1 carries an application name of an application, a meta-ability name of a meta-ability of the application (this parameter may be replaced with a predefined ACTION of the meta-ability of the application), and a CDN download address of the meta-ability.

Because the HAG server 20 pre-stores a plurality of HAPs and a CDN download address of a meta-ability corresponding to each HAP, and the HAG server 20 may obtain an application package name, a meta-ability name, and a predefined ACTION of each HAP, the HAG server 20 may match meta-abilities with the same function as those identified by the predefined ACTION1, so that the HAG server 20 obtains the meta-ability set 1 based on matched package names of applications corresponding to the meta-abilities, matched meta-ability names of the meta-abilities, and matched CDN download addresses corresponding to the meta-abilities.

The CDN download address may be expressed in a manner such as a link or an address string. In addition, the meta-ability B1 corresponding to the CDN download address that is corresponding to the meta-ability B1 and that is matched by the HAG server 20 is usually a latest version. The meta-ability set 1 may include one or more subsets.

S406: The HAG server 20 sends the meta-ability set 1 to the BMS.

The HAG server 20 may carry the meta-ability set 1 in a message, and send the message to the BMS in the device a 11 through the communication channel between the device a 11 and the HAG server 20. The specific implementation of this message is not limited in this application. The message herein may correspond to a third message in step S1104 and step S1405. The meta-ability set 1 herein may correspond to a first set in step S1405.

S407: The BMS sends the meta-ability set 1 to the DMS.

The DMS may carry the meta-ability set 1 in a message, and send the message to the BMS. The specific implementation of this message is not limited in this application. The message herein may correspond to a sixth message in step S1501. The meta-ability set 1 herein may correspond to a first set in step S1501.

S408: Based on the meta-ability set 1, the DMS determines whether a quantity of matched meta-abilities is greater than 1.

Because the quantity of the matched meta-abilities is equal to a quantity of the subsets of the meta-ability set 1, the DMS may determine whether the quantity of the subsets of the meta-ability set 1 is greater than 1, to determine whether the quantity of the matched meta-abilities is greater than 1.

When it is determined that the quantity of the subsets of the meta-ability set 1 is greater than 1, the DMS may determine that the quantity of the matched meta-abilities is greater than 1, so that the DMS may perform step S409 to step S411, so as to determine a meta-ability of a selected application based on wishes of the user, thereby improving user engagement and user experience. When the quantity of the subsets of the meta-ability set 1 is equal to 1, the DMS may determine that the quantity of the matched meta-abilities is equal to 1, so that the DMS may perform step S410 and step S411, so as to use the matched meta-ability as the meta-ability of the selected application, which increases a processing speed of the DMS.

S409: The DMS displays a window 1, and determines a meta-ability of a selected application in response to an operation of the user on the window 1.

Layout parameters such as a size, a position, and a color of the window 1 are not limited in this application. The operation herein corresponds to a third operation in step S15022, the window 1 corresponds to a first window in step S15022, and the meta-ability of the selected application corresponds to a selected software module in step S15022. Alternatively, the DMS may select one meta-ability from the matched meta-abilities as the meta-ability of the selected application, and does not display the window 1, corresponding to the description of step S15021. The DMS may perform the selection in a manner such as based on a preset priority of the matched meta-abilities or storage space of the meta-abilities. This is not limited in this application.

S410: The DMS sends a package name of the selected application and a meta-ability name of the meta-ability of the selected application to the BMS.

The DMS may carry the package name of the selected application and the meta-ability name of the meta-ability of the selected application in a message, and send the message to the BMS. The specific implementation of this message is not limited in this application. The message herein may correspond to a seventh message in step S1503. In addition, in addition to the package name of the selected application and the meta-ability name of the meta-ability of the selected application, the message further carries a CDN download address of the meta-ability.

The meta-ability of the selected application includes the meta-ability B1 of the application B, and the selected device may include the device a 11. For ease of description, the meta-ability of the selected application herein is the meta-ability B1 of the application B.

It should be noted that step S407 to step S410 are optional steps. That is, when the quantity of the matched meta-abilities is equal to 1, the BMS may use the matched meta-ability as the meta-ability of the selected application. When the quantity of the matched meta-abilities is equal to 1, the BMS may select one meta-ability from the matched meta-abilities as the meta-ability of the selected application. The BMS may perform the selection in a manner such as based on a preset priority of the matched meta-abilities or storage space of the meta-abilities. This is not limited in this application.

S411: The BMS downloads the meta-ability of the selected application from a CDN server 30 based on the CDN download address of the meta-ability of the selected application. The CDN server 30 herein corresponds to a second server in step S1406.

S412: The BMS installs the meta-ability of the selected application.

Step S411 and step S412 herein correspond to step S1406.

S413: The BMS notifies the DMS that the meta-ability corresponding to the predefined ACTION1 has been installed. The notification herein may correspond to a fifth message in step S1407.

S414: The DMS starts the meta-ability corresponding to the predefined ACTION1 (that is, implicit start), corresponding to the description in step S1408.

In conclusion, based on the description of the embodiment in FIG. 7C-1 and FIG. 7C-2, the device a 11 may trigger the system service in the device a 11, by using the meta-ability A1 of the application A, to start the meta-ability B1 of the application B in the device a 11 based on the predefined ACTION1, fully considering that a third-party application vendor usually does not provide the meta-ability name of the meta-ability B1 to other vendors, that is, there is no need to rely on the meta-ability name of the meta-ability B1.

It should be noted that, based on the description of the embodiment in FIG. 7A-1 and FIG. 7A-2 to FIG. 7C-1 and FIG. 7C-2, only one interface (corresponding to startability) needs to exist between the application A and the DMS in the device a, that is, only one system API needs to exist between the application A and a software system of the device a, so that the process in which the device a triggers the system service in the device a by using the meta-ability A1 of the application A to start the meta-ability B1 of the application B in the device a may be implemented.

Therefore, an electronic device may query a CDN download address of a meta-ability from a HAG server by using a package name of an application and a meta-ability name of the meta-ability of the application, or a package name of an application and a predefined ACTION of the meta-ability of the application, or a predefined ACTION, and download the meta-ability from a CDN server based on the CDN download address of the meta-ability, so that a meta-ability that is not installed is automatically installed, and the user is unaware of a download process of the meta-ability. The meta-ability does not need to be downloaded when the application is installed for the first time, and may be downloaded based on a user requirement.

However, if an application needs to start a dynamic feature module in the application, and the application needs to download the dynamic feature module from a Google (Google) play store, the application needs to perform the following steps.

1. The application invokes a system query interface to query whether the dynamic feature module is installed.

2. When it is determined that the dynamic feature module has been installed, the application invokes a system startup interface to start the dynamic feature module.

3. When it is determined that the dynamic feature module is not installed, based on a module name of the dynamic feature module, the application invokes a download and installation interface of a Google Play Core (Google Play Core) Library integrated in the application to implement download and installation of the dynamic feature module. The application invokes the system startup interface to start the dynamic feature module.

It may be learned that, when the dynamic feature module has been installed, at least two interfaces need to exist between the application and a system service, so that the application can start the dynamic feature module. When the dynamic feature module is not installed, at least three interfaces need to exist between the application and a system service, and the application needs to integrate the Google Play Core (Google Play Core) Library in advance, so that the application can start the dynamic feature module.

In this application, if an application starts a meta-ability in the application, the application needs to perform the following steps.

1. Regardless of whether the meta-ability is installed or not, the application invokes an interface of the system service, and sends a package name of the application in which the meta-ability is located and a meta-ability name of the meta-ability, or a package name of the application in which the meta-ability is located and a predefined ACTION of the meta-ability, or a predefined ACTION, so that the system service can complete the starting process of the meta-ability.

It may be learned that, regardless of whether the meta-ability is installed or not, the application needs to have an interface with a system service, so that the application can start the meta-ability.

In conclusion, the process from starting a dynamic feature module in the application to starting a meta-ability in the application reduces a quantity of interfaces that are between the application and the system service and are allocated by a developer, and reduces programming costs for the developer. The developer does not need to integrate the Google Play Core (Google Play Core) Library into the application, thereby reducing configuration costs for the developer, and facilitating development of more meta-abilities for enriching use by the user.

With reference to FIG. 8A to FIG. 8I, a specific implementation process of starting a meta-ability of at least one electronic device in a same distributed network is described. For ease of description, in FIG. 8A to FIG. 8I, electronic devices in the same distributed network include a mobile phone, a tablet computer, a television, and a watch. A meta-ability A1 of an application A is installed on the mobile phone, the application A is a leftmost home screen application, and the meta-ability A1 of the application A is software code. The meta-ability A1 is used to provide a page of the leftmost home screen application and trigger and start a meta-ability C1 of an application C. The mobile phone, the tablet computer, the television, and the watch all are capable of installing the meta-ability C1 of the application C. The application C is an XX map application, the meta-ability C1 of the application C is software code, and the meta-ability C1 is used to provide a home page of the XX map application as an example for illustration. Whether the meta-ability C1 of the application C is installed on the mobile phone, the tablet computer, the television, and the watch is not limited in this embodiment of this application.

FIG. 8A to FIG. 8I are schematic diagrams of man-machine interaction interfaces according to an embodiment of this application.

Figure 8A:
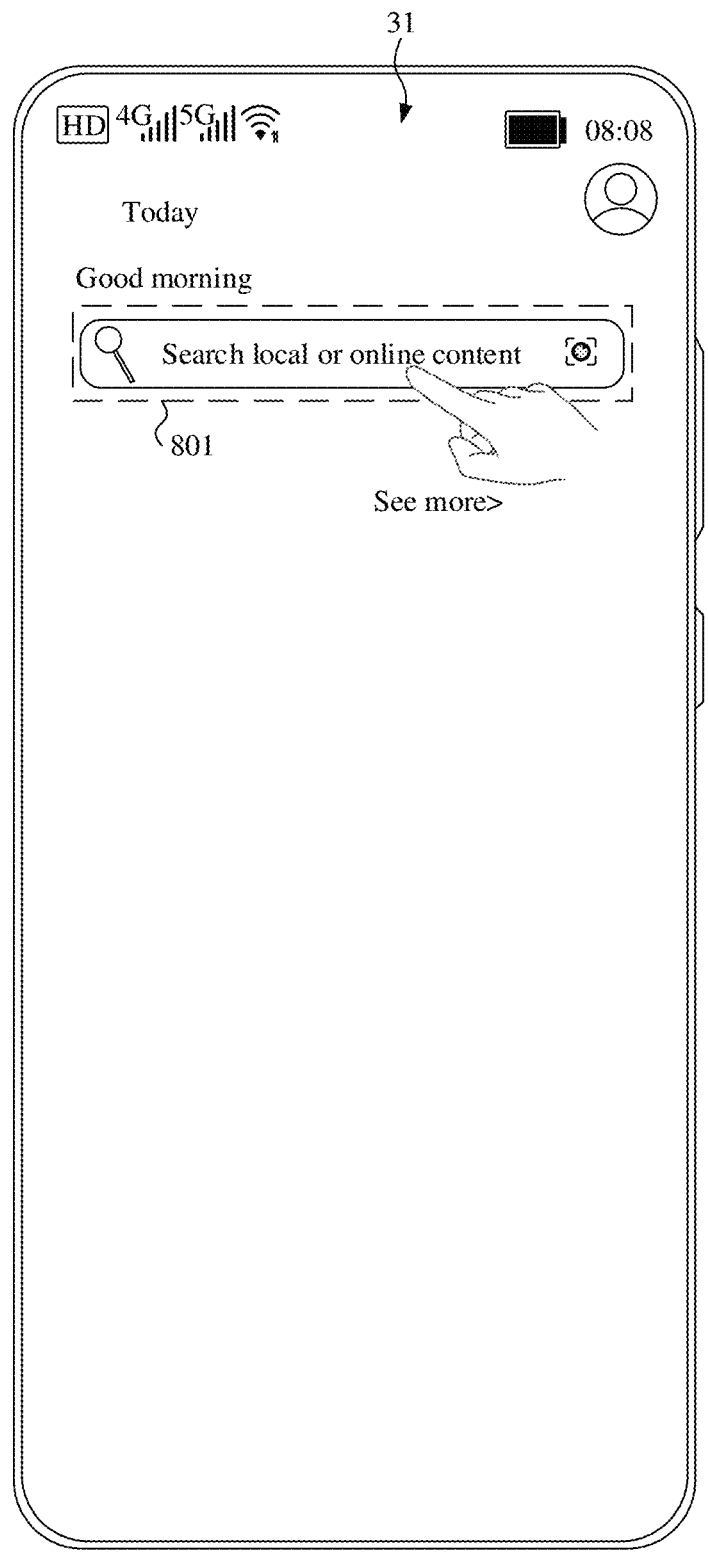
FIG. 8A to FIG. 8I are schematic diagrams of man-machine interaction interfaces according to an embodiment of this application.

A mobile phone may display a user interface 31 in an example shown in FIG. 8A, and the user interface 31 is used to display a page of a leftmost home screen application (that is, start a meta-ability A1). The user interface 31 includes a search box 801, and the search box 801 is used to search resources such as an application, a meta-ability, a file, a video, and a photo in the mobile phone.

Figure 8B:
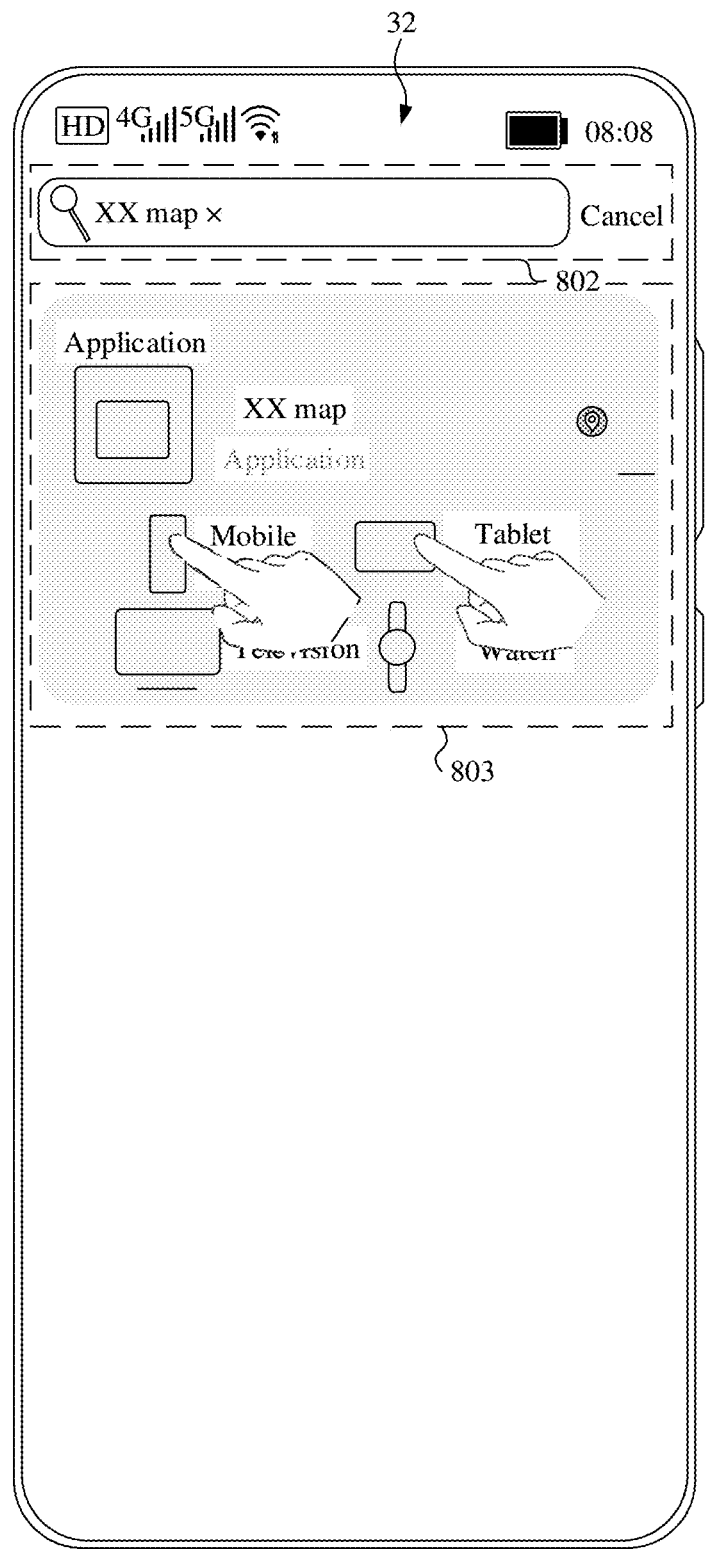

The mobile phone may display a user interface 32 in an example shown in FIG. 8B after detecting an operation of searching an XX map application as indicated by the user (such as inputting the word "XX map" in the search box 801 on the user interface 31 shown in FIG. 8A), and the user interface 32 is used to display a search page of the XX map application.

The user interface 32 includes a search box 802 and a window 803. The search box 802 is used to display search content as the word "XX map". The window 803 is used to display a search result of the word "XX map", and the search result may indicate that the mobile phone searches that a home page of the XX map application (that is, a meta-ability C1 of an application C) has been installed on a mobile phone, a tablet computer, a television, and a watch in a same distributed network. It should be noted that, the search result may also indicate that the mobile phone searches that the mobile phone, the tablet computer, the television, and the watch in the same distributed network is capable of installing the home page of the XX map application (that is, the meta-ability C1 of the application C).

It should be noted that, if an electronic device belonging to the same distributed network as the mobile phone does not have the ability to provide the home page of the XX map application (that is, the meta-ability C1 of the application C), the window 803 may not display a word and an icon of the electronic device, or the window 803 may display the word and the icon of the electronic device in gray, so that the user learns that the electronic device cannot start the home page of the XX map application (that is, the meta-ability C1 of the application C).

Figure 8C:
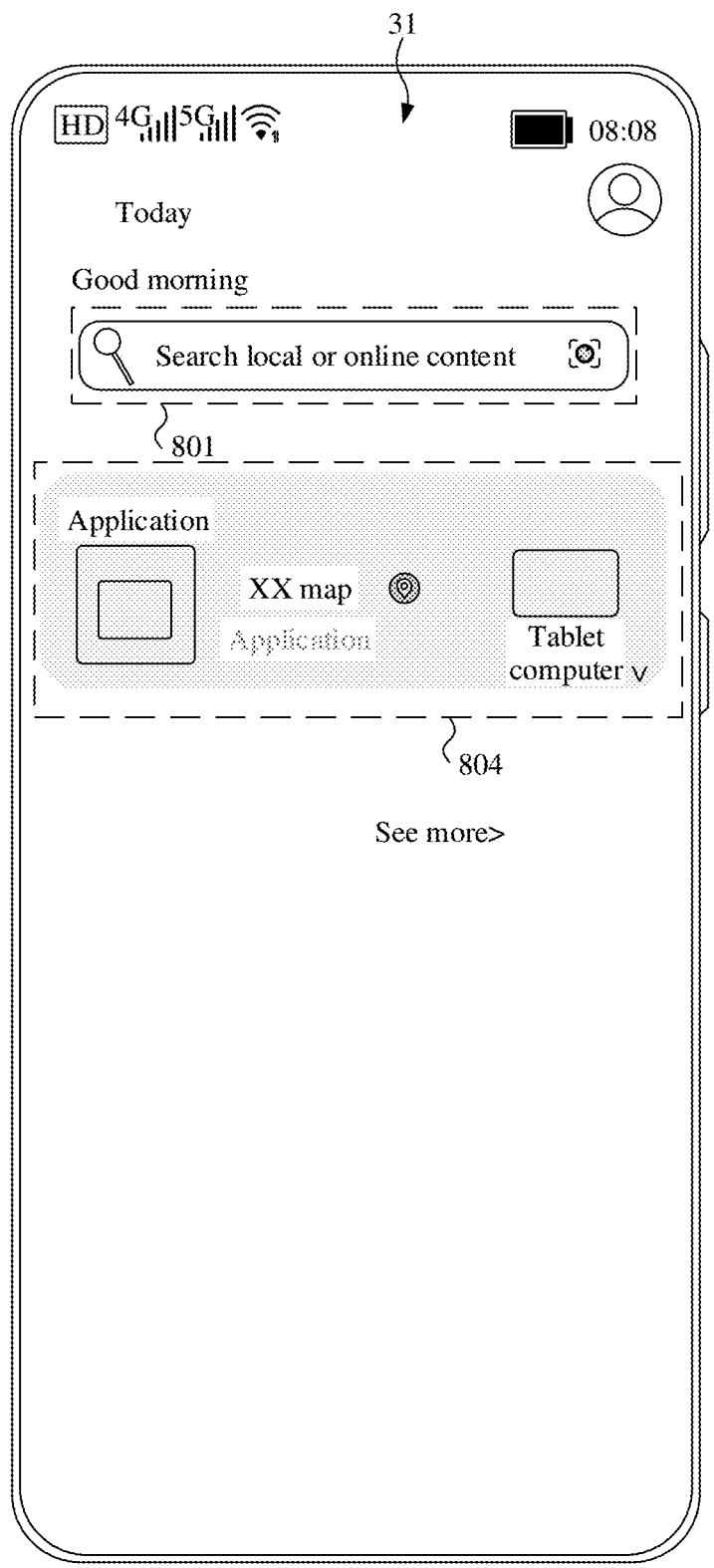

In some embodiments, the mobile phone may display, on the user interface 31, a window 804 in an example shown in FIG. 8C after detecting an operation on the window 803 indicated by the user, such as tapping the tablet computer, and the window 804 is used to indicate that the user indicates to open the XX map application in the tablet computer.

Furthermore, when the home page of the XX map application is not installed on the tablet computer, the tablet computer may download and install the XX map application, so that the tablet computer starts the XX map application. When the home page of the XX map application has been installed on the tablet computer, the tablet computer starts the XX map application.

Figure 8D:
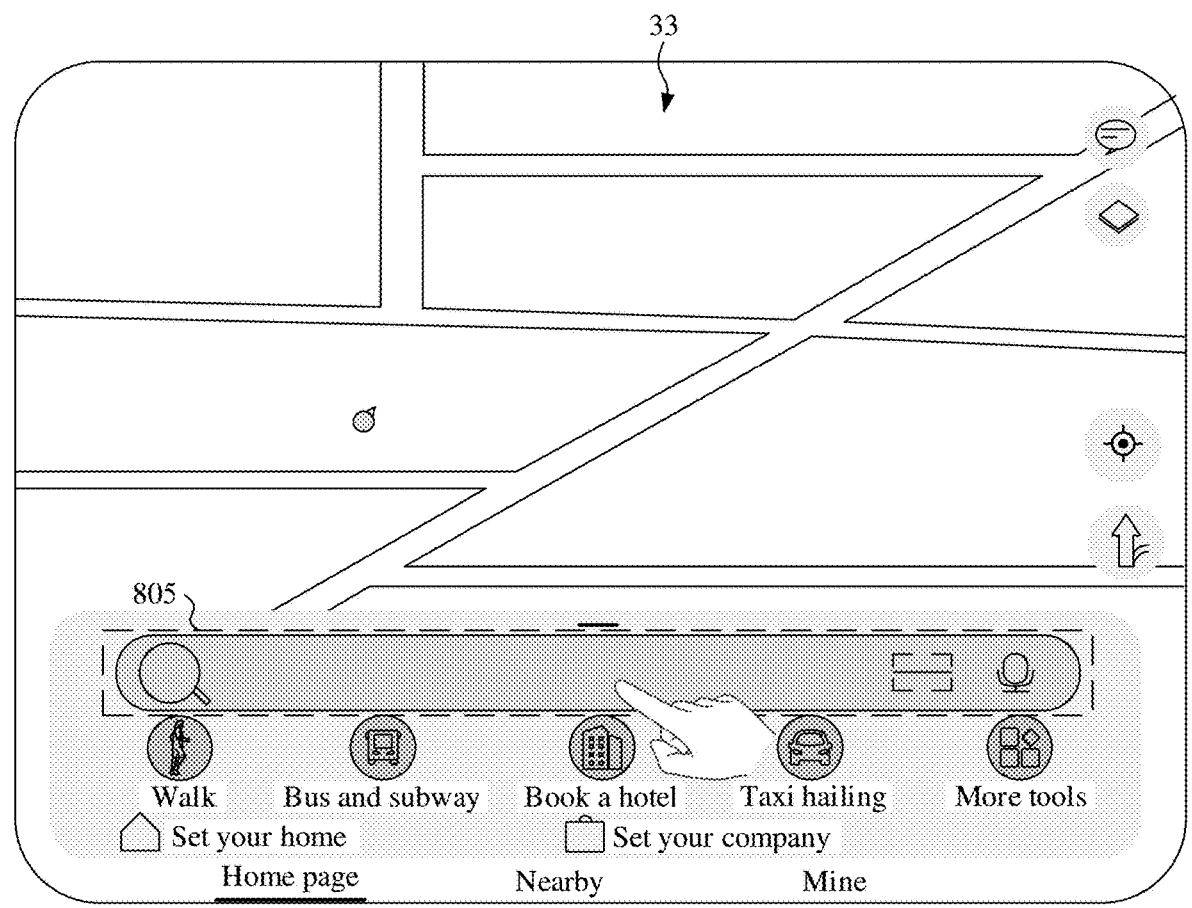

After the XX map application is started, the tablet computer may display, on the user interface 31, a user interface 33 in an example shown in FIG. 8D, and the user interface 33 is used to display the home page of the XX map application (that is, start the meta-ability C1). The user interface 33 may include a search box 805, and the search box 805 is used to search a location such as a hotel, a residence, a school, or a hospital.

Figure 8E:
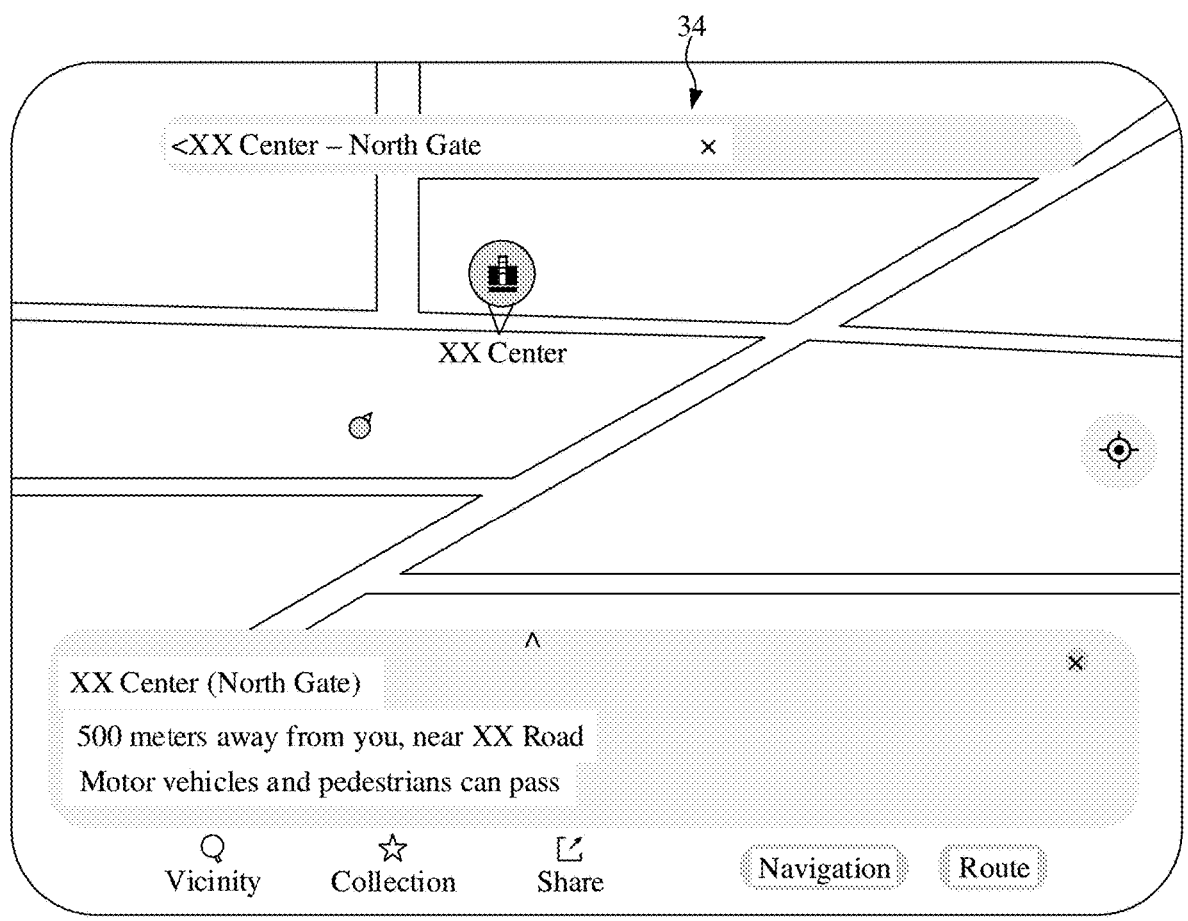

The tablet computer may display a user interface 34 in an example shown in FIG. 8E after detecting an operation of searching a location "XX Center" as indicated by the user (such as inputting the word "XX Center" in the search box 805 on the user interface 33 shown in FIG. 8D), and the user interface 34 is used to display a search page of the XX Center.

Figure 8F:
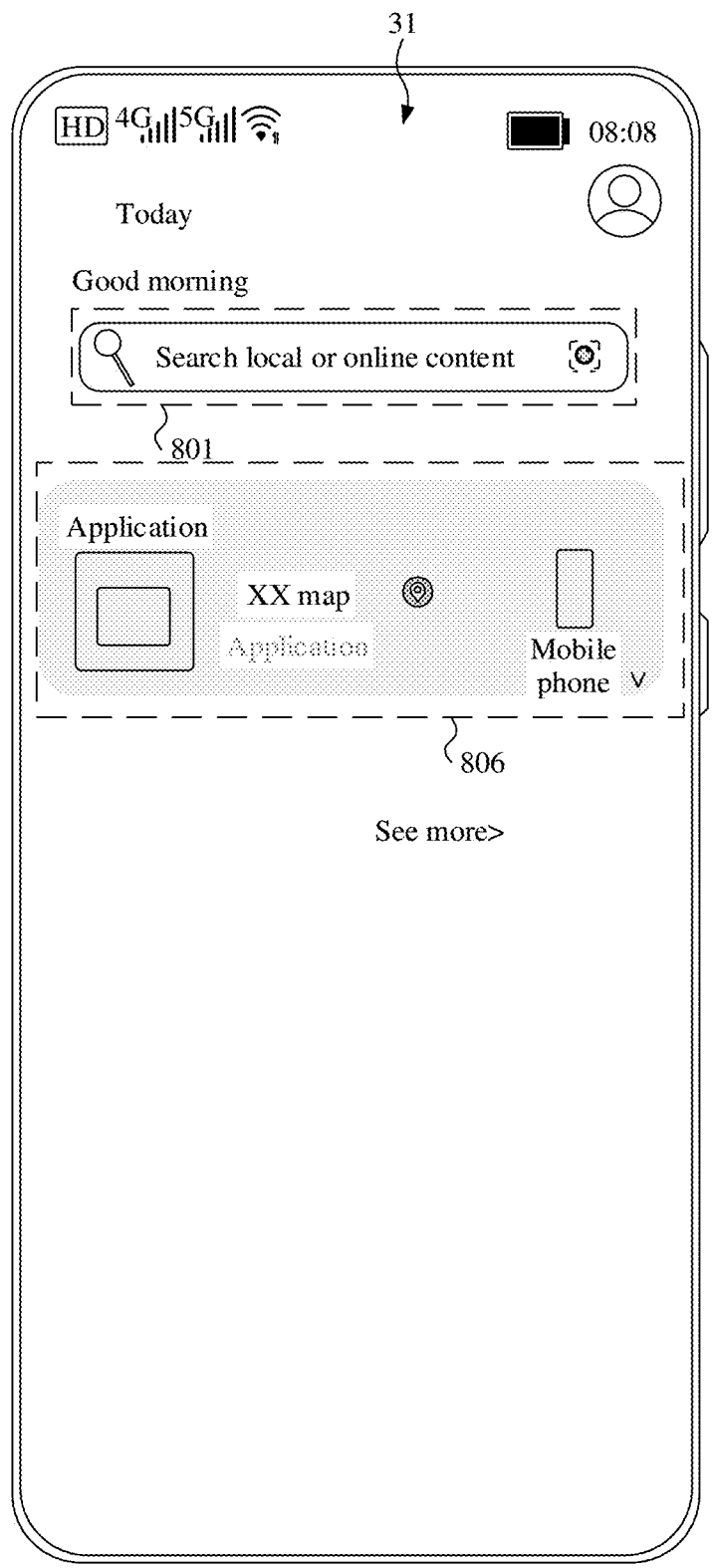

In some other embodiments, the mobile phone may display, on the user interface 31, a window 806 in an example shown in FIG. 8F after detecting an operation on the window 803 indicated by the user, such as tapping the mobile phone, and the window 806 is used to indicate that the user indicates to open the XX map application in the mobile phone.

Furthermore, when the home page of the XX map application is not installed on the mobile phone, the mobile phone may download and install the XX map application (an icon of the XX map application on the user interface 11 shown in FIG. 3A or an icon of the XX map application on the user interface 21 shown in FIG. 4B), so that the mobile phone starts the XX map application. When the home page of the XX map application has been installed on the mobile phone, the mobile phone starts the XX map application.

Figure 8G:
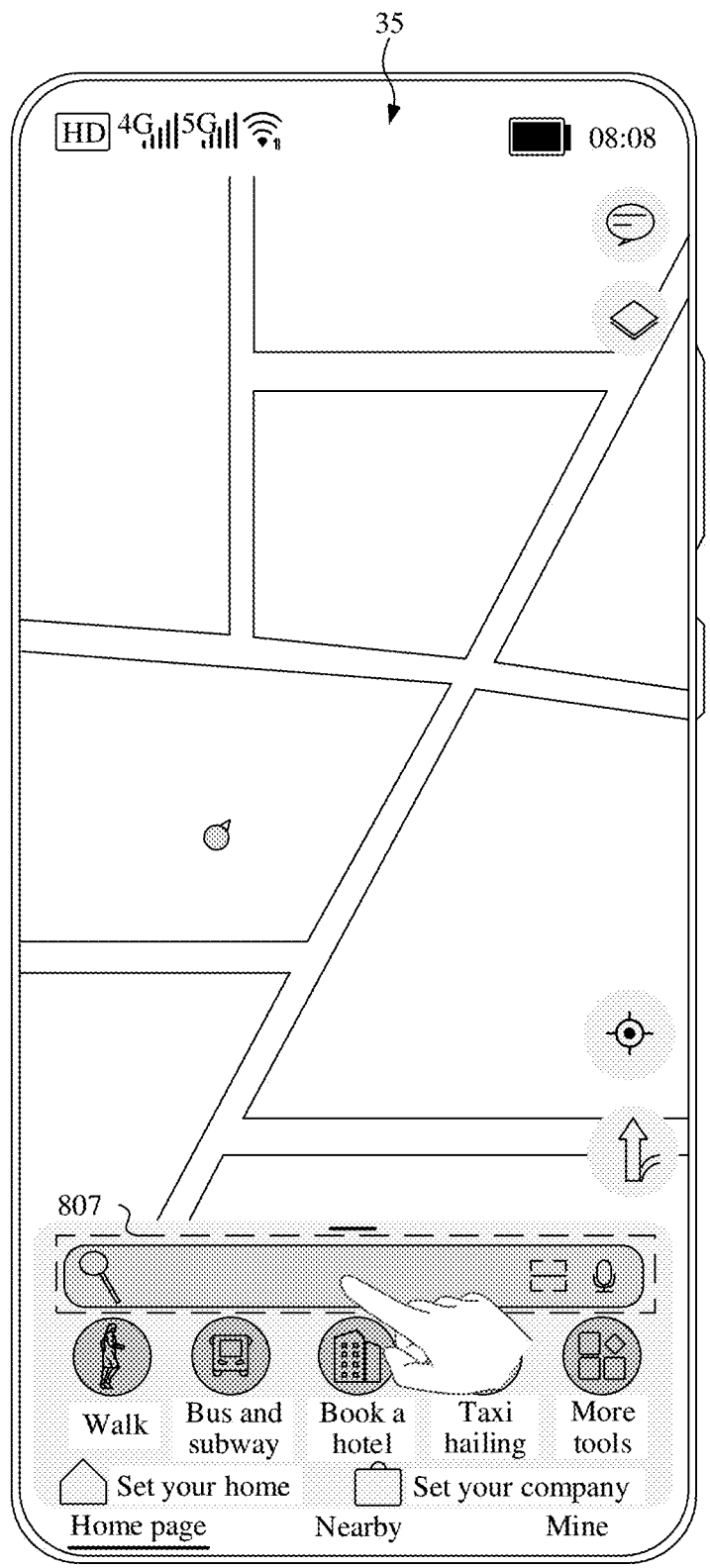

After the XX map application is started, the mobile phone may display a user interface 35 in an example shown in FIG. 8G, and the user interface 35 is used to display the home page of the XX map application (that is, start the meta-ability C1). The user interface 35 may include a search box 807, and the search box 807 is used to search a location such as a hotel, a residence, a school, or a hospital.

Figure 8H:
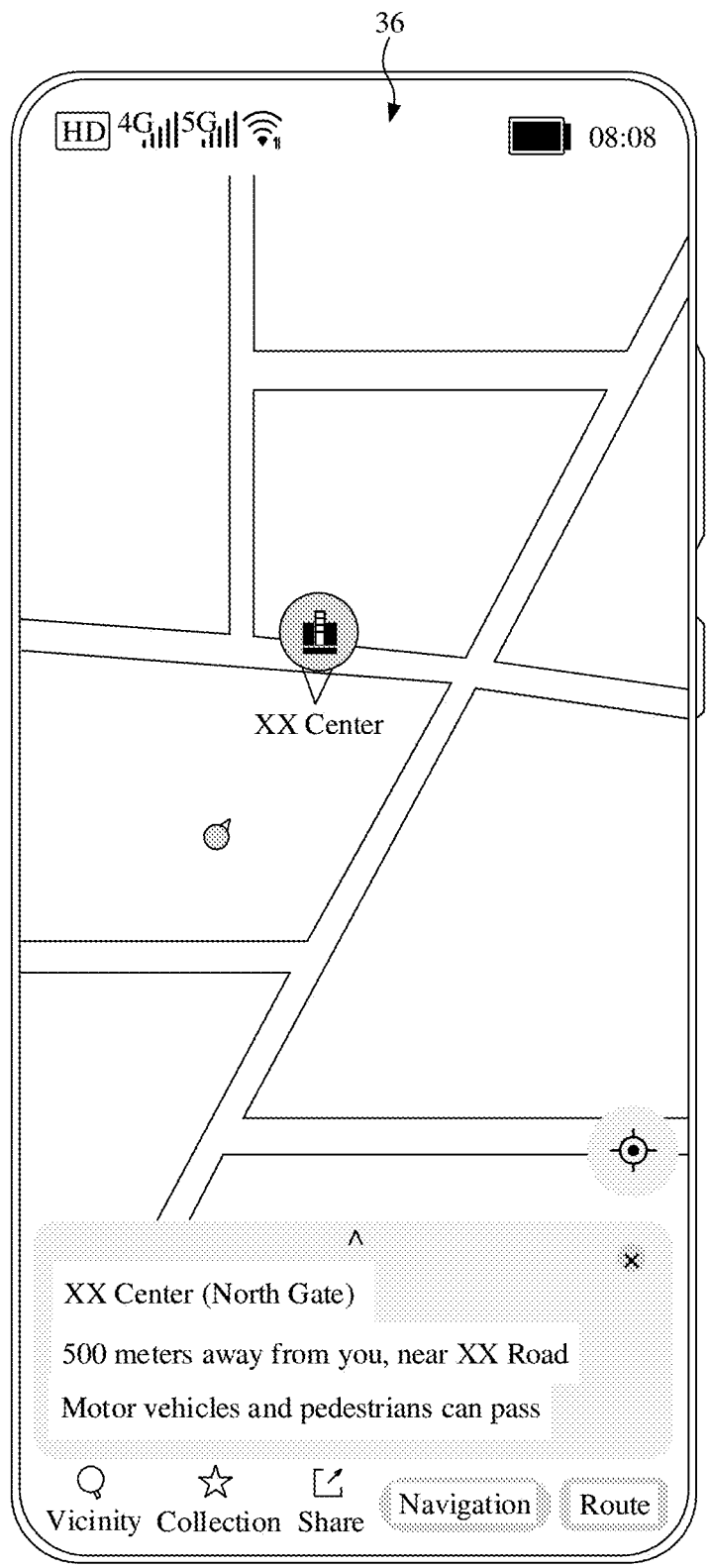

The mobile phone may display a user interface 36 in an example shown in FIG. 8H after detecting an operation of searching a location "XX Center" as indicated by the user (such as inputting the word "XX Center" in the search box 807 on the user interface 35 shown in FIG. 8G), and the user interface 36 is used to display a search page of the XX Center.

It should be noted that, in addition to selecting one electronic device in the window 803 shown in FIG. 8B, the user may further select a plurality of electronic devices in the window 803 shown in FIG. 8B, so that the plurality of electronic devices can open the home page of the XX map application, to actually meet an actual requirement of the user.

Figure 8I:
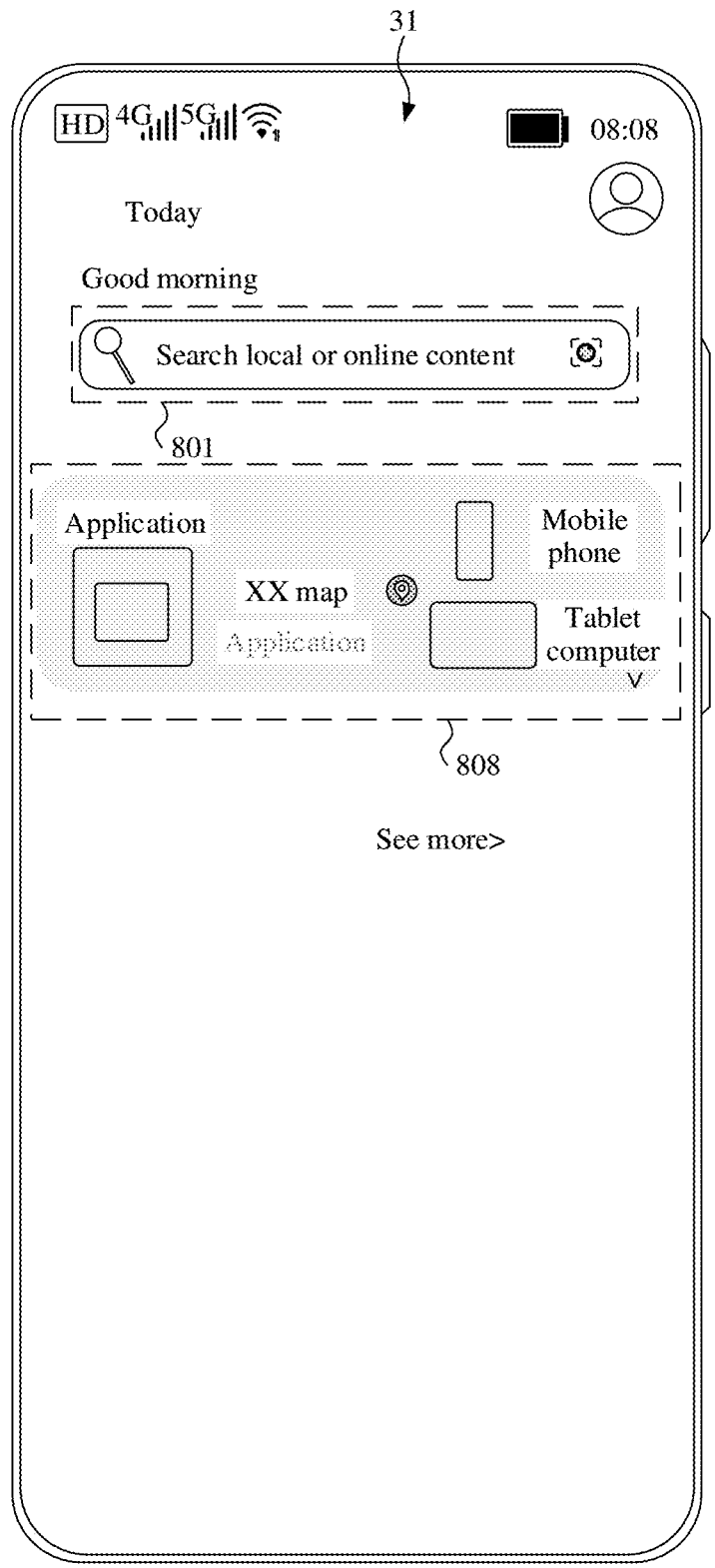

For example, the mobile phone may display, on the user interface 31, a window 808 in an example shown in FIG. 8I after detecting an operation on the window 803 indicated by the user, such as tapping the mobile phone and the tablet computer, and the window 808 is used to indicate that the user indicates to open the XX map application in the mobile phone and the tablet computer.

In addition, the user may further switch an electronic device in the window 804 shown in FIG. 8C or the window 806 shown in FIG. 8F, so that the electronic device after the switching can open the home page of the XX map application (that is, start the meta-ability C1), which improves user experience.

In conclusion, when a mobile phone, a tablet computer, a television, and a watch in a same distributed network are capable of installing a same meta-ability, a mobile phone triggers a system service in the mobile phone by another meta-ability, which may control at least one electronic device among the mobile phone, the tablet computer, the television, and the watch to start the same meta-ability, which meets an actual requirement of the user and improves user experience.

When the same meta-ability has been installed on at least one electronic device among the mobile phone, the tablet computer, the television, and the watch, the mobile phone may control the at least one electronic device to directly start the same meta-ability. When the same meta-ability is not installed on at least one electronic device among the mobile phone, the tablet computer, the television, and the watch, the mobile phone may control the at least one electronic device to download and install the same meta-ability first, and then start the same meta-ability.

Based on the description of the embodiment in FIG. 8A to FIG. 8I, one of all electronic devices in the same distributed network on which a same meta-ability can be installed triggers a system service in the electronic device by using another meta-ability in the electronic device, so as to flexibly select one or more electronic devices from all the electronic devices in the same distributed network based on wishes of the user or an actual situation, and control the selected electronic device/devices to start the same meta-ability, so that the user can use one electronic device to control other electronic devices to complete function implementations corresponding to the same meta-ability, which meets an actual requirement of the user and improves a use sense of the user. Whether another meta-ability is installed on all the electronic devices in the same distributed network is not limited in this application.

Figure 9A:
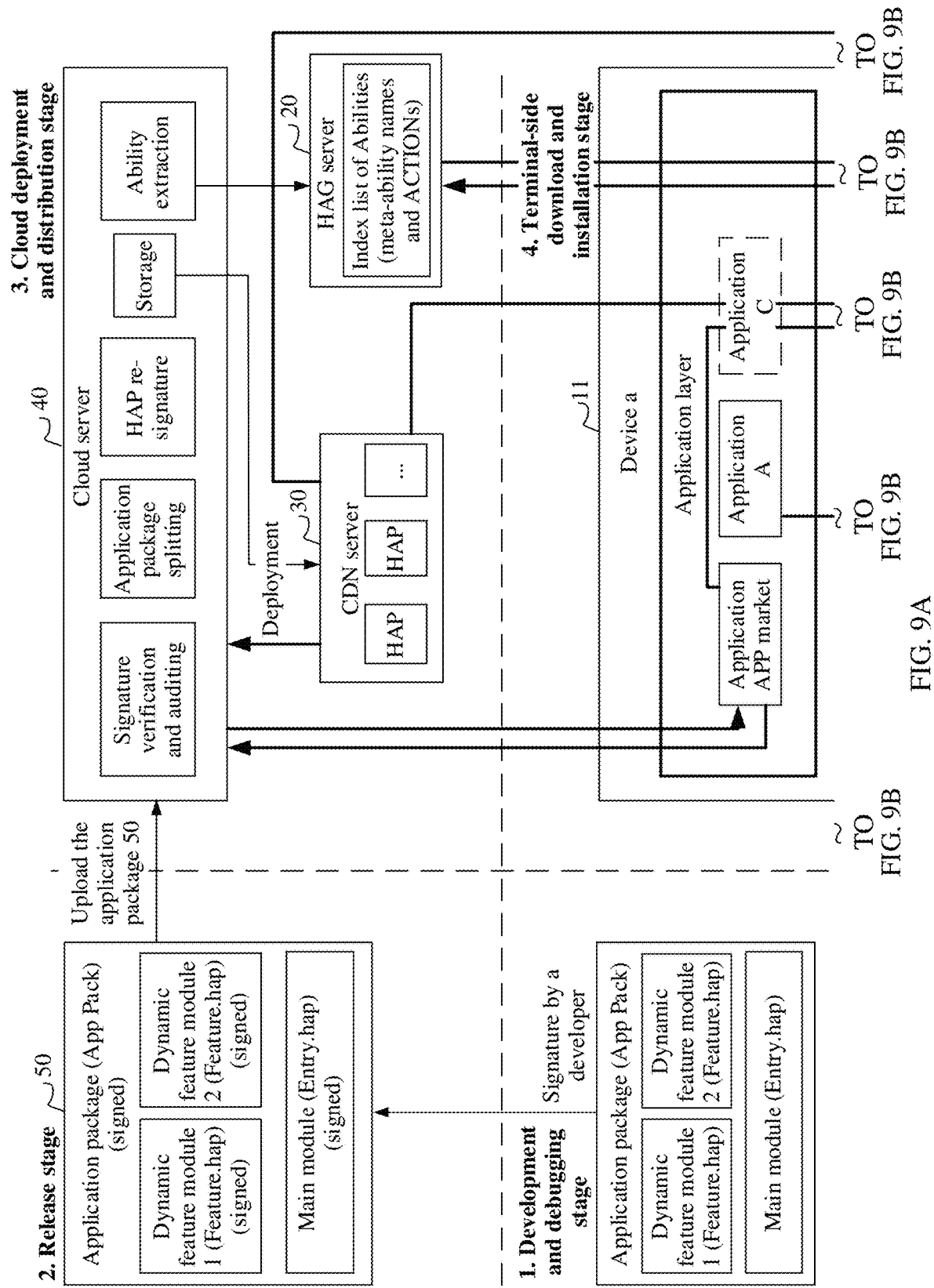
FIG. 9A to FIG. 9C are a schematic diagram of each stage of another application according to an embodiment of this application.
Figure 9B:
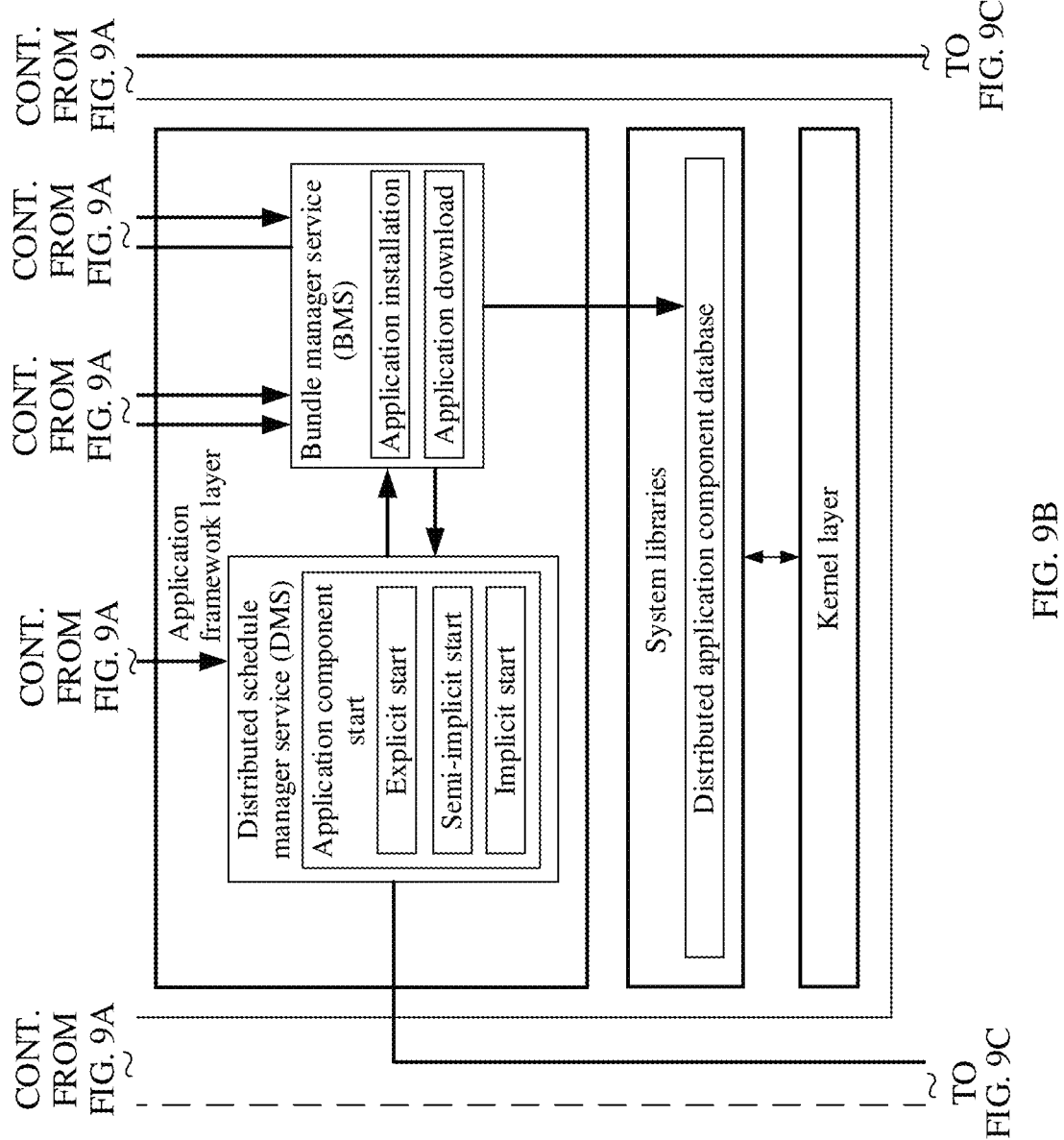
Figure 9C:
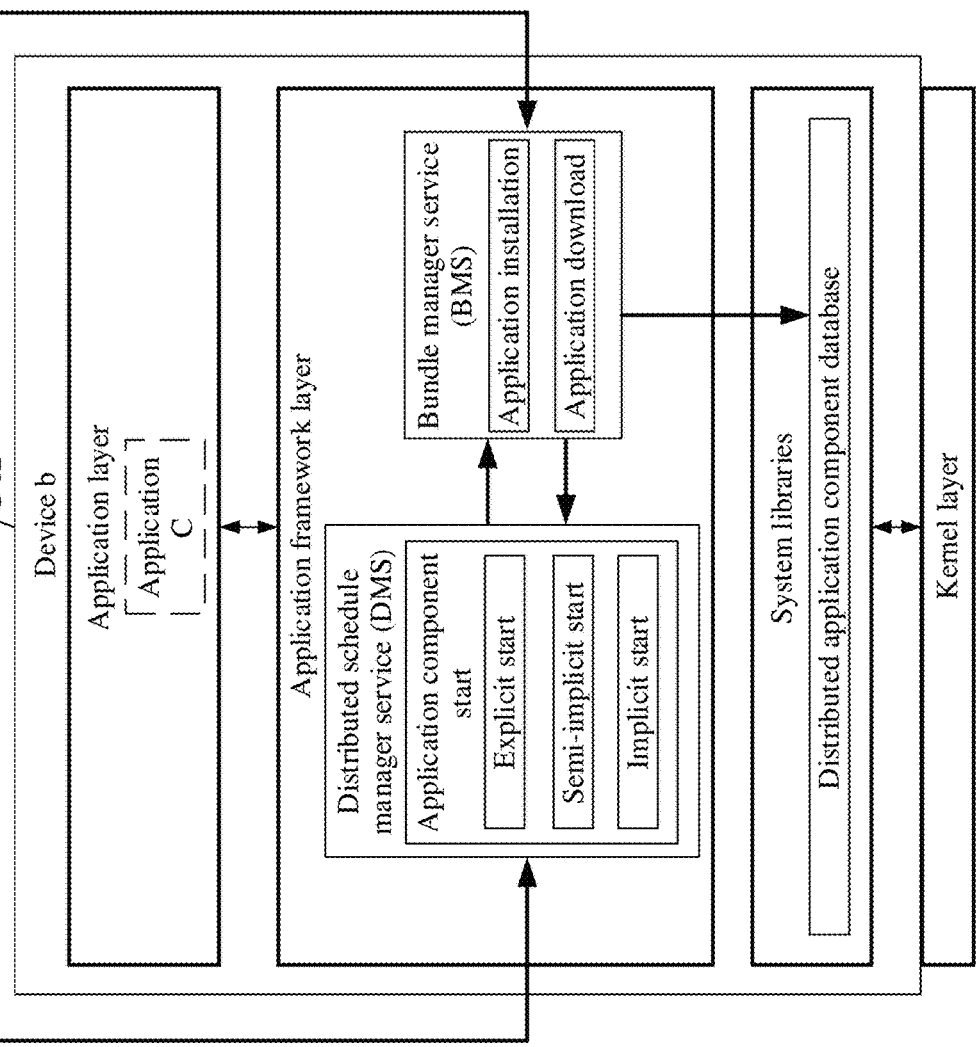

FIG. 9A to FIG. 9C are a schematic diagram of each stage of an application according to an embodiment of this application.

As shown in FIG. 9A to FIG. 9C, a life cycle process of an application may include four stages: a development and debugging stage, a release stage, a cloud deployment and distribution stage, and a terminal-side download and installation stage.

For a specific implementation process of each stage, refer to the description of the embodiment in FIG. 5A and FIG. 5B. For an application C, refer to the description of the application B in the embodiment in FIG. 5A and FIG. 5B. Details are not described herein. In addition, in the terminal-side download and installation stage, a device b 12 is also included in FIG. 9A to FIG. 9C. For details about a layered architecture of the device b 12, refer to the description of the layered architecture of the device a 11 in the embodiment in FIG. 5A and FIG. 5B. In addition, all the electronic devices in the same distributed network include a device a 11 and the device b 12, and a distributed application component database in the device b 12 may store a configuration file of a meta-ability having been installed on the device b 12.

It should be noted that positions of the device a 11 and the device b 12 in this application are interchangeable.

With reference to FIG. 9A to FIG. 9C, assuming that a meta-ability A1 of an application A has been installed on the device a 11, the meta-ability A1 of the application A in the device a 11 may request a DMS in the device a 11 to start a meta-ability C1 of the application C. The DMS in the device a 11 may request a BMS in the device a 11 to query whether the meta-ability C1 of the application C is installed on the device a 11 and the device b 12.

The BMS in the device a 11 may determine whether the meta-ability C1 of the application C is installed on the device a 11 and the device b 12.

1. When the meta-ability C1 of the application C has been installed on at least one of the device a 11 and the device b 12, the BMS in the device a 11 may notify the DMS in the device a 11 of the device/devices on which the meta-ability C1 of the application C has been installed.

1.1. If the device on which the meta-ability C1 of the application C has been installed is the device a 11, the DMS in the device a 11 may start the meta-ability C1 in the device a 11.

It should be noted that, in addition to the foregoing manner, before the DMS in the device a 11 may start the meta-ability C1 in the device a 11, the DMS in the device a 11 may further display a window first, and the window is used to ask a user whether to start the meta-ability C1 in the device a 11, such as displaying an identifier of the device a 11. Therefore, when the DMS in the device a 11 determines, by using an operation of the user on the window, that the meta-ability C1 in the device a 11 is to be started, the DMS in the device a 11 may start the meta-ability C1 in the device a 11. Therefore, a sense of participation of the user is enhanced through interaction with the user.

In conclusion, the device a 11 may trigger the system service in the device a 11, by using the meta-ability A1 of the application A, to start the meta-ability C1 of the application C.

1.2. If the device on which the meta-ability C1 of the application C has been installed is the device b 12, the DMS in the device a 11 displays a window, and the window is used to notify the user and ask whether to start the meta-ability C1 in the device b 12, such as displaying an identifier of the device b 12. Therefore, when the DMS in the device a 11 determines, by using an operation of the user on the window, that the meta-ability C1 in the device b 12 is to be started, the DMS in the device a 11 may notify a DMS in the device b 12 of starting the meta-ability C1 of the application C. The DMS in the device b 12 may request a BMS in the device b 12 to query whether the meta-ability C1 of the application C is installed on the device b 12.

When the BMS in the device b 12 determines that the meta-ability C1 has been installed on the device b 12, the BMS in the device b 12 may notify the DMS in the device b 12 that the meta-ability C1 has been installed on the device b 12. Therefore, the DMS in the device b 12 may start the meta-ability C1 in the device b 12. An application layer in the device b 12 further includes an application C.

When the BMS in the device b 12 determines that the meta-ability C1 is not installed on the device b 12, the BMS in the device b 12 may notify the DMS in the device b 12 that the meta-ability C1 is not installed on the device b 12. The DMS in the device b 12 notifies the DMS in the device a 11 that the meta-ability C1 is not installed on the device b 12. The DMS in the device b 12 may shield an operation of the user, or may display a window to notify the user that the meta-ability C1 of the application C cannot be started. It should be noted that the foregoing is an optional operation.

In conclusion, the device a 11 may trigger the system service in the device a 11, by using the meta-ability A1 of the application A, to start the meta-ability C1 of the application C in the device b 12.

1.3. If the devices on which the meta-ability C1 of the application C has been installed include the device a 11 and the device b 12, the DMS in the device a 11 may select one or more devices from the device a 11 and the device b 12 based on a preset policy, or the DMS in the device a 11 may display a window to notify the user, such as displaying an identifier of the device a 11 and an identifier of the device b 12, so that the DMS in the device a 11 determines, by using an operation of the user on the window, one or more devices selected from the device a 11 and the device b 12.

If the selected device includes the device a 11, the DMS in the device a 11 confirms that the meta-ability C1 of the application C has been installed on the device a 11. Therefore, the DMS in the device a 11 may start the meta-ability C1 of the application C.

In conclusion, the device a 11 may trigger the system service in the device a 11, by using the meta-ability A1 of the application A, to start the meta-ability C1 of the application C.

If the selected devices include the device b 12, the DMS in the device a 11 notifies a DMS in the device b 12 of starting the meta-ability C1 of the application C. The DMS in the device b 12 may request the BMS in the device b 12 to query whether the meta-ability C1 of the application C is installed on the device b 12. For a specific implementation process, refer to the description on that the device on which the meta-ability C1 of the application C has been installed is the device b 12. Details are not described herein.

In conclusion, the device a 11 may trigger the system service in the device a 11, by using the meta-ability A1 of the application A, to start the meta-ability C1 of the application C in the device b 12.

If the selected devices include the device a 11 and the device b 12, for a specific implementation process of the DMS in the device a 11, refer to the description on that the selected devices include the device a 11 and the device b 12. Details are not described herein.

In conclusion, the device a 11 may trigger the system service in the device a 11, by using the meta-ability A1 of the application A, to start the meta-ability C1 of the application C in the device a 11 and the device b 12.

2. When the meta-ability C1 of the application C is not installed on the device a 11 and the device b 12, the BMS in the device a 11 may obtain, from a HAG server 20, a CDN download address of the meta-ability C1 of the application C and a device type applicable to the CDN download address of the meta-ability C1.

One or more CDN download addresses of the meta-ability C1 herein may be provided, and the CDN download address/addresses of the meta-ability C1 may be applicable to the device a 11 and/or the device b 12, or may not be applicable to the device a 11 and the device b 12. In addition, a specific representation manner of the CDN download address of the meta-ability C1 is not limited in this application.

In addition, one or more CDN download addresses of the meta-ability C1 may be provided, and a plurality of CDN download addresses may correspond to meta-abilities C1 of different versions or meta-abilities C1 of different devices. A specific representation manner of the CDN download addresses of the meta-ability C1 is not limited in this application.

The BMS in the device a 11 may send the CDN download address and the device type applicable to the CDN download address of the meta-ability C1 to the DMS in the device a 11. The DMS in the device a 11 determines whether the device type applicable to the CDN download address of the meta-ability C1 includes a device type of the device a 11 and a device type of the device b 12.

2.1. If the device type applicable to the CDN download address of the meta-ability C1 includes the device a 11, the DMS in the device a 11 requests the BMS in the device a 11 to download the meta-ability C1 of the application C. Based on the CDN download address of the meta-ability C1, the BMS in the device a 11 downloads the meta-ability C1 from a CDN server 30, and installs the meta-ability C1 in the device a 11. The BMS in the device a 11 notifies the DMS in the device a 11 that the meta-ability C1 has been installed (so that an application layer in the device a 11 further includes the application C). Therefore, the DMS in the device a 11 may start the meta-ability C1.

In conclusion, the device a 11 may trigger the system service in the device a 11, by using the meta-ability A1 of the application A, to start the meta-ability C1 of the application C in the device a 11.

2.2. If the device type applicable to the CDN download address of the meta-ability C1 includes the device b 12, the DMS in the device a 11 requests the DMS in the device b 12 to start the meta-ability C1 of the application C, and the request may include a CDN download address of the meta-ability C1 of the application C applicable to the device b 12. The DMS in the device b 12 may request the BMS in the device b 12 to download the meta-ability C1 of the application C. Based on the CDN download address of the meta-ability C1 applicable to the device b 12, the BMS in the device b 12 may download the meta-ability C1 from the CDN server 30, and install the meta-ability C1 in the device b 12 (so that the application layer in the device b 12 further includes the application C). The BMS in the device b 12 may notify the DMS in the device b 12 that the meta-ability C1 has been installed. Therefore, the DMS in the device b 12 may start the meta-ability C1.

In conclusion, the device a 11 may trigger the system service in the device a 11, by using the meta-ability A1 of the application A, to start the meta-ability C1 of the application C in the device b 12.

2.3. If the device type applicable to the CDN download address of the meta-ability C1 include the device a 11 and the device b 12, a specific execution process of the device a 11 may be implemented by performing corresponding operations based on the foregoing description in sector 2.1 and sector 2.2. Details are not described herein.

In addition, the DMS in the device a 11 may further display a window, so that the DMS in the device a 11 determines, by using an operation of the user on the window, one or more devices selected by the user from the device a 11 and the device b 12. A specific execution process of the device a 11 may be implemented by performing corresponding operations based on the foregoing description in sector 1.3. Details are not described herein.

In conclusion, the device a 11 may trigger the system service in the device a 11, by using the meta-ability A1 of the application A, to start the meta-ability C1 of the application C in the device a 11 and the device b 12.

The content in the examples in FIG. 8A to FIG. 8I may explain the foregoing process.

It should be noted that, in addition to the foregoing process, the BMS in the device a 11 may further determine whether the device a 11 and the device b 12 in the same distributed network have the ability to install the meta-ability C1 of the application C. The BMS in the device a 11 notifies the DMS in the device a 11 of a result of determining. The DMS in the device a 11 selects one or more devices from the device a 11 and the device b 12 based on a preset policy, or the DMS in the device a 11 may display a window to notify the user, so that the DMS in the device a 11 determines, by using an operation of the user on the window, one or more devices selected from the device a 11 and the device b 12. The DMS in the device a 11 requests the BMS in the device a 11 to query whether the meta-ability C1 of the application C is installed on the selected device. The BMS in the device a 11 determines whether the meta-ability C1 of the application C is installed on the selected device. For a specific implementation process, refer to the foregoing. Details are not described herein. Therefore, based on the selected device, the DMS in the device a 11 implements the process in which the selected device starts the meta-ability C1 of the application C.

Figures 1, 10A:
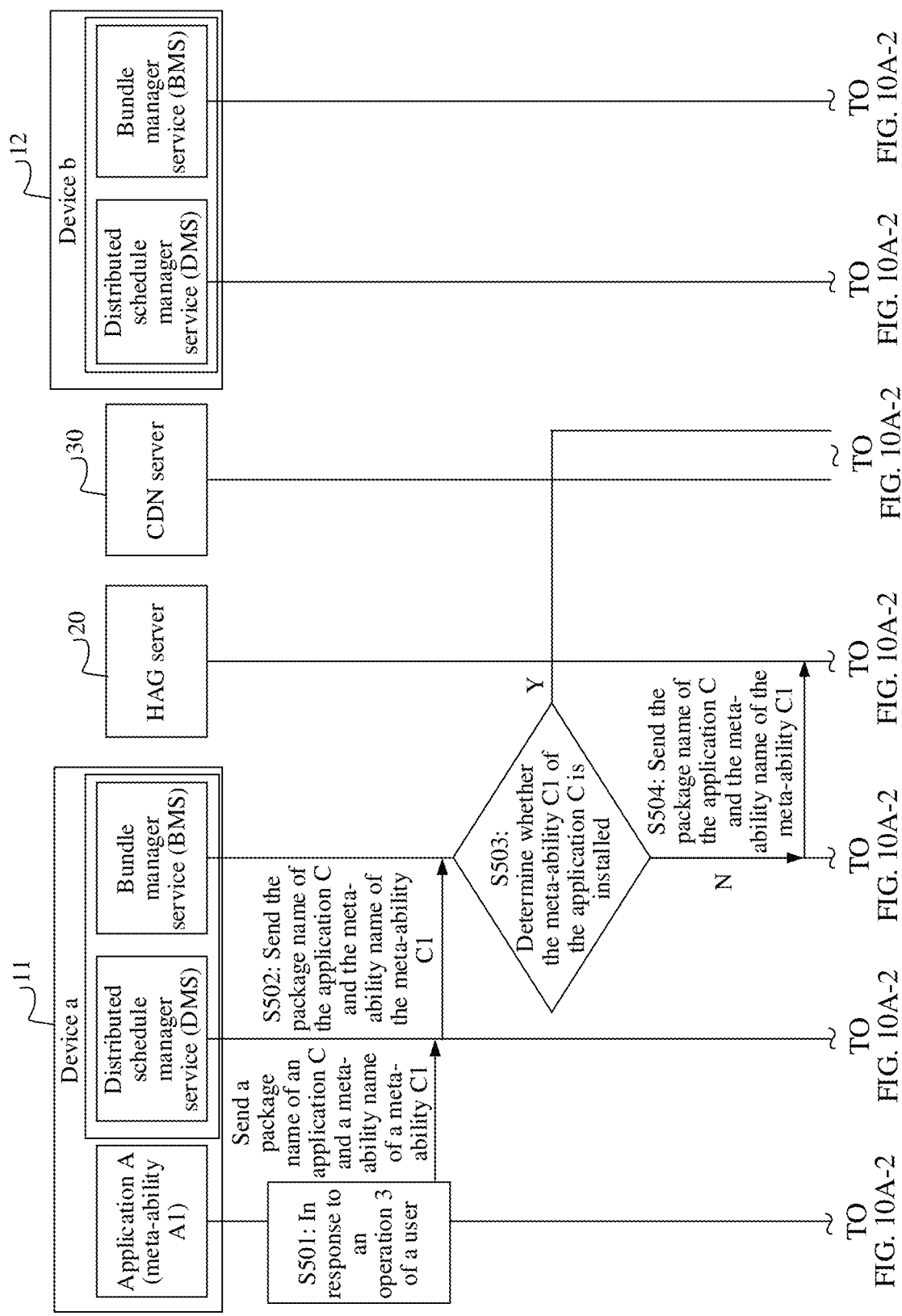
Figures 2, 10A:
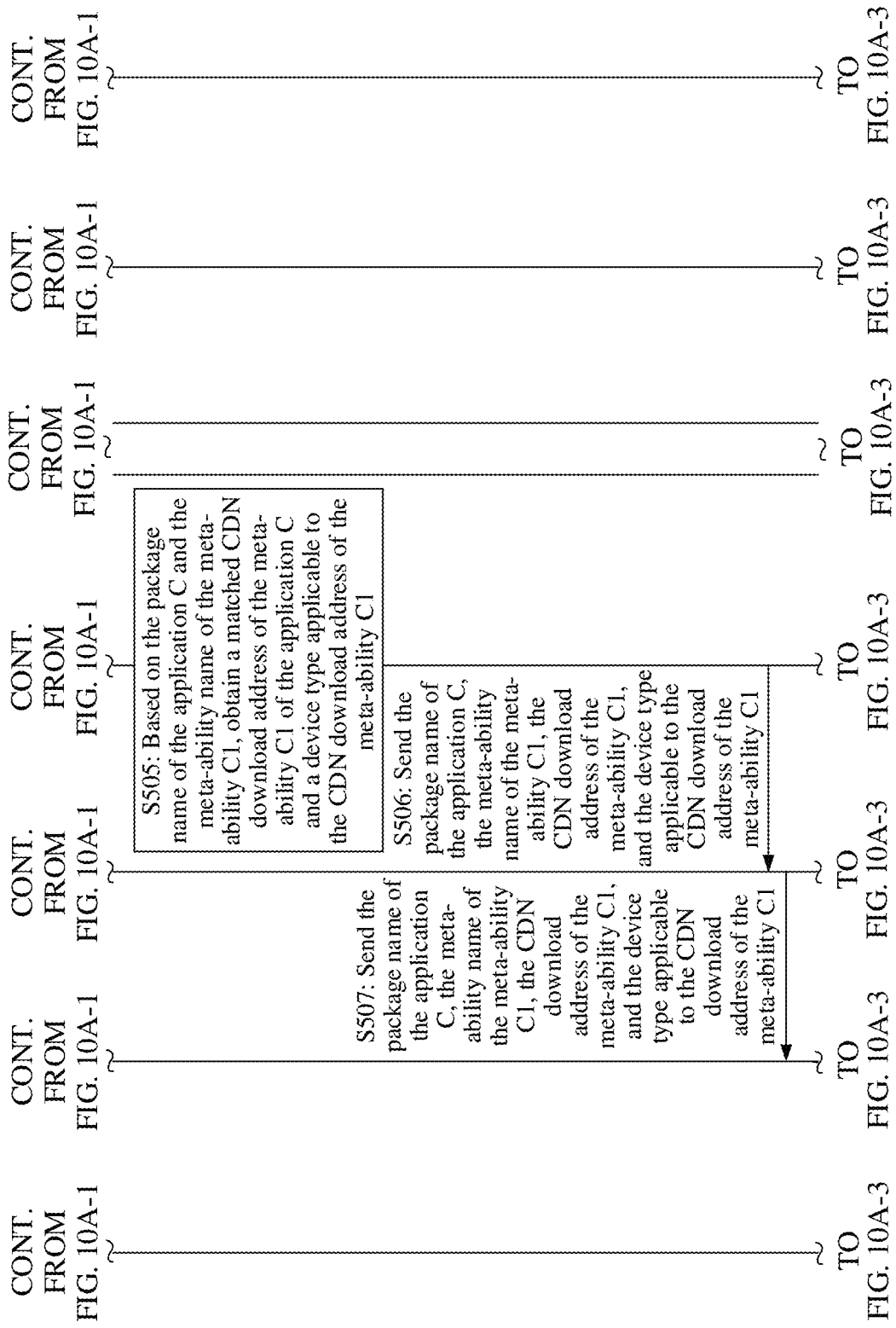
Figures 3, 10A:
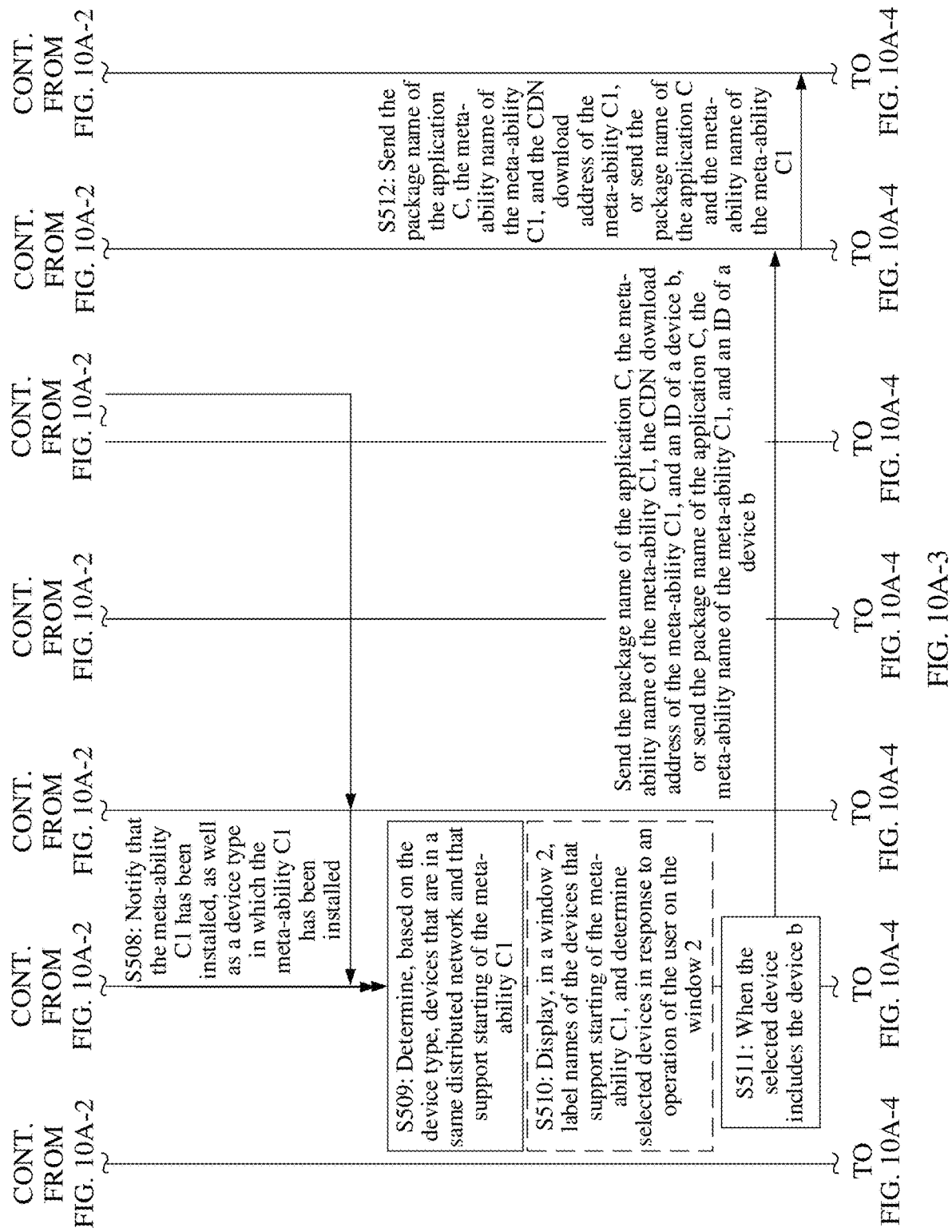
Figures 4, 10A:
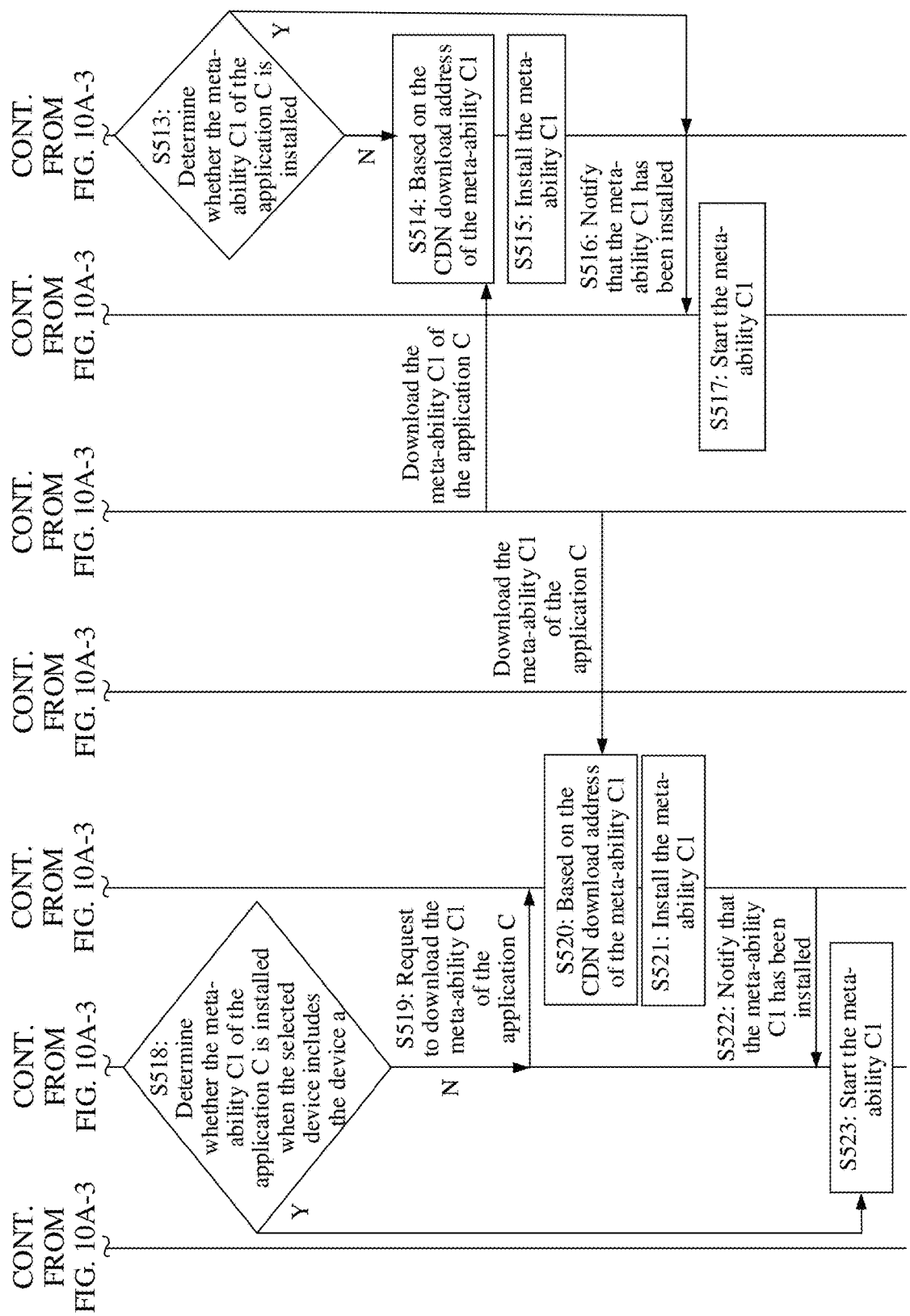
Figures 3, 10B:
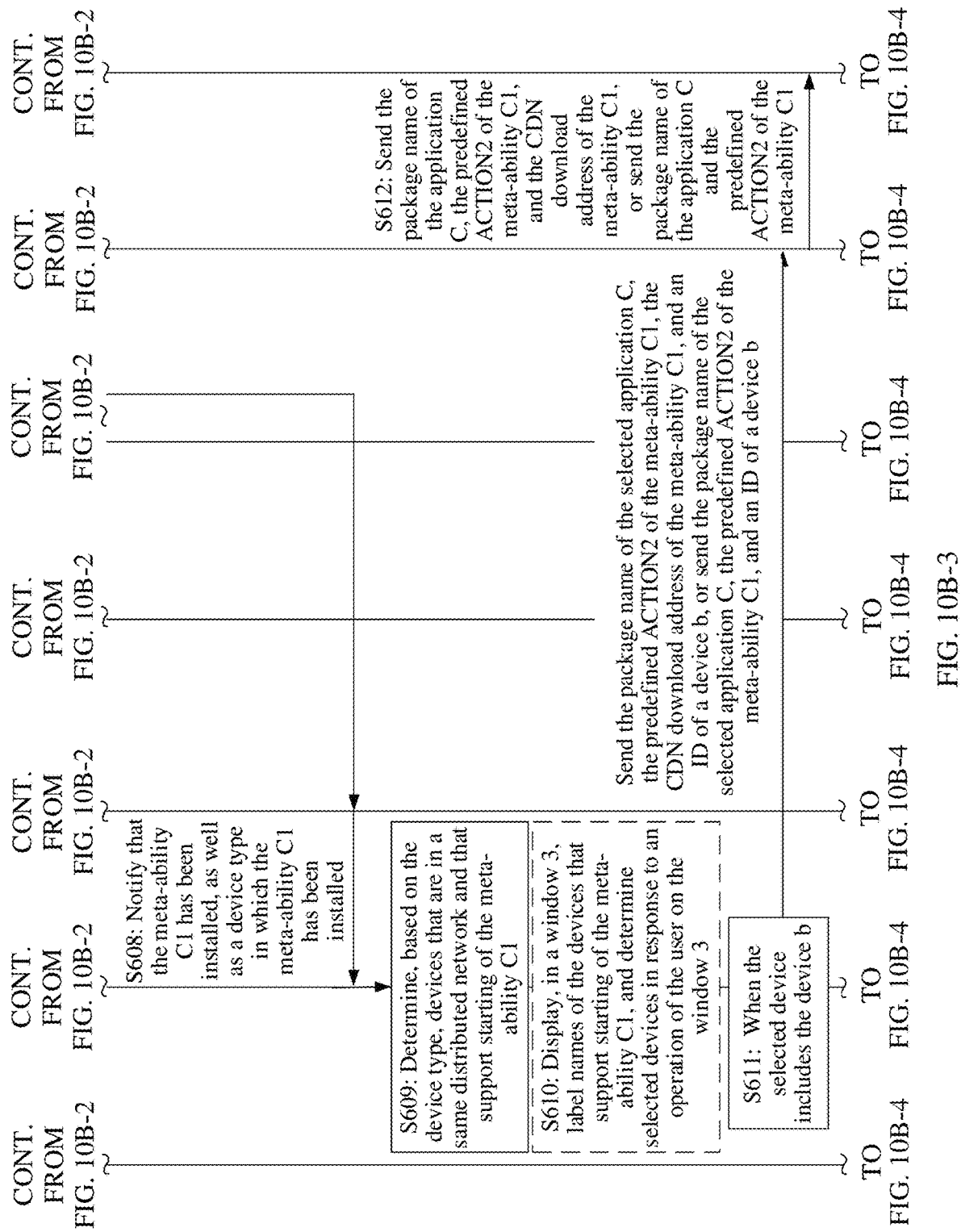
Figures 4, 10B:
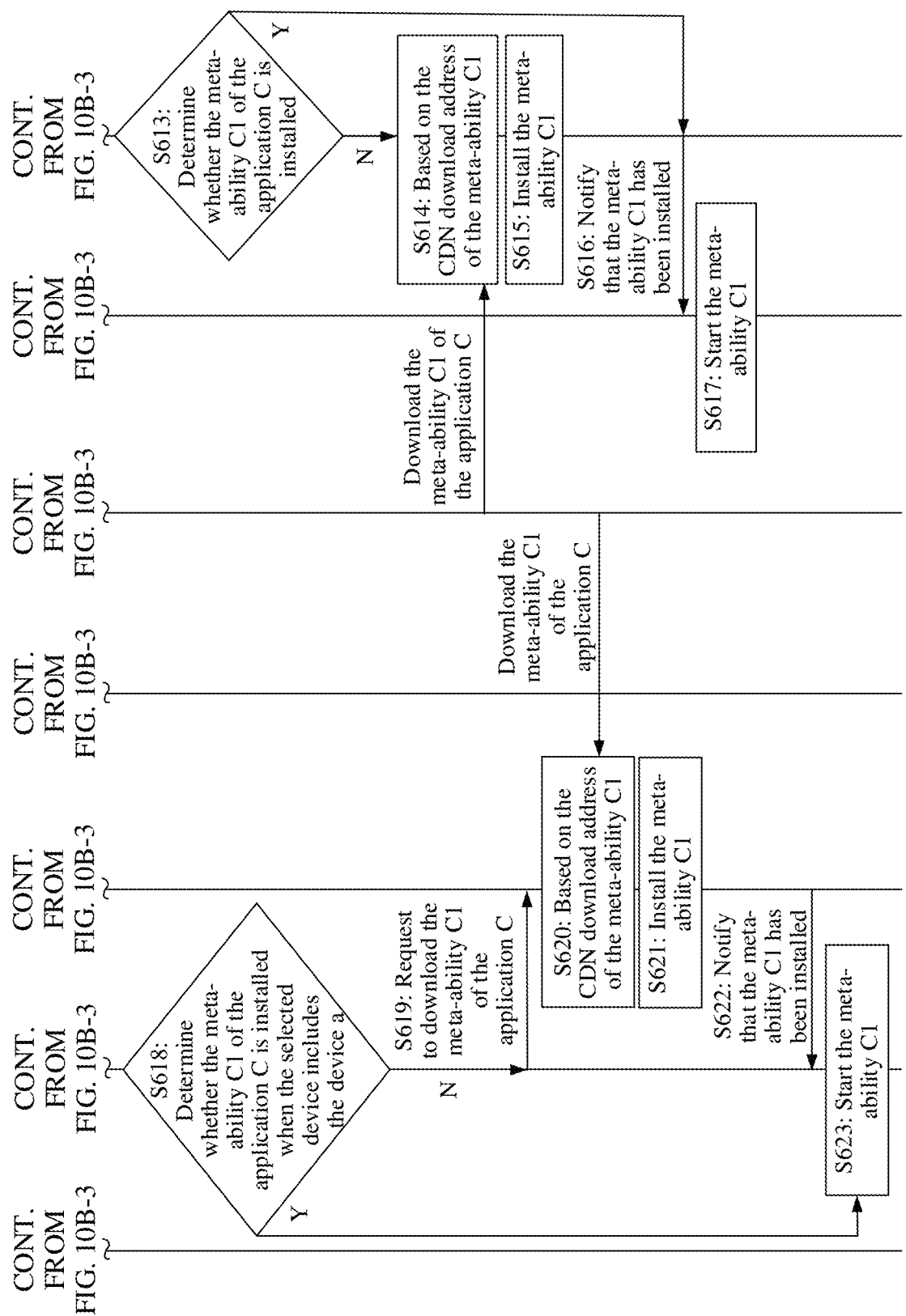
Figures 1, 10C:
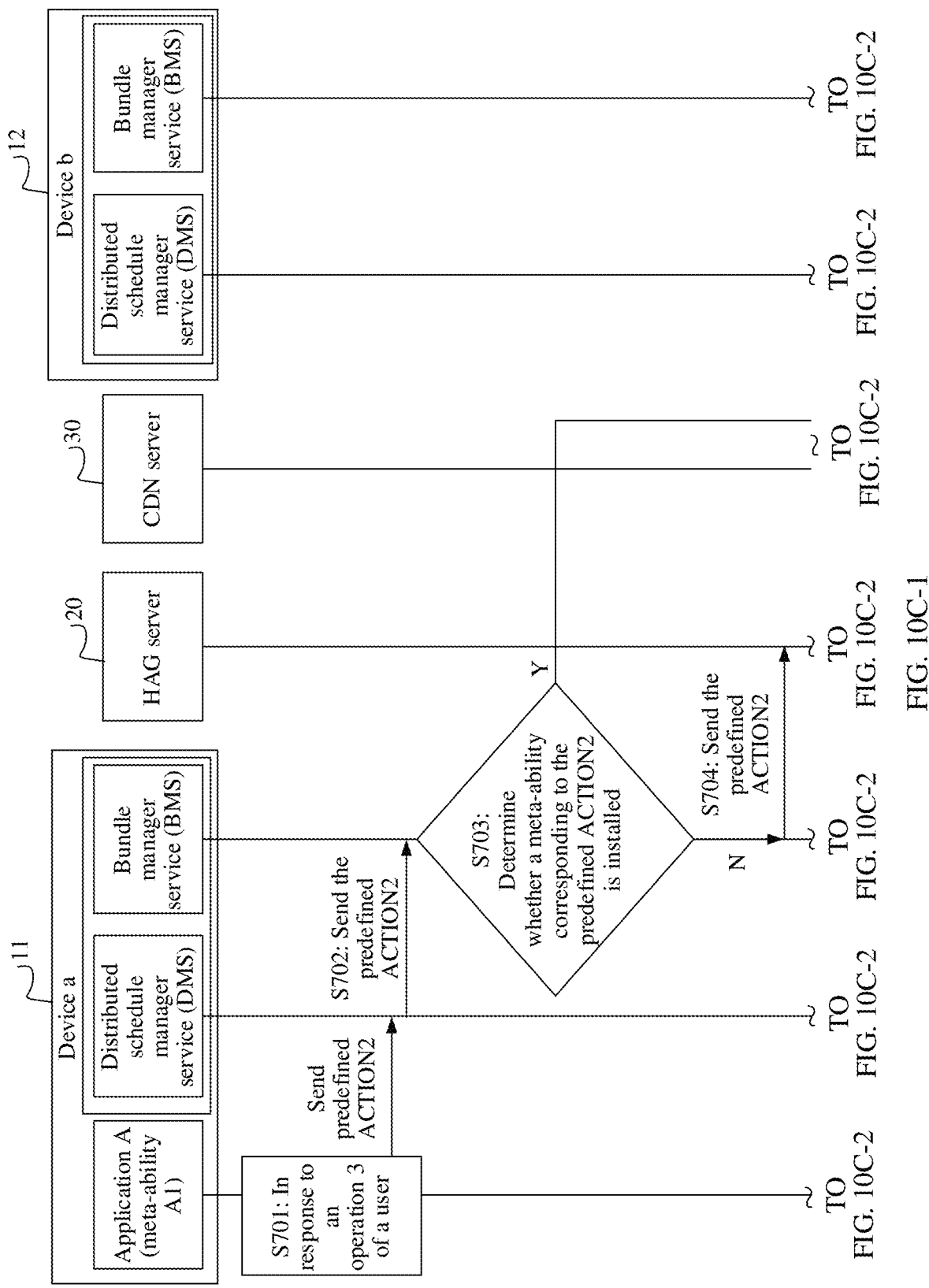
Figures 2, 10C:
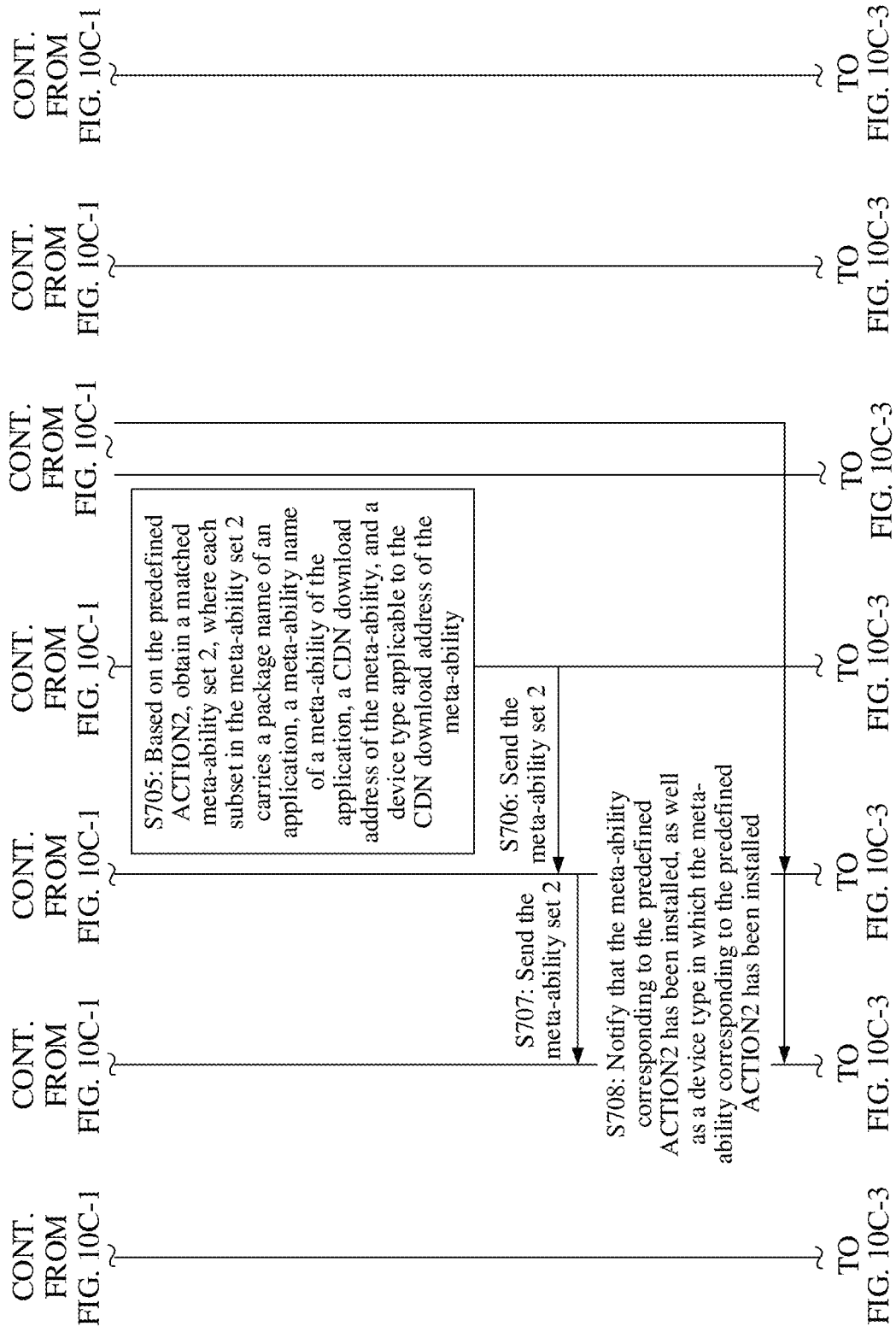
Figures 3, 10C:
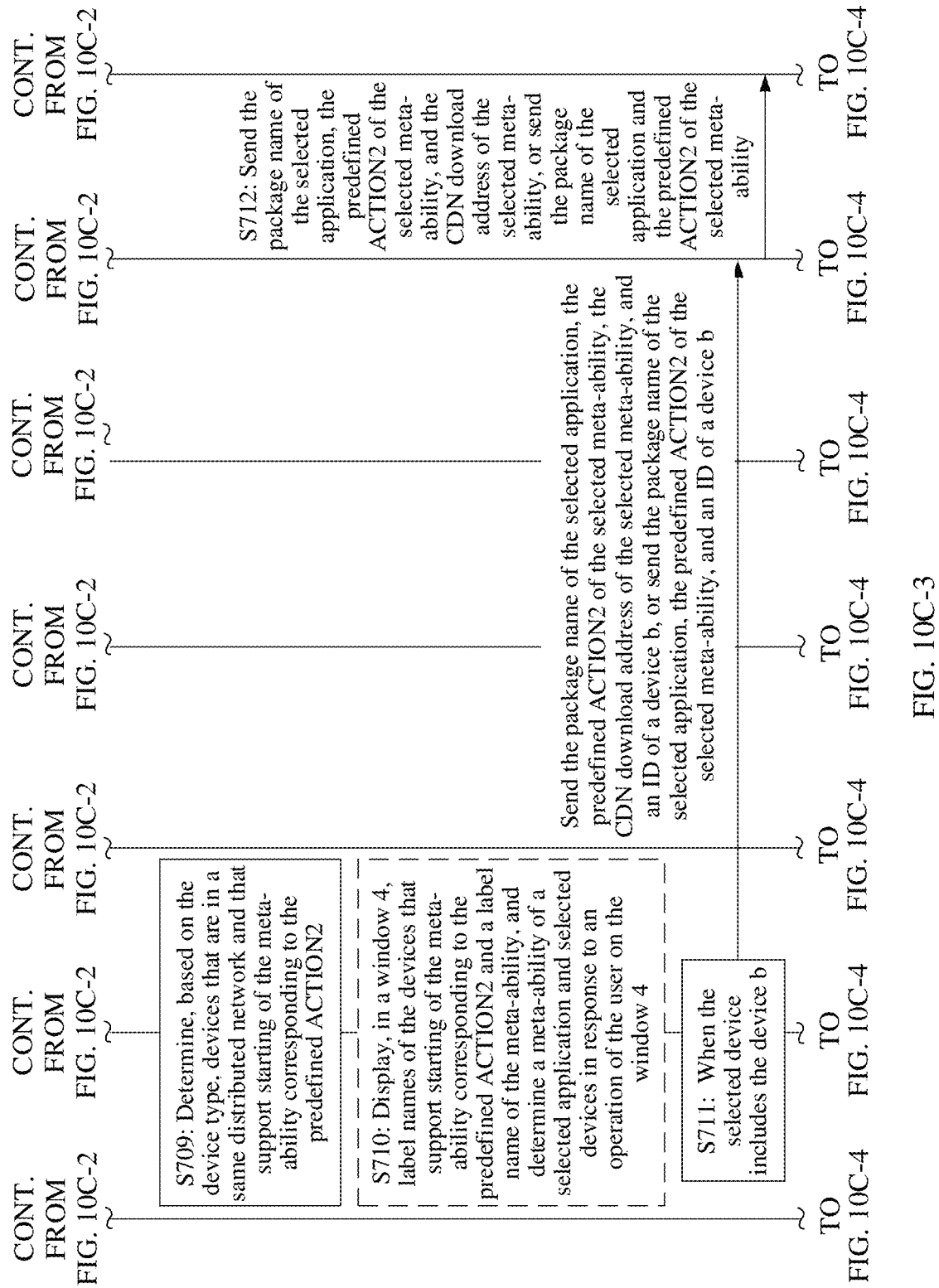

Based on the foregoing description, with reference to 10A to FIG. 10C-1-FIG. 10C-4, an implementation process in which with regard to the device a 11 and the device b 12 in the same distributed network in the embodiment in FIG. 8A to FIG. 8I, the device a 11 triggers the system service in the device a 11, by using the meta-ability A1 of the application A, to start the meta-ability C1 of the application C in the device b 12 is specifically described. For the device a 11, refer to the description of the mobile phone in the embodiment in FIG. 8A to FIG. 8I. For the device b 12, refer to the description of the tablet computer in the embodiment in FIG. 8A to FIG. 8I. For the application A, refer to the description of the Leftmost home screen application in the embodiment in FIG. 8A to FIG. 8I. For the application C, refer to the description of the XX map application in the embodiment in FIG. 8A to FIG. 8I. For the meta-ability A1, refer to the description of the meta-ability A1 in the embodiment in FIG. 8A to FIG. 8I. For the meta-ability C1, refer to the description of the meta-ability C1 in the embodiment in FIG. 8A to FIG. 8I.

FIG. 10A-1-FIG. 10A-4 to FIG. 10C-1-FIG. 10C-4 are schematic flowcharts of an application module startup method according to an embodiment of this application.

As shown in FIG. 10A-1 to FIG. 10A-4, a specific implementation process of the application module startup method according to this application may include the following steps.

S501: A meta-ability A1 of an application A in a device a 11 sends, in response to an operation 3 of a user, a package name of an application C and a meta-ability name of a meta-ability C1 to a DMS in the device a 11.

The operation 3 may include, but is not limited to, a type of operation such as tap, double tap, touch and hold, or touch. For example, the operation 3 may be the operation of searching an XX map application as indicated by the user in the embodiment in FIG. 8A (such as inputting the word "XX map" in the search box 801 on the user interface 31 shown in FIG. 8A). The operation 3 herein corresponds to a fourth operation in step S1601 and step S1801.

In addition, the operation 3 is associated with the meta-ability C1 of the application C. That is, the meta-ability A1 may learn, based on the operation 3, that the meta-ability C1 of the application C needs to be started. Because the application A pre-stores the package name of the application C and the meta-ability name of the meta-ability C1 of the application C that are associated with the operation 3, the meta-ability A1 may learn the package name of the application C and the meta-ability name of the meta-ability C1. Therefore, the meta-ability A1 may request the DMS in the device a 11 to start the meta-ability C1 of the application C.

The package name of the application C can uniquely identify the application C, and the package name of the application C and the meta-ability name of the meta-ability C1 can uniquely identify the meta-ability C1. The package name of the application C and the meta-ability name of the meta-ability C1 may be represented in at least one manner, such as letters, characters, and digits. In addition, the meta-ability A1 may carry the package name of the application C and the meta-ability name of the meta-ability C1 in a message, and send the message to the DMS in the device a 11. The specific implementation of this message is not limited in this application. The message herein corresponds to a ninth message in step S1601 and step S1801. Herein, the application A corresponds to a fourth application in step S1601 and step S1801, the meta-ability A1 corresponds to a fourth application module in step S1601 and step S1801, the application C corresponds to a fifth application in step S1601 and step S1801, the meta-ability C1 corresponds to a fifth application module in step S1601 and step S1801, the package name of the application C corresponds to an identifier of the fifth application in step S1801, and the meta-ability name of the meta-ability C1 corresponds to a module identifier of the fifth application module in step S1801.

S502: The DMS in the device a 11 sends the package name of the application C and the meta-ability name of the meta-ability C1 to a BMS in the device a 11. Therefore, the DMS in the device a 11 may request the BMS in the device a 11 to query whether the meta-ability C1 of the application C has been installed.

The DMS in the device a 11 may carry the package name of the application C and the meta-ability name of the meta-ability C1 in a message, and send the message to the BMS in the device a 11. The specific implementation of this message is not limited in this application. The message herein corresponds to a thirteenth message in step S1802.

S503: Based on the package name of the application C and the meta-ability name of the meta-ability C1, the BMS in the device a 11 determines whether the meta-ability C1 of the application C is installed on each of the device a 11 and a device b 12 that are in a same distributed network (such as networking).

The BMS may store a parsed configuration file of a meta-ability in a distributed application component database when installing the meta-ability, and the device a 11 and the device b 12 belong to the same distributed network. Therefore, the BMS in the device a 11 may query whether the meta-ability C1 of the application C in the device a 11 exists in a distributed application component database in the device a 11 and whether the meta-ability C1 of the application C in the device b 12 exists in a distributed application component database in the device b 12, so as to determine whether the meta-ability C1 of the application C is installed on the device a 11 and the device b 12. If the BMS in the device a 11 determines that the meta-ability C1 of the application C is not installed on the device a 11 and the device b 12, the BMS in the device a 11 performs step S504 to step S507; or if the BMS in the device a 11 determines that the meta-ability C1 of the application C has been installed on at least one of the device a 11 and the device b 12, the BMS in the device a 11 performs step S508.

When no meta-ability C1 of the application C exists in the distributed application component database in the device a 11 and no meta-ability C1 of the application C in the device b 12 exists in the distributed application component database in the device b 12, the BMS in the device a 11 may determine that the meta-ability C1 of the application C is not installed on the device a 11 and the device b12, so that the BMS in the device a 11 may perform step S504 to step S507.

When the meta-ability C1 of the application C in the device a 11 exists in the distributed application component database in the device a 11, or the meta-ability C1 of the application C in the device b 12 exists in the distributed application component database in the device b 12, or the meta-ability C1 of the application C in the device a 11 exists in the distributed application component database in the device a 11 and the meta-ability C1 of the application C in the device b 12 exists in the distributed application component database in the device b 12, the BMS in the device a 11 may determine that the meta-ability C1 of the application C is installed on at least one of the device a 11 and the device b 12, so that the BMS in the device a 11 may perform step S508.

S504: The BMS in the device a 11 sends the package name of the application C and the meta-ability name of the meta-ability C1 to a HAG server 20. Therefore, the BMS in the device a 11 may request the HAG server 20 to download the meta-ability C1 of the application C.

The BMS in the device a 11 may carry the package name of the application C and the meta-ability name of the meta-ability C1 in a message, and send the message to the HAG server 20 through a channel between the device a 11 and the HAG server 20. The specific implementation of this message is not limited in this application. The message herein corresponds to a tenth message in step S1603 and step S1804. The HAG server 20 herein corresponds to a first server in step S1603 and step S1804.

S505: Based on the package name of the application C and the meta-ability name of the meta-ability C1, the HAG server 20 obtains a matched CDN download address of the meta-ability C1 of the application C and a device type applicable to the CDN download address of the meta-ability C1.

Because the HAG server 20 pre-stores a plurality of HAPs and a CDN download address of a meta-ability corresponding to each HAP, and the HAG server 20 may obtain an application package name, a meta-ability name, and a CDN download address of a meta-ability C1 of each HAP, the HAG server 20 may match, based on the package name of the application C and the meta-ability name of the meta-ability C1, the CDN download address of the meta-ability C1 of the application C and the device type applicable to the CDN download address of the meta-ability C1.

The CDN download address may be expressed in a manner such as a link or an address string. One or more CDN download address of the meta-ability C1 of the application C may be provided. Each device type applicable to the CDN download address of the meta-ability C1 may be represented in at least one manner, such as letters, characters, and digits, for example, by a device number or a model or a networking number The device type applicable to the CDN download address of the meta-ability C1 may include the device a 11 and/or the device b 12, or may not include the device a 11 and the device b 12. In addition, the meta-ability C1 corresponding to the CDN download address that is corresponding to the meta-ability C1 and that is matched by the HAG server 20 is usually a latest version.

S506: The HAG server 20 sends the package name of the application C, the meta-ability name of the meta-ability C1 (this parameter may be replaced with a predefined ACTION of a meta-ability of the application), the CDN download address of the meta-ability C1, and the device type applicable to the CDN download address of the meta-ability C1 to the BMS in the device a 11.

The HAG server 20 may carry the package name of the application C, the meta-ability name of the meta-ability C1, the CDN download address of the meta-ability C1, and the device type applicable to the CDN download address of the meta-ability C1 in a message, and send the message to the BMS in the device a 11 through the channel between the device a 11 and the HAG server 20. The specific implementation of this message is not limited in this application. The message herein corresponds to an eleventh message in step S1604, step S1701, and step S1805.

S507: The BMS in the device a 11 sends the package name of the application C, the meta-ability name of the meta-ability C1, the CDN download address of the meta-ability C1, and the device type applicable to the CDN download address of the meta-ability C1 to the DMS in the device a 11.

The BMS in the device a 11 may carry the package name of the application C, the meta-ability name of the meta-ability C1, the CDN download address of the meta-ability C1, and the device type applicable to the CDN download address of the meta-ability C1 in a message, and send the message to the DMS in the device a 11. The specific implementation of this message is not limited in this application. The message herein corresponds to a fourteenth message in step S1806.

It should be noted that after step S507 is performed, step S509 is performed.

S508: The BMS in the device a 11 notifies that the meta-ability C1 of the application C has been installed, as well as a device type in which the meta-ability C1 has been installed, to the DMS in the device a 11. The notification herein corresponds to a fourteenth message in step S1806.

For example, the BMS in the device a 11 notifies that the meta-ability C1 of the application C has been installed on the device a 11, as well as the device type of the device a 11, to the DMS in the device a 11.

For another example, the BMS in the device a 11 notifies that the meta-ability C1 of the application C has been installed on the device b 12, as well as the device type of the device b 12, to the DMS in the device a 11.

For another example, the BMS in the device a 11 notifies that the meta-ability C1 of the application C has been installed on the device a 11 and the device b 12, as well as the device type of the device a 11 and the device type of the device b 12, to the DMS in the device a 11.

The device type in which the meta-ability C1 has been installed may be represented in at least one manner, such as letters, characters, and digits, for example, by a device number or a model.

It should be noted that after step S508 is performed, step S509 is performed.

S509: The DMS in the device a 11 determines, based on the device type sent in step S507 or step S508, devices that are in a same distributed network and that support starting of the meta-ability C1.

With regard to step S507, the DMS in the device a 11 may determine devices that appear in the device type applicable to the CDN download address of the meta-ability C1 and also appear in the device type currently in the same distributed network as the device a 11 as devices that support starting of the meta-ability C1 and that are in the same distributed network.

With regard to step S508, the DMS in the device a 11 may determine devices that appear in the device type in which the meta-ability C1 has been installed and also appear in the device type currently in the same distributed network as the device a 11 as devices that support starting of the meta-ability C1 and that are in the same distributed network.

The device type currently in the same distributed network as the device a 11 may be understood as different electronic devices that may communicate with each other in a communication manner such as Bluetooth, Wi-Fi, ZigBee, or account sharing, for example, the device a 11 and the device b 12 that undergo distributed networking in a same Wi-Fi network environment by using a Huawei account.

S510: The DMS in the device a 11 displays, in a window 2, label names of the devices that support starting of the meta-ability C1 and that are in the same distributed network, and determines selected devices in response to an operation of the user on the window 2.

Layout parameters such as a size, a position, and a color of the window 2 are not limited in this application. The window 2 herein corresponds to a second window in step S17033. Alternatively, the DMS in the device a 11 may select one of the devices that support starting of the meta-ability C1 and that are in the same distributed network as the selected device, and does not display the window 2. The DMS in the device a 11 may perform the selection based on parameters such as a preset priority of the devices that support starting of the meta-ability C1 and that are in the same distributed network, storage space of the devices or communication rates of the devices. This is not limited in this application.

It should be noted that when the selected device only includes the device b 12, step S511 to step S517 may be performed in this application. When the selected device only includes the device a 11, step S518 to step S523 may be performed in this application. When the selected devices include the device a 11 and the device b 12, step S511 to step S517 and step S518 to step S523 may be performed separately in this application.

The selection operation may be implemented by the user in step S510, or by the DMS in the device a 11, or by the user in step S510 and the DMS in the device a 11. This is not limited in this application.

S511: Based on the device type sent in step S507, the DMS in the device a 11 sends the package name of the application C, the meta-ability name of the meta-ability C1, the CDN download address of the meta-ability C1, and an ID of the device b 12 to a DMS in the device b 12 when the selected devices include the device b 12. Alternatively, based on the device type sent in step S508, the DMS in the device a 11 sends the package name of the application C, the meta-ability name of the meta-ability C1, and an ID of the device b 12 to a DMS in the device b 12 when the selected devices include the device b 12.

The DMS in the device a 11 may carry the package name of the application C, the meta-ability name of the meta-ability C1, the CDN download address of the meta-ability C1, and the ID of the device b 12 in a message, and send the message to the DMS in the device b 12, or the DMS in the device a 11 may carry the package name of the application C, the meta-ability name of the meta-ability C1, and the ID of the device b 12 in a message, and send the message to the DMS in the device b 12. The specific implementation of this message is not limited in this application. The message herein corresponds to a twelfth message in step S17032, step S17033, step S18082, and step S18083.

In addition, the ID of the device b 12 may be a networking identifier of the device b 12 in the same distributed network.

S512: The DMS in the device b 12 sends the package name of the application C, the meta-ability name of the meta-ability C1, and the CDN download address of the meta-ability C1 to a BMS in the device b 12, or sends the package name of the application C and the meta-ability name of the meta-ability C1 to a BMS in the device b 12.

Based on the ID of the device b 12, the DMS in the device b 12 may determine whether the package name of the application C, the meta-ability name of the meta-ability C1, and the CDN download address of the meta-ability C1 that are sent by the device a 11 are sent to the device b 12. Therefore, the DMS in the device b 12 may determine that the meta-ability C1 of the application C needs to be started, and then perform step S512.

The DMS in the device b 12 may carry the package name of the application C, the meta-ability name of the meta-ability C1, and the CDN download address of the meta-ability C1 in a message, and send the message to the BMS in the device b 12, or the DMS in the device b 12 may carry the package name of the application C and the meta-ability name of the meta-ability C1 in a message, and send the message to the BMS in the device b 12. The specific implementation of this message is not limited in this application.

S513: The BMS in the device b 12 determines, based on the package name of the application C and the meta-ability name of the meta-ability C1, whether the meta-ability C1 of the application C is installed on the device b 12.

The BMS may store a parsed configuration file of a meta-ability in a distributed application component database when installing the meta-ability. Therefore, the BMS in the device b 12 may query whether the meta-ability C1 of the application C exists in the distributed application component database in the device b 12, so as to determine whether the meta-ability C1 of the application C is installed on the device b 12.

When no meta-ability C1 of the application C exists in the distributed application component database in the device b 12, the BMS in the device b 12 may determine that the meta-ability C1 of the application C is not installed on the device b 12, so that the BMS in the device b 12 may perform step S514 to step S517 based on the received BMS in the device b 12 or the CDN download address of the meta-ability C1 obtained from the HAG server 20; or when the meta-ability C1 of the application C exists in the distributed application component database in the device b 12, the BMS in the device b 12 may determine that the meta-ability C1 of the application C has been installed on the device b 12, so that the BMS in the device b 12 may perform step S516 and step S517.

It should be noted that, in addition to the foregoing method for determining whether the meta-ability C1 of the application C is installed on the device b 12, the BMS in the device b 12 may determine that the meta-ability C1 of the application C is not installed on the device b 12 when receiving the CDN download address of the meta-ability C1 sent by the DMS in the device b 12. Therefore, the BMS in the device b 12 performs step S514 to step S517 based on the received BMS in the device b 12.

S514: The BMS in the device b 12 downloads the meta-ability C1 of the application C from a CDN server 30 based on the package name of the application C, the meta-ability name of the meta-ability C1, and the CDN download address of the meta-ability C1.

S515: The BMS in the device b 12 installs the meta-ability C1 of the application C.

S516: The BMS in the device b 12 notifies the DMS in the device b 12 that the meta-ability C1 of the application C has been installed.

S517: The DMS in the device b 12 starts the meta-ability C1 of the application C (that is, explicit start).

In conclusion, based on the foregoing description, the device a 11 may trigger the system service in the device a 11, by using the meta-ability A1 of the application A, to start the meta-ability C1 of the application C in the device b 12 based on the package name of the application C and the meta-ability name of the meta-ability C1.

S518: When the selected device includes the device a 11, the DMS in the device a 11 determines, based on the package name of the application C and the meta-ability name of the meta-ability C1, whether the meta-ability C1 of the application C is installed on the device a 11.

The BMS may store a parsed configuration file of a meta-ability in a distributed application component database when installing the meta-ability. Therefore, the DMS in the device a 11 may query, by using the BMS in the device a 11, whether the meta-ability C1 of the application C exists in the distributed application component database in the device a 11, so as to determine whether the meta-ability C1 of the application C is installed on the device a 11.

When no meta-ability C1 of the application C exists in the distributed application component database in the device a 11, the DMS in the device a 11 may determine that the meta-ability C1 of the application C is not installed on the device a 11, so that the DMS in the device a 11 may perform step S519 to step S523; or when the meta-ability C1 of the application C exists in the distributed application component database in the device a 11, the DMS in the device a 11 may determine that the meta-ability C1 of the application C has been installed on the device a 11, so that the DMS in the device a 11 may perform step S523.

S519: The DMS in the device a 11 requests the BMS in the device a 11 to download the meta-ability C1 of the application C. The request herein corresponds to a fifteenth message in step S18081 and step S18083.

S520: The BMS in the device a 11 downloads the meta-ability C1 of the application C from the CDN server 30 based on the package name of the application C, the meta-ability name of the meta-ability C1, and the CDN download address of the meta-ability C1. The CDN server 30 herein corresponds to a second server in step S1731.

S521: The BMS in the device a 11 installs the meta-ability C1 of the application C.

S522: The BMS in the device a 11 notifies the DMS in the device a 11 that the meta-ability C1 of the application C has been installed. The request herein corresponds to a sixteenth message in step S18081 and step S18083.

S523: The DMS in the device a 11 starts the meta-ability C1 of the application C (that is, explicit start).

In conclusion, based on the foregoing description, the device a 11 may trigger the system service in the device a 11, by using the meta-ability A1 of the application A, to start the meta-ability C1 of the application C in the device a 11 based on the package name of the application C and the meta-ability name of the meta-ability C1.

As shown in FIG. 10B-1 to FIG. 10B-4, a specific implementation process of the application module startup method according to this application may include the following steps.

S601: A meta-ability A1 of an application A in a device a 11 sends a package name of an application C and predefined ACTION2 of a meta-ability C1 to a DMS in the device a 11 in response to an operation 3 of a user.

The operation 3 may include, but is not limited to, a type of operation such as tap, double tap, touch and hold, or touch. For example, the operation 3 may be the operation of searching an XX map application as indicated by the user in the embodiment in FIG. 8A (such as inputting the word "XX map" in the search box 801 on the user interface 31 shown in FIG. 8A). The operation 3 herein corresponds to a fourth operation in step S1601 and step S1901.

In addition, the operation 3 is associated with the meta-ability C1 of the application C. That is, the meta-ability A1 may learn, based on the operation 3, that the meta-ability C1 of the application C needs to be started. Because the application A pre-stores the package name of the application C and the predefined ACTION2 of the meta-ability C1 of the application C that are associated with the operation 3, the meta-ability A1 may learn the package name of the application C and the predefined ACTION2 of the meta-ability C1. Therefore, the meta-ability A1 may request the DMS in the device a 11 to start the meta-ability C1 of the application C.

The package name of the application C can uniquely identify the application C, and the predefined ACTION2 of the meta-ability C1 can uniquely identify the meta-ability C1. The package name of the application C and the predefined ACTION2 of the meta-ability C1 may be represented in at least one manner, such as letters, characters, and digits. In addition, the meta-ability A1 may carry the package name of the application C and the predefined ACTION2 of the meta-ability C1 in a message, and send the message to the DMS in the device a 11. The specific implementation of this message is not limited in this application. The message herein corresponds to a ninth message in step S1601 and step S1901. Herein, the application A corresponds to a fourth application in step S1601 and step S1901, the meta-ability A1 corresponds to a fourth application module in step S1601 and step S1901, the application C corresponds to a fifth application in step S1601 and step S1901, the meta-ability C1 corresponds to a fifth application module in step S1601 and step S1901, the package name of the application C corresponds to an identifier of the fifth application in step S1901, and the predefined ACTION2 of the meta-ability C1 corresponds to an identifier of a type of the fifth application module in step S1901.

S602: The DMS in the device a 11 sends the package name of the application C and the predefined ACTION2 of the meta-ability C1 to a BMS in the device a 11. Therefore, the DMS in the device a 11 may request the BMS in the device a 11 to query whether the meta-ability C1 of the application C has been installed.

The DMS in the device a 11 may carry the package name of the application C and the predefined ACTION2 of the meta-ability C1 in a message, and send the message to the BMS in the device a 11. The specific implementation of this message is not limited in this application. The message herein corresponds to a thirteenth message in step S1902.

S603: Based on the package name of the application C and the predefined ACTION2 of the meta-ability C1, the BMS in the device a 11 determines whether the meta-ability C1 of the application C is installed on each of the device a 11 and a device b 12 in a same distributed network.

The BMS may store a parsed configuration file of a meta-ability in a distributed application component database when installing the meta-ability, and the device a 11 and the device b 12 belong to the same distributed network. Therefore, the BMS in the device a 11 may query whether the meta-ability C1 of the application C in the device a 11 exists in a distributed application component database in the device a 11 and whether the meta-ability C1 of the application C in the device b 12 exists in a distributed application component database in the device b 12, so as to determine whether the meta-ability C1 of the application C is installed on the device a 11 and the device b 12.

If the BMS in the device a 11 determines that the meta-ability C1 of the application C is not installed on the device a 11 and the device b 12, the BMS in the device a 11 performs step S604 to step S607. If the BMS in the device a 11 determines that the meta-ability C1 of the application C has been installed on at least one of the device a 11 and the device b 12, the BMS in the device a 11 performs step S608.

For a specific implementation process of a determining policy of the BMS in the device a 11, refer to the description of step S503. Details are not described herein.

S604: The BMS in the device a 11 sends the package name of the application C and the predefined ACTION2 of the meta-ability C1 to a HAG server 20. Therefore, the BMS in the device a 11 may request the HAG server 20 to download the meta-ability C1 of the application C.

The BMS in the device a 11 may carry the package name of the application C and the predefined ACTION2 of the meta-ability C1 in a message, and send the message to the HAG server 20 through a channel between the device a 11 and the HAG server 20. The specific implementation of this message is not limited in this application. The message herein corresponds to a tenth message in step S1603 and step S1904. The HAG server 20 herein corresponds to a first server in step S1603 and step S1904.

S605: Based on the package name of the application C and the predefined ACTION2 of the meta-ability C1, the HAG server 20 obtains a matched CDN download address of the meta-ability C1 of the application C and a device type applicable to the CDN download address of the meta-ability C1.

Because the HAG server 20 pre-stores a plurality of HAPs and a CDN download address of a meta-ability corresponding to each HAP, and the HAG server 20 may obtain an application package name, a meta-ability name, a predefined ACTION, and a device type applicable to a device of each HAP, the HAG server 20 may match, based on the package name of the application C and the predefined ACTION2 of the meta-ability C1, the CDN download address of the meta-ability C1 of the application C and the device type applicable to the CDN download address of the meta-ability C1.

For a specific implementation of the CDN download address, refer to the description of step S505. Details are not described herein.

S606: The HAG server 20 sends the package name of the application C, the predefined ACTION2 of the meta-ability C1, the CDN download address of the meta-ability C1, and the device type applicable to the CDN download address of the meta-ability C1 to the BMS in the device a 11.

The HAG server 20 may carry the package name of the application C, the predefined ACTION2 of the meta-ability C1, the CDN download address of the meta-ability C1, and the device type applicable to the CDN download address of the meta-ability C1 in a message, and send the message to the BMS in the device a 11 through the channel between the device a 11 and the HAG server 20. The specific implementation of this message is not limited in this application. The message herein corresponds to an eleventh message in step S1604, step S1701, and step S1905.

S607: The BMS in the device a 11 sends the package name of the application C, the predefined ACTION2 of the meta-ability C1, the CDN download address of the meta-ability C1, and the device type applicable to the CDN download address of the meta-ability C1 to the DMS in the device a 11.

The BMS in the device a 11 may carry the package name of the application C, the predefined ACTION2 of the meta-ability C1, the CDN download address of the meta-ability C1, and the device type applicable to the CDN download address of the meta-ability C1 in a message, and send the message to the DMS in the device a 11. The specific implementation of this message is not limited in this application. The message herein corresponds to a fourteenth message in step S1906.

It should be noted that after step S607 is performed, step S609 is performed.

S608: The BMS in the device a 11 notifies that the meta-ability C1 of the application C has been installed, as well as a device type in which the meta-ability C1 has been installed, to the DMS in the device a 11.

For a specific implementation process of step S608, refer to the description of step S508. Details are not described herein. The notification herein corresponds to a fourteenth message in step S1906.

It should be noted that after step S608 is performed, step S609 is performed.

S609: The DMS in the device a 11 determines, based on the device type sent in step S607 or step S608, devices that are in a same distributed network and that support starting of the meta-ability C1.

With regard to step S607, the DMS in the device a 11 may determine devices that appear in the device type applicable to the CDN download address of the meta-ability C1 and also appear in the device type currently in the same distributed network as the device a 11 as devices that support starting of the meta-ability C1 and that are in the same distributed network.

With regard to step S608, the DMS in the device a 11 may determine devices that appear in the device type in which the meta-ability C1 has been installed and also appear in the device type currently in the same distributed network as the device a 11 as devices that support starting of the meta-ability C1 and that are in the same distributed network.

The device type currently in the same distributed network as the device a 11 may be understood as different electronic devices that may communicate with each other in a communication manner such as Bluetooth, Wi-Fi, ZigBee, or account sharing, for example, the device a 11 and the device b 12 that undergo distributed networking in a same Wi-Fi network environment by using a Huawei account.

S610: The DMS in the device a 11 displays, in a window 3, label names of the devices that support starting of the meta-ability C1 and that are in the same distributed network, and determines selected devices in response to an operation of the user on the window 3.

Layout parameters such as a size, a position, and a color of the window 3 are not limited in this application. The window 3 herein corresponds to a second window in step S17033. Alternatively, the DMS in the device a 11 may select one of the devices that support starting of the meta-ability C1 and that are in the same distributed network as the selected device, and does not display the window 3. The DMS in the device a 11 may perform the selection based on parameters such as a preset priority of the devices that support starting of the meta-ability C1 and that are in the same distributed network, storage space of the devices or communication rates of the devices. This is not limited in this application.

It should be noted that when the selected device only includes the device b 12, step S611 to step S617 may be performed in this application. When the selected device only includes the device a 11, step S618 to step S623 may be performed in this application. When the selected devices include the device a 11 and the device b 12, step S611 to step S617 and step S618 to step S623 may be performed separately in this application.

The selection operation may be implemented by the user in step S610, or by the DMS in the device a 11, or by the user in step S610 and the DMS in the device a 11. This is not limited in this application.

S611: Based on the device type sent in step S607, the DMS in the device a 11 sends the package name of the application C, the predefined ACTION2 of the meta-ability C1, the CDN download address of the meta-ability C1, and an ID of the device b 12 to a DMS in the device b 12 when the selected devices include the device b 12. Alternatively, based on the device type sent in step S608, the DMS in the device a 11 sends the package name of the application C, the predefined ACTION2 of the meta-ability C1, and an ID of the device b 12 to a DMS in the device b 12 when the selected devices include the device b 12.

The DMS in the device a 11 may carry the package name of the application C, the predefined ACTION2 of the meta-ability C1, the CDN download address of the meta-ability C1, and the ID of the device b 12 in a message, and send the message to the DMS in the device b 12, or the DMS in the device a 11 may carry the package name of the application C, the predefined ACTION2 of the meta-ability C1, and the ID of the device b 12 in a message, and send the message to the DMS in the device b 12. The specific implementation of this message is not limited in this application. The message herein corresponds to a twelfth message in step S17032, step S17033, step S19082, and step S19083.

In addition, the ID of the device b 12 may be a networking identifier of the device b 12 in the same distributed network.

S612: The DMS in the device b 12 sends the package name of the application C, the predefined ACTION2 of the meta-ability C1, and the CDN download address of the meta-ability C1 to a BMS in the device b 12, or sends the package name of the application C and the predefined ACTION2 of the meta-ability C1 to a BMS in the device b 12.

Based on the ID of the device b 12, the DMS in the device b 12 may determine whether the package name of the application C, the predefined ACTION2 of the meta-ability C1, and the CDN download address of the meta-ability C1 that are sent by the device a 11 are sent to the device b 12. Therefore, the DMS in the device b 12 may determine that the meta-ability C1 of the application C needs to be started, and then perform step S612.

The DMS in the device b 12 may carry the package name of the application C, the predefined ACTION2 of the meta-ability C1, and the CDN download address of the meta-ability C1 in a message, and send the message to the BMS in the device b 12, or the DMS in the device b 12 may carry the package name of the application C and the predefined ACTION2 of the meta-ability C1 in a message, and send the message to the BMS in the device b 12. The specific implementation of this message is not limited in this application.

S613: The BMS in the device b 12 determines, based on the package name of the application C and the predefined ACTION2 of the meta-ability C1, whether the meta-ability C1 of the application C is installed on the device b 12.

The BMS may store a parsed configuration file of a meta-ability in a distributed application component database when installing the meta-ability. Therefore, the BMS in the device b 12 may query whether the meta-ability C1 of the application C exists in the distributed application component database in the device b 12, so as to determine whether the meta-ability C1 of the application C is installed on the device b 12.

When no meta-ability C1 of the application C exists in the distributed application component database in the device b 12, the BMS in the device b 12 may determine that the meta-ability C1 of the application C is not installed on the device b 12, so that the BMS in the device b 12 may perform step S614 to step S617 based on the received BMS in the device b 12 or the CDN download address of the meta-ability C1 obtained from the HAG server 20; or when the meta-ability C1 of the application C exists in the distributed application component database in the device b 12, the BMS in the device b 12 may determine that the meta-ability C1 of the application C has been installed on the device b 12, so that the BMS in the device b 12 may perform step S616 and step S617.

It should be noted that, in addition to the foregoing method for determining whether the meta-ability C1 of the application C is installed on the device b 12, the BMS in the device b 12 may determine that the meta-ability C1 of the application C is not installed on the device b 12 when receiving the CDN download address of the meta-ability C1 sent by the DMS in the device b 12. Therefore, the BMS in the device b 12 performs step S614 to step S617 based on the received BMS in the device b 12.

S614: The BMS in the device b 12 downloads the meta-ability C1 of the application C from a CDN server 30 based on the package name of the application C, the predefined ACTION2 of the meta-ability C1, and the CDN download address of the meta-ability C1.

S615: The BMS in the device b 12 installs the meta-ability C1 of the application C.

S616: The BMS in the device b 12 notifies the DMS in the device b 12 that the meta-ability C1 of the application C has been installed.

S617: The DMS in the device b 12 starts the meta-ability C1 of the application C (that is, semi-implicit start).

In conclusion, based on the foregoing description, the device a 11 may trigger the system service in the device a 11, by using the meta-ability A1 of the application A, to start the meta-ability C1 of the application C in the device b 12 based on the package name of the application C and the predefined ACTION2 of the meta-ability C1, fully considering that a third-party application vendor usually does not provide the meta-ability name of the meta-ability C1 to other vendors, that is, there is no need to rely on the meta-ability name of the meta-ability C1.

S618: When the selected device includes the device a 11, the DMS in the device a 11 determines, based on the package name of the application C and the predefined ACTION2 of the meta-ability C1, whether the meta-ability C1 of the application C is installed on the device a 11.

The BMS may store a parsed configuration file of a meta-ability in a distributed application component database when installing the meta-ability. Therefore, the DMS in the device a 11 may query, by using the BMS in the device a 11, whether the meta-ability C1 of the application C exists in the distributed application component database in the device a 11, so as to determine whether the meta-ability C1 of the application C is installed on the device a 11.

When no meta-ability C1 of the application C exists in the distributed application component database in the device a 11, the DMS in the device a 11 may determine that the meta-ability C1 of the application C is not installed on the device a 11, so that the DMS in the device a 11 may perform step S619 to step S623; or when the meta-ability C1 of the application C exists in the distributed application component database in the device a 11, the DMS in the device a 11 may determine that the meta-ability C1 of the application C has been installed on the device a 11, so that the DMS in the device a 11 may perform step S623.

S619: The DMS in the device a 11 requests the BMS in the device a 11 to download the meta-ability C1 of the application C. The request herein corresponds to a fifteenth message in step S19081 and step S19083.

S620: The BMS in the device a 11 downloads the meta-ability C1 of the application C from the CDN server 30 based on the package name of the application C, the predefined ACTION2 of the meta-ability C1, and the CDN download address of the meta-ability C1. The CDN server 30 herein corresponds to a second server in step S1731.

S621: The BMS in the device a 11 installs the meta-ability C1 of the application C.

S622: The BMS in the device a 11 notifies the DMS in the device a 11 that the meta-ability C1 of the application C has been installed. The request herein corresponds to a sixteenth message in step S19081 and step S19083.

S623: The DMS in the device a 11 starts the meta-ability C1 of the application C (that is, semi-implicit start).

In conclusion, based on the foregoing description, the device a 11 may trigger the system service in the device a 11, by using the meta-ability A1 of the application A, to start the meta-ability C1 of the application C in the device a 11 based on the package name of the application C and the predefined ACTION2 of the meta-ability C1, fully considering that a third-party application vendor usually does not provide the meta-ability name of the meta-ability C1 to other vendors, that is, there is no need to rely on the meta-ability name of the meta-ability C1.

As shown in FIG. 10C-1 to FIG. 10C-4, a specific implementation process of the application module startup method according to this application may include the following steps.

S701: A meta-ability A1 of an application A in a device a 11 sends predefined ACTION2 to a DMS in the device a 11 in response to an operation 3 of a user.

The operation 3 may include, but is not limited to, a type of operation such as tap, double tap, touch and hold, or touch. For example, the operation 3 may be the operation of searching an XX map application as indicated by the user in the embodiment in FIG. 8A (such as inputting the word "XX map" in the search box 801 on the user interface 31 shown in FIG. 8A). The operation 3 herein corresponds to a fourth operation in step S1601 and step S2001.

In addition, the operation 3 is associated with a meta-ability corresponding to the predefined ACTION2. That is, the meta-ability A1 may learn, based on the operation 3, that the meta-ability corresponding to the predefined ACTION2 needs to be started. Because the application A pre-stores the predefined ACTION2 of the meta-ability C1 associated with the operation 3, the meta-ability A1 may learn the meta-ability corresponding to the predefined ACTION2. Therefore, the meta-ability A1 may request the DMS in the device a 11 to start the meta-ability corresponding to the predefined ACTION2.

The predefined ACTION2 may identify meta-abilities with a same function. The predefined ACTION2 may be represented in at least one manner, such as letters, characters, and digits. In addition, the meta-ability A1 may carry the predefined ACTION2 in a message, and send the message to the DMS in the device a 11. The specific implementation of this message is not limited in this application. The message herein corresponds to a ninth message in step S1601 and step S2001. Herein, the application A corresponds to a fourth application in step S1601 and step S2001, the meta-ability A1 corresponds to a fourth application module in step S1601 and step S2001, the application C corresponds to a fifth application in step S1601 and step S2001, the meta-ability C1 corresponds to a fifth application module in step S1601 and step S2001, and the predefined ACTION2 corresponds to an identifier of a type of the fifth application module in step S2001.

S702: The DMS in the device a 11 sends the predefined ACTION2 to a BMS in the device a 11. Therefore, the DMS in the device a 11 may request the BMS in the device a 11 to query whether the meta-ability corresponding to the predefined ACTION2 has been installed.

The DMS in the device a 11 may carry the predefined ACTION2 in a message, and send the message to the BMS in the device a 11. The specific implementation of this message is not limited in this application. The message herein corresponds to a thirteenth message in step S2002.

S703: Based on the predefined ACTION2, the BMS in the device a 11 determines whether a meta-ability corresponding to the predefined ACTION2 is installed on each of the device a 11 and a device b 12 in a same distributed network.

The BMS may store a parsed configuration file of a meta-ability in a distributed application component database when installing the meta-ability, and the device a 11 and the device b 12 belong to the same distributed network. Therefore, the BMS in the device a 11 may query whether the meta-ability corresponding to the predefined ACTION2 in the device a 11 exists in a distributed application component database in the device a 11 and whether the meta-ability corresponding to the predefined ACTION2 in the device b 12 exists in a distributed application component database in the device b 12, so as to determine whether the meta-ability corresponding to the predefined ACTION2 is installed on the device a 11 and the device b 12.

If the BMS in the device a 11 determines that the meta-ability C1 of the application C is not installed on the device a 11 and the device b 12, the BMS in the device a 11 performs step S704 to step S707. If the BMS in the device a 11 determines that the meta-ability C1 of the application C is installed on at least one of the device a 11 and the device b 12, the BMS in the device a 11 performs step S708.

For a specific implementation process of a determining policy of the BMS in the device a 11, refer to the description of step S503. Details are not described herein.

S704: The BMS in the device a 11 sends the predefined ACTION2 to a HAG server 20. Therefore, the BMS in the device a 11 may request the HAG server 20 to download the meta-ability corresponding to the predefined ACTION2 for the device a 11 and/or the device b 12.

The BMS in the device a 11 may carry the predefined ACTION2 in a message, and send the message to the HAG server 20 through a channel between the device a 11 and the HAG server 20. The specific implementation of this message is not limited in this application. The message herein corresponds to a tenth message in step S1603 and step S2004. The HAG server 20 herein corresponds to a first server in step S1603 and step S2004.

S705: Based on the predefined ACTION2, the HAG server 20 obtains a matched meta-ability set 2, where each subset in the meta-ability set 2 carries an application name of an application, a meta-ability name of a meta-ability of the application (this parameter may be replaced with a predefined ACTION of the meta-ability of the application), a CDN download address of the meta-ability, and a device type applicable to the CDN download address of the meta-ability.

The HAG server 20 pre-stores a plurality of HAPs and a CDN download address of a meta-ability corresponding to each HAP, the HAG server 20 may obtain an application package name, a meta-ability name, a predefined ACTION, and a device type applicable to a CDN download address of a meta-ability of each HAP, and the HAG server 20 further pre-stores device types supported by meta-abilities (that is, device types in which meta-abilities can be installed). Therefore, the HAG server 20 may obtain the meta-ability set 2 based on matched CDN download addresses corresponding to meta-abilities with the same function as those identified by the predefined ACTION2, and device types applicable to the CDN download addresses of the meta-abilities. The meta-ability set 2 herein corresponds to a second set in step S2005.

Therefore, the HAG server 20 obtains the meta-ability set 2 based on matched package names of applications corresponding to meta-abilities, matched meta-ability names of the meta-abilities, matched CDN download addresses of the meta-abilities, and matched device types applicable to the meta-abilities.

For a specific implementation of the CDN download address, refer to the description of step S505. Details are not described herein. The meta-ability set 2 may include one or more subsets.

S706: The HAG server 20 sends the meta-ability set 2 to the BMS in the device a 11.

The HAG server 20 may carry the meta-ability set 2 in a message, and send the message to the BMS in the device a 11 through the channel between the device a 11 and the HAG server 20. The specific implementation of this message is not limited in this application. The message herein corresponds to an eleventh message in step S1604, step S1701, and step S2005. The meta-ability set 2 herein corresponds to a second set in step S2005.

S707: The BMS in the device a 11 sends the meta-ability set 2 to the DMS in the device a 11.

The BMS in the device a 11 may carry the meta-ability set 2 in a message, and send the message to the DMS in the device a 11. The specific implementation of this message is not limited in this application. The message herein corresponds to a fourteenth message in step S2006. The meta-ability set 2 herein corresponds to a second set in step S2006.

It should be noted that after step S707 is performed, step S709 is performed.

S708: The BMS in the device a 11 notifies that the meta-ability corresponding to the predefined ACTION2 has been installed, as well as a device type in which the meta-ability corresponding to the predefined ACTION2 has been installed, to the DMS in the device a 11. The notification herein corresponds to the fourteenth message in step S2006.

For example, the BMS in the device a 11 notifies that the meta-ability corresponding to the predefined ACTION2 has been installed on the device a 11, as well as the device type of the device a 11, to the DMS in the device a 11.

For another example, the BMS in the device a 11 notifies that the meta-ability corresponding to the predefined ACTION2 has been installed on the device b 12, as well as the device type of the device b 12, to the DMS in the device a 11.

For another example, the BMS in the device a 11 notifies that the meta-ability corresponding to the predefined ACTION2 has been installed on the device a 11 and the device b 12, as well as the device type of the device a 11 and the device type of the device b 12, to the DMS in the device a 11.

The device type in which the meta-ability corresponding to the predefined ACTION2 has been installed may be represented in at least one manner, such as letters, characters, and digits, for example, by a device number or a model.

It should be noted that after step S708 is performed, step S709 is performed.

S709: The DMS in the device a 11 determines, based on the device type of the meta-ability sent in step S707 or step S708, devices that are in a same distributed network and that support starting of the meta-ability corresponding to the predefined ACTION2.

With regard to step S707, the DMS in the device a 11 may determine devices that appear in the device type applicable to the CDN download address of the meta-ability corresponding to the predefined ACTION2 and also appear in the device type currently in the same distributed network as the device a 1 as devices that support starting of the meta-ability corresponding to the predefined ACTION2 and that are in the same distributed network.

With regard to step S708, the DMS in the device a 11 may determine devices that appear in the device type in which the meta-ability of the CDN download address corresponding to the predefined ACTION2 has been installed and also appear in the device type currently in the same network as the device a 1 as devices that support starting of the meta-ability corresponding to the predefined ACTION2 and that are in the same distributed network.

The device type currently in the same distributed network as the device a 11 may be understood as different electronic devices that may communicate with each other in a communication manner such as Bluetooth, Wi-Fi, ZigBee, or account sharing, for example, the device a 11 and the device b 12 that undergo distributed networking in a same Wi-Fi network environment by using a Huawei account.

S710: The DMS in the device a 11 displays, in a window 4, label names of the devices that support starting of the meta-ability corresponding to the predefined ACTION2 and that are in the same distributed network, and determines a meta-ability of a selected application and selected devices in response to an operation of the user on the window 4.

Layout parameters such as a size, a position, and a color of the window 4 are not limited in this application. The window 4 herein corresponds to a second window in step S17033. Alternatively, the DMS in the device a 11 may select one of the devices that support starting of the meta-ability corresponding to the predefined ACTION2 and that are in the same distributed network as the selected device, and does not display the window 4. The DMS in the device a 11 may perform the selection based on parameters such as a preset priority of the devices that support starting of the meta-ability corresponding to the predefined ACTION2 and that are in the same distributed network, storage space of the devices or communication rates of the devices. This is not limited in this application.

The meta-ability of the selected application includes the meta-ability C1 of the application C, and the selected devices may include the device a 11 and the device b 12. For ease of description, the meta-ability of the selected application herein is the meta-ability C1 of the application C.

It should be noted that when the selected device only includes the device b 12, step S711 to step S717 may be performed in this application. When the selected device only includes the device a 11, step S718 to step S723 may be performed in this application. When the selected devices include the device a 11 and the device b 12, step S711 to step S717 and step S718 to step S723 may be performed separately in this application.

The selection operation may be implemented by the user in step S710, or by the DMS in the device a 11, or by the user in step S710 and the DMS in the device a 11. This is not limited in this application.

S711: Based on the device type sent in step S707, the DMS in the device a 11 sends the package name of the selected application, the predefined ACTION2 of the selected meta-ability, the CDN download address of the selected meta-ability, and an ID of the device b 12 to a DMS in the device b 12 when the selected devices include the device b 12. Alternatively, based on the device type sent in step S708, the DMS in the device a 11 sends the package name of the selected application, the predefined ACTION2 of the selected meta-ability, and an ID of the device b 12 to a DMS in the device b 12 when the selected devices include the device b 12.

The DMS in the device a 11 may carry the package name of the selected application, the predefined ACTION2 of the selected meta-ability (this parameter may be replaced with the meta-ability name of the meta-ability of the application), the CDN download address of the meta-ability, and the ID of the device b 12 in a message, and send the message to the DMS in the device b 12, or the DMS in the device a 11 may carry the package name of the selected application, the predefined ACTION2 of the selected meta-ability (this parameter may be replaced with the meta-ability name of the meta-ability of the application), and the ID of the device b 12 in a message, and send the message to the DMS in the device b 12. The specific implementation of this message is not limited in this application. The message herein corresponds to a twelfth message in step S17032, step S17033, step S20082, and step S20083.

In addition, the ID of the device b 12 may be a networking identifier of the device b 12 in the same distributed network.

S712: The DMS in the device b 12 sends the package name of the selected application, the predefined ACTION2 of the selected meta-ability, and the CDN download address of the selected meta-ability to a BMS in the device b 12, or sends the package name of the selected application and the predefined ACTION2 of the selected meta-ability to a BMS in the device b 12.

Based on the ID of the device b 12, the DMS in the device b 12 may determine whether the package name of the selected application, the predefined ACTION2 of the selected meta-ability, and the CDN download address of the selected meta-ability that are sent by the device a 11 are sent to the device b 12. Therefore, the DMS in the device b 12 may determine that the meta-ability of the selected application needs to be started, and then step S712 may be performed.

The DMS in the device b 12 may carry the package name of the selected application, the predefined ACTION2 of the selected meta-ability, and the CDN download address of the selected meta-ability in a message, and send the message to the BMS in the device b 12, or the DMS in the device b 12 may carry the package name of the selected application and the predefined ACTION2 of the selected meta-ability in a message, and send the message to the BMS in the device b 12. The specific implementation of this message is not limited in this application.

S713: The BMS in the device b 12 determines, based on the package name of the selected application and the predefined ACTION2 of the selected meta-ability, whether the meta-ability of the selected application is installed on the device b 12.

The BMS may store a parsed configuration file of a meta-ability in a distributed application component database when installing the meta-ability. Therefore, the BMS in the device b 12 may query whether the meta-ability of the selected application exists in the distributed application component database in the device b 12, so as to determine whether the meta-ability of the selected application is installed on the device b 12.

When no meta-ability of the selected application exists in the distributed application component database in the device b 12, the BMS in the device b 12 may determine that the meta-ability of the selected application is not installed on the device b 12, so that the BMS in the device b 12 may perform step S714 to step S717 based on the received BMS in the device b 12 or the CDN download address of the meta-ability C1 obtained from the HAG server 20; or when the meta-ability of the selected application exists in the distributed application component database in the device b 12, the BMS in the device b 12 may determine that the meta-ability of the selected application has been installed on the device b 12, so that the BMS in the device b 12 may perform step S716 and step S717.

It should be noted that, in addition to the foregoing method for determining whether the meta-ability C1 of the application C is installed on the device b 12, the BMS in the device b 12 may determine that the meta-ability of the selected application is not installed on the device b 12 when receiving the CDN download address of the selected meta-ability that is sent by the DMS in the device b 12. Therefore, the BMS in the device b 12 performs step S714 to step S717 based on the received BMS in the device b 12.

S714: The BMS in the device b 12 downloads the meta-ability of the selected application from a CDN server 30 based on the package name of the selected application, the predefined ACTION2 of the selected meta-ability, and the CDN download address of the selected meta-ability.

S715: The BMS in the device b 12 installs the meta-ability of the selected application.

S716: The BMS in the device b 12 notifies the DMS in the device b 12 that the meta-ability of the selected application has been installed.

S717: The DMS in the device b 12 starts the meta-ability of the selected application (that is, implicit start).

In conclusion, based on the foregoing description, the device a 11 may trigger the system service in the device a 11, by using the meta-ability A1 of the application A, to start the meta-ability of the application corresponding to the predefined ACTION2 in the device b 12 based on the predefined ACTION2, fully considering that a third-party application vendor usually does not provide the meta-ability name of the meta-ability C1 to other vendors, that is, there is no need to rely on the meta-ability name of the meta-ability C1.

S718: When the selected device includes the device a 11, the DMS in the device a 11 determines, based on the package name of the selected application and the predefined ACTION2 of the selected meta-ability, whether the meta-ability of the selected application is installed on the device a 11.

The BMS may store a parsed configuration file of a meta-ability in a distributed application component database when installing the meta-ability. Therefore, the DMS in the device a 11 may query, by using the BMS in the device a 11, whether the meta-ability of the selected application exists in the distributed application component database in the device a 11, so as to determine whether the meta-ability of the selected application is installed on the device a 11.

When no meta-ability of the selected application exists in the distributed application component database in the device a 11, the DMS in the device a 11 may determine that the meta-ability of the selected application is not installed on the device a 11, so that the DMS in the device a 11 may perform step S719 to step S723; or when the meta-ability of the selected application exists in the distributed application component database in the device a 11, the DMS in the device a 11 may determine that the meta-ability of the selected application has been installed on the device a 11, so that the DMS in the device a 11 may perform step S723.

S719: The DMS in the device 11 requests the BMS in the device a 11 to download the meta-ability of the selected application. The request herein corresponds to a fifteenth message in step S20081 and step S20083.

S720: The BMS in the device a 11 downloads the meta-ability of the selected application from a CDN server 30 based on the package name of the selected application, the predefined ACTION2 of the selected meta-ability, and the CDN download address of the selected meta-ability. The CDN server 30 herein corresponds to a second server in step S1731.

S721: The BMS in the device a 11 installs the meta-ability of the selected application.

S722: The BMS in the device a 11 notifies the DMS in the device a 11 that the meta-ability of the selected application has been installed. The request herein corresponds to a sixteenth message in step S20081 and step S20083.

S723: The DMS in the device a 11 starts the meta-ability of the selected application (that is, implicit start).

In conclusion, based on the foregoing description, the device a 11 may trigger the system service in the device a 11, by using the meta-ability A1 of the application A, to start the meta-ability of the application corresponding to the predefined ACTION2 in the device a 11 based on the predefined ACTION2, fully considering that a third-party application vendor usually does not provide the meta-ability name of the meta-ability C1 to other vendors, that is, there is no need to rely on the meta-ability name of the meta-ability C1.

Therefore, with regard to an electronic device 1 and an electronic device 2 in a same distributed network, the electronic device 1 may query a CDN download address of a meta-ability from a HAG server by using a package name of an application and a meta-ability name of the meta-ability of the application, or a package name of an application and a predefined ACTION of the meta-ability of the application, or a predefined ACTION, and one of the electronic device 1 and the electronic device 2 may be controlled to download the meta-ability from a CDN server based on the CDN download address of the meta-ability, so that a meta-ability that is not installed is automatically installed, and the user is unaware of a download process of the meta-ability. The meta-ability does not need to be downloaded when the application is installed for the first time, and may be downloaded based on a user requirement.

With reference to FIG. 11A to FIG. 11E, a specific implementation process in which an electronic device 1 starts a meta-ability in an electronic device 2 is described. For ease of description, in FIG. 11A to FIG. 11E, the following is used as an example for description: The electronic device 1 is a mobile phone, the electronic device 2 is a watch, an application A is downloaded in the mobile phone and is a sports health application, and the mobile phone and the watch is capable of installing a meta-ability D1 of an application D. The electronic device 1 is communicatively connected to the electronic device 2, a meta-ability A1 of the application A is software code, and the meta-ability A1 is used to trigger and start the meta-ability D1 of the application D. The meta-ability D1 of the application D is software code, the application D is a heart rate application, and the meta-ability D1 is used to provide the home page of the heart rate application. In addition, whether the watch has the ability to install the meta-ability D1 of the application D is not limited in this application.

FIG. 11A to FIG. 11E are schematic diagrams of man-machine interaction interfaces according to an embodiment of this application.

Figure 11A:
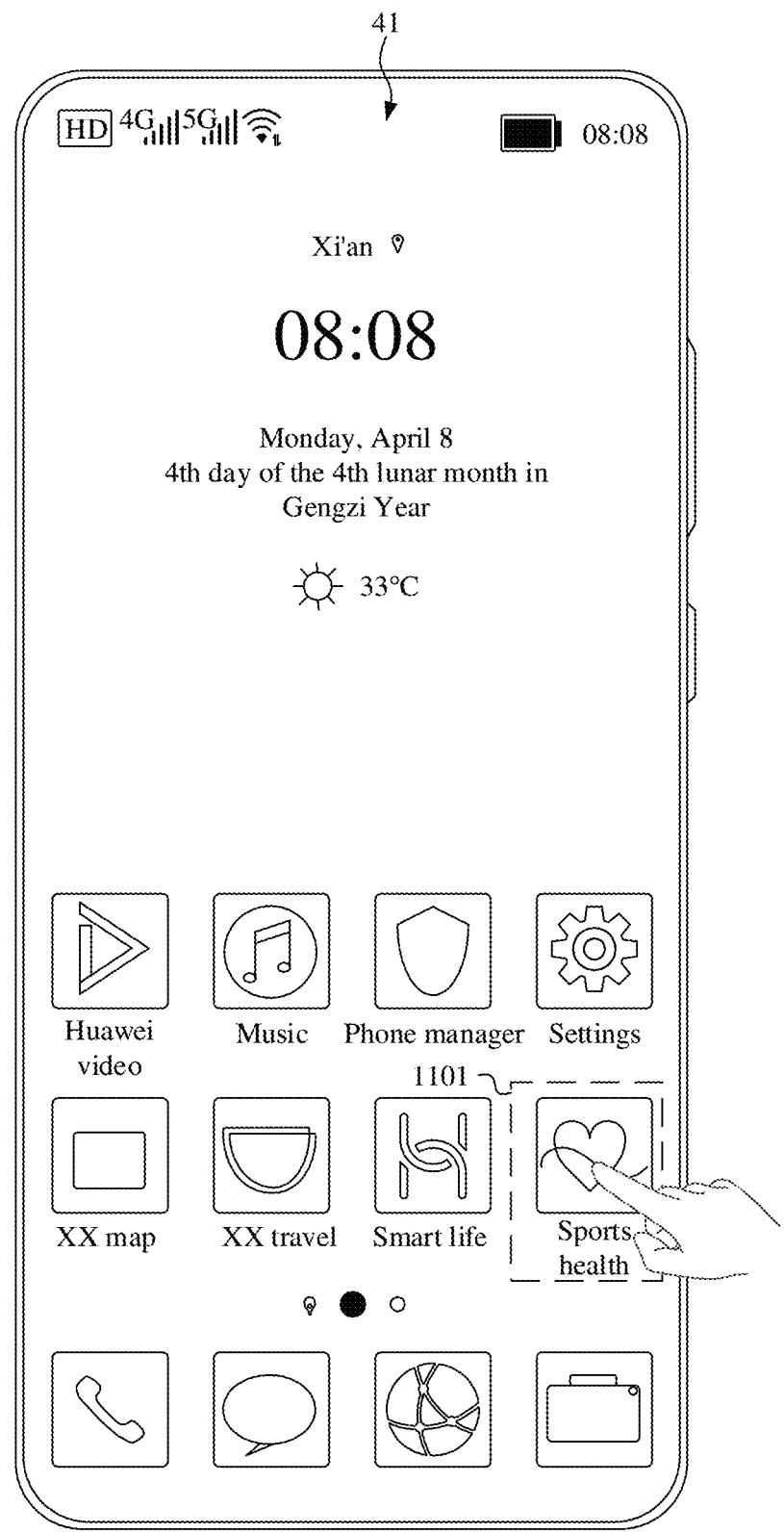
FIG. 11A to FIG. 11E are schematic diagrams of man-machine interactions interface according to an embodiment of this application.

A mobile phone may display a user interface 41 in an example shown in FIG. 11A. The user interface 41 is used to display a home screen (Home screen) of a desktop, and the user interface 41 may include, but is not limited to, a status bar, a navigation bar, a calendar indicator, a weather indicator, and a plurality of application icons. The application icons may further include an icon 1101 of a sports health application, and may also include, for example: an icon of a Huawei video application, an icon of a music application, an icon of a phone manager application, an icon of a setting application, an icon of an XX map application, an icon of an XX travel application, an icon of a smart life application, an icon of a calling application, an icon of a short message application, an icon of a browser application, an icon of a camera application, and the like.

Figure 11B:
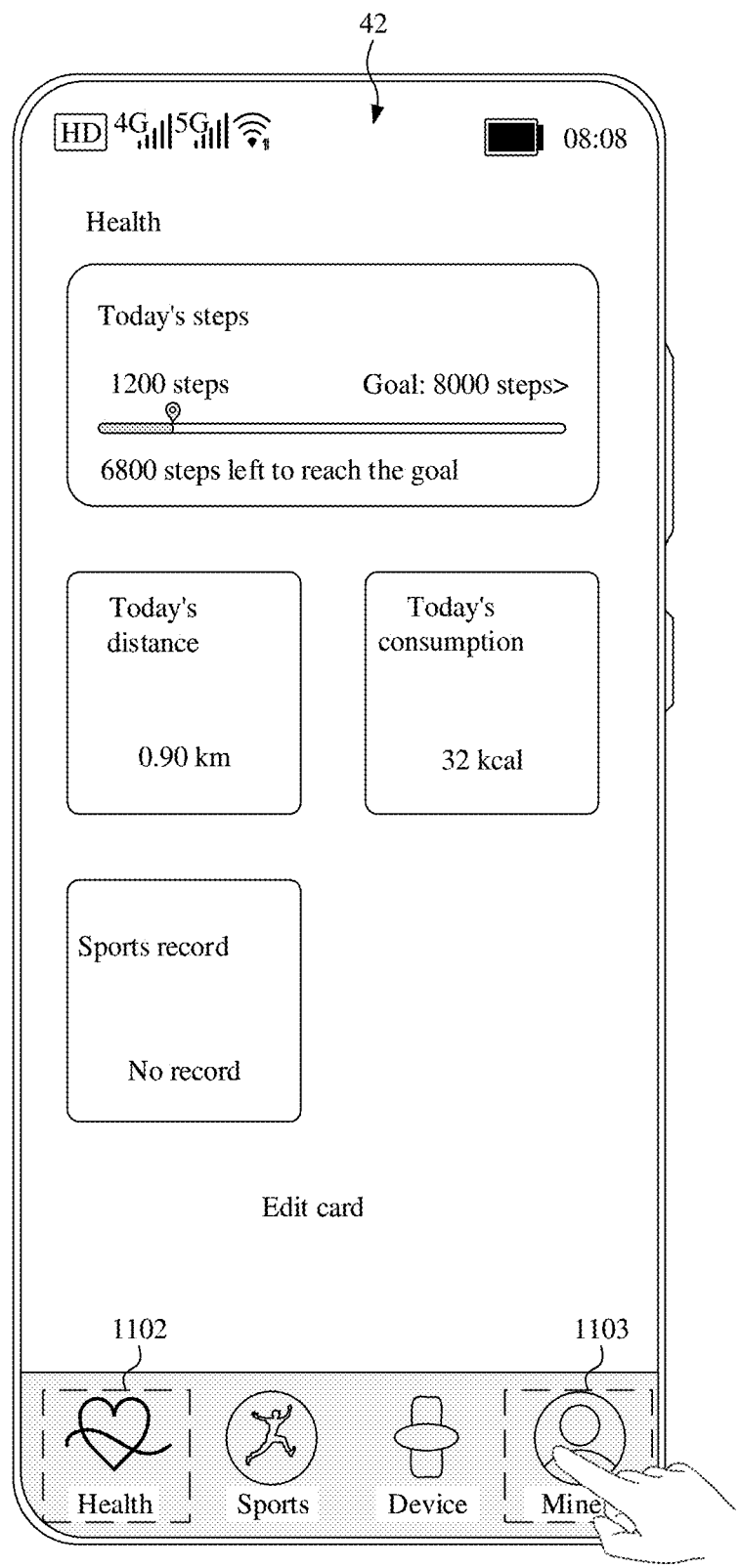

The mobile phone may display a user interface 42 in an example shown in FIG. 11B after detecting an operation of opening the sports health application as indicated by a user (such as an operation of tapping the icon 1101 of the sports health application on the user interface 41 shown in FIG. 11A), and the user interface 42 is used to display a home page of the sports health application.

The user interface 42 includes a control 1102 and a control 1103. The control 1102 is used to enter the home page of sports health application. The control 1103 is used to enter, for example, a page that stores parameters such as a sports record, body data, a step list, a weekly sports report, and shared steps.

Figure 11C:
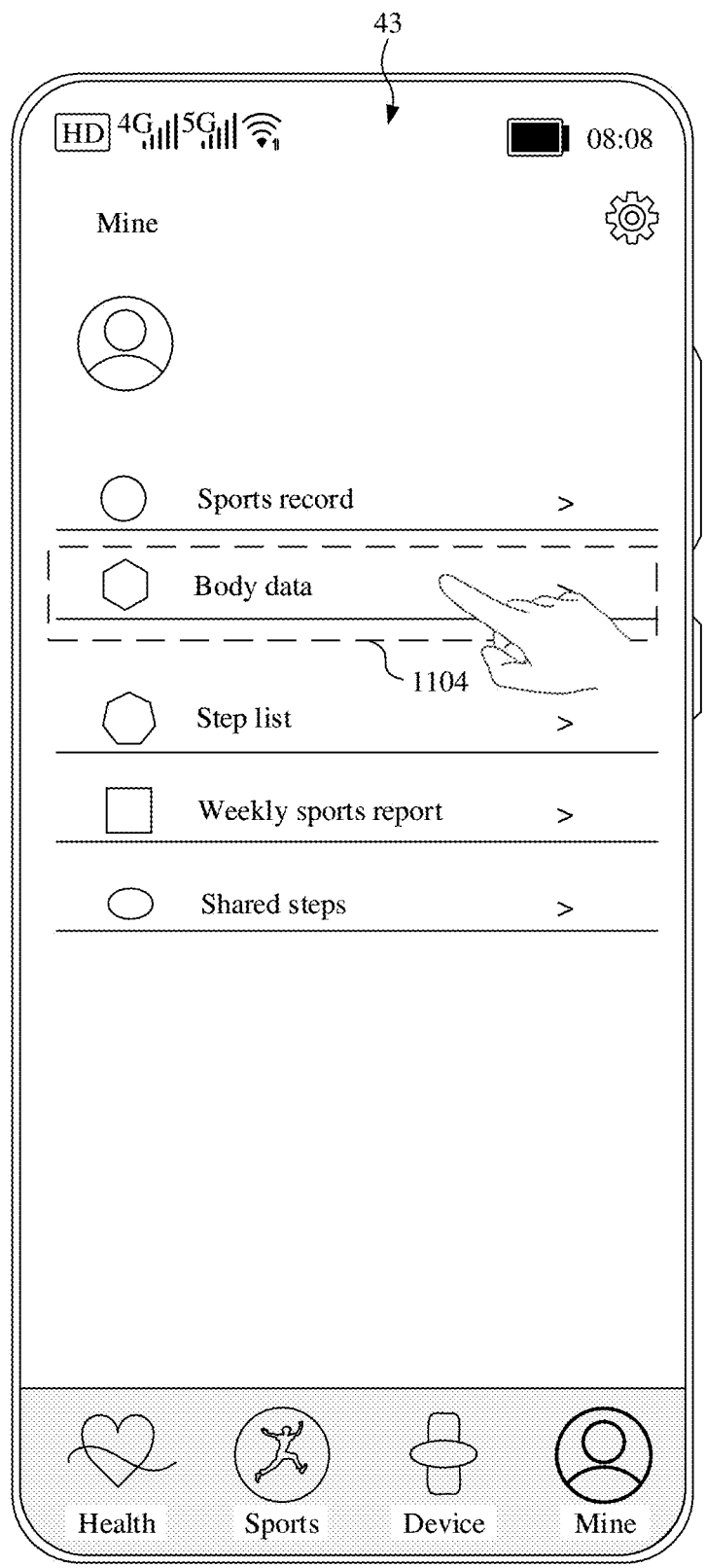

The mobile phone may display a user interface 43 in an example shown in FIG. 11C after detecting an operation of checking a heart rate situation as indicated by the user (such as an operation of tapping the control 1103 on the user interface 42), and the user interface 43 is used to display, for example, a page that stores parameters such as a sports record, body data, a step list, a weekly sports report, and shared steps. The user interface 43 includes a control 1104, and the control 1104 is used to enter, for example, a page that stores the body data such as steps, a distance, consumption, a sleep state, a heart rate, pressure, and blood oxygen saturation.

Figure 11D:
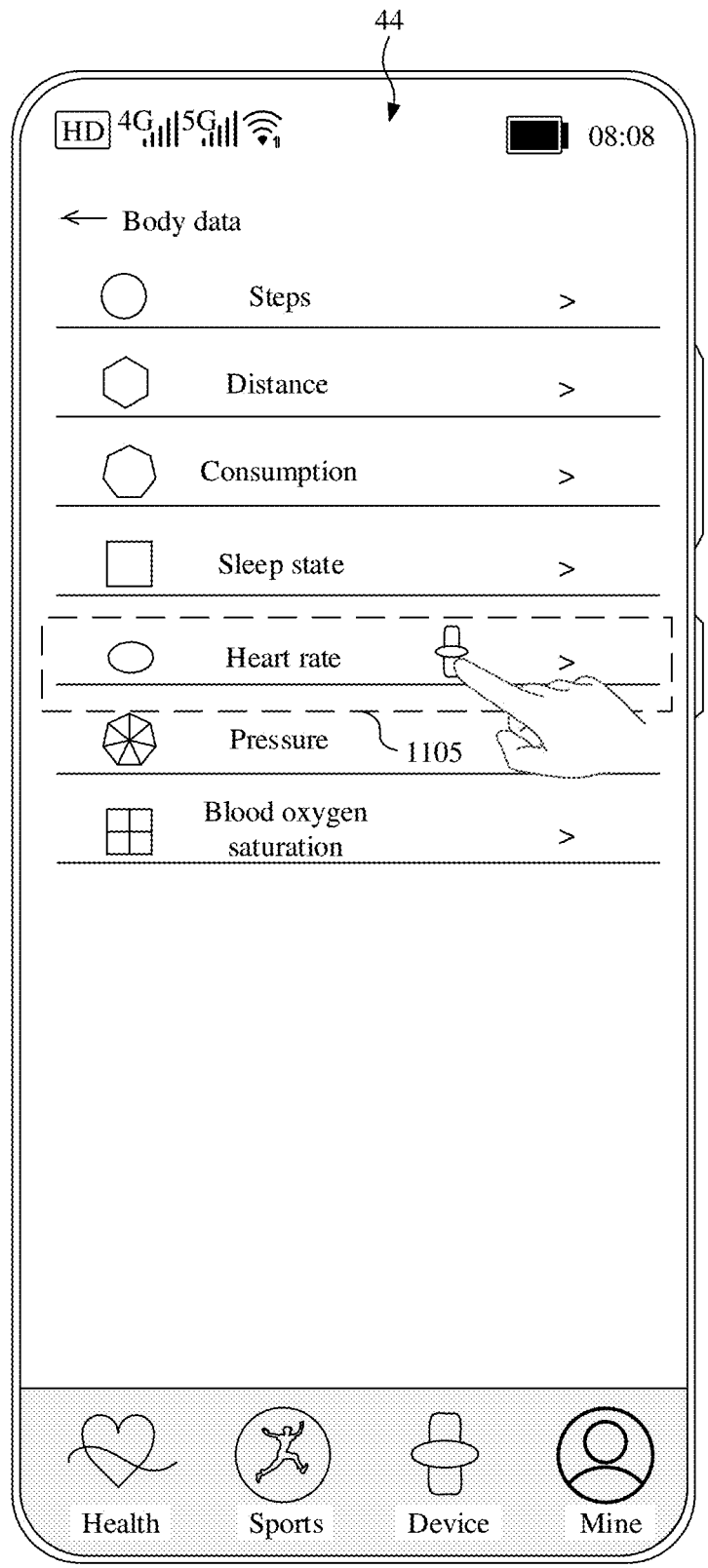
Figure 11E:
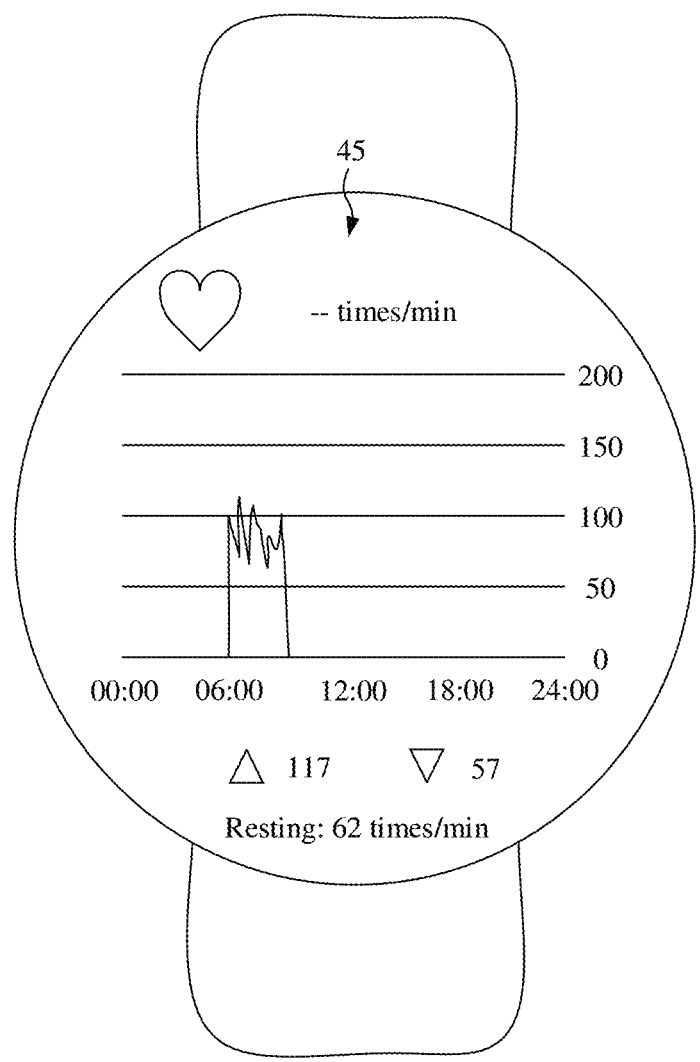

The mobile phone may display a user interface 44 in an example shown in FIG. 11D after detecting an operation on the user interface 43 indicated by the user, such as tapping the control 1104, and the user interface 44 is used to display, for example, a page that stores the body data such as steps, a distance, consumption, a sleep state, a heart rate, pressure, and blood oxygen saturation. The user interface 44 includes a control 1105, where the control 1105 is used to enter a home page corresponding to the heart rate application in the watch.

After detecting an operation on the user interface 44 indicated by the user, such as tapping an icon of the watch in the control 1105, the mobile phone may control the watch to start the home page of the heart rate application. For example, the watch may display a user interface 45 (that is, start the meta-ability D1) in an example shown in FIG. 11E, and the user interface 45 is used to display a heart rate situation of the user on the current day.

In conclusion, when the mobile phone and the watch may be communicatively connected to each other, the mobile phone may start a meta-ability in the watch, which meets an actual requirement of the user and improves user experience.

Based on the description of the embodiment in FIG. 11A to FIG. 11E, with regard to an electronic device 1 and an electronic device 2 that may be communicatively connected to each other, the electronic device 1 may, based on wishes of a user or an actual situation, control the electronic device 2 to download and install a meta-ability, so as to start the meta-ability, so that the user can use an electronic device to control another electronic devices to complete function implementations corresponding to the meta-ability, which meets an actual requirement of the user and improves a use sense of the user. Whether the meta-ability is installed on the electronic device 2 is not limited in this application. In addition, the electronic device 1 and the electronic device 2 may be in communication connection in advance or manually by the user. This is not limited in this embodiment of this application.

Figure 12A:
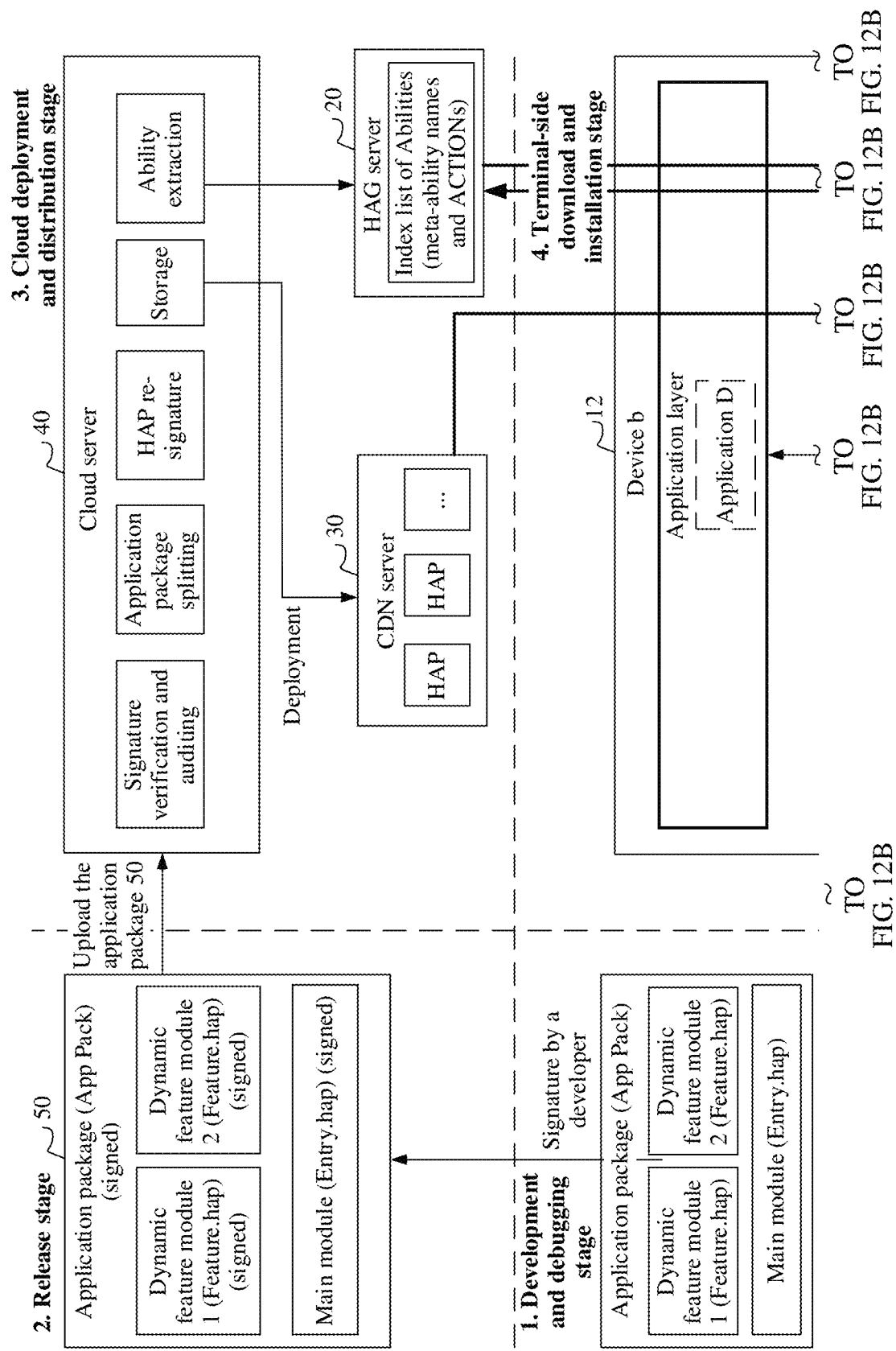
FIG. 12A to FIG. 12C are a schematic diagram of each stage of an application according to an embodiment of this application.
Figure 12B:
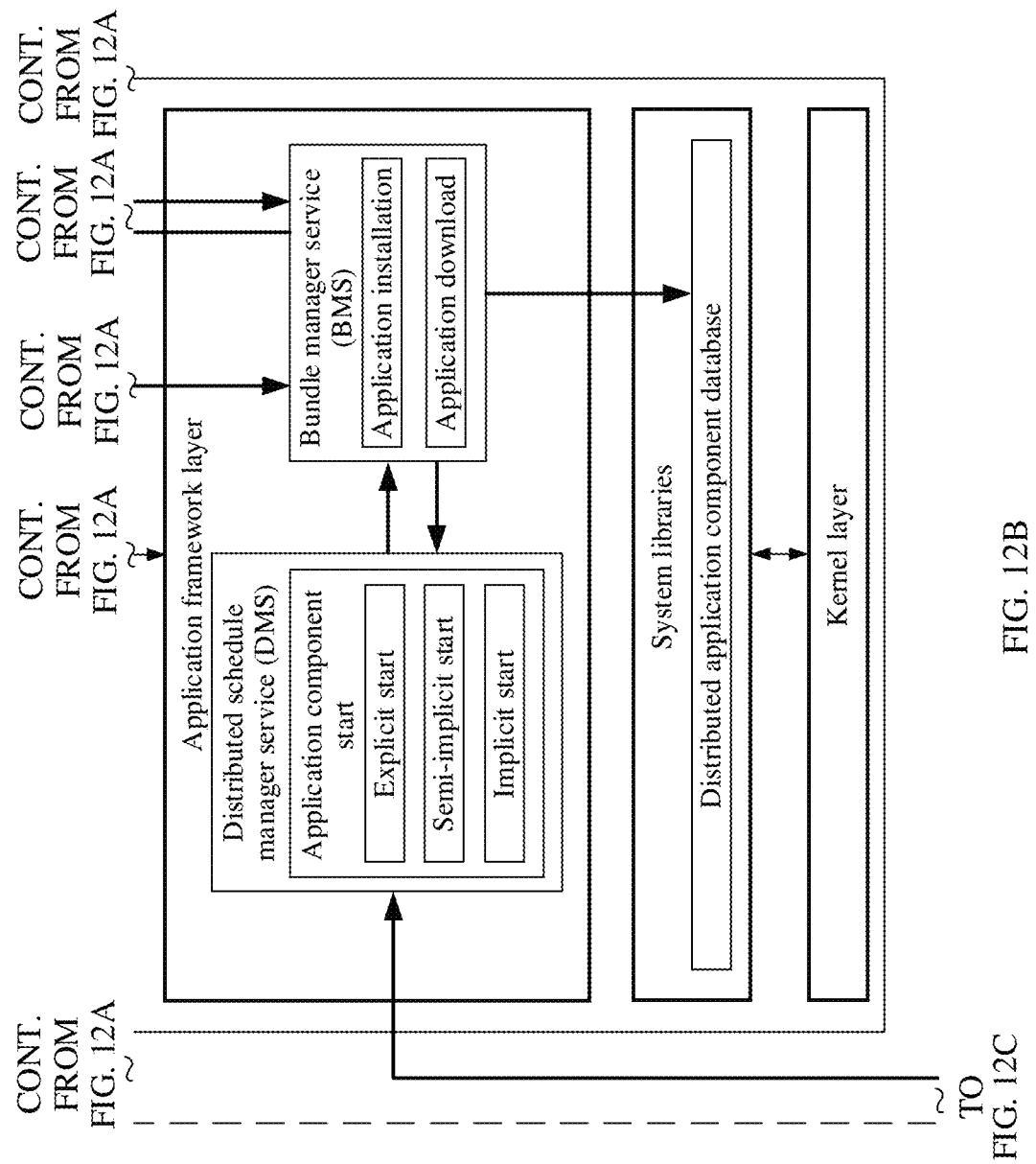
Figure 12C:
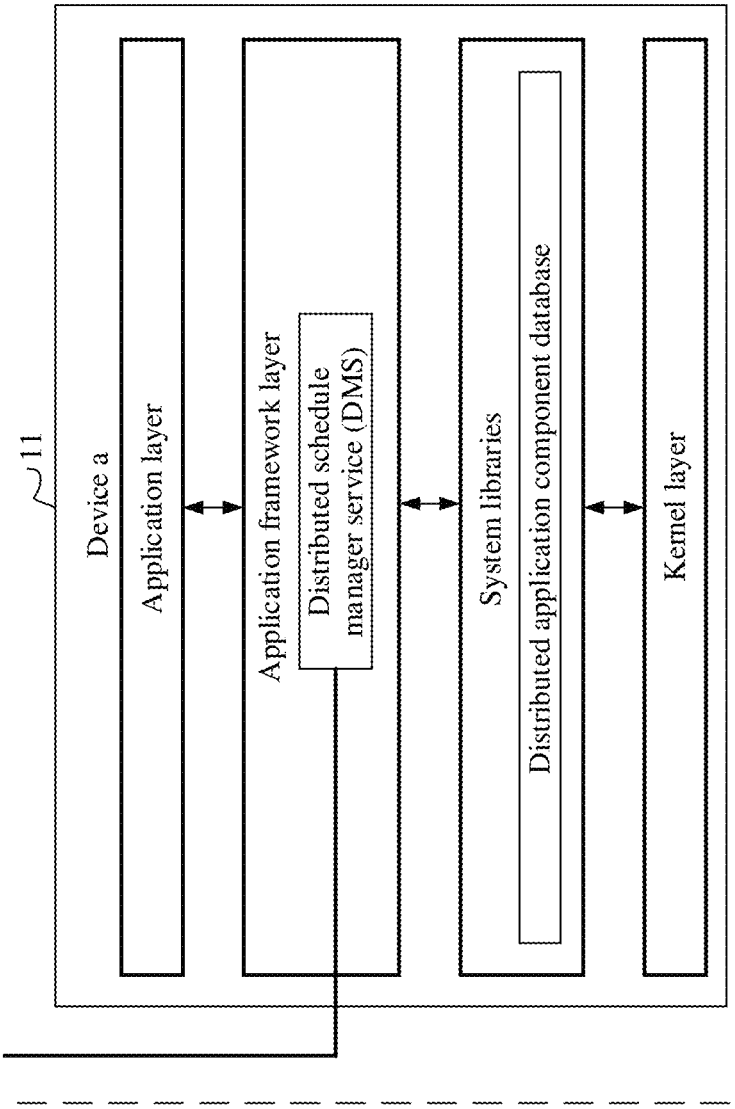

FIG. 12A to FIG. 12C are a schematic diagram of each stage of an application according to an embodiment of this application.

As shown in FIG. 12A to FIG. 12C, a life cycle process of an application may include four stages: a development and debugging stage, a release stage, a cloud deployment and distribution stage, and a terminal-side download and installation stage.

For a specific implementation process of each stage, refer to the description of the embodiment in FIG. 5A and FIG. 5B. For an application D, refer to the description of the application B in the embodiment in FIG. 5A and FIG. 5B. Details are not described herein. In addition, in the terminal-side download and installation stage, FIG. 12A to FIG. 12C further show a device b 12. For details about a layered architecture of the device b 12, refer to the description of the layered architecture of the device a 11 in the embodiment in FIG. 5A and FIG. 5B.

With reference to FIG. 1, assuming that a meta-ability A1 of an application A has been installed on the device a 11, the meta-ability A1 of the application A in the device a 11 may invoke a DMS in the device a 11 to request a DMS in a device b 12 to start a meta-ability D1 of the application D in the device b 12. The DMS in the device b 12 requests a BMS in the device b 12 to query whether the meta-ability D1 of the application D is installed on the device b 12.

When the BMS in the device b 12 determines that the meta-ability D1 has been installed on the device b 12, the BMS in the device b 12 may notify the DMS in the device b 12 that the meta-ability D1 has been installed. Therefore, the DMS in the device b 12 may start the meta-ability D1. An application layer further includes the application D.

When the BMS in the device b 12 determines that the meta-ability D1 is not installed on the device b 12, the BMS in the device b 12 may obtain a CDN download address of the meta-ability D1 from a HAG server 20. Based on the CDN download address of the meta-ability D1, the BMS in the device b 12 may download the meta-ability D1 from a CDN server 30, so that the BMS in the device b 12 installs the meta-ability D1 in the device b 12, and the application layer further includes the application D. The BMS in the device b 12 may notify the DMS in the device b 12 that the meta-ability D1 has been installed. Therefore, the DMS in the device b 12 may start the meta-ability D1.

The content in the examples in FIG. 11A to FIG. 11E may explain the foregoing process.

In conclusion, the device a 11 may trigger the system service in the device a 11, by using the meta-ability A1 of the application A, to start the meta-ability D1 of the application D in the device b 12 that may be communicatively connected to the device a 11.

Figures 1, 13A:
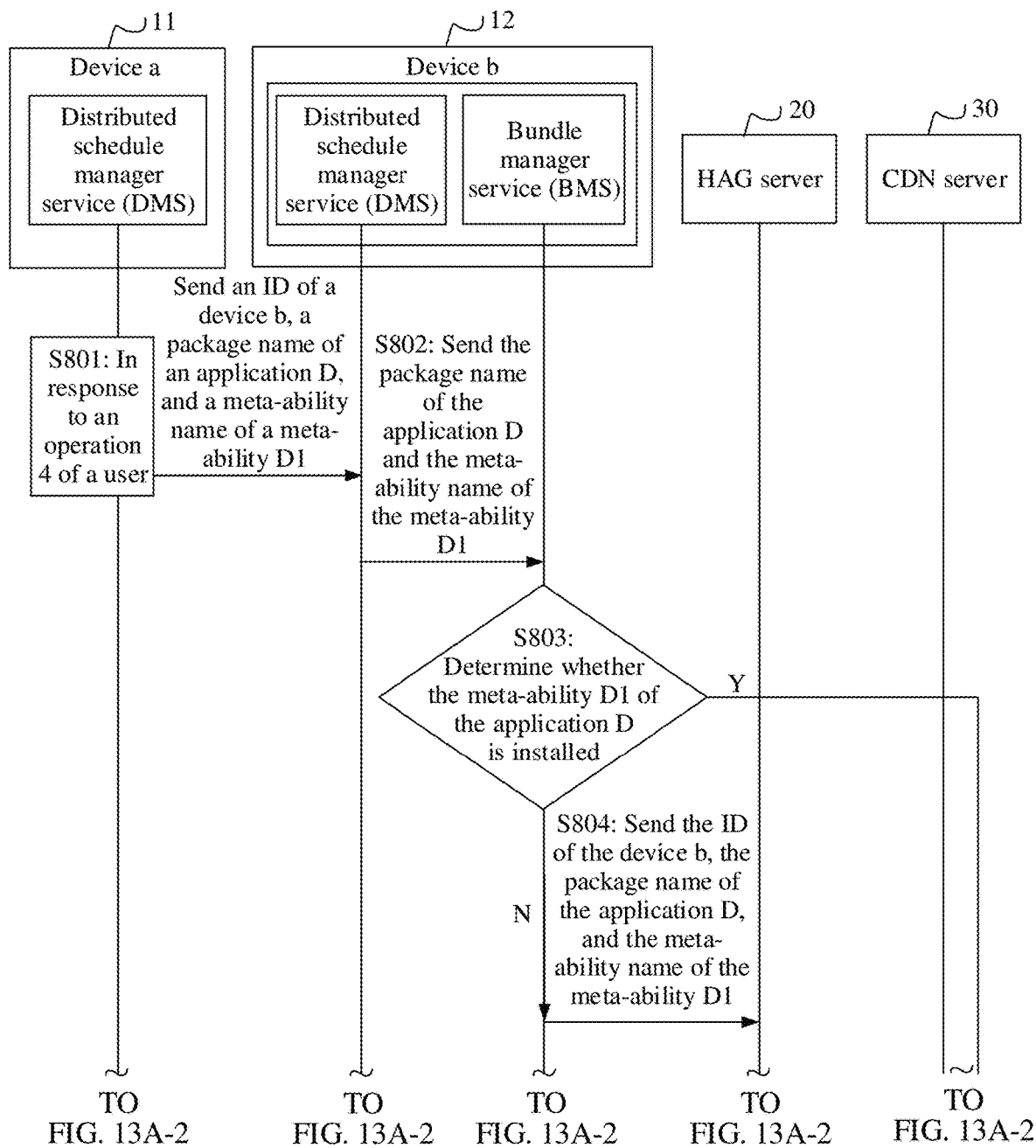
Figures 2, 13A:
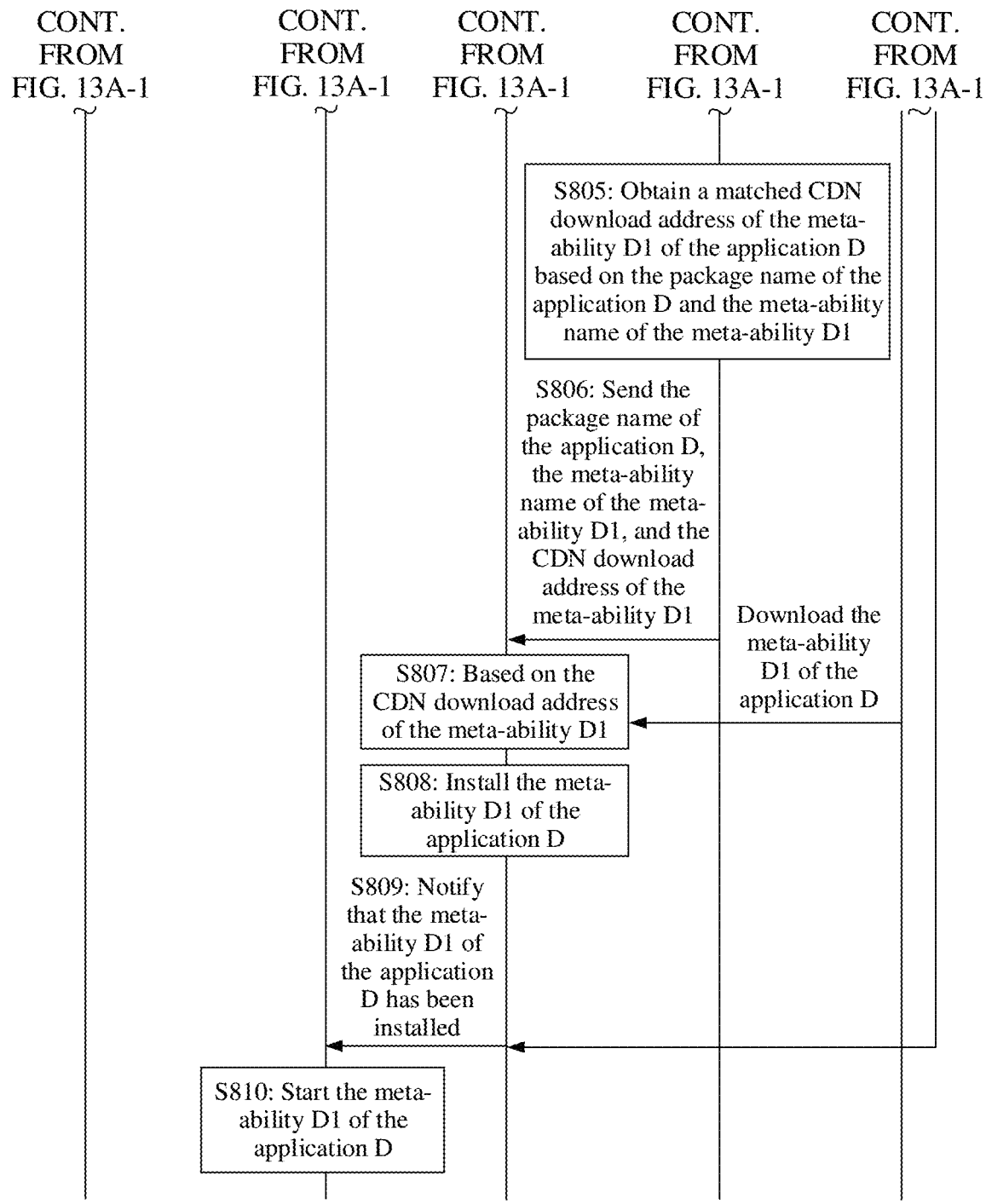
Figures 1, 13B:
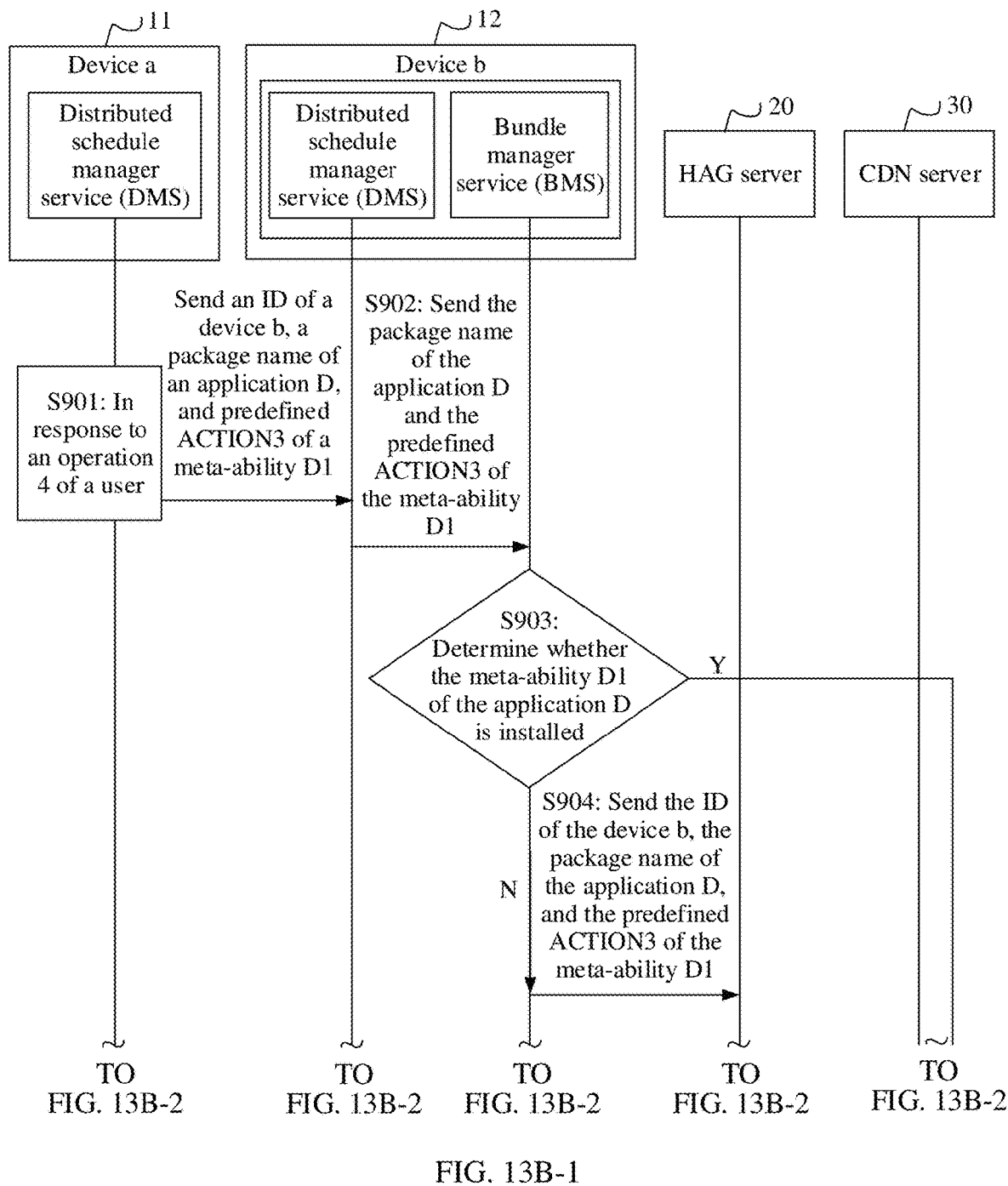
Figures 2, 13B:
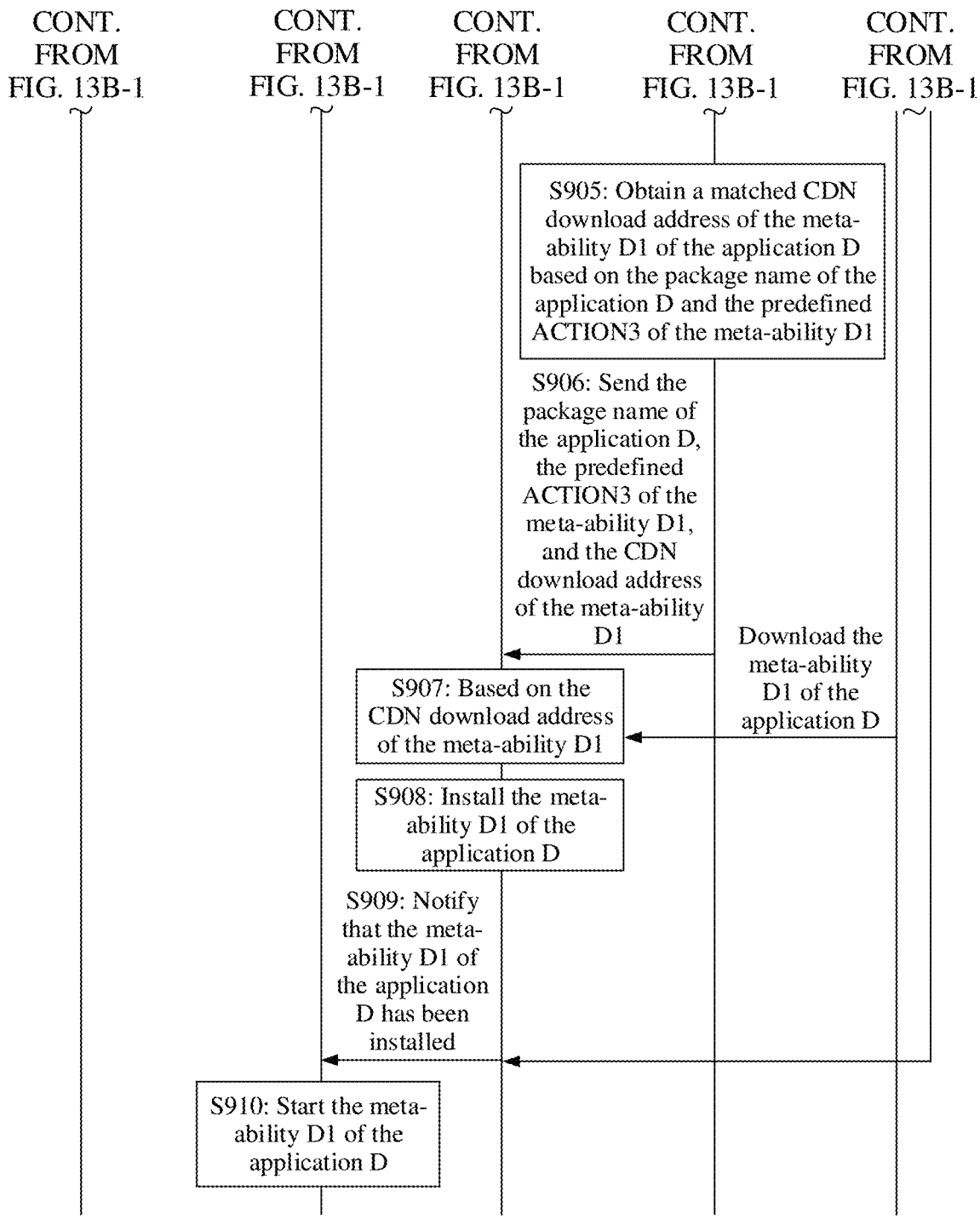
Figures 1, 13C:
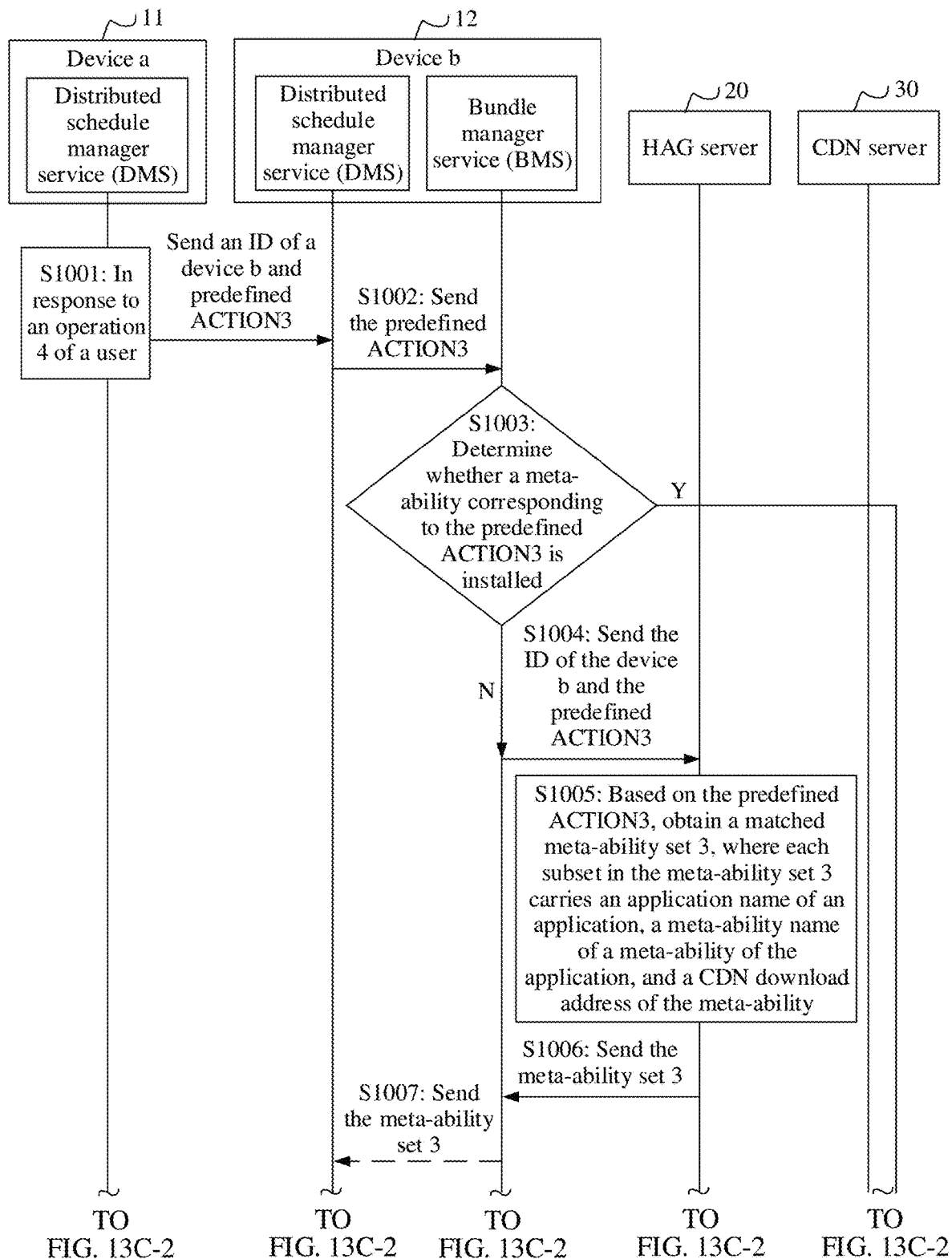
Figures 2, 13C:
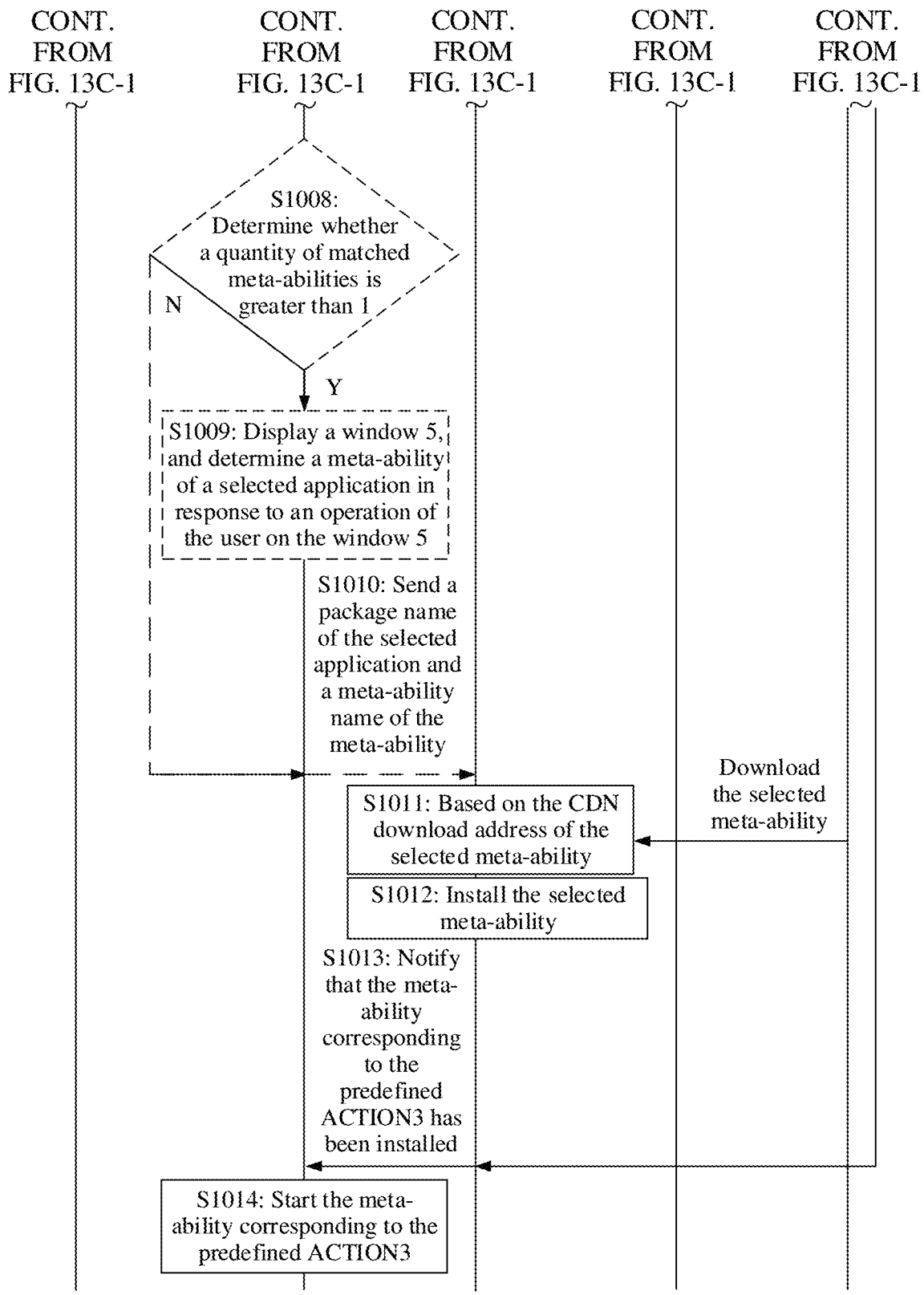

Based on the foregoing description, with reference to 13A to FIG. 13C-1 and FIG. 13C-2, the implementation process in which the device a 11 triggers the system service in the device a 11, by using the meta-ability A1 in the application A, to start the meta-ability D1 of the application D in the device b 12 in the embodiment in FIG. 11A to FIG. 11E is described in detail. For the device a 11, refer to the description of the mobile phone in the embodiment in FIG. 11A to FIG. 11E. For the device b 12, refer to the description of the watch in the embodiment in FIG. 11A to FIG. 11E. For the application A, refer to the description of the sports health application in the embodiment in FIG. 11A to FIG. 11E. For the application D, refer to the description of the heart rate application in the embodiment in FIG. 11A to FIG. 11E. For the meta-ability A1, refer to the description of the meta-ability A1 in the embodiment in FIG. 11A to FIG. 11E. For the meta-ability D1, refer to the description of the meta-ability D1 in the embodiment in FIG. 11A to FIG. 11E.

FIG. 13A-1 and FIG. 13A-2 to FIG. 13C-1 and FIG. 13C-2 are schematic flowcharts of an application module startup method according to an embodiment of this application.

As shown in FIG. 13A-1 and FIG. 13A-2, a specific implementation process of the application module startup method according to this application may include the following steps.

S801: A DMS in a device a 11 sends, in response to an operation 4 of a user, an ID of a device b 12, a package name of an application D, and a meta-ability name of a meta-ability D1 to a DMS in the device b 12.

The operation 4 may include, but is not limited to, a type of operation such as tap, double tap, touch and hold, or touch. For example, the operation 4 may be an operation of tapping the control 1105 performed by the user in the embodiment in FIG. 11D.

In addition, the operation 4 is associated with the meta-ability D1 of the application D. That is, the meta-ability A1 of the application A may learn, based on the operation 4, that the device a 11 needs to start the meta-ability D1 of the application D in the device b 12. Because the application A pre-stores the package name of the application D and the meta-ability name of the meta-ability D1 of the application D that are associated with the operation 4, the meta-ability A1 may learn the package name of the application D and the meta-ability name of the meta-ability D1. Therefore, the meta-ability A1 of the application A may invoke the DMS in the device a 11 to send an ID of the device b 12, the package name of the application D, and the meta-ability name of the meta-ability D1 to the DMS in the device b 12, that is, request the device b 12 to start the meta-ability D1 of the application D.

The package name of the application D can uniquely identify the application D, and the meta-ability name of the meta-ability D1 can uniquely identify the meta-ability D1. The package name of the application D and the meta-ability name of the meta-ability D1 may be represented in at least one manner, such as letters, characters, and digits. Herein, the package name of the application D may correspond to an identifier of a first application in step S1201, and the meta-ability name of the meta-ability D1 may correspond to a module identifier of a first application module in step S1201.

In addition, the DMS in the device a 11 may carry the ID of the device b 12, the package name of the application D, and the meta-ability name of the meta-ability D1 in a message, and send the message to the DMS in the device b 12. The specific implementation of this message is not limited in this application. The message herein may correspond to a first message in step S1101 and step S1201.

S802: The DMS in the device b 12 sends the package name of the application D and the meta-ability name of the meta-ability D1 to a BMS in the device b 12.

Based on the ID of the device b 12, the DMS in the device b 12 may determine whether the package name of the application D and the meta-ability name of the meta-ability D1 that are sent by the device a 11 are sent to the device b 12. Therefore, the DMS in the device b 12 may determine that the meta-ability D1 of the application D needs to be started, and then step S802 may be performed, that is, the DMS in the device b 12 may request the BMS in the device b 12 to query whether the meta-ability D1 of the application D has been installed.

The DMS in the device b 12 may carry the package name of the application D and the meta-ability name of the meta-ability D1 in a message, and send the message to the BMS in the device b 12. The specific implementation of this message is not limited in this application. The message herein may correspond to a fourth message in step S1202.

S803: The BMS in the device b 12 determines, based on the package name of the application D and the meta-ability name of the meta-ability D1, whether the meta-ability D1 of the application D is installed on the device b 12.

The BMS in the device b 12 may store a parsed configuration file of a meta-ability in a distributed application component database in the device b 12 when installing the meta-ability. Therefore, the BMS in the device b 12 may query whether the meta-ability D1 of the application D exists in the distributed application component database in the device b 12, so as to determine whether the meta-ability D1 of the application D is installed on the device b 12.

When no meta-ability D1 of the application D exists in the distributed application component database in the device b 12, the BMS in the device b 12 may determine that the meta-ability D1 of the application D is not installed on the device b 12, so that the BMS in the device b 12 may perform step S804 to step S810; or when the meta-ability D1 of the application D exists in the distributed application component database in the device b 12, the BMS in the device b 12 may determine that the meta-ability D1 of the application D has been installed on the device b 12, so that the BMS in the device b 12 may perform step S809 and step S810.

S804: The BMS in the device b 12 sends the ID of the device b 12, the package name of the application D, and the meta-ability name of the meta-ability D1 to a HAG server 20. Therefore, the BMS in the device b 12 may obtain the ID of the device b 12 by using a system attribute in the device b 12, and request the HAG server 20 to download the meta-ability D1 of the application D for the device b 12.

The BMS in the device b 12 may carry the ID of the device b 12, the package name of the application D, and the meta-ability name of the meta-ability D1 in a message, and send the message to the HAG server 20 through a communication channel between the device b 12 and the HAG server 20. The specific implementation of this message is not limited in this application. The message herein may correspond to a second message in step S1103 and step S1204.

In addition, the ID of the device b 12 is used to uniquely indicate the device b 12, indicating that the device b 12 needs to obtain a CDN download address of the meta-ability A2 from the HAG server 20. In addition, the specific implementation of the ID of the device b 12 is not limited in this application, for example, by using a device type of the device b 12 or a fixed asset number of the device b 12.

S805: The HAG server 20 obtains a matched CDN download address of the meta-ability B1 of the application B based on the package name of the application B and the meta-ability name of the meta-ability B1.

Because the HAG server 20 pre-stores a plurality of HAPs and a CDN download address of a meta-ability corresponding to each HAP, and the HAG server 20 may obtain an application package name and a meta-ability name of each HAP, the HAG server 20 may match the CDN download address corresponding to the meta-ability D1 of the application D based on the package name of the application D and the meta-ability name of the meta-ability D1.

The CDN download address may be expressed in a manner such as a link or an address string. In addition, the meta-ability D1 corresponding to the CDN download address that is corresponding to the meta-ability D1 and that is matched by the HAG server 20 is usually a latest version.

S806: The HAG server 20 sends the package name of the application D, the meta-ability name of the meta-ability D1, and the CDN download address of the meta-ability D1 to the BMS in the device b 12.

The HAG server 20 may carry the package name of the application D, the meta-ability name of the meta-ability D1, and the CDN download address of the meta-ability D1 in a message, and send the message to the BMS in the device b 12 through the communication channel between the device b 12 and the HAG server 20. The specific implementation of this message is not limited in this application. The message herein may correspond to a third message in step S1104 and step S1205. The CDN download address of the meta-ability D1 herein may correspond to a download address of the first application module in step S1205.

S807: The BMS in the device b 12 downloads the meta-ability D1 of the application D from a CDN server 30 based on the package name of the application D, the meta-ability name of the meta-ability D1, and the CDN download address of the meta-ability D1. The CDN server 30 herein corresponds to a second server in step S1206.

S808: The BMS in the device b 12 installs the meta-ability D1 of the application D.

S809: The BMS in the device b 12 notifies the DMS in the device b 12 that the meta-ability D1 of the application D has been installed. The notification herein may correspond to a fifth message in step S1207.

S810: The DMS in the device b 12 starts the meta-ability D1 of the application D (that is, explicit start), corresponding to the description in step S1208.

In conclusion, based on the description of the embodiment in FIG. 13A-1 and FIG. 13A-2, the device a 11 may trigger the system service in the device a 11, by using the meta-ability A1 of the application A, to start the meta-ability D1 of the application D in the device b 12 based on the package name of the application D and the meta-ability name of the meta-ability D1.

As shown in FIG. 13B-1 and FIG. 13B-2, a specific implementation process of the application module startup method according to this application may include the following steps.

S901: A DMS in a device a 11 sends, in response to an operation 4 of a user, an ID of a device b 12, a package name of an application D, and predefined ACTION3 of a meta-ability D1 to a DMS in the device b 12.

The operation 4 may include, but is not limited to, a type of operation such as tap, double tap, touch and hold, or touch. For example, the operation 4 may be an operation of tapping the control 1105 performed by the user in the embodiment in FIG. 11D.

In addition, the operation 4 is associated with the meta-ability D1 of the application D. That is, the meta-ability A1 of the application A may learn, based on the operation 4, that the device a 11 needs to start the meta-ability D1 of the application D in the device b 12. Because the application A pre-stores the package name of the application D and the predefined ACTION3 of the meta-ability D1 of the application D that are associated with the operation 4, the meta-ability A1 may learn the package name of the application D and the predefined ACTION3 of the meta-ability D1. Therefore, the meta-ability A1 of the application A may invoke the DMS in the device a 11 to send an ID of the device b 12, the package name of the application D, and the predefined ACTION3 of the meta-ability D1 to the DMS in the device b 12, that is, request the device b 12 to start the meta-ability D1 of the application D.

The package name of the application D can uniquely identify the application D, and the package name of the application D and the predefined ACTION3 of the meta-ability D1 can uniquely identify the meta-ability D1. The package name of the application D and the packet name of the application D of the meta-ability D1 may be represented in at least one manner, such as letters, characters, and digits. Herein, the package name of the application D may correspond to an identifier of a first application in step S1301, and the predefined ACTION3 of the meta-ability D1 may correspond to a module identifier of a first application module in step S1301.

In addition, the DMS in the device a 11 may carry the ID of the device b 12, the package name of the application D, and the packet name of the application D of the meta-ability D1 in a message, and send the message to the DMS in the device b 12. The specific implementation of this message is not limited in this application. The message herein may correspond to a first message in step S1101 and step S1301.

S902: The DMS in the device b 12 sends the package name of the application D and the predefined ACTION3 of the meta-ability D1 to a BMS in the device b 12.

Based on the ID of the device b 12, the DMS in the device b 12 may determine whether the package name of the application D and the predefined ACTION3 of the meta-ability D1 that are sent by the device a 11 are sent to the device b 12. Therefore, the DMS in the device b 12 may determine that the meta-ability D1 of the application D needs to be started, and then step S902 may be performed, that is, the DMS in the device b 12 may request the BMS in the device b 12 to query whether the meta-ability D1 of the application D has been installed.

The DMS in the device b 12 may carry the package name of the application D and the predefined ACTION3 of the meta-ability D1 in a message, and send the message to the BMS in the device b 12. The specific implementation of this message is not limited in this application. The message herein may correspond to a fourth message in step S1302.

S903: The BMS in the device b 12 determines, based on the package name of the application D and the predefined ACTION3 of the meta-ability D1, whether the meta-ability D1 of the application D is installed on the device b 12.

The BMS may store a parsed configuration file of a meta-ability in a distributed application component database when installing the meta-ability. Therefore, the BMS in the device b 12 may query whether the meta-ability D1 of the application D exists in the distributed application component database in the device b 12, so as to determine whether the meta-ability D1 of the application D is installed on the device b 12.

When no meta-ability D1 of the application D exists in the distributed application component database in the device b 12, the BMS in the device b 12 may determine that the meta-ability D1 of the application D is not installed on the device b 12, so that the BMS in the device b 12 may perform step S904 to step S910; or when the meta-ability D1 of the application D exists in the distributed application component database in the device b 12, the BMS in the device b 12 may determine that the meta-ability D1 of the application D has been installed on the device b 12, so that the BMS in the device b 12 may perform step S909 and step S910.

S904: The BMS in the device b 12 sends the ID of the device b 12, the package name of the application D, and the predefined ACTION3 of the meta-ability D1 to a HAG server 20. Therefore, the BMS in the device b 12 may obtain the ID of the device b 12 by using a system attribute in the device b 12, and request the HAG server 20 to download the meta-ability D1 of the application D for the device b 12.

The BMS in the device b 12 may carry the ID of the device b 12, the package name of the application D, and the predefined ACTION3 of the meta-ability D1 in a message, and send the message to the HAG server 20 through a communication channel between the device b 12 and the HAG server 20. The specific implementation of this message is not limited in this application. The message herein may correspond to a second message in step S1103 and step S1304. In addition, for the specific implementation of the ID of the device b 12, refer to the description of step S804. Details are not described herein.

S905: The HAG server 20 obtains a matched CDN download address of the meta-ability D1 of the application D based on the package name of the application D and the predefined ACTION3 of the meta-ability D1.

Because the HAG server 20 pre-stores a plurality of HAPs and a CDN download address of a meta-ability corresponding to each HAP, and the HAG server 20 may obtain an application package name, a meta-ability name, and a predefined ACTION of each HAP, the HAG server 20 may match the CDN download address corresponding to the meta-ability D1 of the application D based on the package name of the application D and the predefined ACTION3 of the meta-ability D1.

The CDN download address may be expressed in a manner such as a link or an address string. In addition, the meta-ability D1 corresponding to the CDN download address that is corresponding to the meta-ability D1 and that is matched by the HAG server 20 is usually a latest version.

S906: The HAG server 20 sends the package name of the application D, the predefined ACTION3 of the meta-ability D1 (this parameter may be replaced with the meta-ability name of meta-ability D1), and the CDN download address of the meta-ability D1 to the BMS in the device b 12.

The HAG server 20 may carry the package name of the application D, the predefined ACTION3 of the meta-ability D1, and the CDN download address of the meta-ability D1 in a message, and send the message to the BMS in the device b 12 through the communication channel between the device b 12 and the HAG server 20. The specific implementation of this message is not limited in this application. The message herein may correspond to a third message in step S1104 and step S1305. The CDN download address of the meta-ability D1 herein may correspond to a download address of the first application module in step S1305.

S907: The BMS in the device b 12 downloads the meta-ability D1 of the application D from a CDN server 30 based on the package name of the application D, the predefined ACTION3 of the meta-ability D1, and the CDN download address of the meta-ability D1. The CDN server 30 herein corresponds to a second server in step S1306.

S908: The BMS in the device b 12 installs the meta-ability D1 of the application D.

S909: The BMS in the device b 12 notifies the DMS in the device b 12 that the meta-ability D1 of the application D has been installed. The notification herein may correspond to a fifth message in step S1307.

S910: The DMS in the device b 12 starts the meta-ability D1 of the application D (that is, semi-implicit start), corresponding to the description in step S1308.

In conclusion, based on the description of the embodiment in FIG. 13B-1 and FIG. 13B-2, the device a 11 may trigger the system service in the device a 11, by using the meta-ability A1 of the application A, to start the meta-ability D1 of the application D in the device b 12 based on the package name of the application D and the predefined ACTION3 of the meta-ability D1, fully considering that a third-party application vendor usually does not provide the meta-ability name of the meta-ability D1 to other vendors, that is, there is no need to rely on the meta-ability name of the meta-ability D1.

As shown in FIG. 13C-1 and FIG. 13C-2, a specific implementation process of the application module startup method according to this application may include the following steps.

S1001: A DMS in a device a 11 sends, in response to an operation 4 of a user, an ID of a device b 12 and predefined ACTION3 to a DMS in the device b 12.

The operation 4 may include, but is not limited to, a type of operation such as tap, double tap, touch and hold, or touch. For example, the operation 4 may be an operation of tapping the control 1105 performed by the user in the embodiment in FIG. 11D.

In addition, the operation 4 is associated with a meta-ability corresponding to the predefined ACTION3. That is, the meta-ability A1 of the application A may learn, based on the operation 4, that the device a 11 needs to start the meta-ability corresponding to the predefined ACTION3 in the device b 12. Because the application A pre-stores the predefined ACTION3 of the meta-ability associated with the operation 2, the meta-ability A1 may learn the meta-ability corresponding to the predefined ACTION1. Therefore, the meta-ability A1 of the application A may invoke the DMS in the device a 11 to send an ID of the device b 12 and the predefined ACTION3 to the DMS in the device b 12, that is, request the device b 12 to start the meta-ability corresponding to the predefined ACTION3.

The predefined ACTION3 may identify meta-abilities with a same function. The predefined ACTION3 may be represented in at least one manner, such as letters, characters, and digits. The predefined ACTION3 herein may correspond to an identifier of a type of a first application module in step S1401.

In addition, the DMS in the device a 11 may carry the ID of the device b 12 and the predefined ACTION3 in a message, and send the message to the DMS in the device b 12. The specific implementation of this message is not limited in this application. The message herein may correspond to a first message in step S1101 and step S1401.

S1002: The DMS in the device b 12 sends predefined ACTION1 to a BMS in the device b 12.

The DMS may carry the predefined ACTION1 in a message, and send the message to the BMS. The specific implementation of this message is not limited in this application. The message herein may correspond to a fourth message in step S1402.

Based on the ID of the device b 12, the DMS in the device b 12 may determine whether the predefined ACTION3 sent by the device a 11 is sent to the device b 12. Therefore, the DMS in the device b 12 may determine that the meta-ability corresponding to the predefined ACTION3 needs to be started, and then step S1002 may be performed, that is, the DMS in the device b 12 may request the BMS in the device b 12 to query whether the meta-ability corresponding to the predefined ACTION3 has been installed.

The DMS in the device b 12 may carry the predefined ACTION3 in a message, and send the message to the BMS in the device b 12. The specific implementation of this message is not limited in this application.

S1003: The BMS in the device b 12 determines, based on the predefined ACTION3, whether the meta-ability corresponding to the predefined ACTION3 is installed on the device b 12.

The BMS may store a parsed configuration file of a meta-ability in a distributed application component database when installing the meta-ability. Therefore, the BMS in the device b 12 may query whether the meta-ability corresponding to the predefined ACTION3 exists in a distributed application component database in the device b 12, so as to determine whether the meta-ability corresponding to the predefined ACTION3 is installed on the device b 12.

When no meta-ability corresponding to the predefined ACTION3 exists in the distributed application component database in the device b 12, the BMS in the device b 12 may determine that the meta-ability corresponding to the predefined ACTION3 is not installed on the device b 12, so that the BMS in the device b 12 may perform step S1004 to step S1014; or when the meta-ability corresponding to the predefined ACTION3 exists in the distributed application component database in the device b 12, the BMS in the device b 12 may determine that the meta-ability corresponding to the predefined ACTION3 has been installed on the device b 12, so that the BMS in the device b 12 may perform step S1013 and step S1014.

S1004: The BMS in the device b 12 sends the ID of the device b 12 and the predefined ACTION3 to a HAG server 20. Therefore, the BMS in the device b 12 may obtain the ID of the device b 12 by using a system attribute in the device b 12, and request the HAG server 20 to download the meta-ability corresponding to the predefined ACTION3 for the device b 12.

The BMS in the device b 12 may carry the ID of the device b 12 and the predefined ACTION3 in a message, and send the message to the HAG server 20 through a communication channel between the device b 12 and the HAG server 20. The specific implementation of this message is not limited in this application. The message herein may correspond to a second message in step S1103 and step S1404. In addition, for the specific implementation of the ID of the device b 12, refer to the description of step S804. Details are not described herein.

S1005: Based on the predefined ACTION3, the HAG server 20 obtains a matched meta-ability set 3, where each subset in the meta-ability set 3 carries an application name of an application, a meta-ability name of a meta-ability of the application (this parameter may be replaced with a predefined ACTION of the meta-ability of the application), and a CDN download address of the meta-ability.

Because the HAG server 20 pre-stores a plurality of HAPs and a CDN download address of a meta-ability corresponding to each HAP, and the HAG server 20 may obtain an application package name, a meta-ability name, and a predefined ACTION of each HAP, the HAG server 20 may match CDN download addresses corresponding to meta-abilities with the same function as those identified by the predefined ACTION3, so that the HAG server 20 obtains the meta-ability set 3 based on matched package names of applications corresponding to the meta-abilities, matched meta-ability names of the meta-abilities, and matched CDN download addresses of the meta-abilities.

The CDN download address may be expressed in a manner such as a link or an address string. In addition, the meta-ability corresponding to the CDN download address of the meta-ability matched by the HAG server 20 is usually a latest version. The meta-ability set 3 may include one or more subsets.

S1006: The HAG server 20 sends the meta-ability set 3 to the BMS in the device b 12.

The HAG server 20 may carry the meta-ability set 3 in a message, and send the message to the BMS in the device b 12 through the communication channel between the device b 12 and the HAG server 20. The specific implementation of this message is not limited in this application. The message herein may correspond to a third message in step S1104 and step S1405. The meta-ability set 3 herein may correspond to a first set in step S1405.

S1007: The BMS in the device b 12 sends the meta-ability set 3 to the DMS in the device b 12.

The BMS in the device b 12 may carry the meta-ability set 3 in a message, and send the message to the DMS in the device b 12. The specific implementation of this message is not limited in this application. The message herein may correspond to a sixth message in step S1501. The meta-ability set 3 herein may correspond to a first set in step S1501.

S1008: Based on the meta-ability set 3, the DMS in the device b 12 determines whether a quantity of matched meta-abilities is greater than 1.

Because the quantity of the matched meta-abilities is equal to a quantity of the subsets of the meta-ability set 3, the DMS in the device b 12 may determine whether the quantity of the subsets of the meta-ability set 3 is greater than 1, to determine whether the quantity of the matched meta-abilities is greater than 1.

When it is determined that the quantity of the subsets of the meta-ability set 3 is greater than 1, the DMS in the device b 12 may determine that the quantity of the matched meta-abilities is greater than 1, so that the DMS in the device b 12 may perform step S1009 to step S1011, so as to determine a meta-ability of a selected application based on wishes of the user, thereby improving user engagement and user experience. When the quantity of the subsets of the meta-ability set 3 is equal to 1, the DMS in the device b 12 may determine that the quantity of the matched meta-abilities is equal to 1, so that the DMS in the device b 12 may perform step S1010 and step S1011, so as to use the matched meta-ability as the meta-ability of the selected application, which increases a processing speed of the DMS in the device b 12.

S1009: The DMS in the device b 12 displays a window 5, and determines a meta-ability of a selected application in response to an operation of the user on the window 5.

Layout parameters such as a size, a position, and a color of the window 5 are not limited in this application. The operation herein corresponds to a third operation in step S15022, the window 5 corresponds to a first window in step S15022, and the meta-ability of the selected application corresponds to a selected software module in step S15022. Alternatively, the DMS in the device b 12 may select one meta-ability from the matched meta-abilities as the meta-ability of the selected application, and does not display the window 5, corresponding to the description of step S15021. The DMS in the device b 12 may perform the selection in a manner such as based on a preset priority of the matched meta-abilities or storage space of the meta-abilities. This is not limited in this application.

S1010: The DMS in the device b 12 sends the package name of the selected application and the meta-ability name of the meta-ability of the selected application to the BMS in the device b 12.

The DMS in the device b 12 may carry the package name of the selected application and the meta-ability name of the meta-ability of the selected application in a message, and send the message to the BMS in the device b 12. The specific implementation of this message is not limited in this application. The message herein may correspond to a seventh message in step S1503.

The meta-ability of the selected application includes the meta-ability B1 of the application B, and the selected device may include the device a 11 and the device b 12. For ease of description, the meta-ability of the selected application herein is the meta-ability D1 of the application D.

It should be noted that step S1007 to step S1010 are optional steps. That is, when the quantity of the matched meta-abilities is equal to 1, the BMS in the device b 12 may use the matched meta-ability as the meta-ability of the selected application. When the quantity of the matched meta-abilities is equal to 1, the BMS in the device b 12 may select one meta-ability from the matched meta-abilities as the meta-ability of the selected application. The BMS in the device b 12 may perform the selection in a manner such as based on a preset priority of the matched meta-abilities or storage space of the meta-abilities. This is not limited in this application.

S1011: The BMS in the device b 12 downloads the meta-ability of the selected application from a CDN server 30 based on the CDN download address of the meta-ability of the selected application. The CDN server 30 herein corresponds to a second server in step S1406.

S1012: The BMS in the device b 12 installs the meta-ability of the selected application.

Step S411 and step S412 herein correspond to step S1406.

S1013: The BMS in the device b 12 notifies the DMS in the device b 12 that the meta-ability corresponding to the predefined ACTION3 has been installed. The notification herein may correspond to a fifth message in step S1407.

S1014: The DMS in the device b 12 starts the meta-ability corresponding to the predefined ACTION3 (that is, implicit start), corresponding to the description in step S1408.

In conclusion, based on the description of the embodiment in FIG. 13C-1 and FIG. 13C-2, the device a 11 may trigger the system service in the device a 11, by using the meta-ability A1 of the application A, to start the meta-ability D1 of the application D in the device b 12 based on the predefined ACTION5, fully considering that a third-party application vendor usually does not provide the meta-ability name of the meta-ability D1 to other vendors, that is, there is no need to rely on the meta-ability name of the meta-ability D1.

Therefore, an electronic device 1 may query a CDN download address of a meta-ability from a HAG server by using a package name of an application and a meta-ability name of the meta-ability of the application, or a package name of an application and a predefined ACTION of the meta-ability of the application, or a predefined ACTION, and may control at least one electronic device in an electronic device 2 by using a device ID, to download the meta-ability from a CDN server based on the CDN download address of the meta-ability, so that a meta-ability that is not installed is automatically installed, and the user is unaware of a download process of the meta-ability. The meta-ability does not need to be downloaded when the application is installed for the first time, and may be downloaded based on a user requirement.

Based on some of the foregoing embodiments, an application module startup method according to this application is described below.

Figure 14:
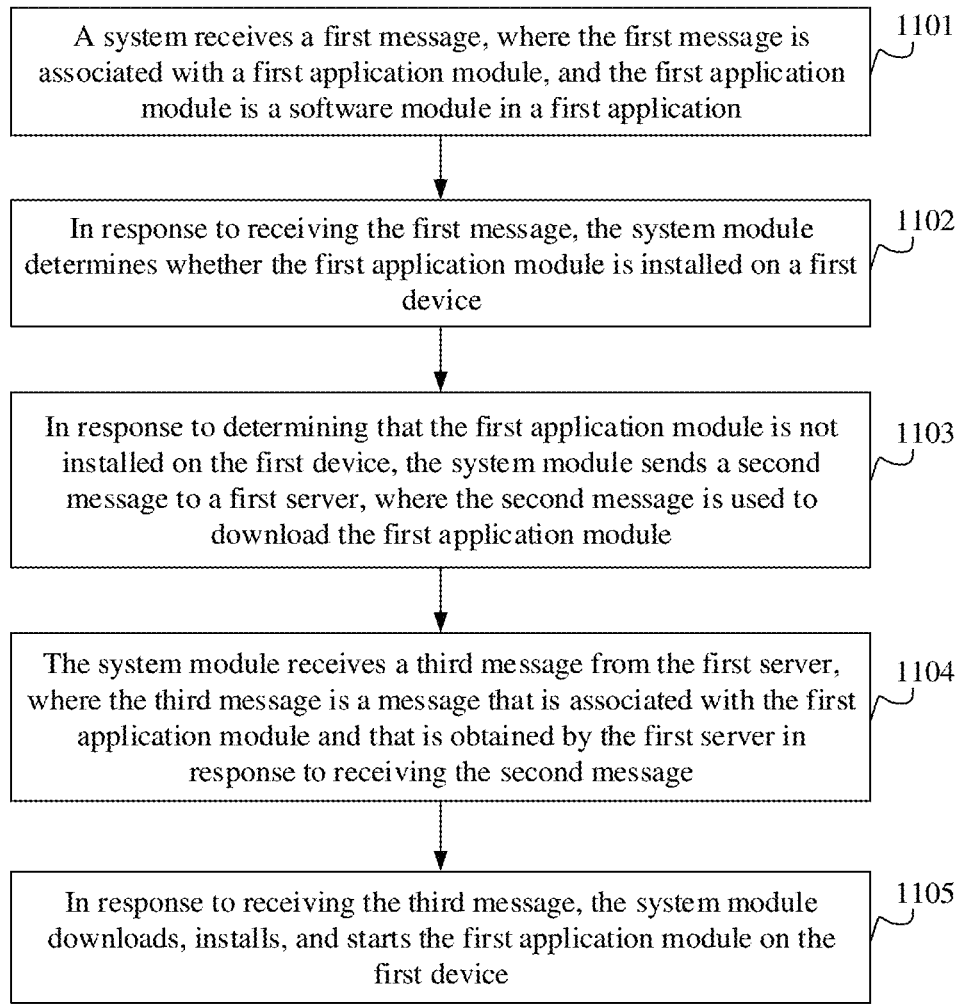
FIG. 14 is a schematic flowchart of an application module startup method according to an embodiment of this application.

For example, this application provides an application module startup method. FIG. 14 is a schematic flowchart of an application module startup method according to an embodiment of this application.

The application module startup method according to this application is performed by a first device, and the first device includes a system module. The first device may be the device a 11 or the device b 12 in FIG. 3A to FIG. 3C, FIG. 4A to FIG. 4C, FIG. 5A and FIG. 5B, FIG. 6A and FIG. 6B, FIG. 7A-1 and FIG. 7A-2 to FIG. 7C-1 and FIG. 7C-2, FIG. 11A to FIG. 11E, FIG. 12A to FIG. 12C, and FIG. 13A-1 and FIG. 13A-2 to FIG. 13C-1 and FIG. 13C-2. For a specific implementation of the system module, refer to the description of the system service in FIG. 3A to FIG. 3C, FIG. 4A to FIG. 4C, FIG. 5A and FIG. 5B, FIG. 6A and FIG. 6B, FIG. 7A-1 and FIG. 7A-2 to FIG. 7C-1 and FIG. 7C-2, FIG. 11A to FIG. 11E, FIG. 12A to FIG. 12C, and FIG. 13A-1 and FIG. 13A-2 to FIG. 13C-1 and FIG. 13C-2. For a specific implementation of a first server, refer to the description of the HAG server in FIG. 3A to FIG. 3C, FIG. 4A to FIG. 4C, FIG. 5A and FIG. 5B, FIG. 6A and FIG. 6B, FIG. 7A-1 and FIG. 7A-2 to FIG. 7C-1 and FIG. 7C-2, FIG. 11A to FIG. 11E, FIG. 12A to FIG. 12C, and FIG. 13A-1 and FIG. 13A-2 to FIG. 13C-1 and FIG. 13C-2. Details are not described herein.

As shown in FIG. 14, the application module startup method according to this application may include the following steps.

S1101: The system module receives a first message, where the first message is associated with a first application module, and the first application module is a software module in a first application.

S1102: In response to receiving the first message, the system module determines whether the first application module is installed on the first device.

S1103: In response to determining that the first application module is not installed on the first device, the system module sends a second message to a first server, where the second message is used to download the first application module.

S1104: The system module receives a third message from the first server, where the third message is a message that is associated with the first application module and that is obtained by the first server in response to receiving the second message.

S1105: In response to receiving the third message, the system module downloads, installs, and starts the first application module on the first device.

In some embodiments, the first device further includes a second application module, and the second application module is a software module in a second application. In step S1101, the method specifically includes: In response to receiving a first operation of a user, the second application module sends the first message to the system module. The first application is the same as the second application.

Correspondingly, for a specific implementation of the first device, refer to the description of the device a 11 in FIG. 6A and FIG. 6B; for a specific implementation of the system module, refer to the description of the system service of the device a 11 in FIG. 6A and FIG. 6B; for the first operation, refer to the description of the operation 1 of step S101 in FIG. 6A and FIG. 6B; for a specific implementation of the first message, refer to the description of step S101 in FIG. 6A and FIG. 6B; for a specific implementation of the first application module, refer to the description of the meta-ability A2 in FIG. 6A and FIG. 6B; for a specific implementation of the second application module, refer to the description of the meta-ability A1 in FIG. 6A and FIG. 6B; for a specific implementation of the first application, refer to the description of the application A in FIG. 6A and FIG. 6B; for a specific implementation of step S1102, refer to the description of step S103 in FIG. 6A and FIG. 6B; for a specific implementation of the second message, refer to the description of step S104 in FIG. 6A and FIG. 6B; for a specific implementation of the third message, refer to the description of step S106 in FIG. 6A and FIG. 6B; and for a specific implementation of step S1105, refer to the description of step S107 to step S110 in FIG. 6A and FIG. 6B. Details are not described herein.

In some other embodiments, the first device further includes a second application module, and the second application module is a software module in a second application. In step S1101, the method specifically includes: In response to receiving a first operation of a user, the second application module sends the first message to the system module. The first application is different from the second application.

Correspondingly, for a specific implementation of the first device, refer to the description of the device a 11 in FIG. 7A-1 and FIG. 7A-2; for a specific implementation of the system module, refer to the description of the system service of the device a 11 in FIG. 7A-1 and FIG. 7A-2; for the first operation, refer to the description of the operation 2 of step S101 in FIG. 6A and FIG. 6B; for a specific implementation of the first message, refer to the description of step S201 in FIG. 7A-1 and FIG. 7A-2; for a specific implementation of the first application module, refer to the description of the meta-ability B1 in FIG. 7A-1 and FIG. 7A-2; for a specific implementation of the first application, refer to the description of the application B in FIG. 7A-1 and FIG. 7A-2; for a specific implementation of the second application, refer to the description of the application A in FIG. 7A-1 and FIG. 7A-2; for a specific implementation of the second application module, refer to the description of the meta-ability A1 in FIG. 7A-1 and FIG. 7A-2; for a specific implementation of step S1102, refer to the description of step S203 in FIG. 7A-1 and FIG. 7A-2; for a specific implementation of the second message, refer to the description of step S204 in FIG. 7A-1 and FIG. 7A-2; for a specific implementation of the third message, refer to the description of step S206 in FIG. 7A-1 and FIG. 7A-2; and for a specific implementation of step S1105, refer to the description of step S207 to step S210 in FIG. 7A-1 and FIG. 7A-2. Details are not described herein.

Alternatively, correspondingly, for a specific implementation of the first device, refer to the description of the device a 11 in FIG. 7B-1 and FIG. 7B-2; for a specific implementation of the system module, refer to the description of the system service of the device a 11 in FIG. 7B-1 and FIG. 7B-2; for the first operation, refer to the description of the operation 2 of step S101 in FIG. 6A and FIG. 6B; for a specific implementation of the first message, refer to the description of step S301 in FIG. 7B-1 and FIG. 7B-2; for a specific implementation of the first application module, refer to the description of the meta-ability B1 in FIG. 7B-1 and FIG. 7B-2; for a specific implementation of the first application, refer to the description of the application B in FIG. 7B-1 and FIG. 7B-2; for a specific implementation of the second application, refer to the description of the application A in FIG. 7B-1 and FIG. 7B-2; for a specific implementation of the second application module, refer to the description of the meta-ability A1 in FIG. 7B-1 and FIG. 7B-2; for a specific implementation of step S1102, refer to the description of step S303 in FIG. 7B-1 and FIG. 7B-2; for a specific implementation of the second message, refer to the description of step S304 in FIG. 7B-1 and FIG. 7B-2; for a specific implementation of the third message, refer to the description of step S306 in FIG. 7B-1 and FIG. 7B-2; and for a specific implementation of step S1105, refer to the description of step S307 to step S310 in FIG. 7B-1 and FIG. 7B-2. Details are not described herein.

Alternatively, correspondingly, for a specific implementation of the first device, refer to the description of the device a 11 in FIG. 7C-1 and FIG. 7C-2; for a specific implementation of the system module, refer to the description of the system service of the device a 11 in FIG. 7C-1 and FIG. 7C-2; for the first operation, refer to the description of the operation 2 of step S101 in FIG. 6A and FIG. 6B; for a specific implementation of the first message, refer to the description of step S401 in FIG. 7C-1 and FIG. 7C-2; for a specific implementation of the first application module, refer to the description of the meta-ability B1 in FIG. 7C-1 and FIG. 7C-2; for a specific implementation of the first application, refer to the description of the application B in FIG. 7C-1 and FIG. 7C-2; for a specific implementation of the second application, refer to the description of the application A in FIG. 7C-1 and FIG. 7C-2; for a specific implementation of the second application module, refer to the description of the meta-ability A1 in FIG. 7C-1 and FIG. 7C-2; for a specific implementation of step S1102, refer to the description of step S403 in FIG. 7C-1 and FIG. 7C-2; for a specific implementation of the second message, refer to the description of step S404 in FIG. 7C-1 and FIG. 7C-2; for a specific implementation of the third message, refer to the description of step S406 in FIG. 7C-1 and FIG. 7C-2; and for a specific implementation of step S1105, refer to the description of step S407 to step S414 in FIG. 7C-1 and FIG. 7C-2. Details are not described herein.

In some other embodiments, the first device is communicatively connected to a second device. In step S1101, the method specifically includes: The system module receives the first message from the second device, where the first message is sent by the second device in response to receiving a second operation of the user, and the first message further carries a device identifier of the first device.

Correspondingly, for a specific implementation of the first device, refer to the description of the device b 12 in FIG. 13A-1 and FIG. 13A-2; for a specific implementation of the second device, refer to the description of the device a 11 in FIG. 13A-1 and FIG. 13A-2; for a specific implementation of the system module, refer to the description of the system service of the device b 12 in FIG. 13A-1 and FIG. 13A-2; for the first operation, refer to the description of the operation 4 of step S801 in FIG. 13A-1 and FIG. 13A-2; for a specific implementation of the first message, refer to the description of step S801 in FIG. 13A-1 and FIG. 13A-2; for a specific implementation of the first application module, refer to the description of the meta-ability D1 in FIG. 13A-1 and FIG. 13A-2; for a specific implementation of the first application, refer to the description of the application D in FIG. 13A-1 and FIG. 13A-2; for a specific implementation of step S1102, refer to the description of step S803 in FIG. 13A-1 and FIG. 13A-2; for a specific implementation of the second message, refer to the description of step S804 in FIG. 13A-1 and FIG. 13A-2; for a specific implementation of the third message, refer to the description of step S806 in FIG. 13A-1 and FIG. 13A-2; and for a specific implementation of step S1105, refer to the description of step S807 to step S810 in FIG. 13A-1 and FIG. 13A-2. Details are not described herein.

Alternatively, correspondingly, for a specific implementation of the first device, refer to the description of the device b 12 in FIG. 13B-1 and FIG. 13B-2; for a specific implementation of the second device, refer to the description of the device a 11 in FIG. 13B-1 and FIG. 13B-2; for a specific implementation of the system module, refer to the description of the system service of the device b 12 in FIG. 13B-1 and FIG. 13B-2; for the first operation, refer to the description of the operation 4 of step S901 in FIG. 13B-1 and FIG. 13B-2; for a specific implementation of the first message, refer to the description of step S901 in FIG. 13B-1 and FIG. 13B-2; for a specific implementation of the first application module, refer to the description of the meta-ability D1 in FIG. 13B-1 and FIG. 13B-2; for a specific implementation of the first application, refer to the description of the application D in FIG. 13B-1 and FIG. 13B-2; for a specific implementation of step S1102, refer to the description of step S903 in FIG. 13B-1 and FIG. 13B-2; for a specific implementation of the second message, refer to the description of step S904 in FIG. 13B-1 and FIG. 13B-2; for a specific implementation of the third message, refer to the description of step S906 in FIG. 13B-1 and FIG. 13B-2; and for a specific implementation of step S1105, refer to the description of step S907 to step S910 in FIG. 13B-1 and FIG. 13B-2. Details are not described herein.

Alternatively, correspondingly, for a specific implementation of the first device, refer to the description of the device b 12 in FIG. 13C-1 and FIG. 13C-2; for a specific implementation of the second device, refer to the description of the device a 11 in FIG. 13C-1 and FIG. 13C-2; for a specific implementation of the system module, refer to the description of the system service of the device b 12 in FIG. 13C-1 and FIG. 13C-2; for the first operation, refer to the description of the operation 4 of step S1001 in FIG. 13C-1 and FIG. 13C-2; for a specific implementation of the first message, refer to the description of step S1001 in FIG. 13C-1 and FIG. 13C-2; for a specific implementation of the first application module, refer to the description of the meta-ability D1 in FIG. 13C-1 and FIG. 13C-2; for a specific implementation of the first application, refer to the description of the application D in FIG. 13C-1 and FIG. 13C-2; for a specific implementation of step S1102, refer to the description of step S1003 in FIG. 13C-1 and FIG. 13C-2; for a specific implementation of the second message, refer to the description of step S1004 in FIG. 13C-1 and FIG. 13C-2; for a specific implementation of the third message, refer to the description of step S1006 in FIG. 13C-1 and FIG. 13C-2; and for a specific implementation of step S1105, refer to the description of step S1001 to step S1014 in FIG. 13C-1 and FIG. 13C-2. Details are not described herein.

A distributed schedule manager service DMS in the system module receives the first message from a distributed schedule manager service DMS in the second device. For a specific implementation process, refer to the description of step S901 in FIG. 13A-1 and FIG. 13A-2, or the description of step S901 in FIG. 13B-1 and FIG. 13B-2, or the description of step S1001 in FIG. 13C-1 and FIG. 13C-2. Details are not described herein.

In some embodiments, the method specifically includes: The system module receives a third message from the first server, where the third message carries a download address of the first application module; and in response to receiving the third message, the system module downloads a first application module from a second server, installs the first application module on the first device, and starts the first application module.

For a specific implementation of the second server, refer to the description of the CDN server. For a specific process of the foregoing implementation, refer to the description of step S106 to step S108 in FIG. 6A and FIG. 6B, or the description of step S206 to step S208 in FIG. 7A-1 and FIG. 7A-2, or the description of step S306 to step S308 in FIG. 7B-1 and FIG. 7B-2, or the description of step S406 to step S412 in FIG. 7C-1 and FIG. 7C-2, or the description of step S806 to step S808 in FIG. 13A-1 and FIG. 13A-2, or the description of step S906 to step S908 in FIG. 13B-1 and FIG. 13B-2, or the description of step S1006 to step S1012 in FIG. 13C-1 and FIG. 13C-2. Details are not described herein.

In some embodiments, when the system module includes a distributed schedule manager service DMS and a bundle manager service BMS, the application module startup method according to this application may include step S1201 to step S1208.

Step S1201: The distributed schedule manager service DMS receives a first message, where the first message carries an identifier of a first application and a module identifier of a first application module.

For a specific implementation of step S1201, refer to the description of step S101 in FIG. 6A and FIG. 6B, or the description of step S201 in FIG. 7A-1 and FIG. 7A-2, or the description of step S801 in FIG. 13A-1 and FIG. 13A-2. For the identifier of the first application, refer to the description of the package name of the application A in FIG. 6A and FIG. 6B, or the description of the package name of the application B in FIG. 7A-1 and FIG. 7A-2. For the module identifier of the first application module, refer to the description of the meta-ability name of the meta-ability A2 in FIG. 6A and FIG. 6B, or the description of the meta-ability name of the meta-ability B1 in FIG. 7A-1 and FIG. 7A-2. Details are not described herein.

Step S1202: In response to receiving the first message, the distributed schedule manager service DMS sends a fourth message to the bundle manager service BMS, where the fourth message carries the identifier of the first application and the module identifier of the first application module.

For a specific implementation of step S1202, refer to the description of step S102 in FIG. 6A and FIG. 6B, or the description of step S202 in FIG. 7A-1 and FIG. 7A-2, or the description of step S802 in FIG. 13A-1 and FIG. 13A-2. Details are not described herein.

Step S1203: In response to receiving the fourth message, the bundle manager service BMS determines whether the first application module is installed on a first device.

For a specific implementation of step S1203, refer to the description of step S103 in FIG. 6A and FIG. 6B, or the description of step S203 in FIG. 7A-1 and FIG. 7A-2, or the description of step S803 in FIG. 13A-1 and FIG. 13A-2. Details are not described herein.

Step S1204: In response to determining that the first application module is not installed on the first device, the bundle manager service BMS sends a second message to a first server, where the second message carries a device identifier of the first device, the identifier of the first application, and the module identifier of the first application module.

For a specific implementation of step S1204, refer to the description of step S104 in FIG. 6A and FIG. 6B, or the description of step S204 in FIG. 7A-1 and FIG. 7A-2, or the description of step S804 in FIG. 13A-1 and FIG. 13A-2. Details are not described herein.

Step S1205: The bundle manager service BMS receives a third message from the first server, where the third message carries a download address of the first application module, the identifier of the first application, and the module identifier of the first application module.

For a specific method for determining the third message, refer to the description of step S105 in FIG. 6A and FIG. 6B, or the description of step S205 in FIG. 7A-1 and FIG. 7A-2, or the description of step S805 in FIG. 13A-1 and FIG. 13A-2. For a specific implementation of step S1205, refer to the description of step S106 in FIG. 6A and FIG. 6B, or the description of step S206 in FIG. 7A-1 and FIG. 7A-2, or the description of step S806 in FIG. 13A-1 and FIG. 13A-2. Details are not described herein.

Step S1206: In response to receiving the third message, the bundle manager service BMS downloads the first application module from a second server based on the download address of the first application module, and installs the first application module on the first device.

For a specific implementation of step S1206, refer to the description of step S107 and step S108 in FIG. 6A and FIG. 6B, or the description of step S207 and step S208 in FIG. 7A-1 and FIG. 7A-2, or the description of step S807 and step S808 in FIG. 13A-1 and FIG. 13A-2. Details are not described herein.

Step S1207: The bundle manager service BMS sends a fifth message to the distributed schedule manager service DMS.

The fifth message is used to notify the distributed schedule manager service DMS that the first application module has been installed on the first device. In addition, for a specific implementation of step S1207, refer to the description of step S109 in FIG. 6A and FIG. 6B, or the description of step S209 in FIG. 7A-1 and FIG. 7A-2, or the description of step S809 in FIG. 13A-1 and FIG. 13A-2. Details are not described herein.

Step S1208: In response to receiving the fifth message, the distributed schedule manager service DMS starts the first application module.

For a specific implementation of step S1208, refer to the description of step S110 in FIG. 6A and FIG. 6B, or the description of step S210 in FIG. 7A-1 and FIG. 7A-2, or the description of step S810 in FIG. 13A-1 and FIG. 13A-2. Details are not described herein.

In some embodiments, when the system module includes a distributed schedule manager service DMS and a bundle manager service BMS, the application module startup method according to this application may include step S1301 to step S1308.

Step S1301: The distributed schedule manager service DMS receives a first message, where the first message carries an identifier of a first application and an identifier of a type of a first application module.

For a specific implementation of step S1301, refer to the description of step S301 in FIG. 7B-1 and FIG. 7B-2, or the description of step S901 in FIG. 13B-1 and FIG. 13B-2. Details are not described herein.

Step S1302: In response to receiving the first message, the distributed schedule manager service DMS sends a fourth message to the bundle manager service BMS, where the fourth message carries the identifier of the first application and the identifier of the type of the first application module.

For a specific implementation of step S1302, refer to the description of step S302 in FIG. 7B-1 and FIG. 7B-2, or the description of step S902 in FIG. 13B-1 and FIG. 13B-2. Details are not described herein.

Step S1303: In response to receiving the fourth message, the bundle manager service BMS determines whether the first application module is installed on a first device.

For a specific implementation of step S1303, refer to the description of step S303 in FIG. 7B-1 and FIG. 7B-2, or the description of step S903 in FIG. 13B-1 and FIG. 13B-2. Details are not described herein.

Step S1304: In response to determining that the first application module is not installed on the first device, the bundle manager service BMS sends a second message to the distributed schedule manager service DMS, where the second message carries a device identifier of the first device, the identifier of the first application, and the identifier of the type of the first application module.

For a specific implementation of step S1304, refer to the description of step S304 in FIG. 7B-1 and FIG. 7B-2, or the description of step S904 in FIG. 13B-1 and FIG. 13B-2. Details are not described herein.

Step S1305: The bundle manager service BMS receives a third message from the first server, where the third message carries a download address of the first application module, the identifier of the first application, and the identifier of the type of the first application module.

For a specific method for determining the third message, refer to the description of step S305 in FIG. 7B-1 and FIG. 7B-2, or the description of step S903 in FIG. 13B-1 and FIG. 13B-2. For a specific implementation of step S1305, refer to the description of step S306 in FIG. 7B-1 and FIG. 7B-2, or the description of step S906 in FIG. 13B-1 and FIG. 13B-2. Details are not described herein.

Step S1306: In response to receiving the third message, the bundle manager service BMS downloads the first application module from a second server based on the download address of the first application module, and installs the first application module on the first device.

For a specific implementation of step S1306, refer to the description of step S307 and step S308 in FIG. 7B-1 and FIG. 7B-2, or the description of step S907 and step A908 in FIG. 13B-1 and FIG. 13B-2. Details are not described herein.

Step S1307: The bundle manager service BMS sends a fifth message to the distributed schedule manager service DMS.

For a specific implementation of step S1307, refer to the description of step S309 in FIG. 7B-1 and FIG. 7B-2, or the description of step S909 in FIG. 13B-1 and FIG. 13B-2. Details are not described herein.

Step S1308: In response to receiving the fifth message, the distributed schedule manager service DMS starts the first application module.

For a specific implementation of step S1308, refer to the description of step S310 in FIG. 7B-1 and FIG. 7B-2, or the description of step S910 in FIG. 13B-1 and FIG. 13B-2. Details are not described herein.

In some embodiments, when the system module includes a distributed schedule manager service DMS and a bundle manager service BMS, the application module startup method according to this application may include step S1401 to step S1408.

Step S1401: The distributed schedule manager service DMS receives a first message, where the first message carries an identifier of a type of a first application module.

For a specific implementation of step S1401, refer to the description of step S401 in FIG. 7C-1 and FIG. 7C-2, or the description of step S1001 in FIG. 13C-1 and FIG. 13C-2. Details are not described herein.

Step S1402: In response to receiving the first message, the distributed schedule manager service DMS sends a fourth message to the bundle manager service BMS, where the fourth message carries the identifier of the type of the first application module.

For a specific implementation of step S1402, refer to the description of step S402 in FIG. 7C-1 and FIG. 7C-2, or the description of step S1002 in FIG. 13C-1 and FIG. 13C-2. Details are not described herein.

Step S1403: In response to receiving the fourth message, the bundle manager service BMS determines whether the first application module is installed on a first device.

For a specific implementation of step S1403, refer to the description of step S403 in FIG. 7C-1 and FIG. 7C-2, or the description of step S1003 in FIG. 13C-1 and FIG. 13C-2. Details are not described herein.

Step S1404: In response to determining that the first application module is not installed on the first device, the bundle manager service BMS sends a second message to a first server, where the second message carries a device identifier of the first device and the identifier of the type of the first application module.

For a specific implementation of step S1404, refer to the description of step S404 in FIG. 7C-1 and FIG. 7C-2, or the description of step S1004 in FIG. 13C-1 and FIG. 13C-2. Details are not described herein.

Step S1405: The bundle manager service BMS receives a third message from the first server, where the third message carries a first set, each subset in the first set carries an identifier of an application, a module identifier of a software module included in the application, and a download address of the software module, and a corresponding software module in each subset and the first application module are of a same type.

For a specific method for determining the third message, refer to the description of step S405 in FIG. 7C-1 and FIG. 7C-2, or the description of step S1005 in FIG. 13C-1 and FIG. 13C-2. For a specific implementation of step S1405, refer to the description of step S406 in FIG. 7C-1 and FIG. 7C-2, or the description of step S1006 in FIG. 13C-1 and FIG. 13C-2. Details are not described herein.

Step S1406: In response to receiving the third message, the bundle manager service BMS downloads a selected software module from a second server based on a download address of the software module selected from the first set, and installs the selected software module on the first device.

For a specific implementation of step S1406, refer to the description of step S411 and step S412 in FIG. 7C-1 and FIG. 7C-2, or the description of step S1011 and step S1012 in FIG. 13C-1 and FIG. 13C-2. Details are not described herein.

Step S1407: The bundle manager service BMS sends a fifth message to the distributed schedule manager service DMS.

For a specific implementation of step S1407, refer to the description of step S413 in FIG. 7C-1 and FIG. 7C-2, or the description of step S1013 in FIG. 13C-1 and FIG. 13C-2. Details are not described herein.

Step S1408: In response to receiving the fifth message, the distributed schedule manager service DMS starts the selected software module.

For a specific implementation of step S1408, refer to the description of step S414 in FIG. 7C-1 and FIG. 7C-2, or the description of step S1014 in FIG. 13C-1 and FIG. 13C-2. Details are not described herein.

In some embodiments, the application module startup method according to this application may specifically include step S1501 to step S1504.

Step S1501: In response to receiving a third message, a bundle manager service BMS sends a sixth message to a distributed schedule manager service DMS, where the sixth message carries a first set.

For a specific implementation of the first set, refer to the description of the meta-ability set 1 in FIG. 7C-1 and FIG. 7C-2, or the description of the meta-ability set 3 in FIG. 13C-1 and FIG. 13C-2. For a specific implementation of step S1501, refer to the description of step S407 in FIG. 7C-1 and FIG. 7C-2, or the description of step S1001 in FIG. 13C-1 and FIG. 13C-2. Details are not described herein.

Step S15021: In response to receiving the sixth message, the distributed schedule manager service DMS determines a selected software module from the first set based on a preset rule.

Step S15022: In response to receiving the sixth message, the distributed schedule manager service DMS displays a first window, where the first window includes controls corresponding to software modules in the first set; and in response to receiving a third operation of the user on a control corresponding to the selected software module in the first window, the distributed schedule manager service DMS determines the selected software module.

The third operation may include, but is not limited to, a type of operation such as tap, double tap, touch and hold, or touch. For the preset rule, refer to the manner such as the preset priority of the meta-abilities or the storage space of the meta-abilities in step S409 in FIG. 7C-1 and FIG. 7C-2 for setting. This is not limited in this application. For a specific implementation of the first window, refer to the description of the window 1 in FIG. 7C-1 and FIG. 7C-2, or the description of the window 5 in FIG. 13C-1 and FIG. 13C-2. For a specific implementation of step S15022, refer to the description of step S409 in FIG. 7C-1 and FIG. 7C-2, or the description of step S1009 in FIG. 13C-1 and FIG. 13C-2. Details are not described herein.

Step S1503: The distributed schedule manager service DMS sends a seventh message to the bundle manager service BMS, where the seventh message carries an identifier of an application which the selected software module belongs to and a module identifier of the selected software module.

For a specific implementation of step S1503, refer to the description of step S410 in FIG. 7C-1 and FIG. 7C-2, or the description of step S1001 in FIG. 13C-1 and FIG. 13C-2. Details are not described herein.

Step S1504: In response to receiving the seventh message, the bundle manager service BMS determines a download address of the selected software module from the first set based on the identifier of the application which the selected software module belongs to and the module identifier of the selected software module.

In some embodiments, the method further includes: In response to determining that the first application module has installed on the first device, the system module starts the first application module.

For a specific implementation of the foregoing process, refer to the description of step S109 in FIG. 6A and FIG. 6B, or the description of step S209 in FIG. 7A-1 and FIG. 7A-2, or the description of step S309 in FIG. 7B-1 and FIG. 7B-2, or the description of step S413 in FIG. 7C-1 and FIG. 7C-2, or the description of step S809 in FIG. 13A-1 and FIG. 13A-2, or the description of step S909 in FIG. 13B-1 and FIG. 13B-2, or the description of step S1013 in FIG. 13C-1 and FIG. 13C-2. Details are not described herein.

In some embodiments, the first device is communicatively connected to a third device. The method further includes: The system module sends an eighth message to the third device, where the eighth message is used to request the third device to start a third application module, the third application module is a software module in a third application, and the third application module is not installed on the third device; and the eighth message carries a device identifier of the third device, an identifier of the third application, and a module identifier of the third application module, or the eighth message carries a device identifier of the third device, an identifier of the third application, and an identifier of a type of the third application module, or the eighth message carries a device identifier of the third device and an identifier of a type of the third application module.

For a specific implementation of the first device, refer to the description of the device a 11 in FIG. 13A-1 and FIG. 13A-2 to FIG. 13C-1 and FIG. 13C-2; for a specific implementation of the third device, refer to the description of the device b 12 in FIG. 13A-1 and FIG. 13A-2 to FIG. 13C-1 and FIG. 13C-2; for a specific implementation of the eighth message, refer to the description of step S801 in FIG. 13A-1 and FIG. 13A-2, step S901 in FIG. 13B-1 and FIG. 13B-2, and step S1011 in FIG. 13C-1 and FIG. 13C-2; and for a specific implementation of the foregoing process, refer to the description of FIG. 13A-1 and FIG. 13A-2 to FIG. 13C-1 and FIG. 13C-2. Details are not described herein.

In some embodiments, the method specifically includes: The distributed schedule manager service DMS in the system module sends the eighth message to a distributed schedule manager service DMS in the third device.

Figure 15:
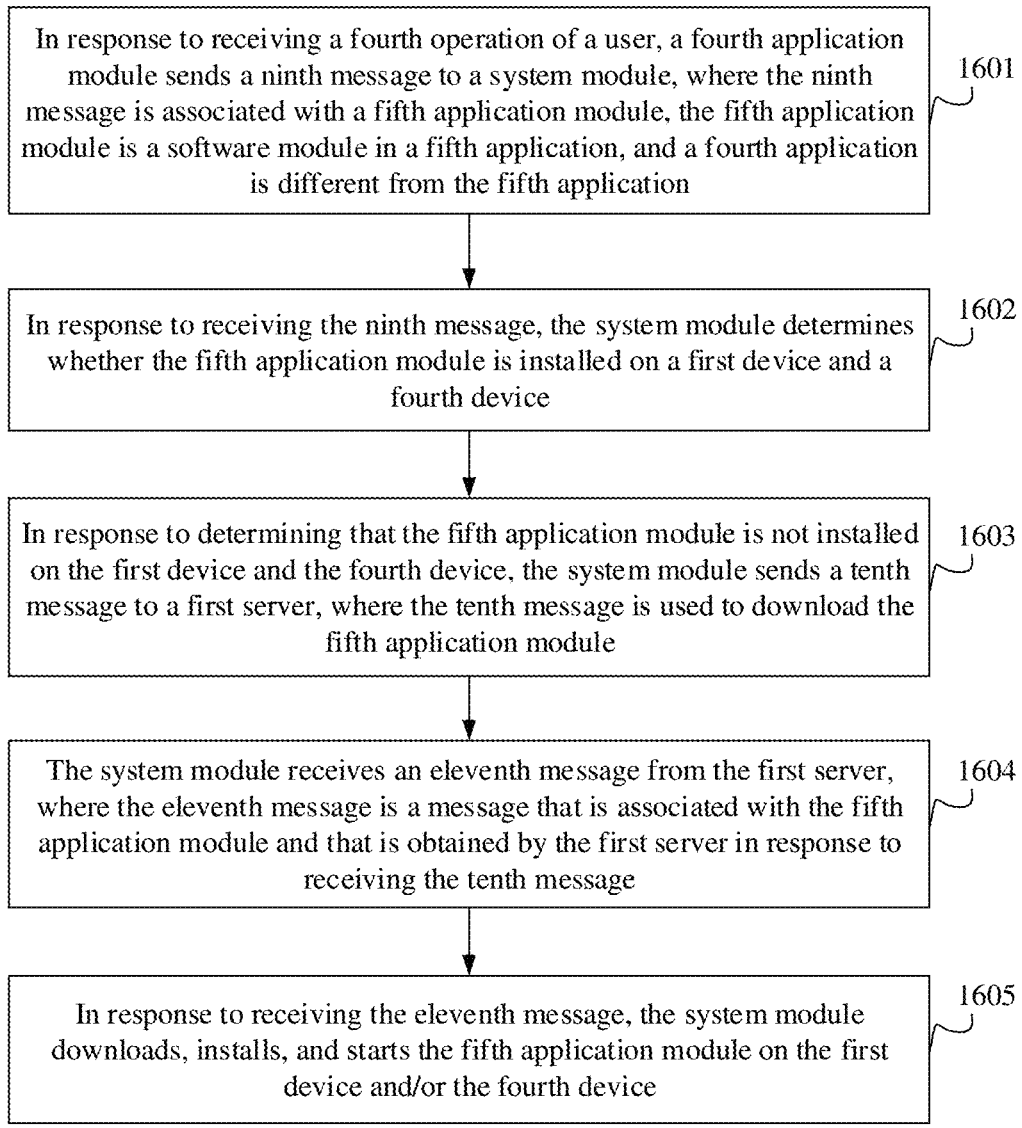
FIG. 15 is a schematic flowchart of an application module startup method according to an embodiment of this application.

For example, this application provides an application module startup method. FIG. 15 is a schematic flowchart of an application module startup method according to an embodiment of this application.

The application module startup method according to this application is performed by a first device, the first device includes a fourth application module and a system module, and the fourth application module is a software module in a fourth application. The first device is communicatively connected to a fourth device. The first device may be the device a 11 in FIG. 8A to 8I, FIG. 9A to FIG. 9C, and FIG. 10A-1-FIG. 10A-4 to FIG. 10C-1-FIG. 10C-4, and the fourth device may be the device b 12 in FIG. 8A to FIG. 8I, FIG. 9A to FIG. 9C, and FIG. 10A-1-FIG. 10A-4 to FIG. 10C-1-FIG. 10C-4. For the system module, refer to the description of the system service in FIG. 8A to FIG. 8I, FIG. 9A to FIG. 9C, and FIG. 10A-1-FIG. 10A-4 to FIG. 10C-1-FIG. 10C-4; for a specific implementation of the fourth application, refer to the description of the application A in FIG. 8A to FIG. 8I, FIG. 9A to FIG. 9C, and FIG. 10A-1-FIG. 10A-4 to FIG. 10C-1-FIG. 10C-4; for a specific implementation of the fourth application module, refer to the description of the meta-ability A1 in FIG. 8A to FIG. 8I, FIG. 9A to FIG. 9C, and FIG. 10A-1-FIG. 10A-4 to FIG. 10C-1-FIG. 10C-4; and for a specific implementation of a first server, refer to the description of the HAG server in FIG. 8A to FIG. 8I, FIG. 9A to FIG. 9C, and FIG. 10A-1-FIG. 10A-4 to FIG. 10C-1-FIG. 10C-4. Details are not described herein.

As shown in FIG. 15, the application module startup method according to this application may include the following steps.

S1601: In response to receiving a fourth operation of a user, the fourth application module sends a ninth message to the system module, where the ninth message is associated with a fifth application module, the fifth application module is a software module in a fifth application, and the fourth application is different from the fifth application.

For the fourth operation, refer to the operation 3 in FIG. 10A-1-FIG. 10A-4 to FIG. 10C-1-FIG. 10C-4; for the fifth application module, refer to the description of the meta-ability C1 in FIG. 10A-1-FIG. 10A-4 to FIG. 10C-1-FIG. 10C-4; for the fifth application, refer to the description of the application C in FIG. 10A-1-FIG. 10A-4 to FIG. 10C-1-FIG. 10C-4; and for the ninth message, refer to the description of step S501 in FIG. 10A-1 to FIG. 10A-4, or the description of step S602 in FIG. 10B-1 to FIG. 10B-4, or the description of step S702 in FIG. 10C-1 to FIG. 10C-4. Details are not described herein.

S1602: In response to receiving the ninth message, the system module determines whether the fifth application module is installed on the first device and the fourth device.

For a specific implementation of the foregoing process, refer to the description of step S503 in FIG. 10A-1 to FIG. 10A-4, or the description of step S603 in FIG. 10B-1 to FIG. 10B-4, or the description of step S703 in FIG. 10C-1 to FIG. 10C-4. Details are not described herein.

S1603: In response to determining that the fifth application module is not installed on the first device and the fourth device, the system module sends a tenth message to a first server, where the tenth message is used to download the fifth application module.

For a specific implementation of the foregoing process, refer to the description of step S504 in FIG. 10A-1 to FIG. 10A-4, or the description of step S604 in FIG. 10B-1 to FIG. 10B-4, or the description of step S704 in FIG. 10C-1 to FIG. 10C-4. Details are not described herein.

S1604: The system module receives an eleventh message from the first server, where the eleventh message is a message that is associated with the fifth application module and that is obtained by the first server in response to receiving the tenth message.

For a specific implementation of the foregoing process, refer to the description of step S506 in FIG. 10A-1 to FIG. 10A-4, or the description of step S606 in FIG. 10B-1 to FIG. 10B-4, or the description of step S706 in FIG. 10C-1 to FIG. 10C-4. Details are not described herein.

S1605: In response to receiving the eleventh message, the system module downloads, installs, and starts the fifth application module on the first device and/or the fourth device.

For a specific implementation of the foregoing process, refer to step S507 and step S509 to step S523 in FIG. 10A-1 to FIG. 10A-4, or the description of step S607 and the description of step S609 to step S623 in FIG. 10B-1 to FIG. 10B-4, or the description of step S707 and step S709 to step S723 in FIG. 10C-1 to FIG. 10C-4. Details are not described herein.

In some embodiments, the application module startup method according to this application may specifically include step S1701 to step S17033.

Step S1701: A system module receives an eleventh message from a first server, where the eleventh message carries a download address of a fifth application module and a device type applicable to the download address of the fifth application module.

For a specific implementation of step S1701, refer to the description of step S506 in FIG. 10A-1 to FIG. 10A-4, or the description of step S606 in FIG. 10B-1 to FIG. 10B-4, or the description of step S706 in FIG. 10C-1 to FIG. 10C-4. Details are not described herein.

Step S1702: In response to receiving the eleventh message, the system module determines whether the device type applicable to the download address of the fifth application module includes the first device and the fourth device.

For a specific implementation of step S1702, refer to the description of step S507, step S509, and step S510 in FIG. 10A-1 to FIG. 10A-4, or the description of step S607, step S609, and step S610 in FIG. 10B-1 to FIG. 10B-4, or the description of step S707, step S709, and step S710 in FIG. 10C-1 to FIG. 10C-4. Details are not described herein.

Step S17031: In response to determining that the device type applicable to the download address of the fifth application module includes the first device, the system module downloads the fifth application module from a second server based on the download address of the fifth application module, installs the fifth application module on the first device, and starts the fifth application module on the first device.

For a specific implementation of step S17031, refer to the description of step S518 to step S523 in FIG. 10A-1 to FIG. 10A-4, or the description of step S618 to step S623 in FIG. 10B-1 to FIG. 10B-4, or the description of step S718 to step S723 in FIG. 10C-1 to FIG. 10C-4. Details are not described herein.

Step S17032: In response to determining that the device type applicable to the download address of the fifth application module includes the fourth device, the system module sends a twelfth message to the fourth device, where the twelfth message is used to request the fourth device to start the fifth application module, and the twelfth message carries the download address of the fifth application module.

For a specific implementation of step S17032, refer to the description of step S511 in FIG. 10A-1 to FIG. 10A-4, or the description of step S611 in FIG. 10B-1 to FIG. 10B-4, or the description of step S711 in FIG. 10C-1 to FIG. 10C-4. Details are not described herein.

Step S17033: In response to determining that the device type applicable to the download address of the fifth application module includes the first device and the fourth device, the system module displays a second window, where the second window includes a control corresponding to the first device and a control corresponding to the fourth device; in response to receiving a fifth operation of the user on the control corresponding to the first device in the second window, the system module downloads the fifth application module from a second server based on the download address of the fifth application module, installs the fifth application module on the first device, and starts the fifth application module on the first device; and/or, in response to receiving a fifth operation of the user on the control corresponding to the fourth device in the second window, the system module sends a twelfth message to the fourth device, where the twelfth message is used to request the fourth device to start the fifth application module, and the twelfth message carries the download address of the fifth application module.

For a specific implementation of the second window, refer to the description of the window 2 in FIG. 10A-1 to FIG. 10A-4, or the description of the window 3 in FIG. 10B-1 to FIG. 10B-4, or the description of the window 4 in FIG. 10C-1 to FIG. 10C-4. The fifth operation may include, but is not limited to, a type of operation such as tap, double tap, touch and hold, or touch. For a specific implementation of step S17033, refer to the description of step 520 to step S523 and step S511 in FIG. 10A-1 to FIG. 10A-4, or the description of step S620 to step S623 and step S611 in FIG. 10B-1 to FIG. 10B-4, or the description of step S720 to step S723 and step S711 in FIG. 10C-1 to FIG. 10C-4. Details are not described herein.

In some embodiments, when the system module includes a distributed schedule manager service DMS and a bundle manager service BMS, the application module startup method according to this application may include step S1801 to step S18083.

Step S1801: In response to receiving the fourth operation, the fourth application module sends the ninth message to the distributed schedule manager service DMS, where the ninth message carries an identifier of the fifth application and a module identifier of the fifth application module.

For a specific implementation of the identifier of the fifth application, refer to the description of the package name of the application C in FIG. 10A-1 to FIG. 10A-4; for a specific implementation of the module identifier of the fifth application module, refer to the description of the meta-ability name of the meta-ability C1 in FIG. 10A-1 to FIG. 10A-4; for a specific implementation of the fourth operation, refer to the description of the operation 3 in step S501 in FIG. 10A-1 to FIG. 10A-4; and for a specific implementation of step S1801, refer to the description of step S501 in FIG. 10A-1 to FIG. 10A-4. Details are not described herein.

Step S1802: In response to receiving the ninth message, the distributed schedule manager service DMS sends a thirteenth message to the bundle manager service BMS, where the thirteenth message carries the identifier of the fifth application and the module identifier of the fifth application module. For a specific implementation of step S1802, refer to the description of step S502 in FIG. 10A-1 to FIG. 10A-4. Details are not described herein.

Step S1803: In response to receiving the thirteenth message, the bundle manager service BMS determines whether the fifth application module is installed on the first device and the fourth device. For a specific implementation of step S1803, refer to the description of step S503 in FIG. 10A-1 to FIG. 10A-4. Details are not described herein.

Step S1804: In response to determining that the fifth application module is not installed on the first device and the fourth device, the bundle manager service BMS sends the tenth message to the first server, where the tenth message carries the identifier of the fifth application and the module identifier of the fifth application module. For a specific implementation of step S1804, refer to the description of step S504 in FIG. 10A-1 to FIG. 10A-4. Details are not described herein.

Step S1805: The bundle manager service BMS receives the eleventh message from the first server, where the eleventh message carries the download address of the fifth application module, the device type applicable to the download address of the fifth application module, the identifier of the fifth application, and the module identifier of the fifth application module.

For a specific method for determining the eleventh message, refer to the description of step S505 in FIG. 10A-1 to FIG. 10A-4. For a specific implementation of step S1805, refer to the description of step S506 in FIG. 10A-1 to FIG. 10A-4. Details are not described herein.

Step S1806: In response to receiving the eleventh message, the bundle manager service BMS sends a fourteenth message to the distributed schedule manager service DMS, where the fourteenth message carries the download address of the fifth application module, the device type applicable to the download address of the fifth application module, the identifier of the fifth application, and the module identifier of the fifth application module.

For a specific implementation of step S1806, refer to the description of step S507 or step S508 in FIG. 10A-1 to FIG. 10A-4. Details are not described herein.

Step S1807: In response to receiving the fourteenth message, the distributed schedule manager service DMS determines whether the device type applicable to the download address of the fifth application module includes the first device and the fourth device. For a specific implementation of step S1807, refer to the description of step S509 and step S510 in FIG. 10A-1 to FIG. 10A-4. Details are not described herein.

Step S18081: In response to determining that the device type applicable to the download address of the fifth application module includes the first device, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; and in response to receiving the sixteenth message, the distributed schedule manager service DMS starts the fifth application module on the first device.

For a specific implementation of step S18081, refer to the description of step S518 to step S523 in FIG. 10A-1 to FIG. 10A-4. Details are not described herein.

Step S18082: In response to determining that the device type applicable to the download address of the fifth application module includes the fourth device, the distributed schedule manager service DMS sends a twelfth message to a distributed schedule manager service DMS in the fourth device, where the twelfth message is used to request the fourth device to start the fifth application module, and the twelfth message carries the download address of the fifth application module, a device identifier of the fourth device, the identifier of the fifth application, and the module identifier of the fifth application module.

For a specific implementation of step S18082, refer to the description of step S511 in FIG. 10A-1 to FIG. 10A-4. Details are not described herein.

Step S18083: In response to determining that the device type applicable to the download address of the fifth application module includes the first device and the fourth device, the distributed schedule manager service DMS displays a second window, where the second window includes a control corresponding to the first device and a control corresponding to the fourth device; in response to receiving a fifth operation of the user on the control corresponding to the first device in the second window, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; in response to receiving the sixteenth message, starting the fifth application module on the first device by the distributed schedule manager service DMS; and/or, in response to receiving a fifth operation of the user on the control corresponding to the fourth device in the second window, the distributed schedule manager service DMS sends the twelfth message to a distributed schedule manager service DMS in the fourth device, where the twelfth message is used to request the fourth device to start the fifth application module, and the twelfth message carries the download address of the fifth application module, the device identifier of the fourth device, the identifier of the fifth application, and the module identifier of the fifth application module.

For a specific implementation of step S18083, refer to the description of step S518 to step S523 and step S511 in FIG. 10A-1 to FIG. 10A-4. Details are not described herein.

In some embodiments, when the system module includes a distributed schedule manager service DMS and a bundle manager service BMS, the application module startup method according to this application may include step S1901 to step S19083.

Step S1901: In response to receiving the fourth operation, the fourth application module sends the ninth message to the distributed schedule manager service DMS, where the ninth message carries an identifier of the fifth application and an identifier of a type of the fifth application module.

For a specific implementation of the identifier of the fifth application, refer to the description of the package name of the application C in FIG. 10B-1 to FIG. 10B-4; for a specific implementation of the identifier of the type of the fifth application module, refer to the description of the predefined ACTION2 of the meta-ability C1 in FIG. 10B-1 to FIG. 10B-4; for a specific implementation of the fourth operation, refer to the description of the operation 3 in step S601 in FIG. 10B-1 to FIG. 10B-4; and for a specific implementation of step S1901, refer to the description of step S601 in FIG. 10B-1 to FIG. 10B-4. Details are not described herein.

Step S1902: In response to receiving the ninth message, the distributed schedule manager service DMS sends a thirteenth message to the bundle manager service BMS, where the thirteenth message carries the identifier of the fifth application and the identifier of the type of the fifth application module. For a specific implementation of step S1902, refer to the description of step S602 in FIG. 10B-1 to FIG. 10B-4. Details are not described herein.

Step S1903: In response to receiving the thirteenth message, the bundle manager service BMS determines whether the fifth application module is installed on the first device and the fourth device. For a specific implementation of step S1903, refer to the description of step S603 in FIG. 10B-1 to FIG. 10B-4. Details are not described herein.

Step S1904: In response to determining that the fifth application module is not installed on the first device and the fourth device, the bundle manager service BMS sends the tenth message to the first server, where the tenth message carries the identifier of the fifth application and the identifier of the type of the fifth application module. For a specific implementation of step S1904, refer to the description of step S604 in FIG. 10B-1 to FIG. 10B-4. Details are not described herein.

Step S1905: The bundle manager service BMS receives the eleventh message from the first server, where the eleventh message carries the download address of the fifth application module, the device type applicable to the download address of the fifth application module, the identifier of the fifth application, and the identifier of the type of the fifth application module.

For a specific method for determining the eleventh message, refer to the description of step S605 in FIG. 10B-1 to FIG. 10B-4. For a specific implementation of step S1905, refer to the description of step S606 in FIG. 10B-1 to FIG. 10B-4. Details are not described herein.

Step S1906: In response to receiving the eleventh message, the bundle manager service BMS sends a fourteenth message to the distributed schedule manager service DMS, where the fourteenth message carries the download address of the fifth application module, the device type applicable to the download address of the fifth application module, the identifier of the fifth application, and the identifier of the type of the fifth application module.

For a specific implementation of step S1906, refer to the description of step S607 or step S608 in FIG. 10B-1 to FIG. 10B-4. Details are not described herein.

Step S1907: In response to receiving the fourteenth message, the distributed schedule manager service DMS determines whether the device type applicable to the download address of the fifth application module includes the first device and the fourth device.

For a specific implementation of step S1907, refer to the description of step S609 and step S610 in FIG. 10B-1 to FIG. 10B-4. Details are not described herein.

Step S19081: In response to determining that the device type applicable to the download address of the fifth application module includes the first device, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; and in response to receiving the sixteenth message, the distributed schedule manager service DMS starts the fifth application module on the first device.

For a specific implementation of step S19081, refer to the description of step S618 to step S623 in FIG. 10B-1 to FIG. 10B-4. Details are not described herein.

Step S19082: In response to determining that the device type applicable to the download address of the fifth application module includes the fourth device, the distributed schedule manager service DMS sends a twelfth message to a distributed schedule manager service DMS in the fourth device, where the twelfth message is used to request the fourth device to start the fifth application module, and the twelfth message carries the download address of the fifth application module, a device identifier of the fourth device, the identifier of the fifth application, and the identifier of the type of the fifth application module.

For a specific implementation of step S19082, refer to the description of step S611 in FIG. 10B-1 to FIG. 10B-4. Details are not described herein.

Step S19083: In response to determining that the device type applicable to the download address of the fifth application module includes the first device and the fourth device, the distributed schedule manager service DMS displays a second window, where the second window includes a control corresponding to the first device and a control corresponding to the fourth device; in response to receiving a fifth operation of the user on the control corresponding to the first device in the second window, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; in response to receiving the sixteenth message, starting the fifth application module on the first device by the distributed schedule manager service DMS; and/or, in response to receiving a fifth operation of the user on the control corresponding to the fourth device in the second window, the distributed schedule manager service DMS sends the twelfth message to a distributed schedule manager service DMS in the fourth device, where the twelfth message is used to request the fourth device to start the fifth application module, and the twelfth message carries the download address of the fifth application module, the device identifier of the fourth device, the identifier of the fifth application, and the identifier of the type of the fifth application module.

For a specific implementation of step S19083, refer to the description of step S618 to step S623 and step S611 in FIG. 10B-1 to FIG. 10B-4. Details are not described herein.

In some embodiments, when the system module includes a distributed schedule manager service DMS and a bundle manager service BMS, the application module startup method according to this application may include step S2001 to step S20083.

Step S2001: In response to receiving the fourth operation, the fourth application module sends the ninth message to the distributed schedule manager service DMS, where the ninth message carries an identifier of a type of the fifth application module.

For a specific implementation of the identifier of the type of the fifth application module, refer to the description of the predefined ACTION2 in FIG. 10C-1 to FIG. 10C-4; for a specific implementation of the fourth operation, refer to the description of the operation 3 in step S601 in FIG. 10C-1 to FIG. 10C-4; and for a specific implementation of step S2001, refer to the description of step S701 in FIG. 10C-1 to FIG. 10C-4. Details are not described herein.

Step S2002: In response to receiving the ninth message, the distributed schedule manager service DMS sends a thirteenth message to the bundle manager service BMS, where the thirteenth message carries the identifier of the type of the fifth application module. For a specific implementation of step S2002, refer to the description of step S702 in FIG. 10C-1 to FIG. 10C-4. Details are not described herein.

Step S2003: In response to receiving the thirteenth message, the bundle manager service BMS determines whether the fifth application module is installed on the first device and the fourth device. For a specific implementation of step S2003, refer to the description of step S703 in FIG. 10C-1 to FIG. 10C-4. Details are not described herein.

Step S2004: In response to determining that the fifth application module is not installed on the first device and the fourth device, the bundle manager service BMS sends the tenth message to the first server, where the tenth message carries the identifier of the type of the fifth application module. For a specific implementation of step S2004, refer to the description of step S704 in FIG. 10C-1 to FIG. 10C-4. Details are not described herein.

Step S2005: The bundle manager service BMS receives the eleventh message from the first server, where the eleventh message carries a second set, each subset in the second set carries an identifier of an application, a module identifier of a software module included in the application, and a device type applicable to a download address of the software module, and a corresponding software module in each subset and the fifth application module are of a same type.

For a specific method for determining the eleventh message, refer to the description of step S705 in FIG. 10C-1 to FIG. 10C-4. For a specific implementation of step S2005, refer to the description of step S706 in FIG. 10C-1 to FIG. 10C-4. Details are not described herein.

Step S2006: In response to receiving the eleventh message, the bundle manager service BMS sends a fourteenth message to the distributed schedule manager service DMS, where the fourteenth message carries the second set. For a specific implementation of step S2006, refer to the description of step S707 or step S708 in FIG. 10C-1 to FIG. 10C-4. Details are not described herein.

Step S2007: In response to receiving the fourteenth message, the distributed schedule manager service DMS determines whether the device type applicable to the download address of the fifth application module in the second set includes the first device and the fourth device. For a specific implementation of step S2007, refer to the description of step S709 and step S710 in FIG. 10C-1 to FIG. 10C-4. Details are not described herein.

Step S20081: In response to determining that the device type applicable to the download address of the fifth application module in the second set includes the first device, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; and in response to receiving the sixteenth message, the distributed schedule manager service DMS starts the fifth application module on the first device.

For a specific implementation of step S20081, refer to the description of step S718 to step S723 in FIG. 10C-1 to FIG. 10C-4. Details are not described herein.

Step S20082: In response to determining that the device type applicable to the download address of the fifth application module in the second set includes the fourth device, the distributed schedule manager service DMS sends a twelfth message to a distributed schedule manager service DMS in the fourth device, where the twelfth message is used to request the fourth device to start the fifth application module, and the twelfth message carries the download address of the fifth application module, a device identifier of the fourth device, the identifier of the fifth application, and the identifier of the type of the fifth application module.

For a specific implementation of step S20082, refer to the description of step S711 in FIG. 10C-1 to FIG. 10C-4. Details are not described herein.

Step S20083: In response to determining that the device type applicable to the download address of the fifth application module in the second set includes the first device and the fourth device, the distributed schedule manager service DMS displays a second window, where the second window includes a control corresponding to the first device and a control corresponding to the fourth device; in response to receiving a fifth operation of the user on the control corresponding to the first device in the second window, the distributed schedule manager service DMS sends a fifteenth message to the bundle manager service BMS, where the fifteenth message is used to request download of the fifth application module; in response to receiving the fifteenth message, the bundle manager service BMS downloads the fifth application module from a second server based on the download address of the fifth application module, installs the fifth application module on the first device, and sends a sixteenth message to the distributed schedule manager service DMS; in response to receiving the sixteenth message, starting the fifth application module on the first device by the distributed schedule manager service DMS; and/or, in response to receiving a fifth operation of the user on the control corresponding to the fourth device in the second window, the distributed schedule manager service DMS sends the twelfth message to a distributed schedule manager service DMS in the fourth device, where the twelfth message is used to request the fourth device to start the fifth application module, and the twelfth message carries the download address of the fifth application module, the device identifier of the fourth device, the identifier of the fifth application, and the identifier of the type of the fifth application module.

For a specific implementation of step S20083, refer to the description of step S718 to step S723 and step S711 in FIG. 10C-1 to FIG. 10C-4. Details are not described herein.

In some embodiments, the method further includes: In response to determining that the fifth application module has been installed on the first device, and the fifth application module is not installed on the fourth device, the system module starts the fifth application module on the first device module.

For a specific implementation of the foregoing process, refer to the description of step S508, step S509, step S518, and step S523 in FIG. 10A-1 to FIG. 10A-4, or the description of step S608, step S609, step S618, and step S623 in FIG. 10B-1 to FIG. 10B-4, or the description of step S708, step S709, step S718, and step S723 in FIG. 10C-1 to FIG. 10C-4. Details are not described herein.

In some embodiments, the method further includes: In response to determining that the fifth application module is not installed on the first device, and the fifth application module has been installed on the fourth device, the system module sends a seventeenth message to the fourth device, where the seventeenth message is used to request the fourth device to start the fifth application module.

For a specific implementation of the foregoing process, refer to the description of step S508, step S509, and step S511 in FIG. 10A-1 to FIG. 10A-4, or the description of step S608, step S609, and step S611 in FIG. 10B-1 to FIG. 10B-4, or the description of step S708, step S709, and step S711 in FIG. 10C-1 to FIG. 10C-4. Details are not described herein.

In some embodiments, the method further includes: in response to determining that the fifth application module has been installed on both the first device and the fourth device, the system module displays a third window, where the third window includes a control corresponding to the first device and a control corresponding to the fourth device; in response to receiving a sixth operation of the user on the control corresponding to the first device in the third window, the system module downloads the fifth application module from a second server based on the download address of the fifth application module, installs the fifth application module on the first device, and starts the fifth application module on the first device; and/or, in response to receiving a sixth operation of the user on the control corresponding to the fourth device in the third window, the system module sends a seventeenth message to the fourth device, where the seventeenth message is used to request the fourth device to start the fifth application module.

The sixth operation may include, but is not limited to, a type of operation such as tap, double tap, touch and hold, or touch. For a specific implementation of the third window, refer to the description of the window 2. For a specific implementation of the foregoing process, refer to the description of step S508 to step S510, step S518, step S523, and step S511 in FIG. 10A-1 to FIG. 10A-4, or the description of step S608 to step S610, step S618, step S623, and step S611 in FIG. 10B-1 to FIG. 10B-4, or the description of step S708 to step S710, step S718, step S723, and step S711 in FIG. 10C-1 to FIG. 10C-4. Details are not described herein.

For example, this application provides an electronic device, including a memory and a processor, where the memory is configured to store program instructions; and the processor is configured to invoke the program instructions in the memory, so that the electronic device performs the application module startup method according to the foregoing embodiments.

For example, this application provides a chip system, where the chip system is applied to an electronic device including a memory, a display, and a sensor; the chip system includes a processor; and the electronic device performs the application module startup method according to the foregoing embodiments.

For example, this application provides a computer readable storage medium storing a computer program, where when the computer program is executed by a processor, an electronic device is enabled to implement the application module startup method according to the foregoing embodiments.

For example, this application provides a computer program product, where when the computer program product runs on a computer, the computer is enabled to perform the application module startup method according to the foregoing embodiments.

In the foregoing embodiments, all or some functions may be implemented by using software, hardware, or a combination of software and hardware. When being implemented by using software, all or some of the functions may be implemented in the form of a computer program product. The computer program product includes one or more computer instructions. When the computer program instructions are loaded and executed on a computer, all or some processes or functions according to this embodiment of this application are generated. The computer may be a general-purpose computer, a special-purpose computer, a computer network, or another programmable apparatus. The computer instructions may be stored in the computer readable storage medium. The computer readable storage medium may be any available medium that can be accessed by a computer or a data storage device such as a server or a data center that includes one or an integration of more available media. The available medium may be a magnetic medium (for example, a floppy disk, a hard disk or a magnetic tape), an optical medium (for example, DVD), a semiconductor medium (for example, a solid state disk (solid state disk, SSD)), or the like.

A person of ordinary skill in the art may understand that all or some processes in implementing the method of the foregoing embodiment may be completed by using a computer program to instruct related hardware. The program may be stored in the computer readable storage medium. When the program is executed, the processes of the foregoing method embodiments are performed. The foregoing storage medium includes various media that can store program code, such as an ROM, a random access memory RAM, a magnetic disk, or an optical disk.

What is claimed is:

1. A method, wherein the method is applied to a first device, the first device implements a system service, the first device further implements a second application service, and the method comprises:
   in response to receiving a first operation of a user, sending a first message to the system service by the second application service;
   receiving the first message by the system service, wherein the first message is associated with a first application service, and the first application service is a service of a first application installed on the first device, wherein the first message carries an identifier of the first application and an identifier of the first application service, and the second application service is a service of a second application, and wherein the first application is a different application than the second application;
   in response to receiving the first message, determining, by the system service, that the first application service is not installed on the first device;
   in response to determining that the first application service is not installed on the first device, sending a second message to a first server by the system service, wherein the second message requests to download the first application service;
   receiving a third message from the first server by the system service, wherein the third message is associated with the first application service and is obtained by the first server in response to receiving the second message; and
   in response to receiving the third message, downloading, installing and starting the first application service on the first device by the system service.

2. The method according to claim 1, wherein:
   the third message carries a download address of the first application service; and
   in response to receiving the third message, downloading, installing and starting the first application service on the first device by the system service comprises:
      in response to receiving the third message, downloading the first application service from a second server by the system service; and
      installing, by the system service, the first application service on the first device, and starting the first application service.

3. The method according to claim 1, wherein the system service comprises a distributed schedule manager service (DMS) and a bundle manager service (BMS), and wherein:
   receiving the first message by the system service comprises:
      receiving the first message by the DMS, wherein the identifier of the first application service in the first message is a service identifier of the first application service;
   in response to receiving the first message, determining, by the system service, whether the first application service is installed on the first device comprises:
      in response to receiving the first message, sending a fourth message to the BMS by the DMS, wherein the fourth message carries the identifier of the first application and the service identifier of the first application service; and
      in response to receiving the fourth message, determining, by the BMS, whether the first application service is installed on the first device;
   wherein in response to determining that the first application service is not installed on the first device, sending the second message to the first server by the system service comprises:
      in response to determining that the first application service is not installed on the first device, sending the second message to the first server by the BMS, wherein the second message carries a device identifier of the first device, the identifier of the first application, and the service identifier of the first application service;
   wherein receiving the third message from the first server by the system service comprises:
      receiving the third message from the first server by the BMS, wherein the third message carries a download address of the first application service, the identifier of the first application, and the service identifier of the first application service; and
   wherein in response to receiving the third message, downloading, installing and starting the first application service on the first device by the system service comprises:
      in response to receiving the third message, downloading, by the BMS, the first application service from a second server based on the download address of the first application service, and installing the first application service on the first device;
      sending a fifth message to the DMS by the BMS, wherein the fifth message notifies the DMS that the first application service has been installed on the first device; and
      in response to receiving the fifth message, starting the first application service by the DMS.

4. The method according to claim 1, wherein the system service comprises a distributed schedule manager service (DMS) and a bundle manager service (BMS), and wherein:
   receiving the first message by the system service comprises:
      receiving the first message by the DMS, wherein the identifier of the first application service in the first message is an identifier of a type of the first application service;
   in response to receiving the first message, determining, by the system service, whether the first application service is installed on the first device comprises:
      in response to receiving the first message, sending a fourth message to the BMS by the DMS, wherein the fourth message carries the identifier of the first application and the identifier of the type of the first application service;

in response to receiving the fourth message, determining, by the BMS, whether the first application service is installed on the first device;

wherein in response to determining that the first application service is not installed on the first device, sending the second message to the first server by the system service comprises:

in response to determining that the first application service is not installed on the first device, sending the second message to the DMS by the BMS, wherein the second message carries a device identifier of the first device, the identifier of the first application, and the identifier of the type of the first application service;

wherein receiving the third message from the first server by the system service comprises:

receiving the third message from the first server by the BMS, wherein the third message carries a download address of the first application service, the identifier of the first application, and the identifier of the type of the first application service; and in response to receiving the third message, downloading, installing and starting the first application service on the first device by the system service comprises:

in response to receiving the third message, downloading, by the BMS, the first application service from a second server based on the download address of the first application service, and installing the first application service on the first device;

sending a fifth message to the DMS by the BMS, wherein the fifth message notifies the DMS that the first application service has been installed on the first device; and in response to receiving the fifth message, starting the first application service by the DMS.

5. The method according to claim 1, wherein the system service comprises a distributed schedule manager service (DMS) and a bundle manager service (BMS), and wherein:

receiving the first message by the system service comprises:

receiving the first message by the DMS, wherein the identifier of the first application service in the first message is an identifier of a type of the first application service;

in response to receiving the first message, determining, by the system service, whether the first application service is installed on the first device comprises:

in response to receiving the first message, sending a fourth message to the BMS by the DMS, wherein the fourth message carries the identifier of the type of the first application service; and in response to receiving the fourth message, determining, by the BMS, whether the first application service is installed on the first device;

wherein in response to determining that the first application service is not installed on the first device, sending the second message to the first server by the system service comprises:

in response to determining that the first application service is not installed on the first device, sending the second message to the first server by the BMS, wherein the second message carries a device identifier of the first device and the identifier of the type of the first application service;

wherein receiving the third message from the first server by the system service comprises:

receiving the third message from the first server by the BMS, wherein the third message carries a first set, each subset in the first set carries an identifier of an application, a service identifier of a service corresponding to the application, and a download address of the service, and a corresponding service in each subset and the first application service are of a same type; and in response to receiving the third message, downloading, installing and starting the first application service on the first device by the system service comprises:

in response to receiving the third message, downloading, by the BMS, a selected service from a second server based on a download address of the selected service from the first set, and installing the selected service on the first device;

sending a fifth message to the DMS by the BMS, wherein the fifth message notifies the DMS that the first application service has been installed on the first device; and in response to receiving the fifth message, starting the selected service by the DMS.

6. The method according to claim 5, further comprising:

in response to receiving the third message, sending a sixth message to the DMS by the BMS, wherein the sixth message carries the first set;

performing the following:

in response to receiving the sixth message, determining the selected service from the first set by the DMS based on a preset rule; or in response to receiving the sixth message, displaying a first window by the DMS, wherein the first window comprises controls corresponding to services in the first set; and in response to receiving a third operation of a user on a control corresponding to the selected service in the first window, determining the selected service by the DMS;

sending a seventh message to the BMS by the DMS, wherein the seventh message carries an identifier of an application to which the selected service belongs and a service identifier of the selected service; and in response to receiving the seventh message, determining, by the BMS, a download address of the selected service from the first set based on the identifier of the application to which the selected service belongs to and the service identifier of the selected service.

7. The method according to claim 1, wherein the first device is communicatively connected to a third device; and the method further comprises:

sending an eighth message to the third device by the system service, wherein the eighth message requests the third device to start a third application service, the third application service corresponds to a third application, and the third application service is not installed on the third device, and wherein:

the eighth message carries a device identifier of the third device, an identifier of the third application, and a service identifier of the third application service, or the eighth message carries a device identifier of the third device, an identifier of the third application, and an identifier of a type of the third application service, or the eighth message carries a device identifier of the third device and an identifier of a type of the third application service.

8. The method according to claim 7, wherein the method specifically comprises:
sending the eighth message to a distributed schedule manager service (DMS) in the third device by a DMS in the system service.

9. An electronic device, comprising:
a display;
a non-transitory memory; and
one or more processors;
wherein the display and the memory are coupled to the one or more processors, the display is configured to display an image generated by the one or more processors, the memory is configured to store computer program code, and the computer program code comprises computer instructions, and when the computer instructions are executed by the one or more processors, the electronic device is enabled to implement a system service and a second application service, and to perform the following operations:
in response to receiving a first operation of a user, sending a first message to the system service by the second application service;
receiving the first message by the system service, wherein the first message is associated with a first application service, the first application service corresponds to a first application, wherein the first message carries an identifier of the first application and an identifier of the first application service, and the second application service is a service of a second application, and wherein the first application is a different application than the second application;
in response to receiving the first message, determining, by the system service, whether the first application service is installed on the electronic device;
in response to determining that the first application service is not installed on the electronic device, sending a second message to a first server by the system service, wherein the second message requests to download the first application service;
receiving a third message from the first server by the system service, wherein the third message is associated with the first application service and is obtained by the first server in response to receiving the second message; and
in response to receiving the third message, downloading, installing and starting the first application service on the electronic device by the system service.

10. The electronic device according to claim 9, wherein:
the third message carries a download address of the first application service; and
in response to receiving the third message, downloading, installing and starting the first application service on the electronic device by the system service comprises:
in response to receiving the third message, downloading the first application service from a second server by the system service; and
installing, by the system service, the first application service on the electronic device, and starting the first application service.

11. The electronic device according to claim 9, wherein the system service comprises a distributed schedule manager service (DMS) and a bundle manager service (BMS), and wherein:
receiving the first message by the system service comprises:
receiving the first message by the DMS, wherein the identifier of the first application service in the first message is a service identifier of the first application service;
in response to receiving the first message, determining, by the system service, whether the first application service is installed on the electronic device comprises:
in response to receiving the first message, sending a fourth message to the BMS by the DMS, wherein the fourth message carries the identifier of the first application and the service identifier of the first application service; and
in response to receiving the fourth message, determining, by the BMS, whether the first application service is installed on the electronic device;
wherein in response to determining that the first application service is not installed on the electronic device, sending the second message to the first server by the system service comprises:
in response to determining that the first application service is not installed on the electronic device, sending the second message to the first server by the BMS, wherein the second message carries a device identifier of the electronic device, the identifier of the first application, and the service identifier of the first application service;
wherein receiving the third message from the first server by the system service comprises:
receiving the third message from the first server by the BMS, wherein the third message carries a download address of the first application service, the identifier of the first application, and the service identifier of the first application service; and
wherein in response to receiving the third message, downloading, installing and starting the first application service on the electronic device by the system service comprises:
in response to receiving the third message, downloading, by the BMS, the first application service from a second server based on the download address of the first application service, and installing the first application service on the electronic device;
sending a fifth message to the DMS by the BMS, wherein the fifth message notifies the DMS that the first application service has been installed on the electronic device; and
in response to receiving the fifth message, starting the first application service by the DMS.

12. The electronic device according to claim 9, wherein the system service comprises a distributed schedule manager service (DMS) and a bundle manager service (BMS), and wherein:
receiving the first message by the system service comprises:
receiving the first message by the DMS, wherein the identifier of the first application service in the first message is an identifier of a type of the first application service;
in response to receiving the first message, determining, by the system service, whether the first application service is installed on the electronic device comprises:
in response to receiving the first message, sending a fourth message to the BMS by the DMS, wherein the fourth message carries the identifier of the first application and the identifier of the type of the first application service;

in response to receiving the fourth message, determining, by the BMS, whether the first application service is installed on the electronic device;
wherein in response to determining that the first application service is not installed on the electronic device, sending the second message to the first server by the system service comprises:
in response to determining that the first application service is not installed on the electronic device, sending the second message to the DMS by the BMS, wherein the second message carries a device identifier of the electronic device, the identifier of the first application, and the identifier of the type of the first application service;
wherein receiving the third message from the first server by the system service comprises:
receiving the third message from the first server by the BMS, wherein the third message carries a download address of the first application service, the identifier of the first application, and the identifier of the type of the first application service; and
in response to receiving the third message, downloading, installing and starting the first application service on the electronic device by the system service comprises:
in response to receiving the third message, downloading, by the BMS, the first application service from a second server based on the download address of the first application service, and installing the first application service on the electronic device;
sending a fifth message to the DMS by the BMS, wherein the fifth message notifies the DMS that the first application service has been installed on the electronic device; and
in response to receiving the fifth message, starting the first application service by the DMS.

13. The electronic device according to claim 9, wherein the system service comprises a distributed schedule manager service (DMS) and a bundle manager service (BMS), and wherein:
receiving the first message by the system service comprises:
receiving the first message by the DMS, wherein the identifier of the first application service in the first message is an identifier of a type of the first application service;
in response to receiving the first message, determining, by the system service, whether the first application service is installed on the electronic device comprises:
in response to receiving the first message, sending a fourth message to the BMS by the DMS, wherein the fourth message carries the identifier of the type of the first application service; and
in response to receiving the fourth message, determining, by the BMS, whether the first application service is installed on the electronic device;
wherein in response to determining that the first application service is not installed on the electronic device, sending the second message to the first server by the system service comprises:
in response to determining that the first application service is not installed on the electronic device, sending the second message to the first server by the BMS, wherein the second message carries a device identifier of the electronic device and the identifier of the type of the first application service;
wherein receiving the third message from the first server by the system service comprises:
receiving the third message from the first server by the BMS, wherein the third message carries a first set, each subset in the first set carries an identifier of an application, a service identifier of a service corresponding to the application, and a download address of the service, and a corresponding service in each subset and the first application service are of a same type; and
in response to receiving the third message, downloading, installing and starting the first application service on the electronic device by the system service comprises:
in response to receiving the third message, downloading, by the BMS, a selected service from a second server based on a download address of the selected service from the first set, and installing the selected service on the electronic device;
sending a fifth message to the DMS by the BMS, wherein the fifth message notifies the DMS that the first application service has been installed on the electronic device; and
in response to receiving the fifth message, starting the selected service by the DMS.

14. The electronic device according to claim 13, wherein when the computer instructions are executed by the one or more processors, the electronic device is enabled perform the following further operations:
in response to receiving the third message, sending a sixth message to the DMS by the BMS, wherein the sixth message carries the first set;
performing the following:
in response to receiving the sixth message, determining the selected service from the first set by the DMS based on a preset rule; or
in response to receiving the sixth message, displaying a first window by the DMS, wherein the first window comprises controls corresponding to services in the first set; and in response to receiving a third operation of a user on a control corresponding to the selected service in the first window, determining the selected service by the DMS;
sending a seventh message to the BMS by the DMS, wherein the seventh message carries an identifier of an application to which the selected service belongs and a service identifier of the selected service; and
in response to receiving the seventh message, determining, by the BMS, a download address of the selected service from the first set based on the identifier of the application to which the selected service belongs to and the service identifier of the selected service.

15. A non-transitory computer-readable storage medium, comprising computer instructions, wherein when the computer instructions are run on an electronic device, the electronic device is enabled to implement a system service and a second application service, and perform the following operations:
in response to receiving a first operation of a user, sending a first message to the system service by the second application service;
receiving the first message by the system service, wherein the first message is associated with a first application service, the first application service corresponds to a first application, wherein the first message carries an identifier of the first application and an identifier of the first application service, and the second application service is a service of a second application, and wherein the first application is a different application than the second application;

in response to receiving the first message, determining, by the system service, whether the first application service is installed on the electronic device;

in response to determining that the first application service is not installed on the first electronic device, sending a second message to a first server by the system service, wherein the second message requests to download the first application service;

receiving a third message from the first server by the system service, wherein the third message is associated with the first application service and is obtained by the first server in response to receiving the second message; and in response to receiving the third message, downloading, installing and starting the first application service on the electronic device by the system service.

16. The non-transitory computer-readable storage medium according to claim 15, wherein:

the third message carries a download address of the first application service; and in response to receiving the third message, downloading, installing and starting the first application service on the electronic device by the system service comprises:

in response to receiving the third message, downloading the first application service from a second server by the system service; and installing, by the system service, the first application service on the electronic device, and starting the first application service.

17. The non-transitory computer-readable storage medium according to claim 15, wherein the system service comprises a distributed schedule manager service (DMS) and a bundle manager service (BMS), and wherein:

receiving the first message by the system service comprises:

receiving the first message by the DMS, wherein the identifier of the first application service in the first message is a service identifier of the first application service;

in response to receiving the first message, determining, by the system service, whether the first application service is installed on the electronic device comprises:

in response to receiving the first message, sending a fourth message to the BMS by the DMS, wherein the fourth message carries the identifier of the first application and the service identifier of the first application service; and in response to receiving the fourth message, determining, by the BMS, whether the first application service is installed on the electronic device;

wherein in response to determining that the first application service is not installed on the electronic device, sending the second message to the first server by the system service comprises:

in response to determining that the first application service is not installed on the electronic device, sending the second message to the first server by the BMS, wherein the second message carries a device identifier of the electronic device, the identifier of the first application, and the service identifier of the first application service;

wherein receiving the third message from the first server by the system service comprises:

receiving the third message from the first server by the BMS, wherein the third message carries a download address of the first application service, the identifier of the first application, and the service identifier of the first application service; and wherein in response to receiving the third message, downloading, installing and starting the first application service on the electronic device by the system service comprises:

in response to receiving the third message, downloading, by the BMS, the first application service from a second server based on the download address of the first application service, and installing the first application service on the electronic device;

sending a fifth message to the DMS by the BMS, wherein the fifth message notifies the DMS that the first application service has been installed on the electronic device; and in response to receiving the fifth message, starting the first application service by the DMS.

18. The non-transitory computer-readable storage medium according to claim 15, wherein the system service comprises a distributed schedule manager service (DMS) and a bundle manager service (BMS), and wherein:

receiving the first message by the system service comprises:

receiving the first message by the DMS, wherein the identifier of the first application service in the first message is an identifier of a type of the first application service;

in response to receiving the first message, determining, by the system service, whether the first application service is installed on the electronic device comprises:

in response to receiving the first message, sending a fourth message to the BMS by the DMS, wherein the fourth message carries the identifier of the first application and the identifier of the type of the first application service;

in response to receiving the fourth message, determining, by the BMS, whether the first application service is installed on the electronic device;

wherein in response to determining that the first application service is not installed on the electronic device, sending the second message to the first server by the system service comprises:

in response to determining that the first application service is not installed on the electronic device, sending the second message to the DMS by the BMS, wherein the second message carries a device identifier of the electronic device, the identifier of the first application, and the identifier of the type of the first application service;

wherein receiving the third message from the first server by the system service comprises:

receiving the third message from the first server by the BMS, wherein the third message carries a download address of the first application service, the identifier of the first application, and the identifier of the type of the first application service; and in response to receiving the third message, downloading, installing and starting the first application service on the electronic device by the system service comprises:

in response to receiving the third message, downloading, by the BMS, the first application service from a second server based on the download address of the first application service, and installing the first application service on the electronic device;

sending a fifth message to the DMS by the BMS, wherein the fifth message notifies the DMS that the first application service has been installed on the electronic device; and in response to receiving the fifth message, starting the first application service by the DMS.

19. The non-transitory computer-readable storage medium according to claim 15, wherein the system service comprises a distributed schedule manager service (DMS) and a bundle manager service (BMS), and wherein:

receiving the first message by the system service comprises:

receiving the first message by the DMS, wherein the identifier of the first application service in the first message is an identifier of a type of the first application service;

in response to receiving the first message, determining, by the system service, whether the first application service is installed on the electronic device comprises:

in response to receiving the first message, sending a fourth message to the BMS by the DMS, wherein the fourth message carries the identifier of the type of the first application service; and in response to receiving the fourth message, determining, by the BMS, whether the first application service is installed on the electronic device;

wherein in response to determining that the first application service is not installed on the electronic device, sending the second message to the first server by the system service comprises:

in response to determining that the first application service is not installed on the electronic device, sending the second message to the first server by the BMS, wherein the second message carries a device identifier of the electronic device and the identifier of the type of the first application service;

wherein receiving the third message from the first server by the system service comprises:

receiving the third message from the first server by the BMS, wherein the third message carries a first set, each subset in the first set carries an identifier of an application, a service identifier of a service corresponding to the application, and a download address of the service, and a corresponding service in each subset and the first application service are of a same type; and in response to receiving the third message, downloading, installing and starting the first application service on the electronic device by the system service comprises:

in response to receiving the third message, downloading, by the BMS, a selected service from a second server based on a download address of the selected service from the first set, and installing the selected service on the electronic device;

sending a fifth message to the DMS by the BMS, wherein the fifth message notifies the DMS that the first application service has been installed on the electronic device; and in response to receiving the fifth message, starting the selected service by the DMS.

\* \* \* \* \*

UNITED STATES PATENT AND TRADEMARK OFFICE
CERTIFICATE OF CORRECTION

PATENT NO. : 12,282,761 B2
APPLICATION NO. : 18/003871
DATED : April 22, 2025
INVENTOR(S) : Liu et al.

Page 1 of 1

It is certified that error appears in the above-identified patent and that said Letters Patent is hereby corrected as shown below:

In the Claims

In Column 111, in Claim 15, Line 5, after "on the" delete "first".

Signed and Sealed this
Twenty-seventh Day of May, 2025

Coke Morgan Stewart
*Acting Director of the United States Patent and Trademark Office*